United States Patent
Mihara

(10) Patent No.: US 7,085,070 B2
(45) Date of Patent: Aug. 1, 2006

(54) ZOOM LENS AND ELECTRONIC IMAGING DEVICE HAVING THE SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 259 days.

(21) Appl. No.: 10/429,043

(22) Filed: May 5, 2003

(65) Prior Publication Data

US 2003/0214726 A1    Nov. 20, 2003

(30) Foreign Application Priority Data

May 14, 2002  (JP)  .............................. 2002-138835
May 16, 2002  (JP)  .............................. 2002-141234

(51) Int. Cl.
  *G02B 15/14* (2006.01)

(52) U.S. Cl. ...................... 359/686; 359/683; 359/685; 359/695; 359/714; 359/715; 359/723; 359/726; 359/737; 359/740; 359/766; 359/774

(58) Field of Classification Search ................ 359/676, 359/683–687, 695, 714, 715, 723, 726, 737, 359/738, 740, 766, 774

See application file for complete search history.

(56) References Cited

U.S. PATENT DOCUMENTS

| 3,649,101 A * | 3/1972 | Straw et al. ................ 359/686 |
| 3,658,411 A | 4/1972 | Price |
| 4,114,171 A | 9/1978 | Altman |
| 4,249,798 A | 2/1981 | Moskovich |
| 5,570,229 A | 10/1996 | Kanamori ................... 359/431 |
| 5,668,668 A | 9/1997 | Shibayama et al. ......... 359/683 |
| 6,016,228 A | 1/2000 | Uzawa ....................... 359/687 |
| 6,088,169 A | 7/2000 | Ohno .......................... 359/682 |
| 6,124,987 A | 9/2000 | Kayanuma et al. ......... 359/692 |
| 6,185,048 B1 | 2/2001 | Ishii et al. .................. 359/687 |
| 6,308,011 B1 | 10/2001 | Wachi et al. ................. 396/72 |
| 6,618,209 B1 * | 9/2003 | Nishioka et al. ............ 359/676 |
| 6,754,446 B1 * | 6/2004 | Hagimori et al. ........... 359/687 |
| 2001/0038496 A1 | 11/2001 | Yamamoto et al. ......... 359/689 |
| 2003/0103268 A1 * | 6/2003 | Nishikawa et al. ......... 359/683 |

FOREIGN PATENT DOCUMENTS

EP            0773460 A2    5/1997

(Continued)

OTHER PUBLICATIONS

Partial European search report (R. 46 EPC).

*Primary Examiner*—Evelyn A. Lester
(74) *Attorney, Agent, or Firm*—Kenyon & Kenyon LLP

(57) ABSTRACT

A zoom lens includes a most object-side lens unit remaining fixed on the optical axis when the magnification of the zoom lens is changed and a focusing operation is performed; a most image-side lens unit remaining fixed when the focusing operation is performed; and a plurality of moving lens units lying between the most object-side lens unit and the most image-side lens unit, moved along the optical axis when the magnification is changed. The most object-side lens unit includes, in order from the object side, a negative lens component, a reflective optical component having a reflecting surface for bending the optical path, and a positive lens component. The most image-side lens unit has at least one aspherical surface. An electronic imaging device includes an electronic image sensor located on the image side of the zoom lens.

55 Claims, 99 Drawing Sheets

FOREIGN PATENT DOCUMENTS

| | | |
|---|---|---|
| EP | 0773460 A3 | 7/1998 |
| EP | 0 906 587 | 9/2002 |
| JP | 63-292108 | 11/1988 |
| JP | 03-139607 | 6/1991 |
| JP | 03-158817 | 7/1991 |
| JP | 7-261073 | 10/1995 |
| JP | 07261073 | 10/1995 |
| JP | 08-070400 | 3/1996 |
| JP | 08-130702 | 5/1996 |
| JP | 09-211287 | 8/1997 |
| JP | 10-020191 | 1/1998 |
| JP | 11-194274 | 7/1999 |
| JP | 2000-137164 | 5/2000 |

* cited by examiner

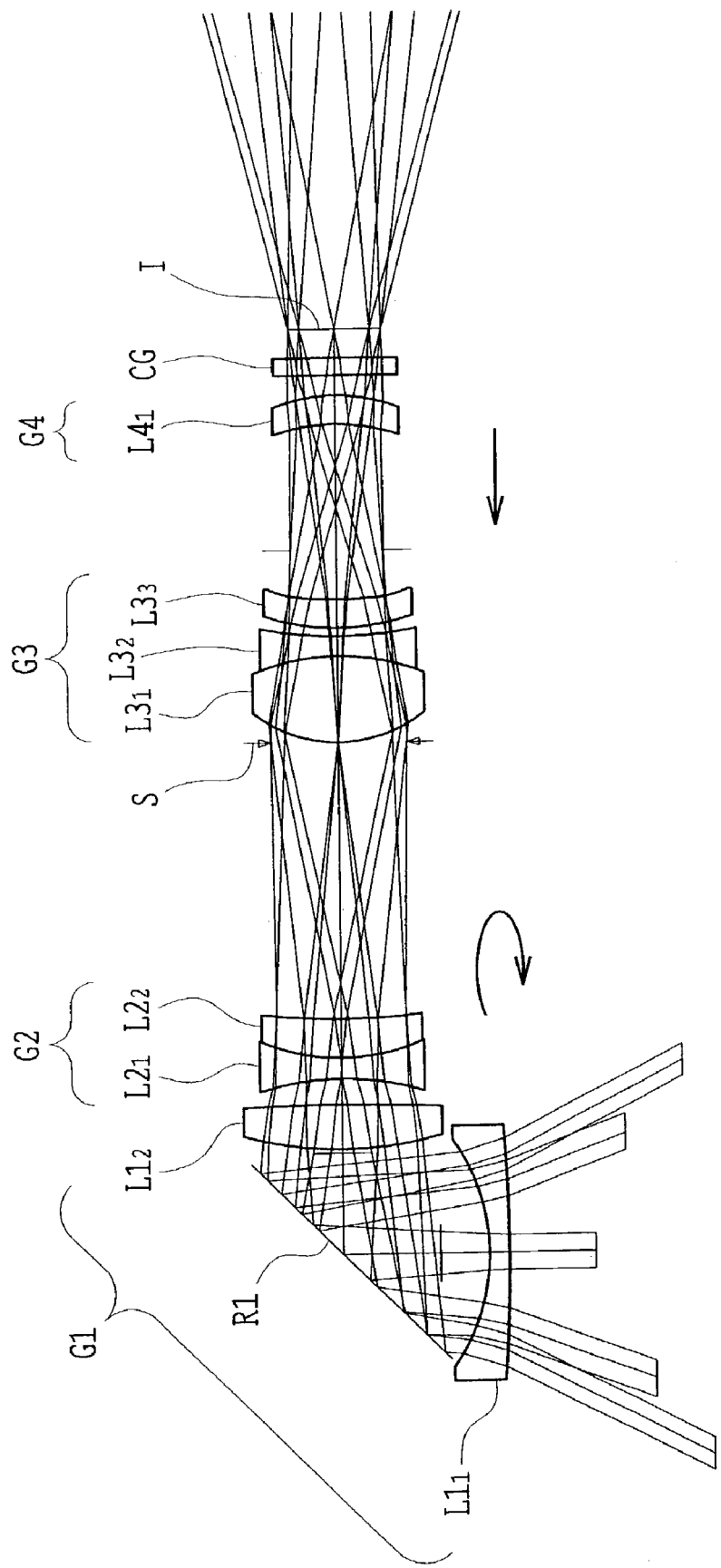

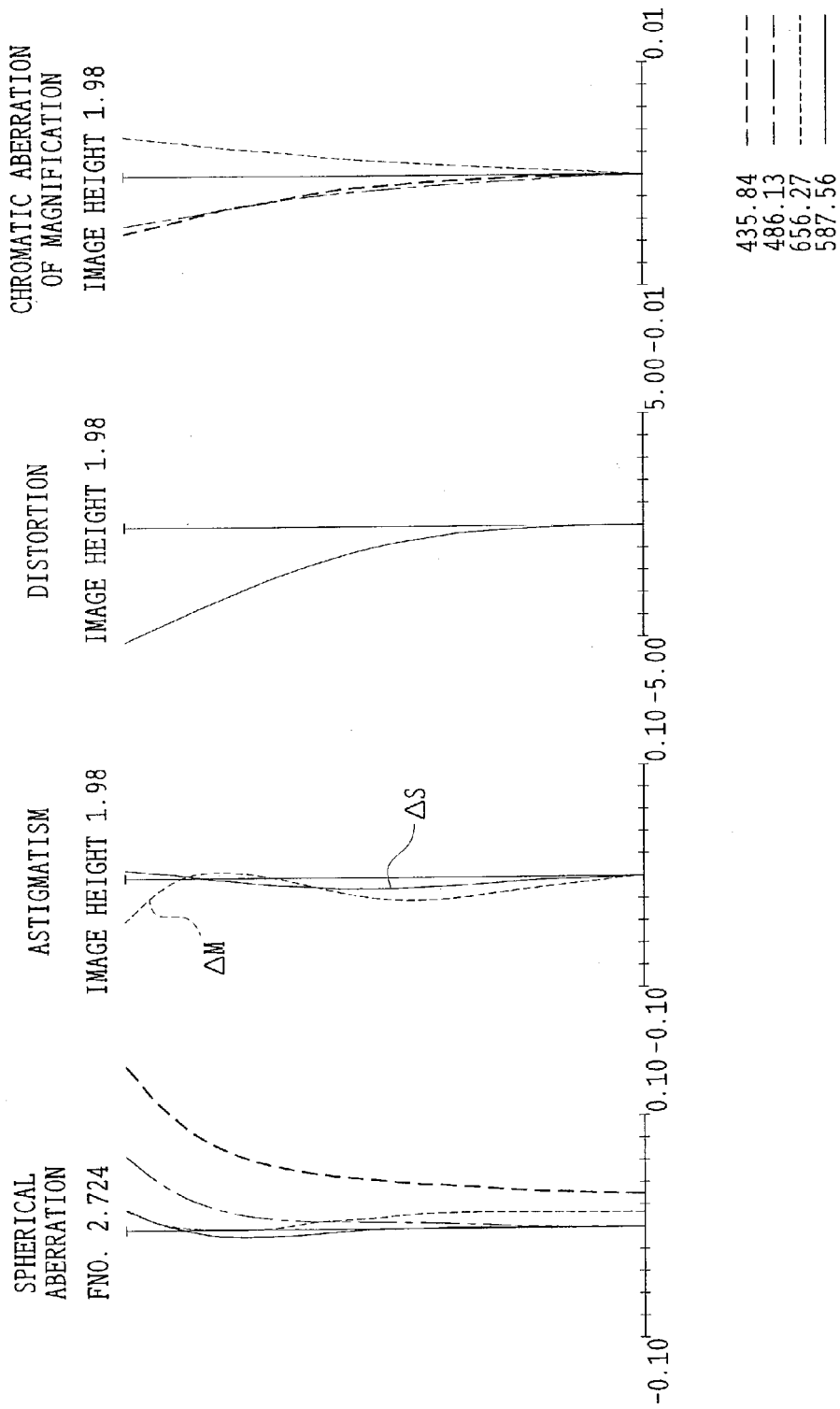

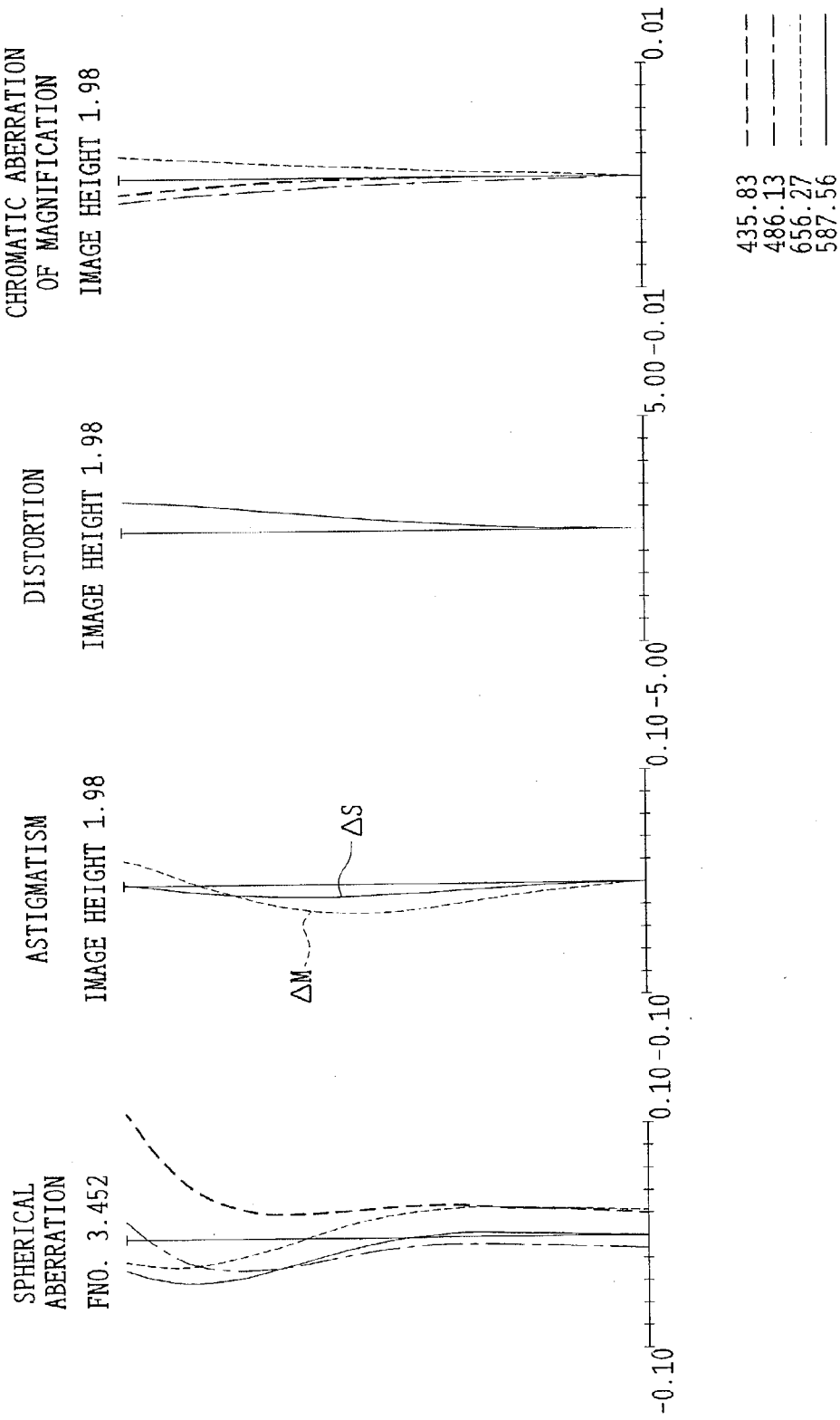

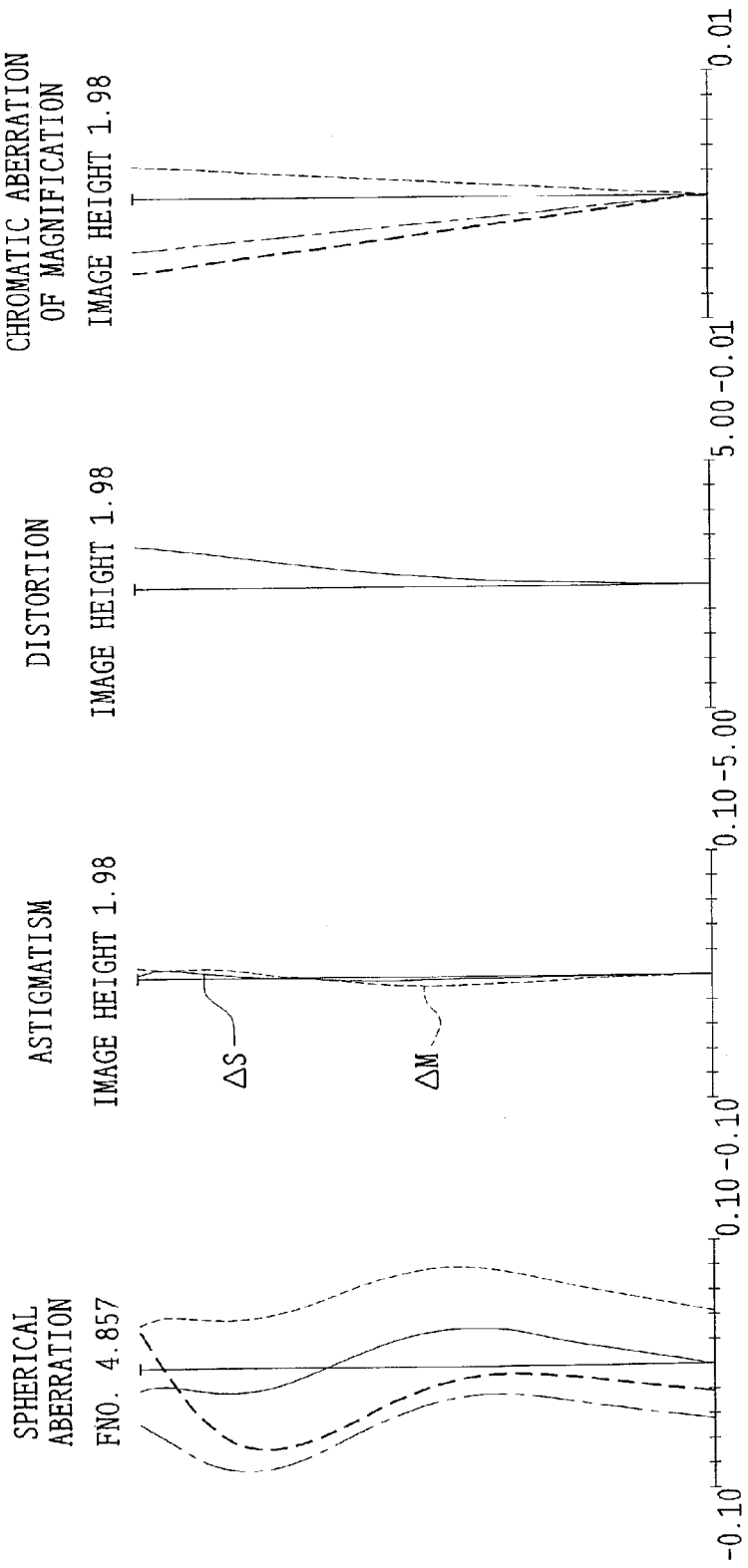

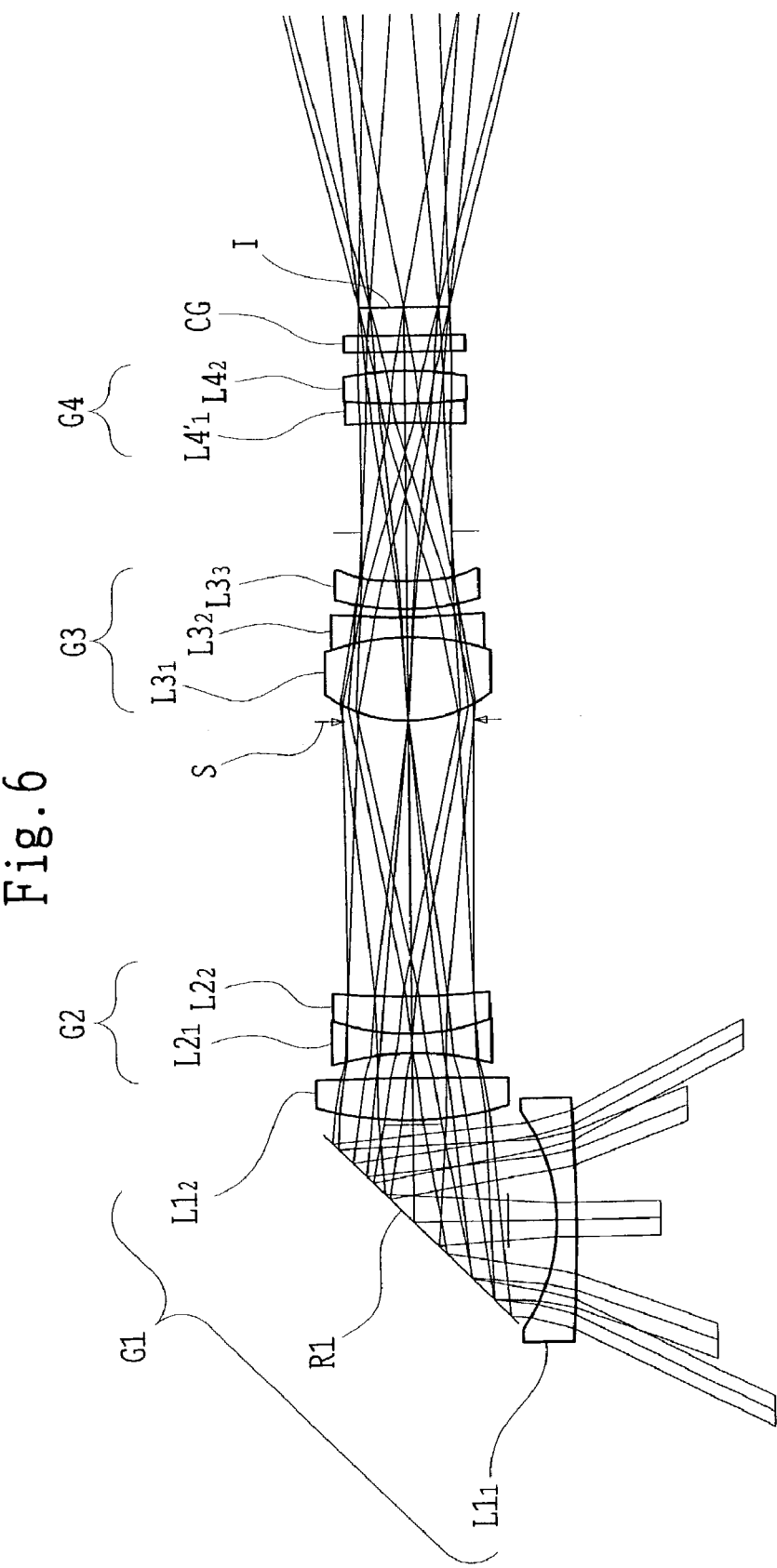

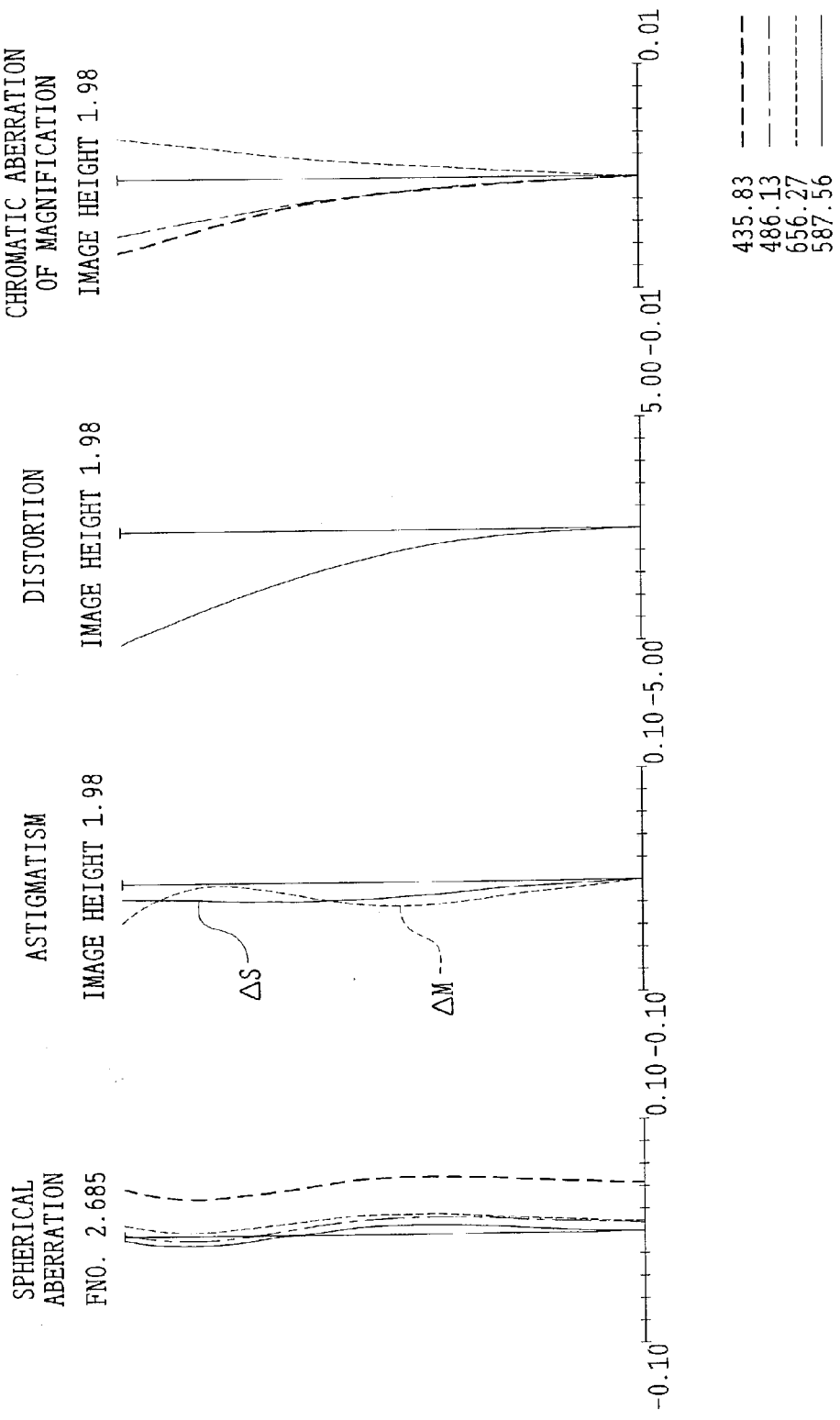

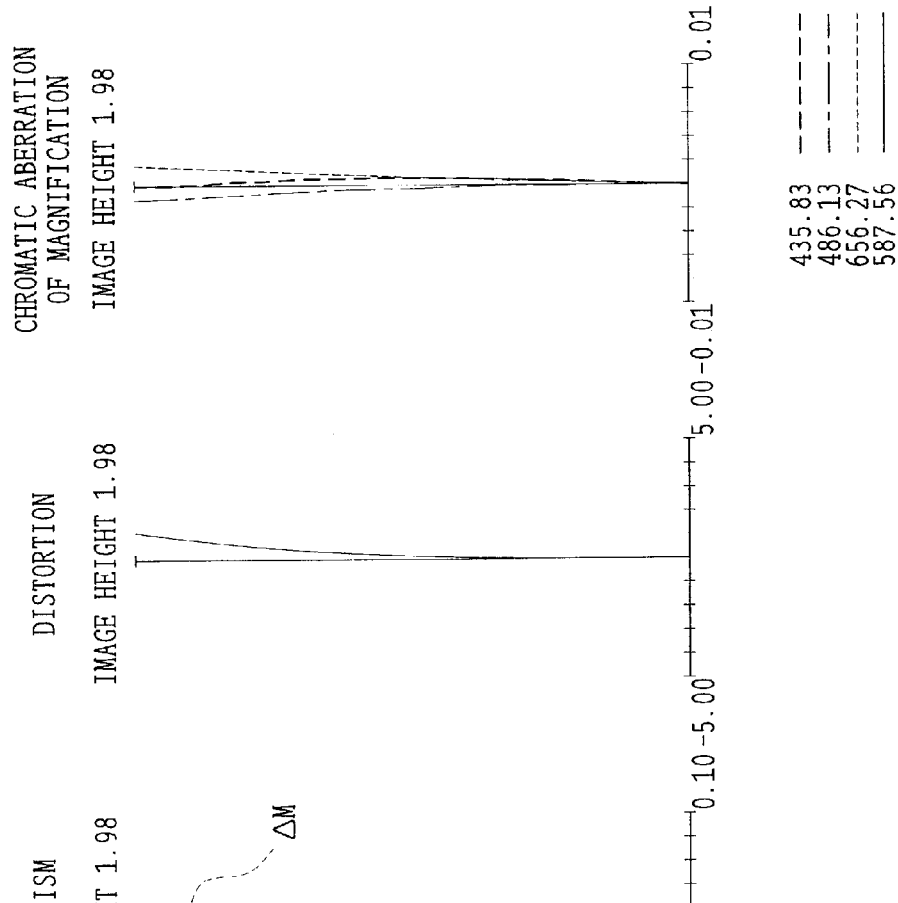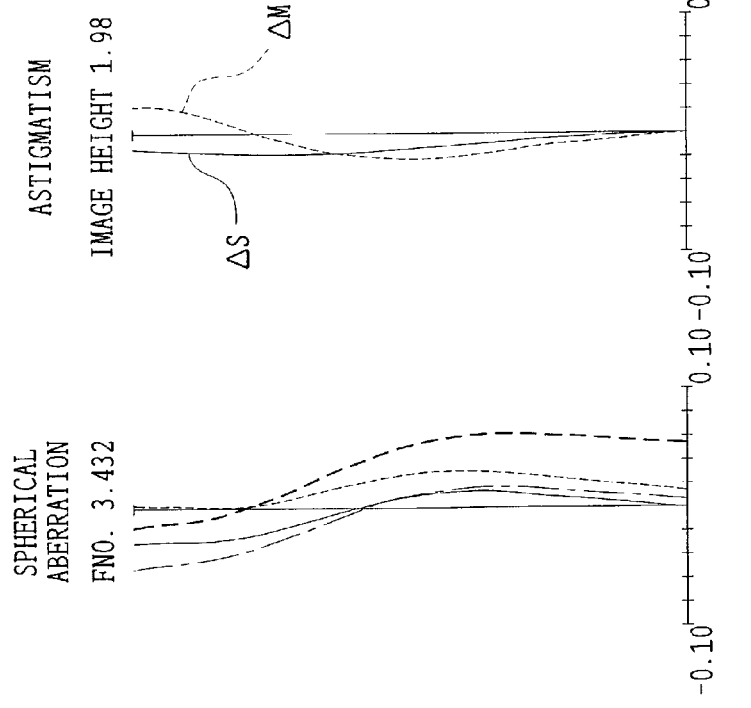

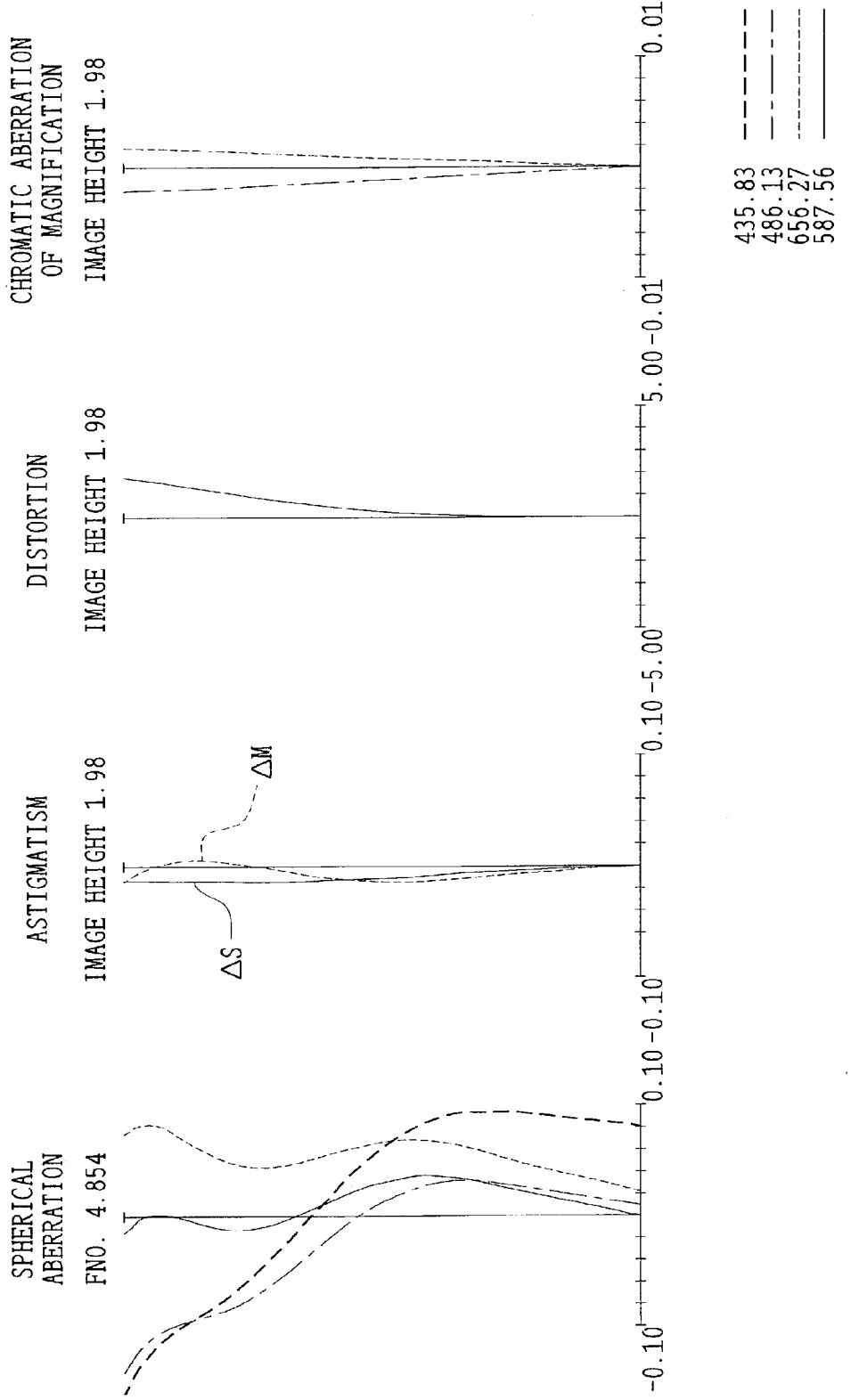

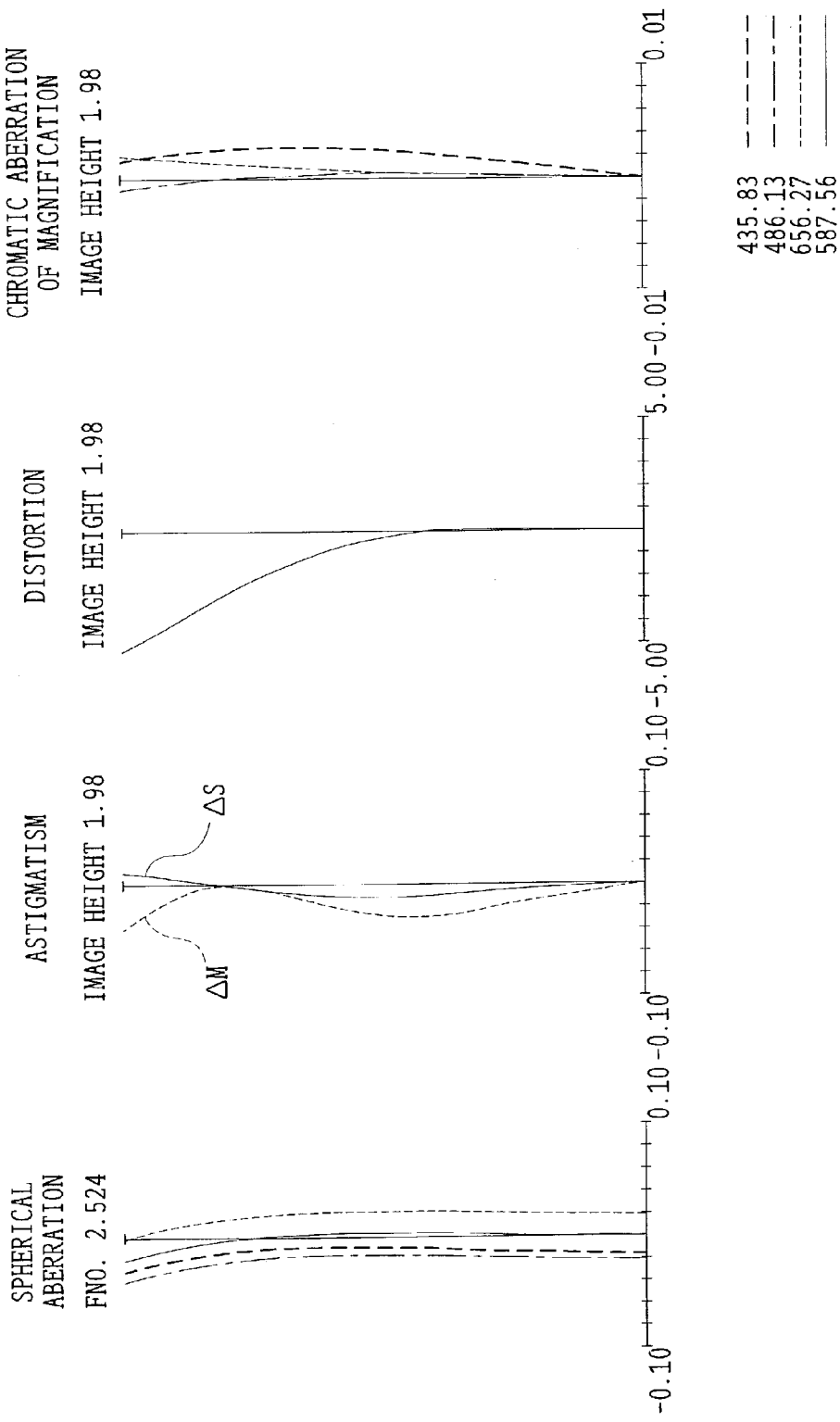

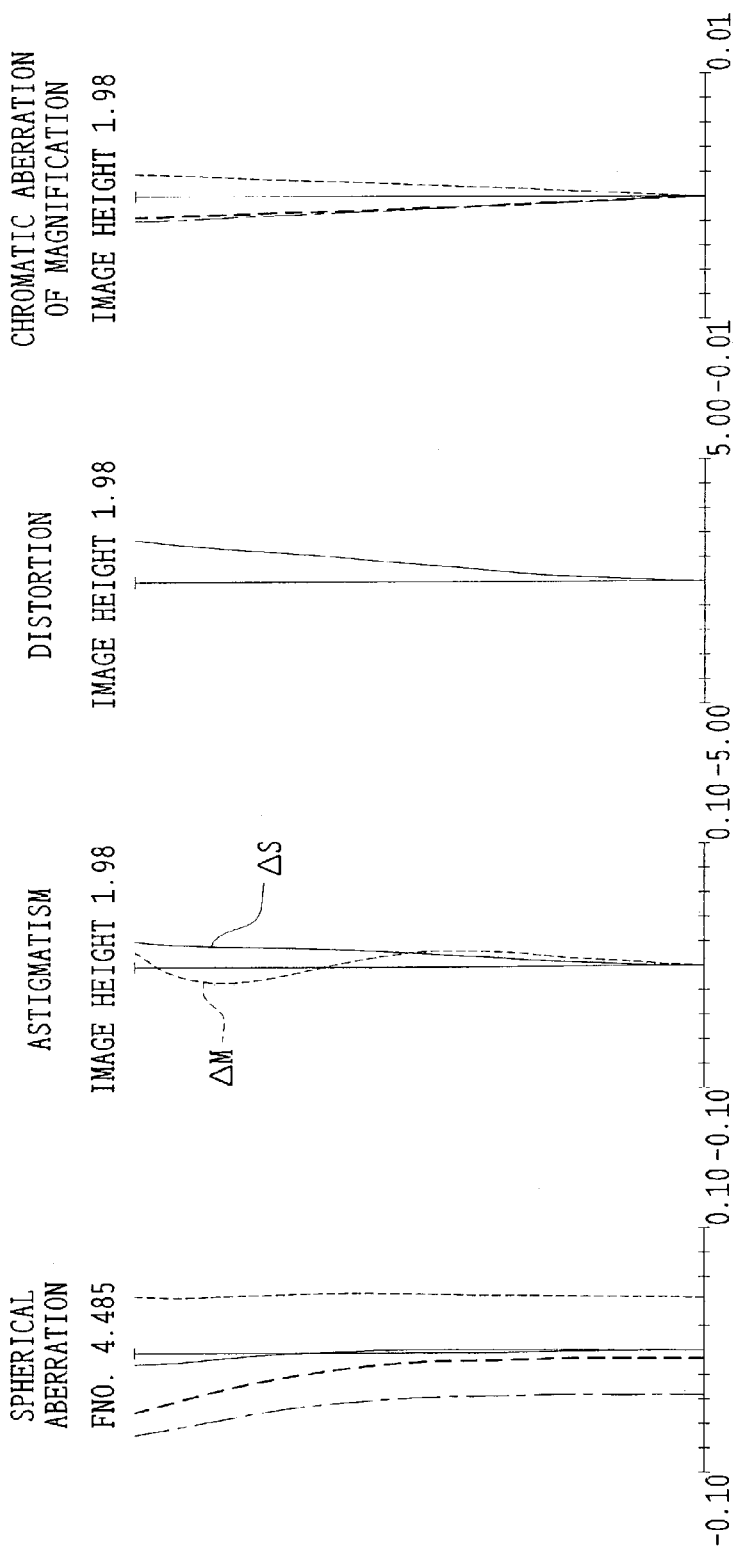

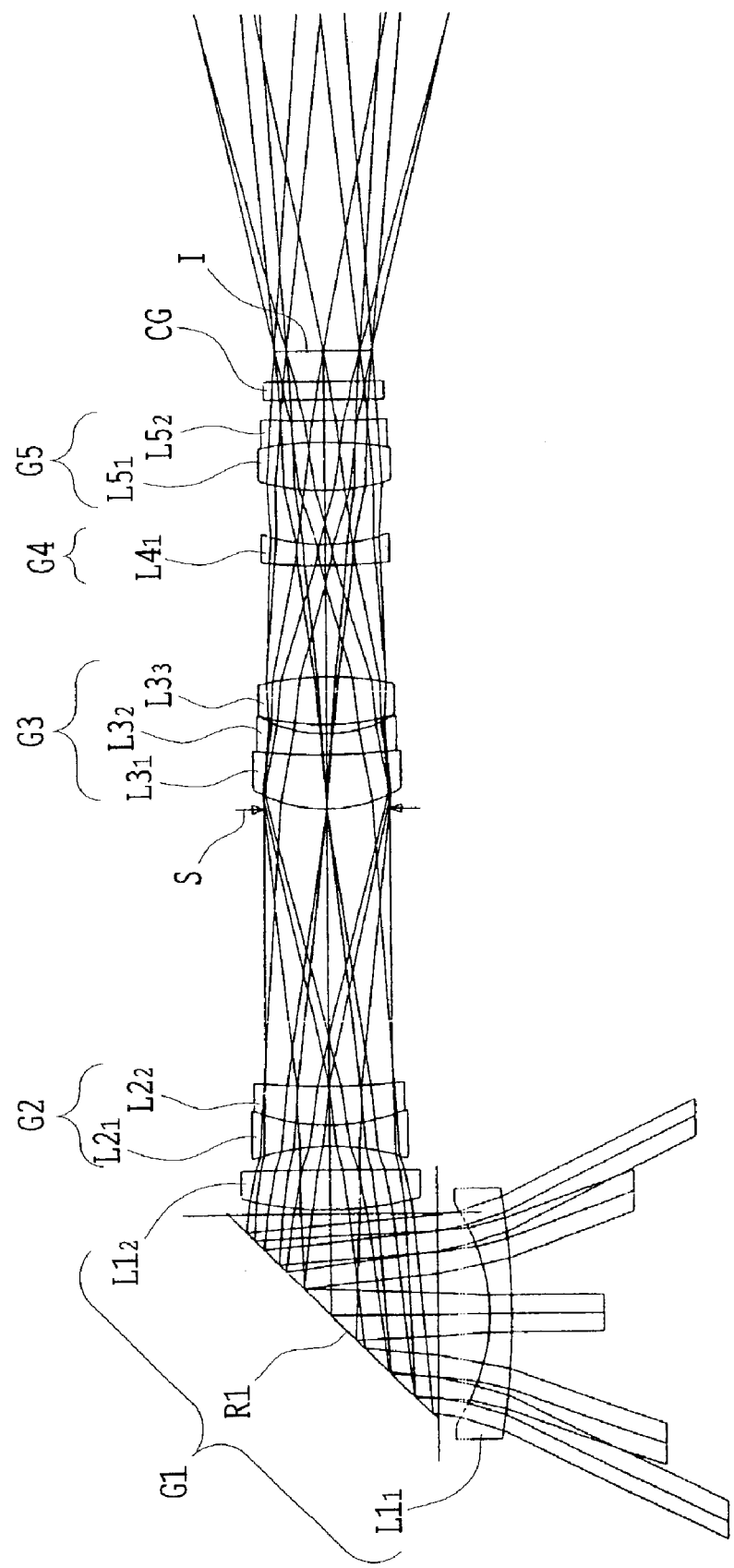

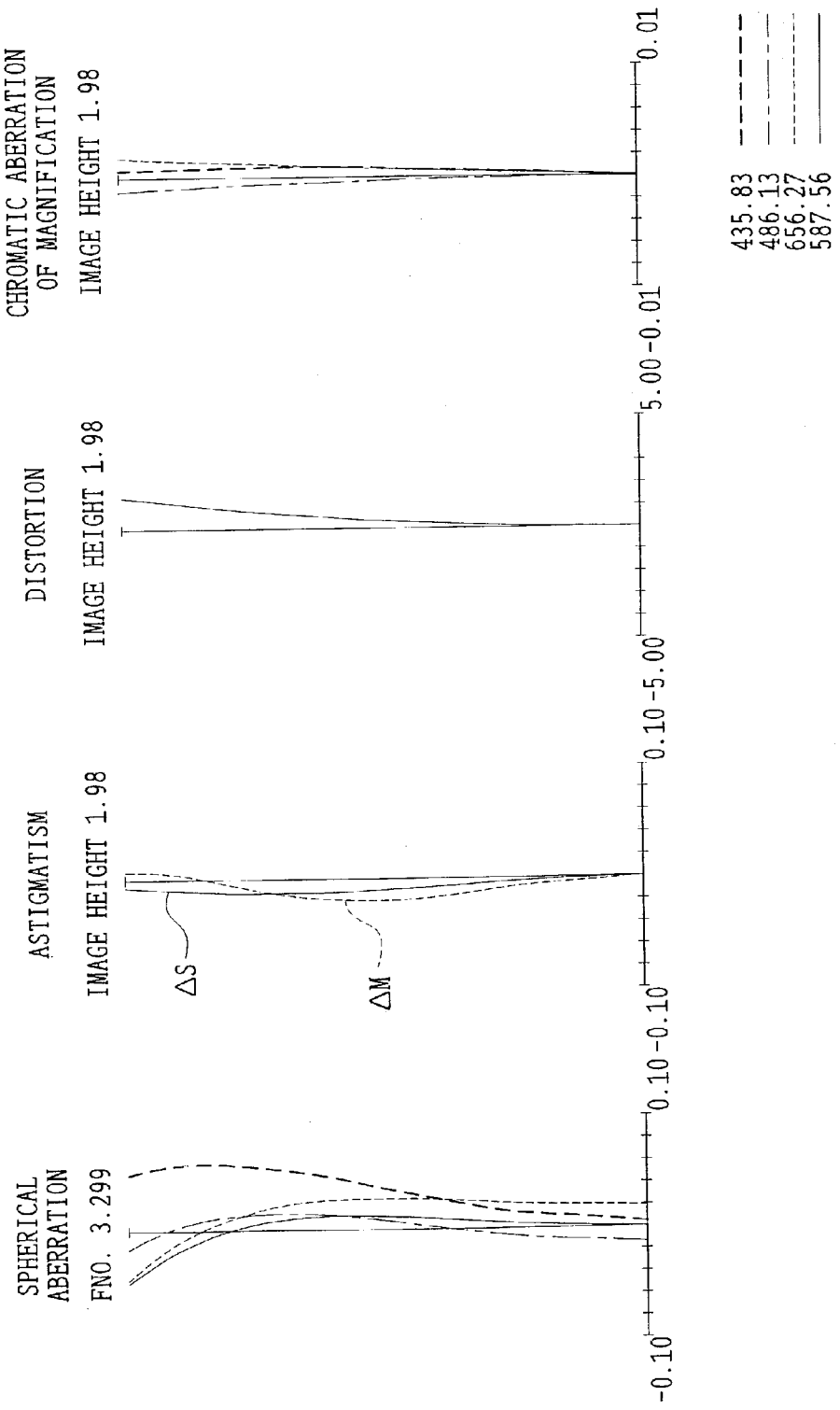

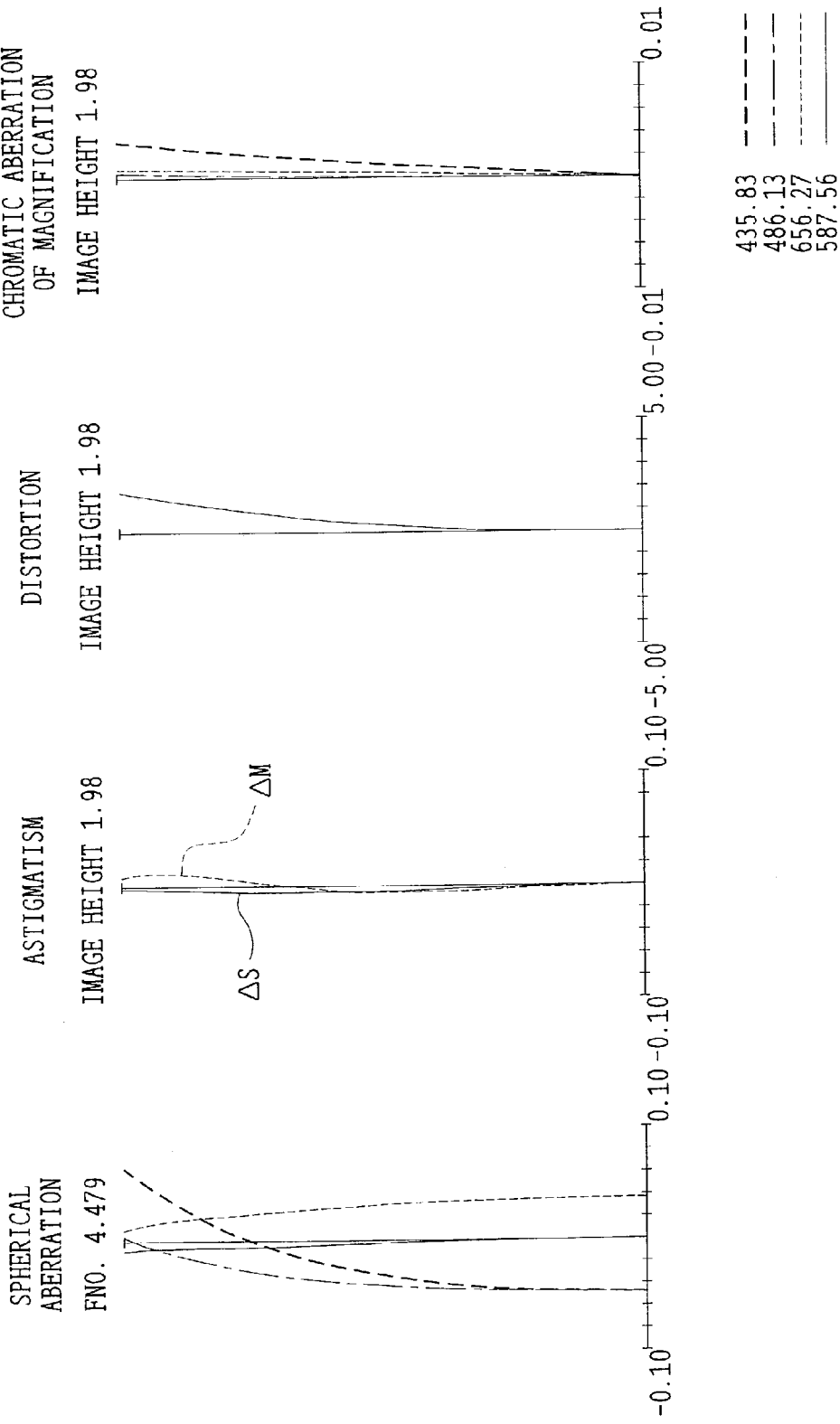

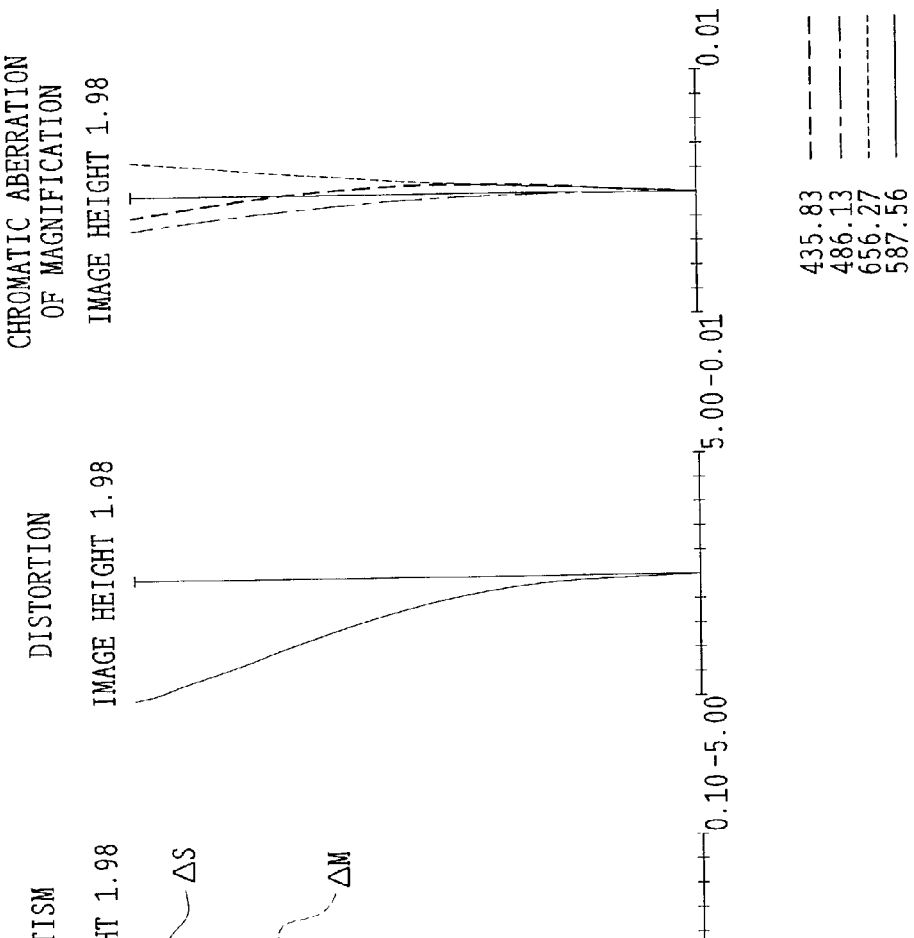

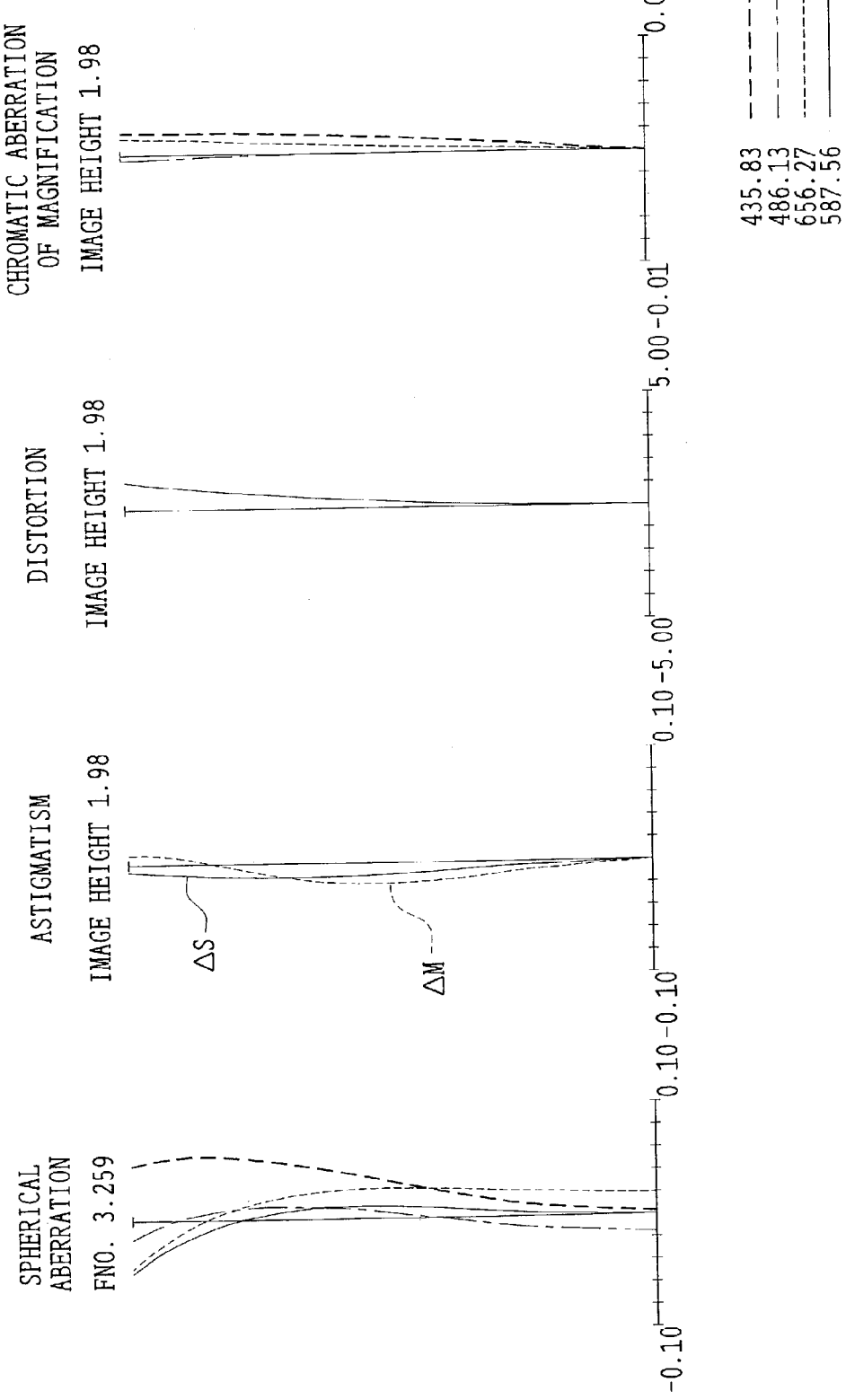

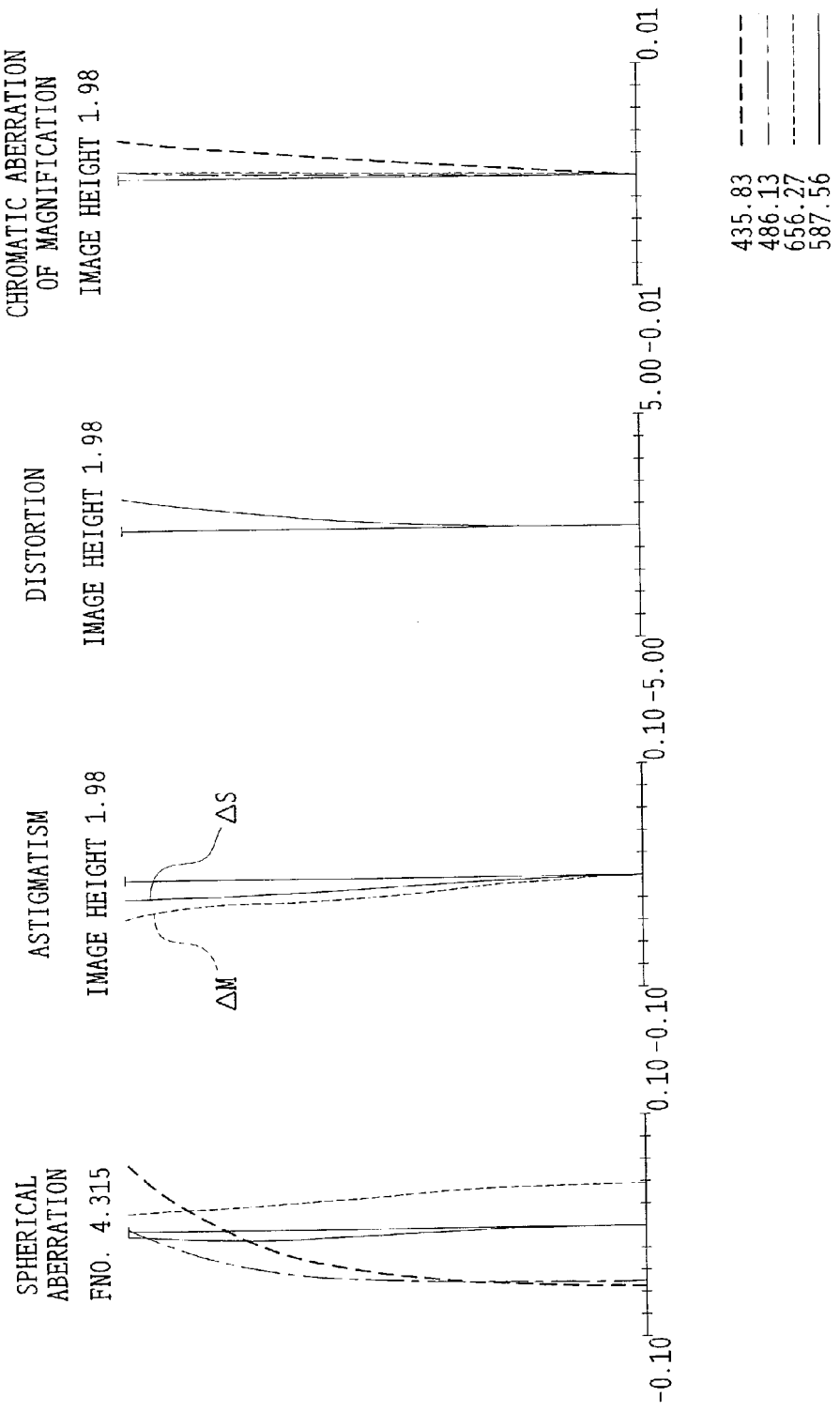

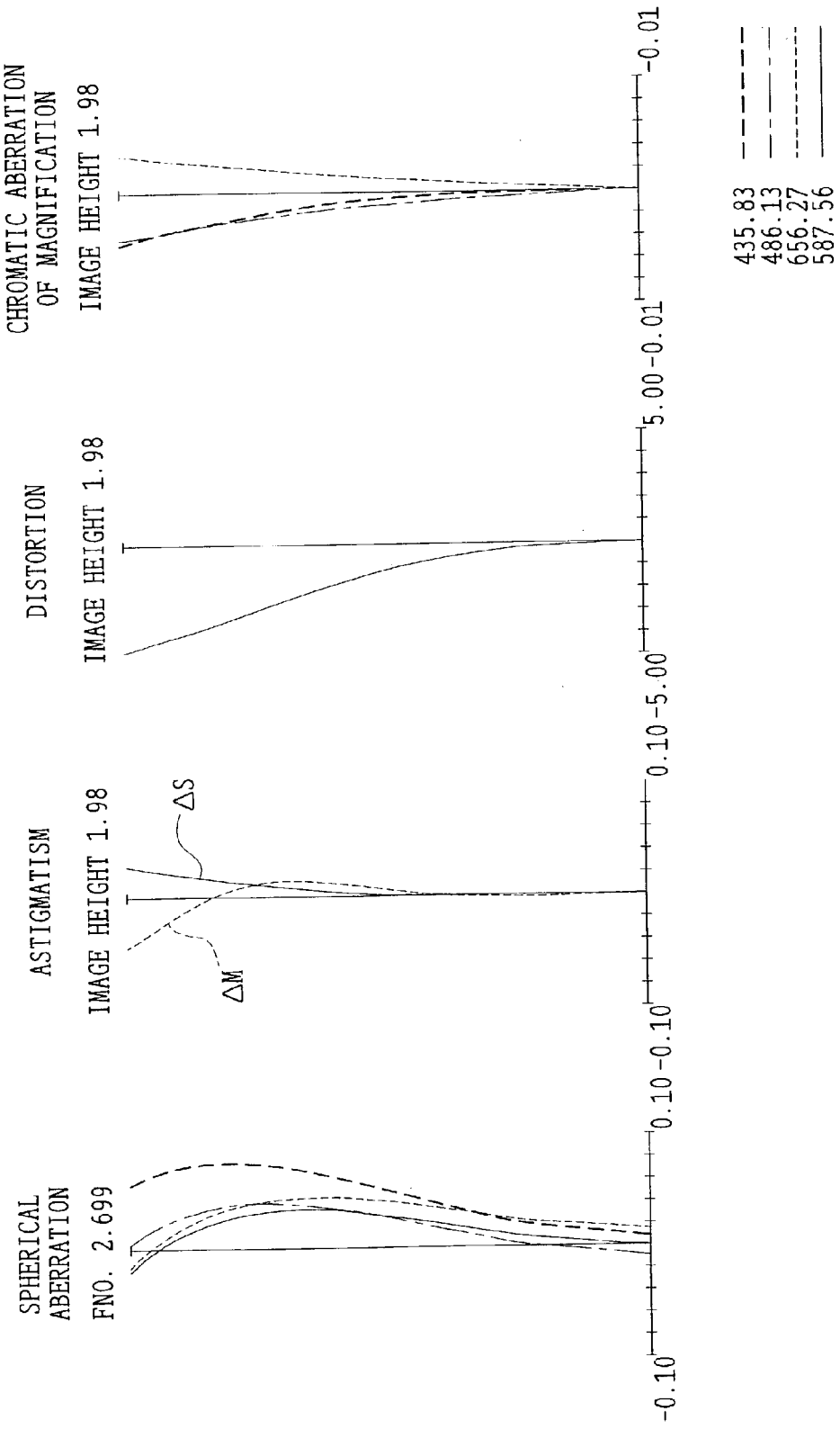

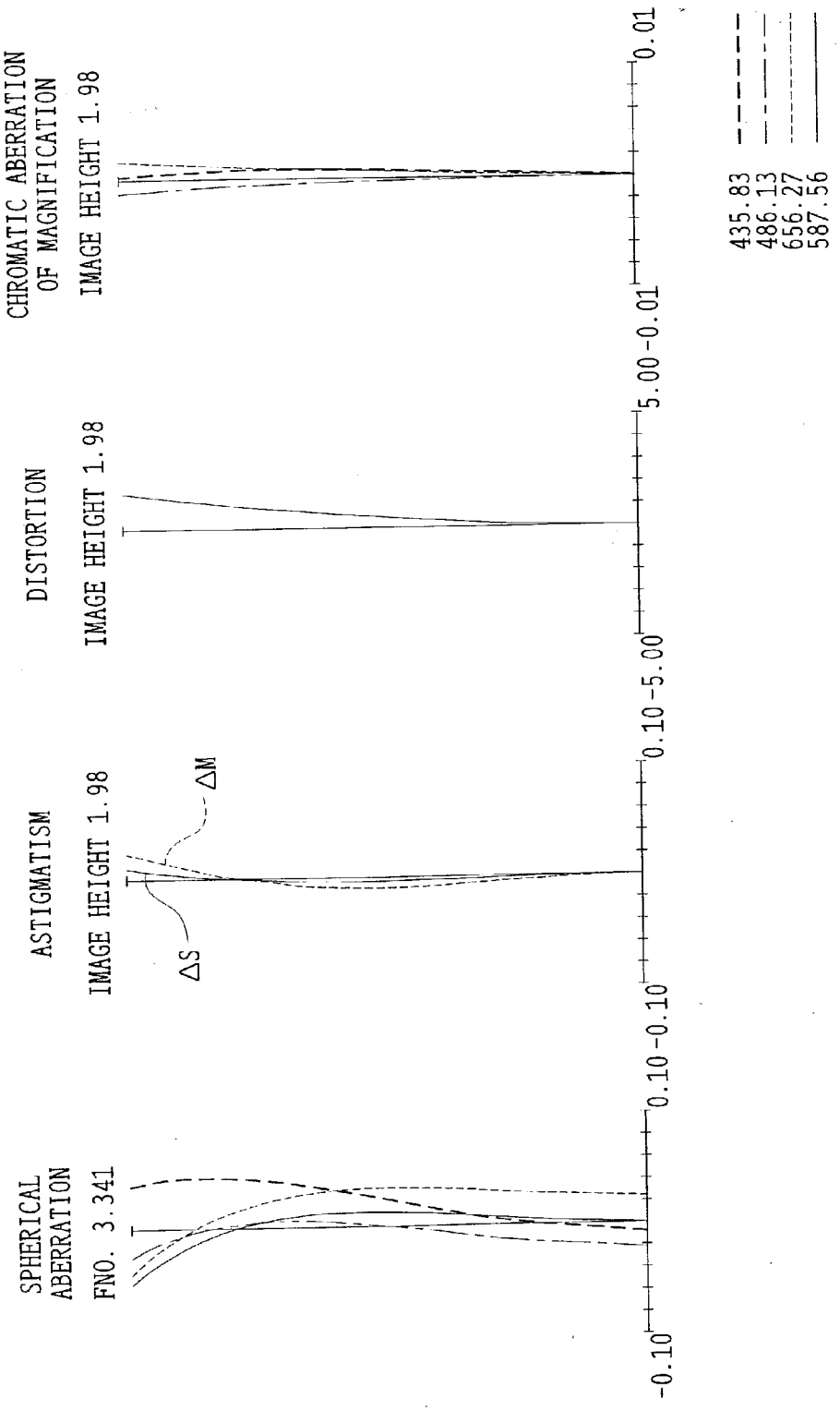

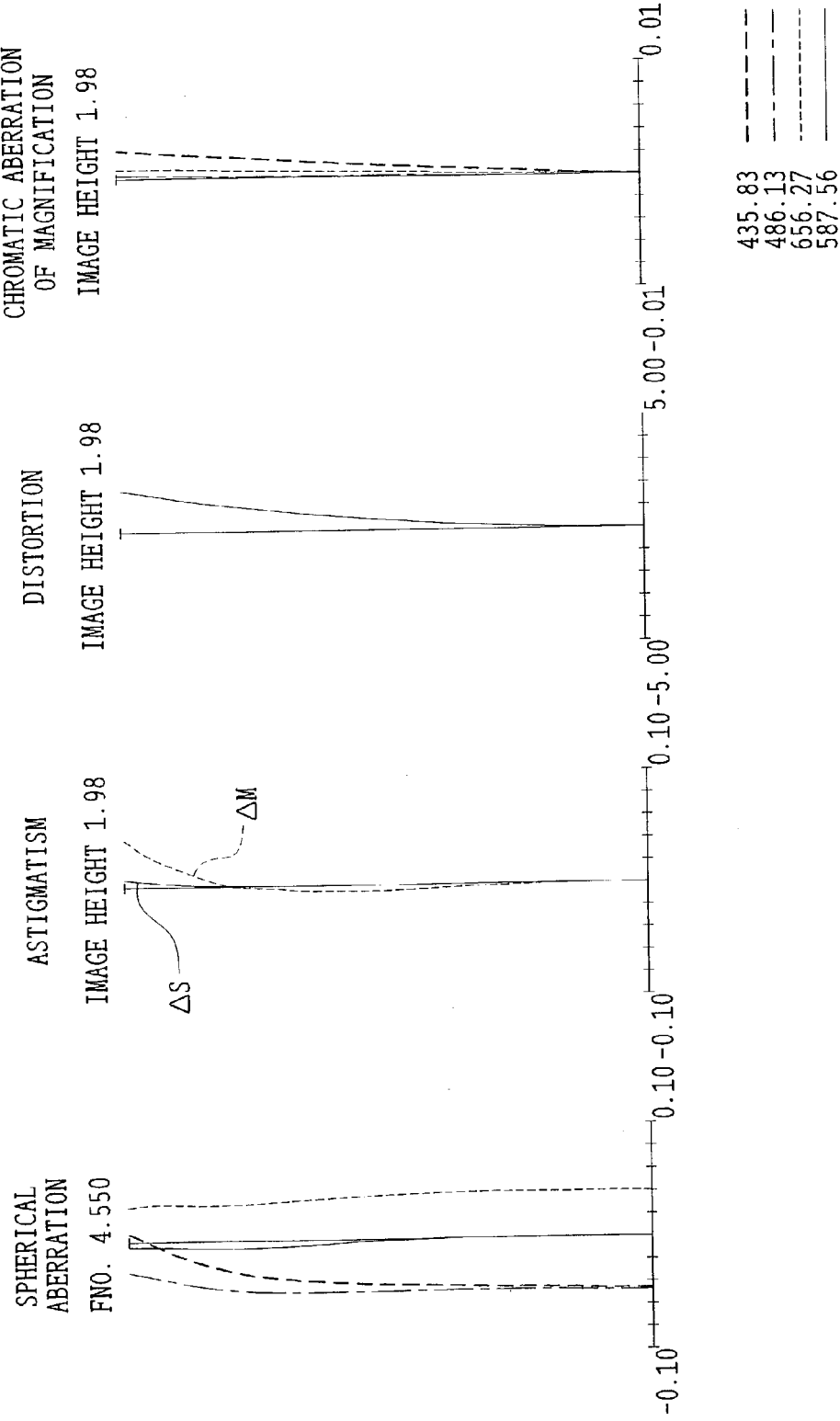

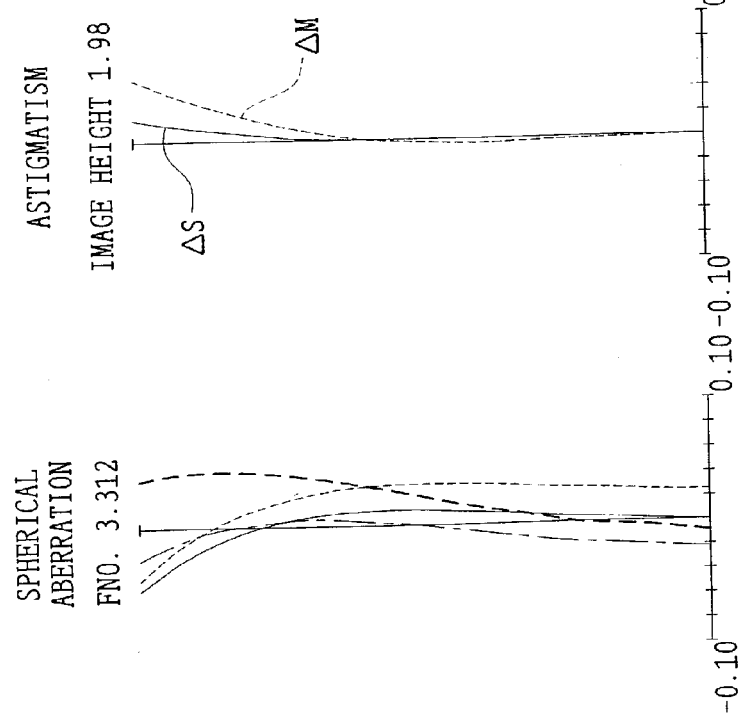

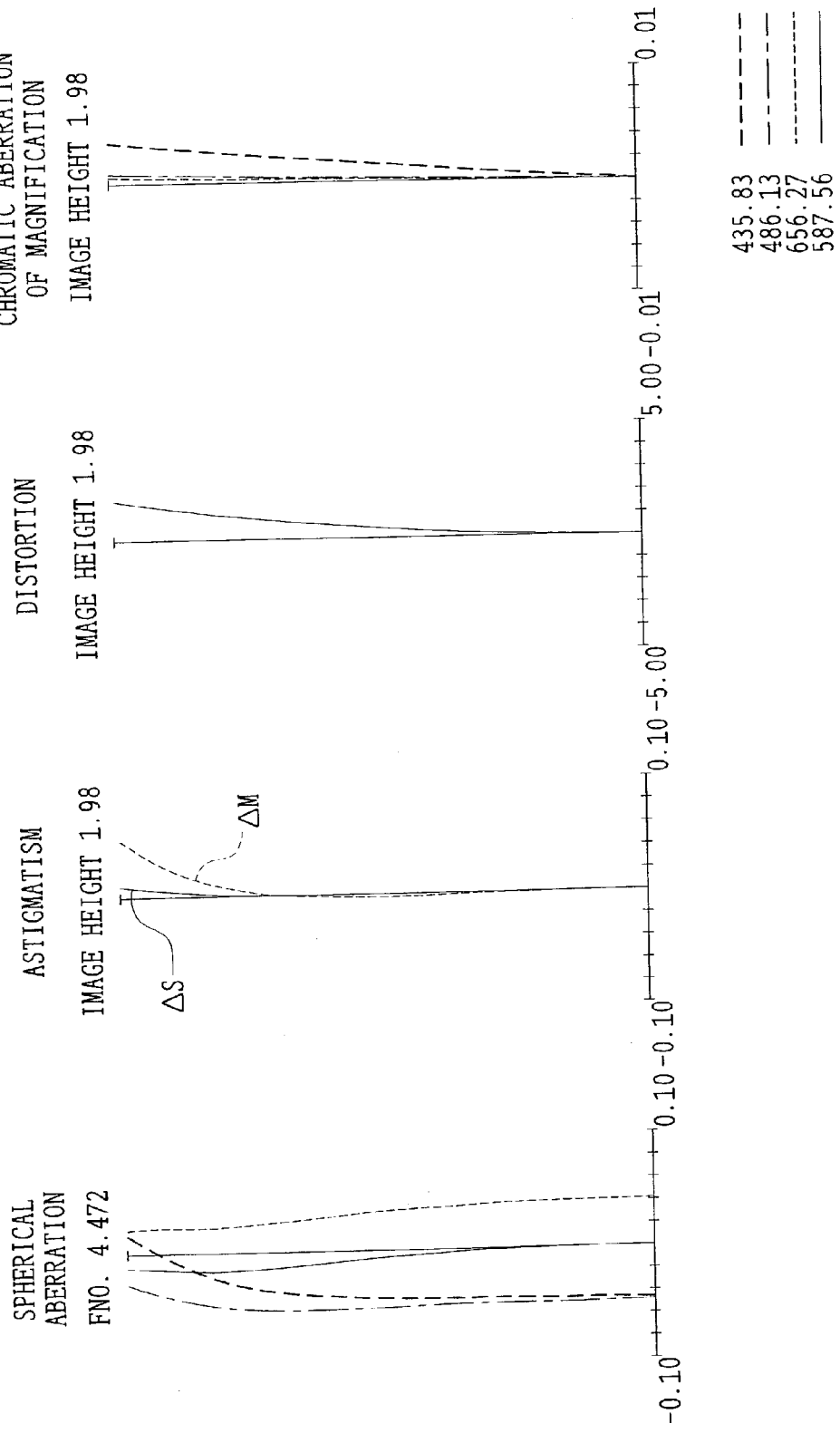

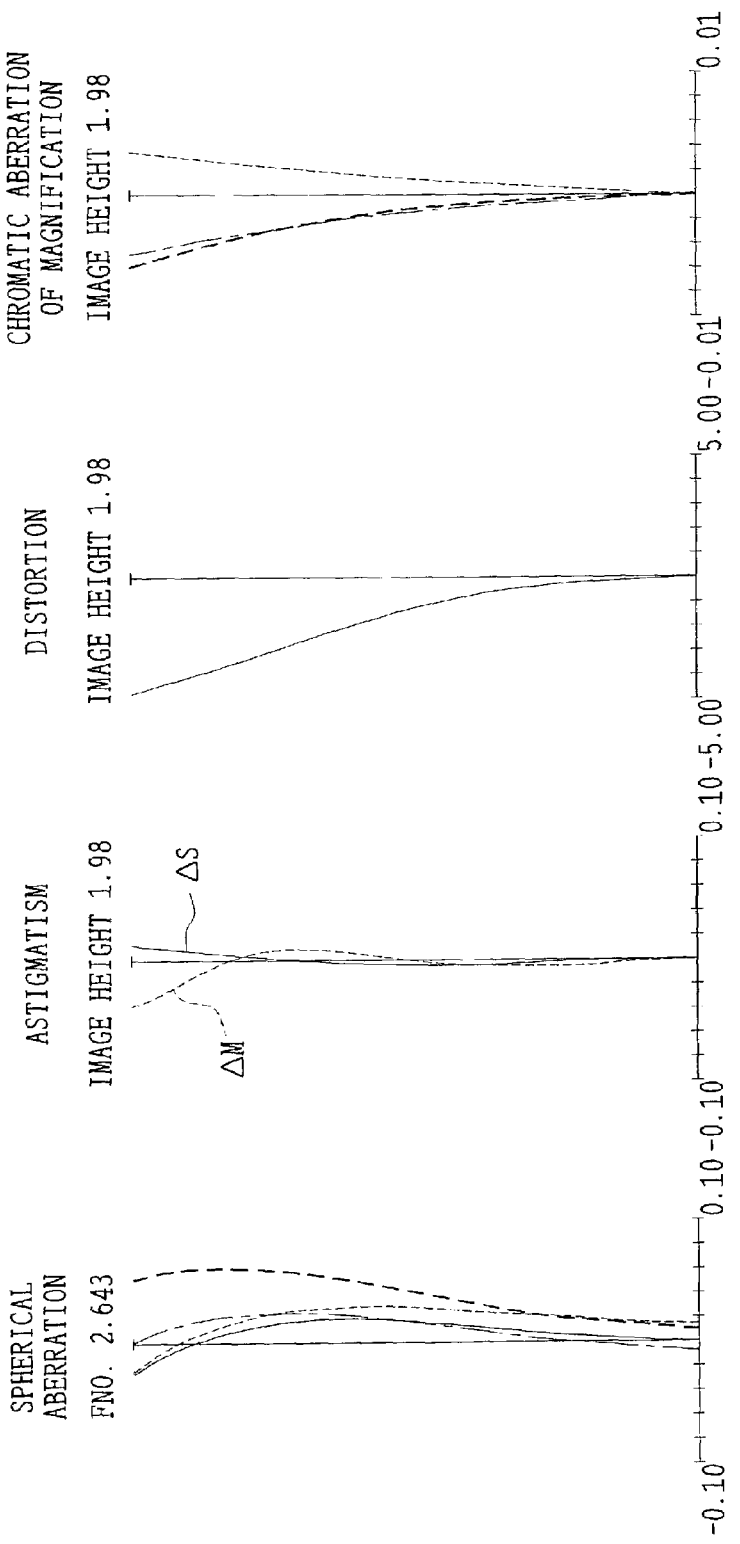

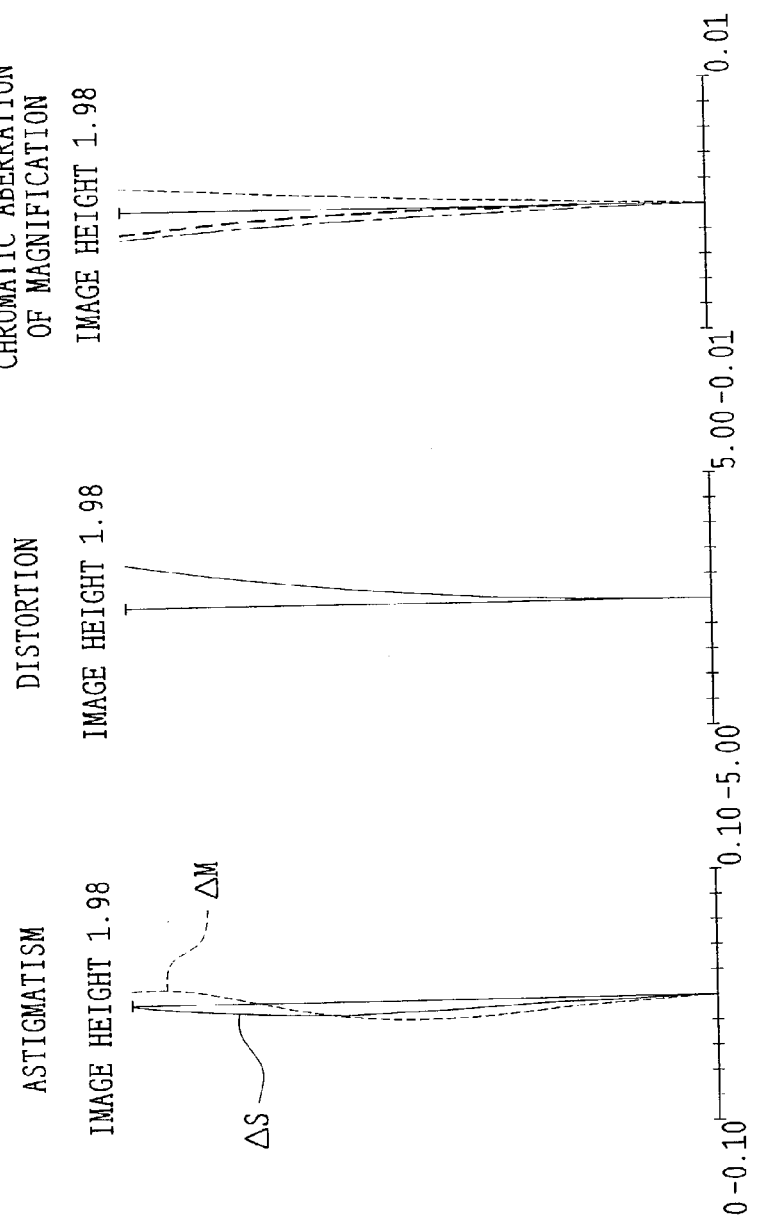

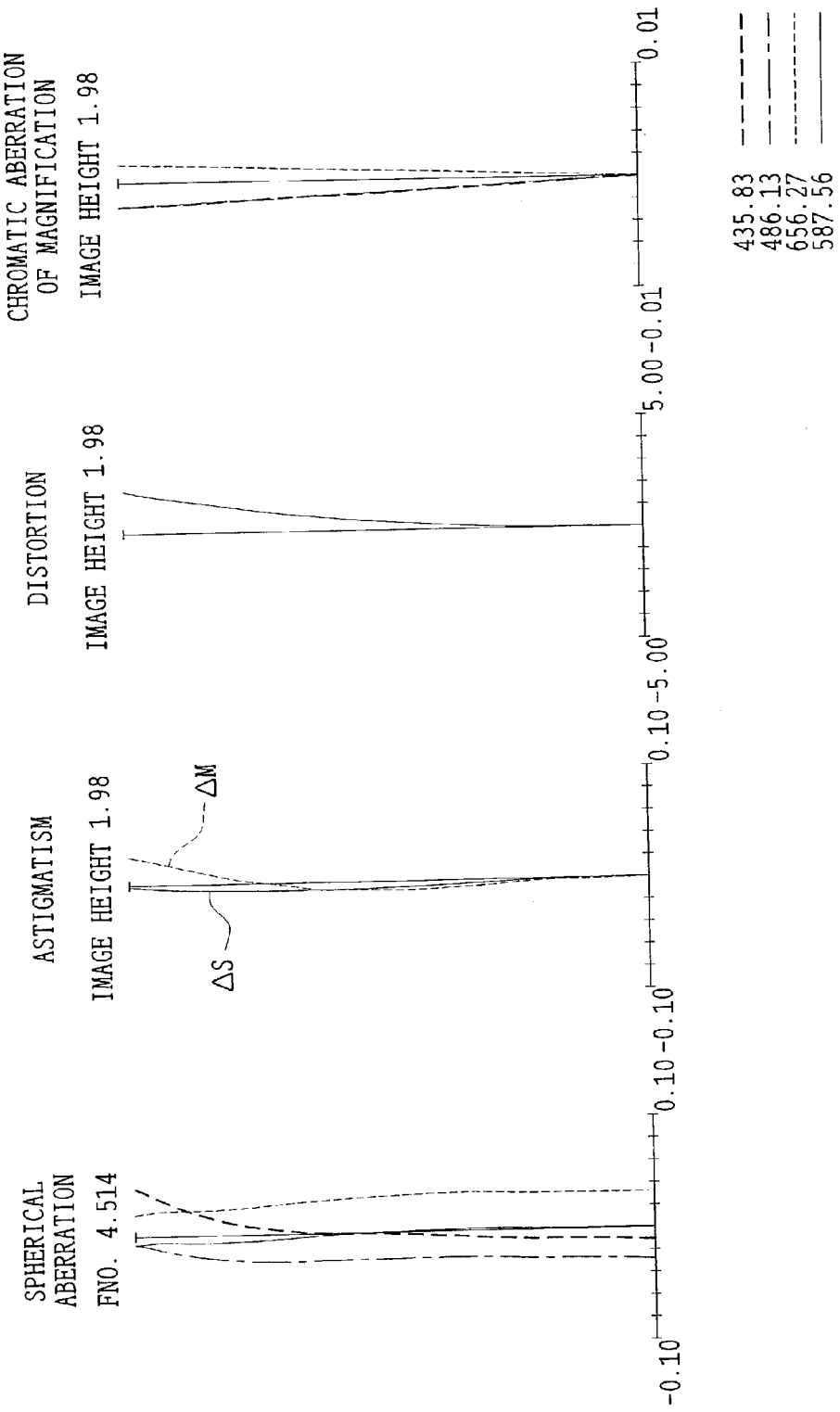

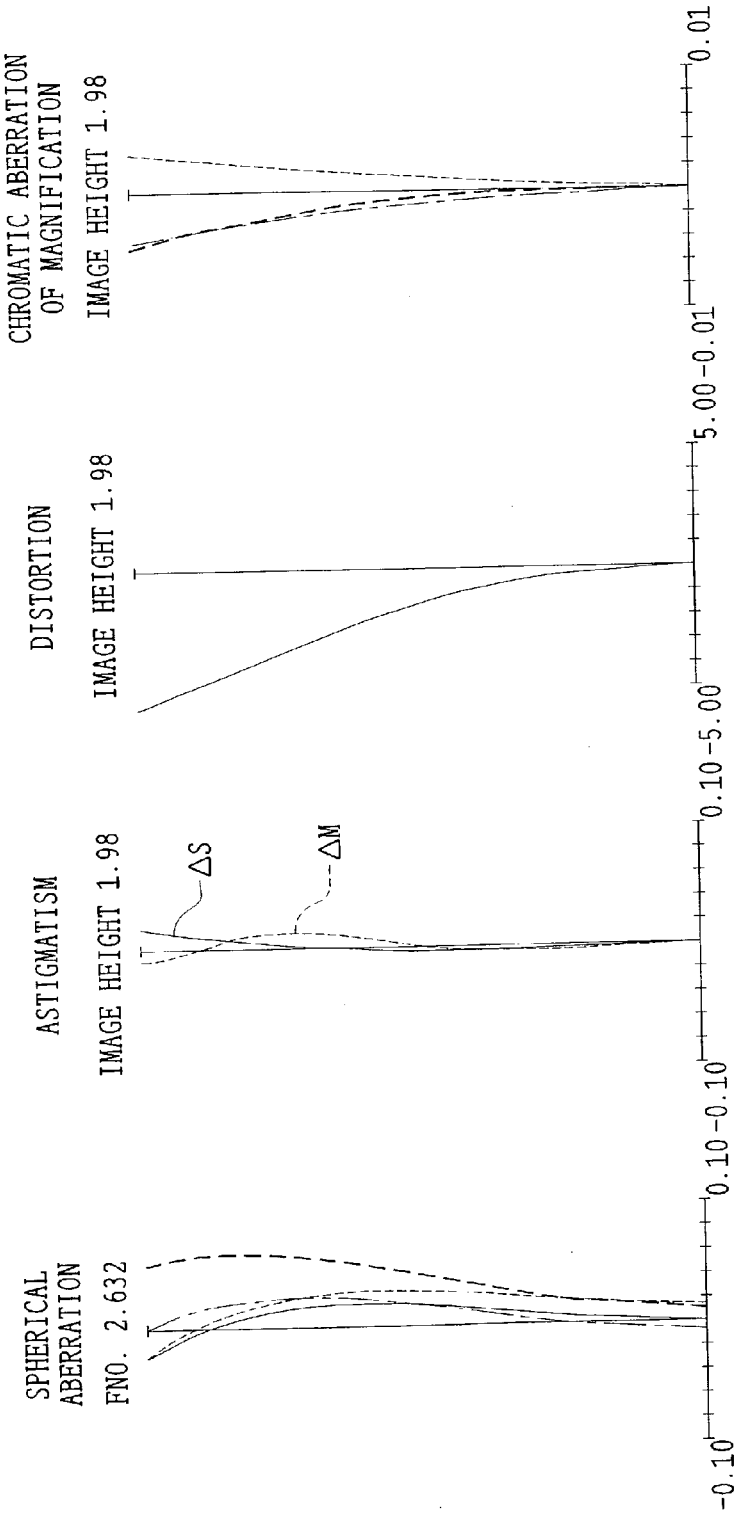

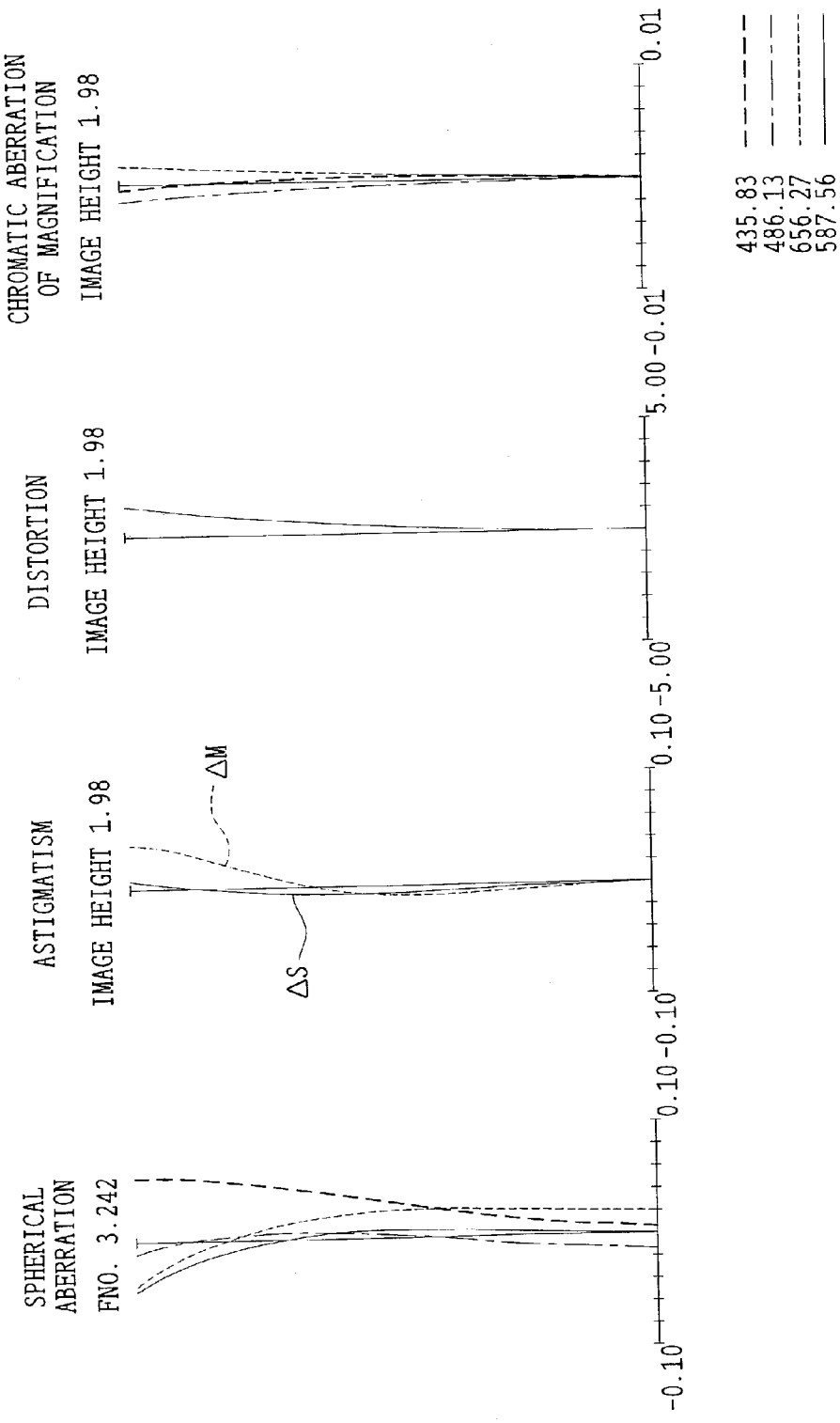

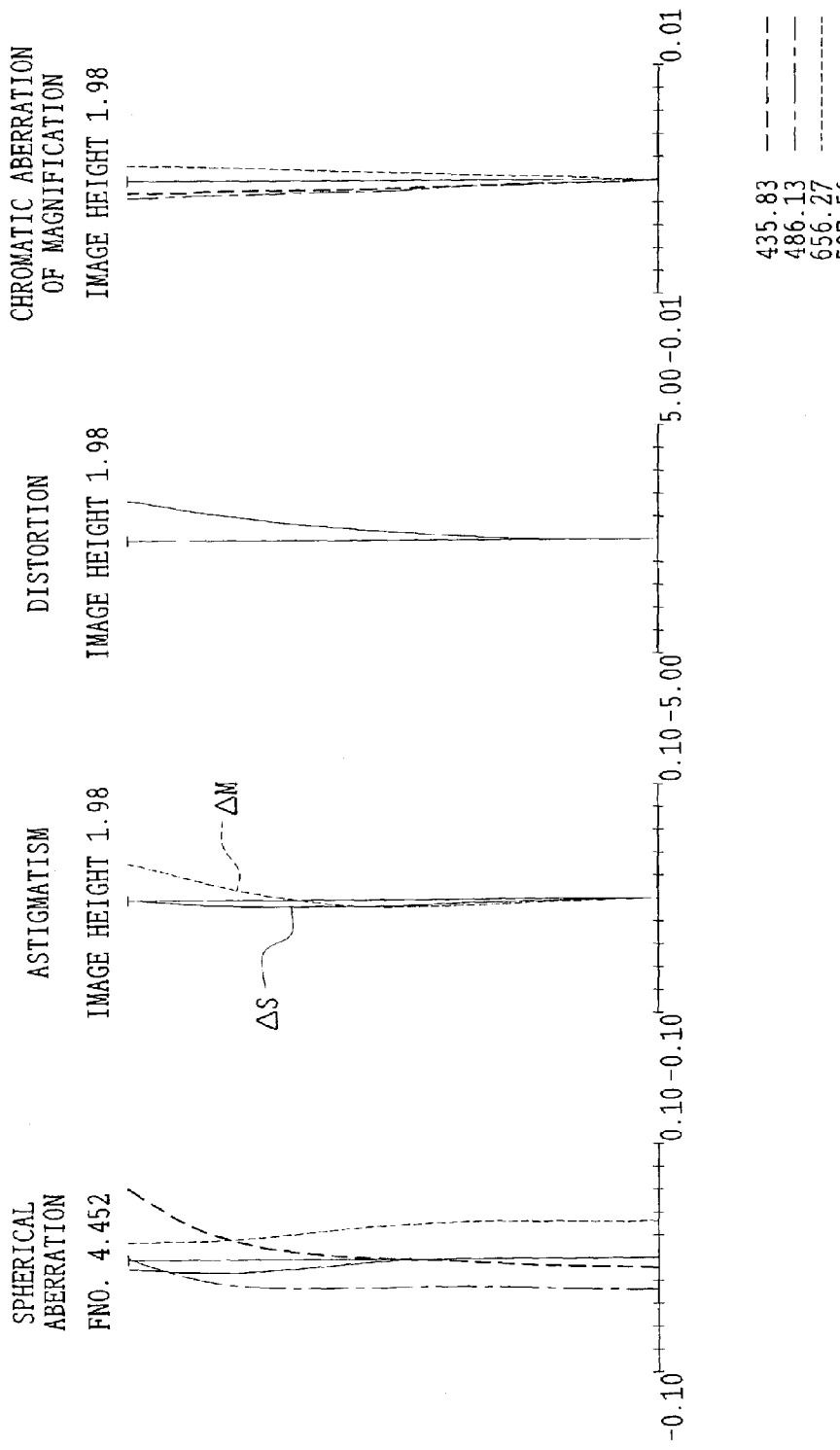

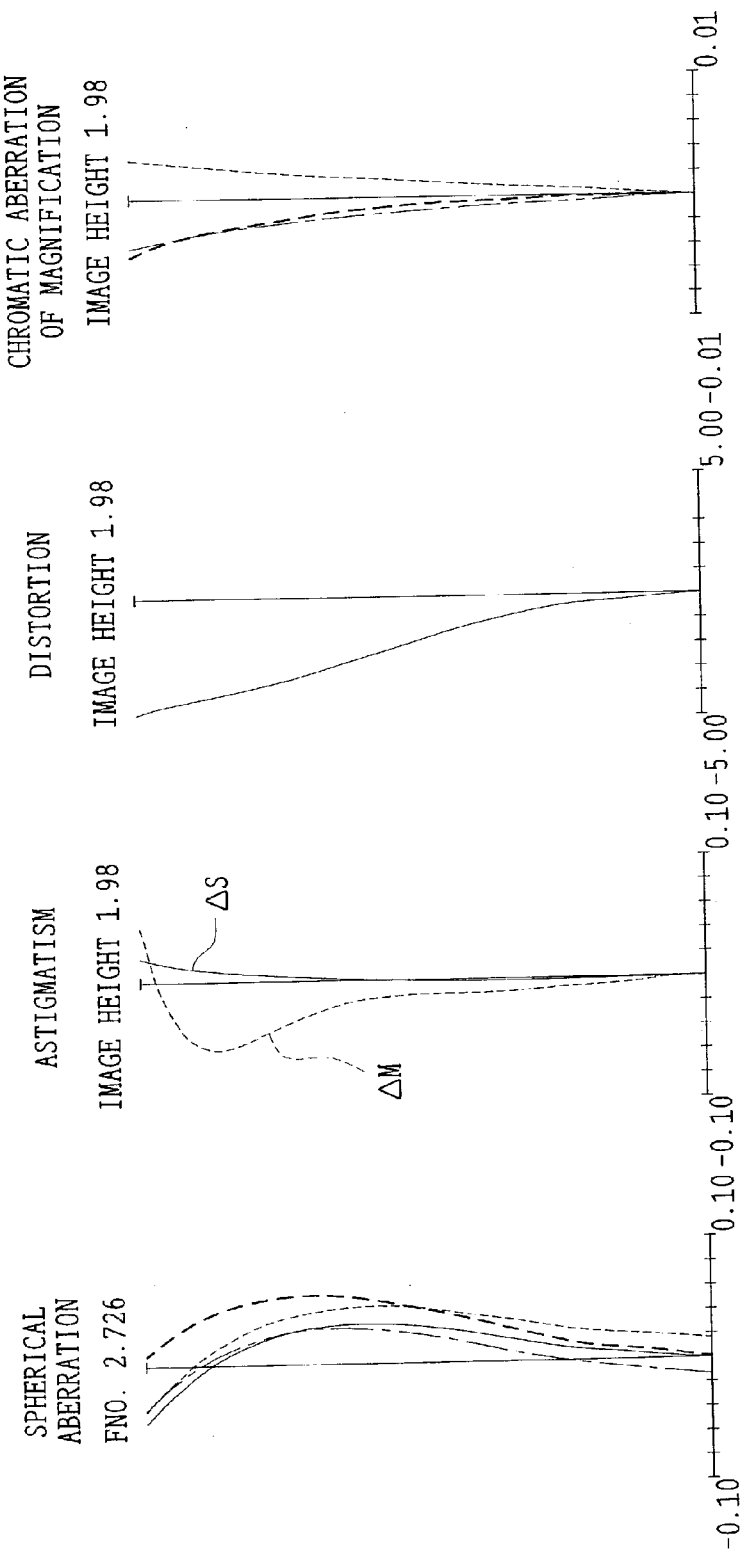

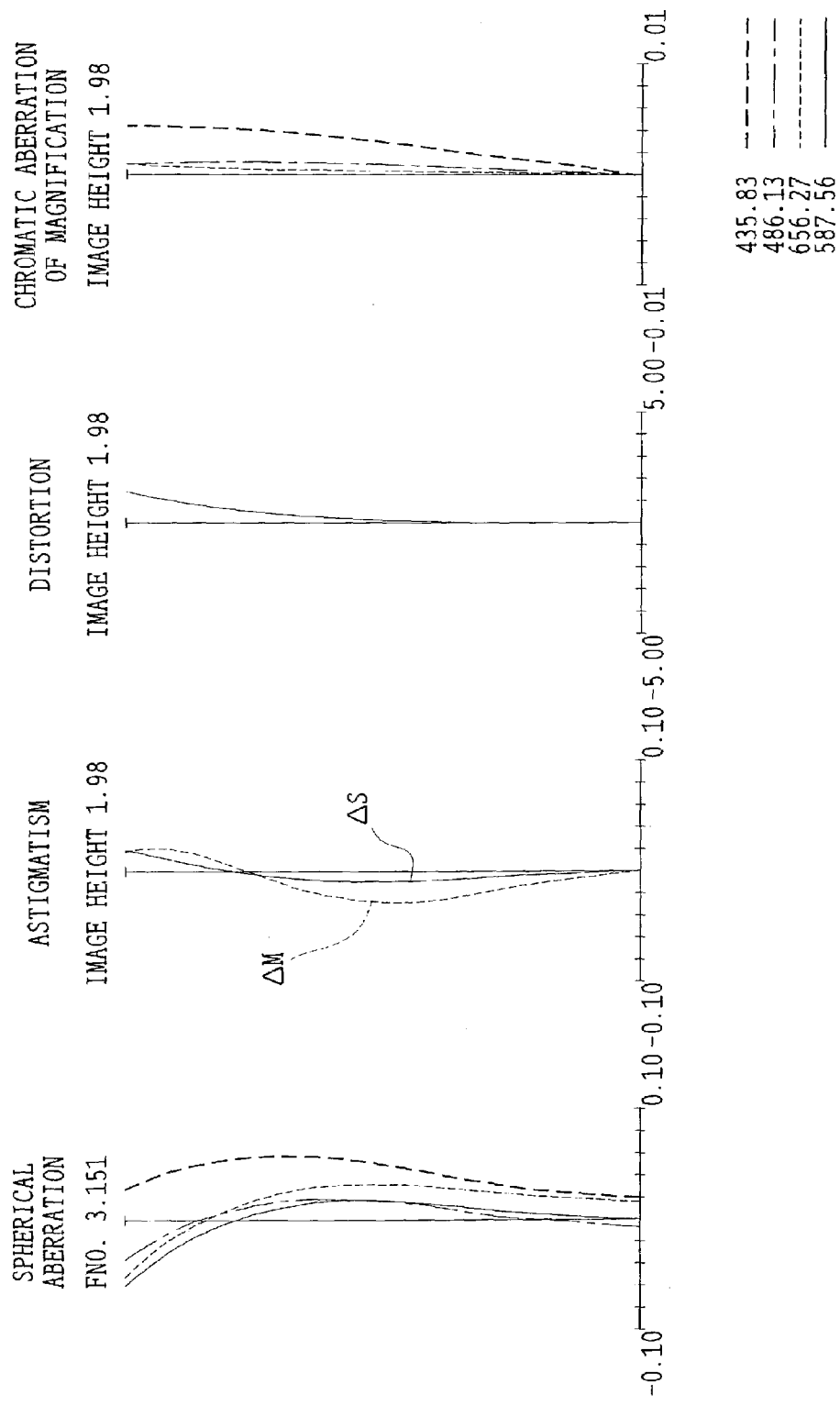

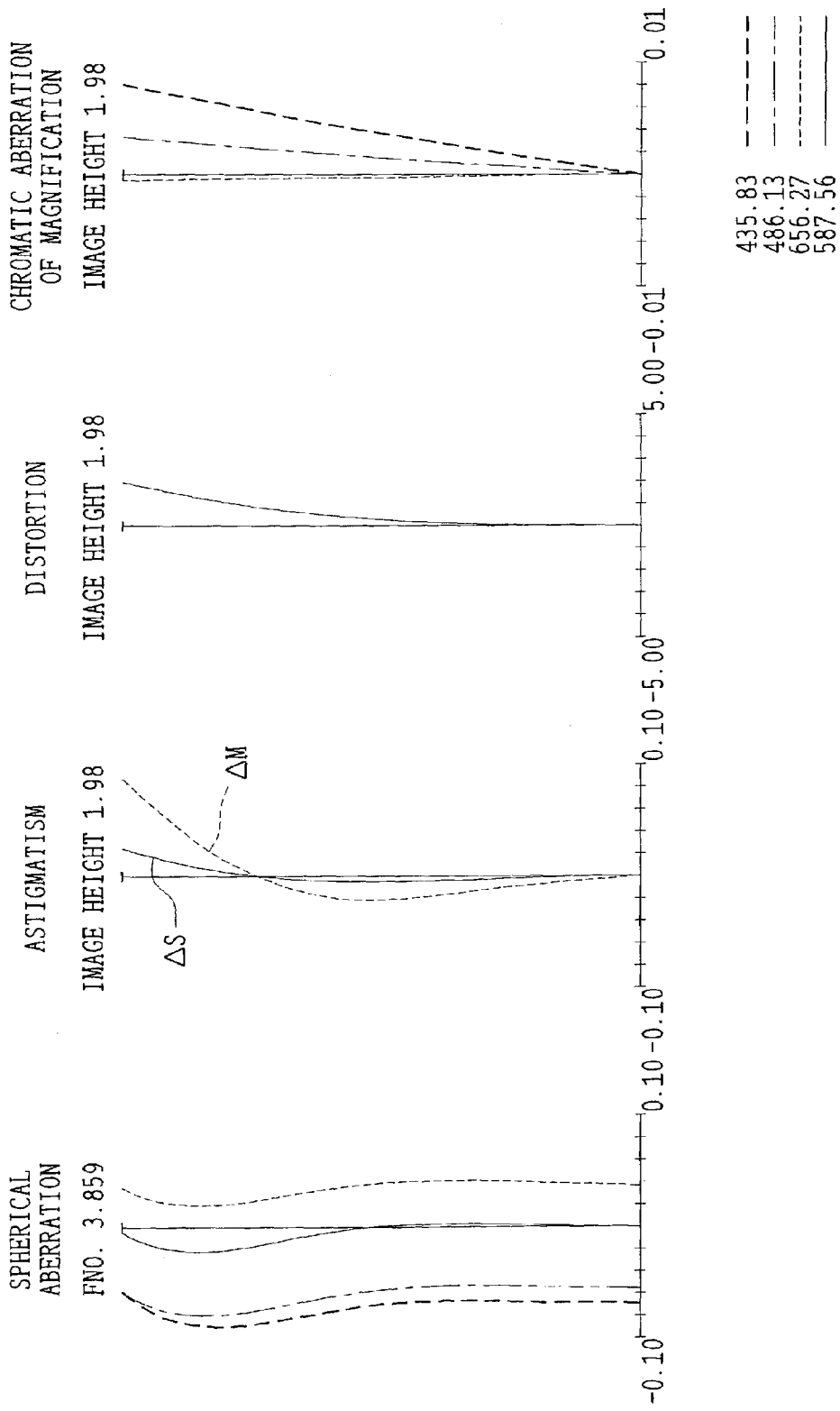

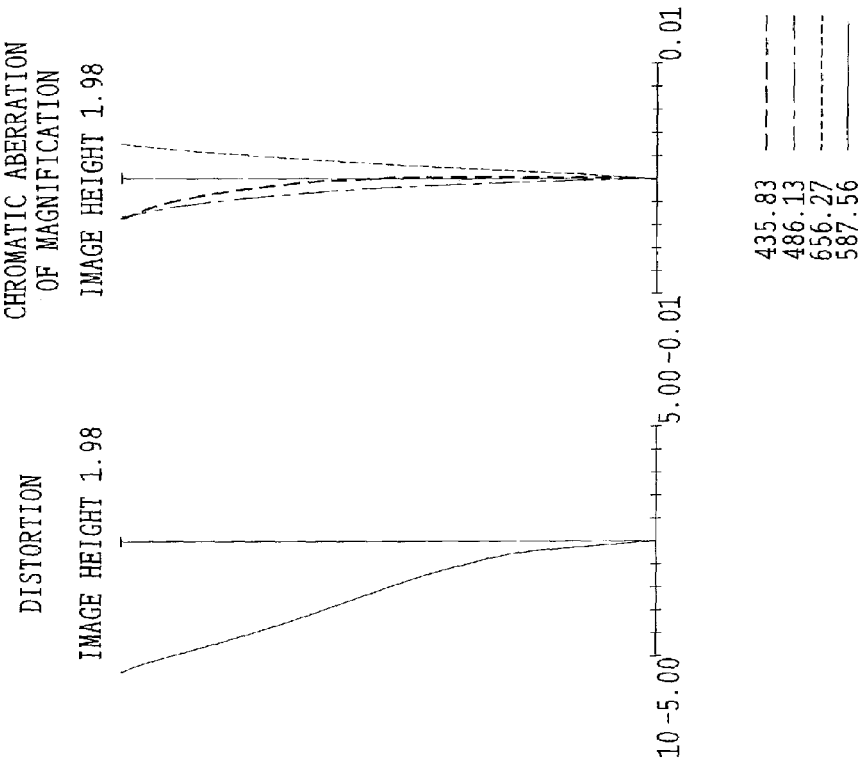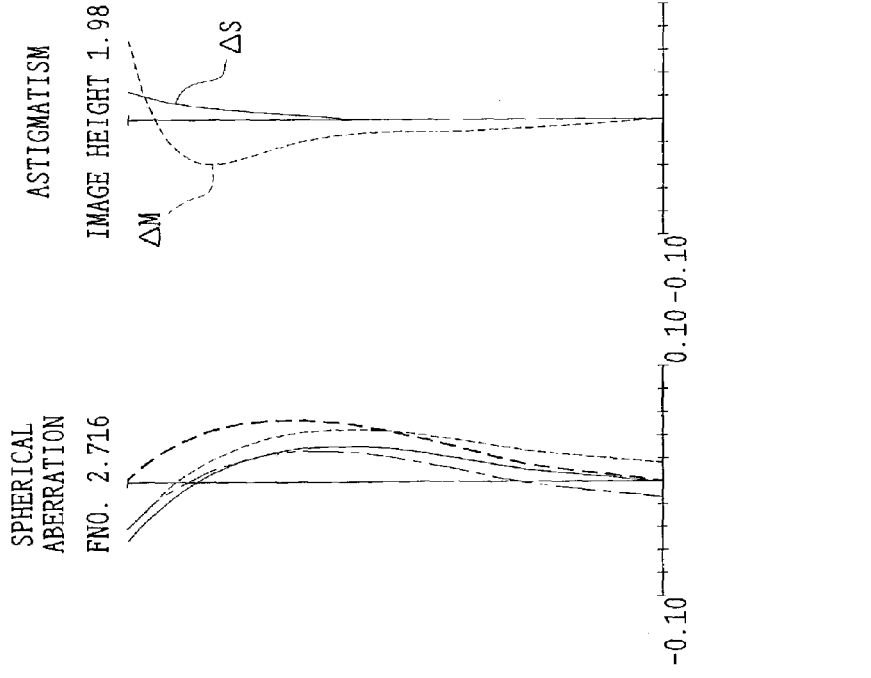

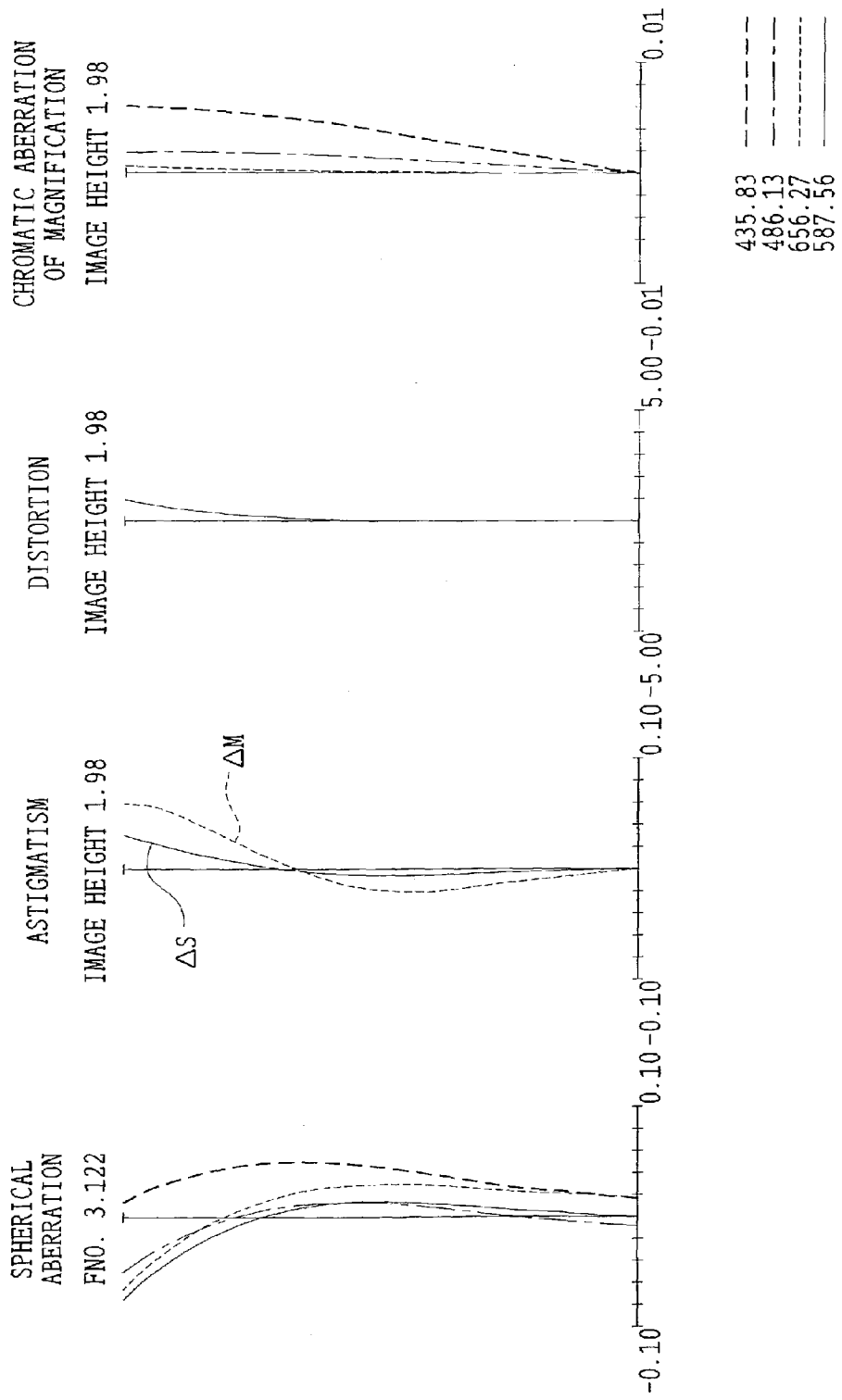

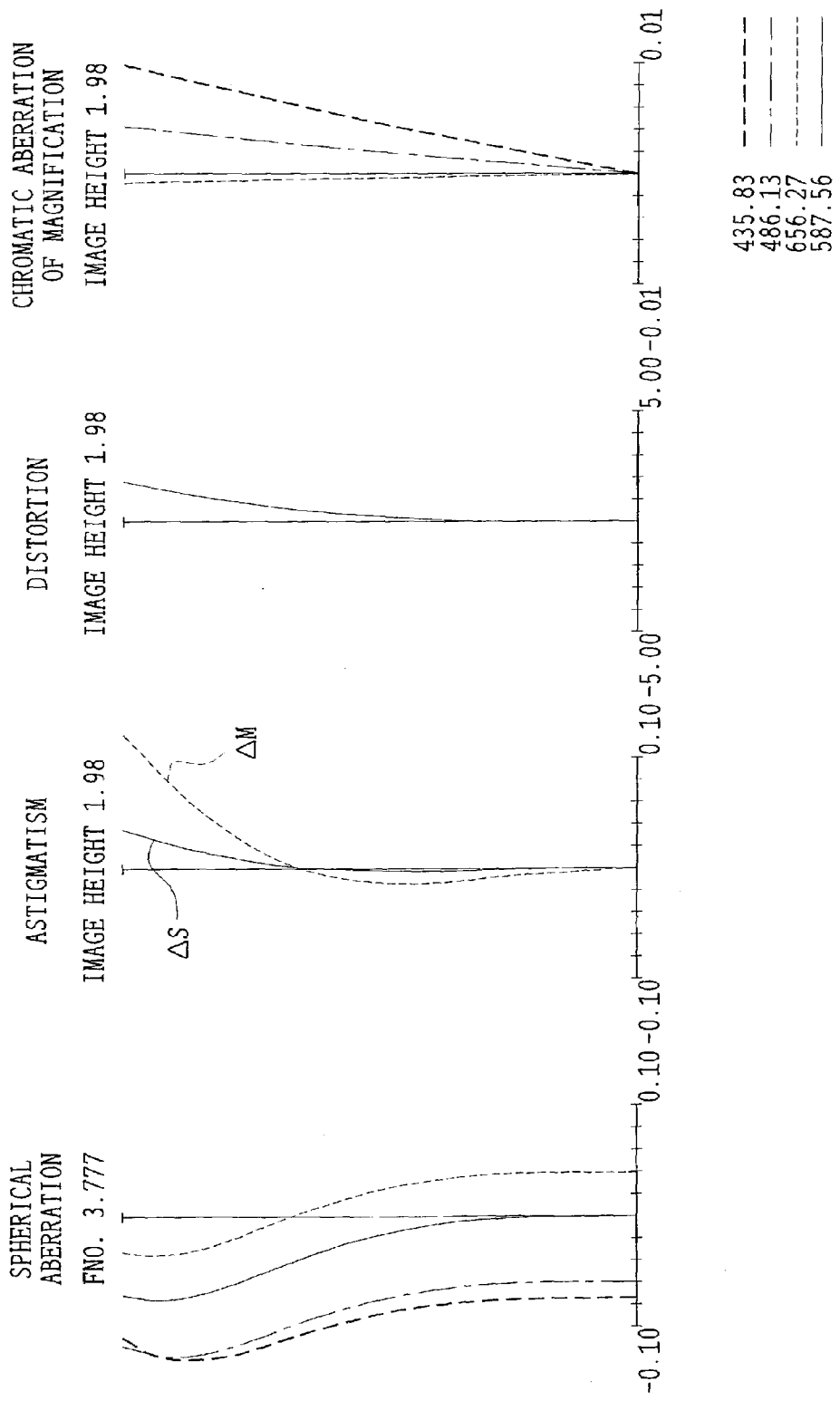

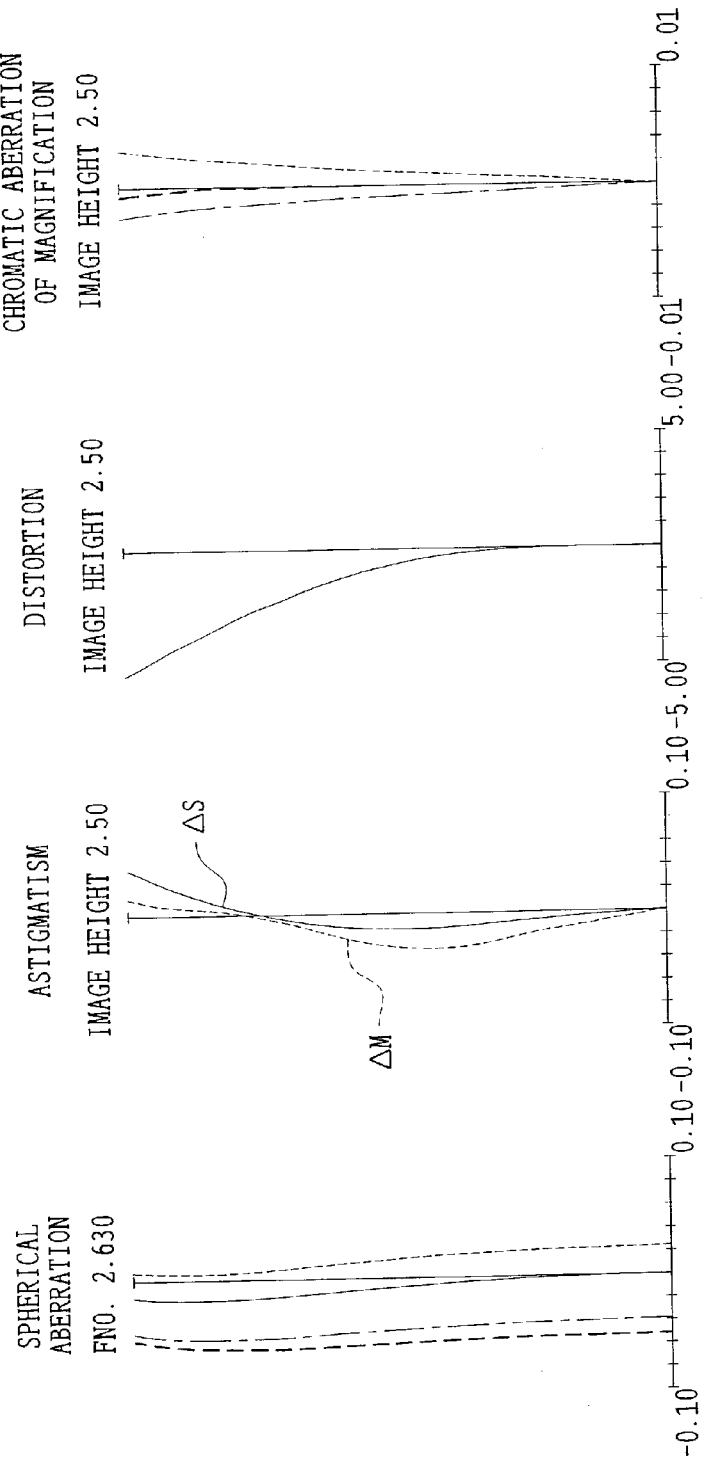

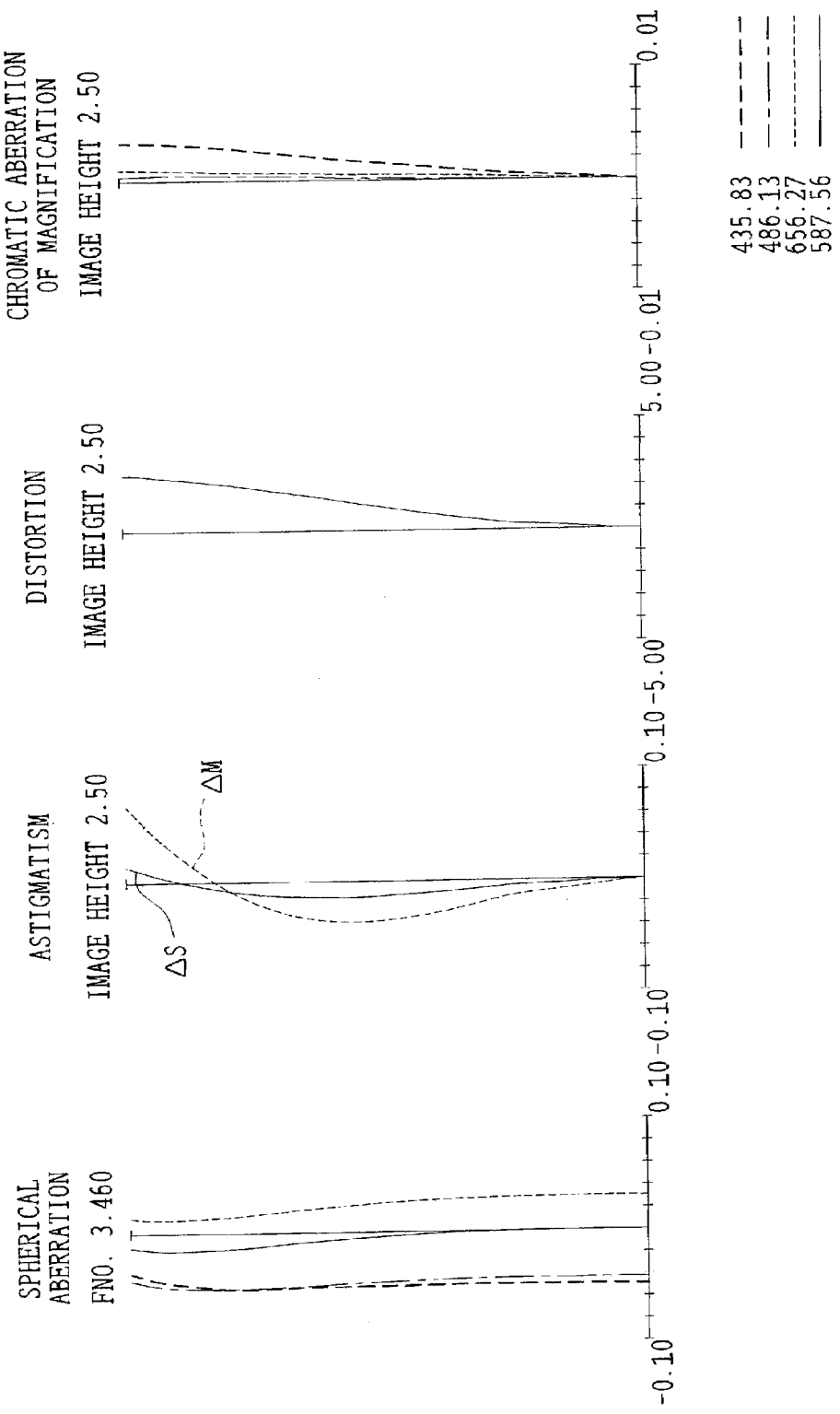

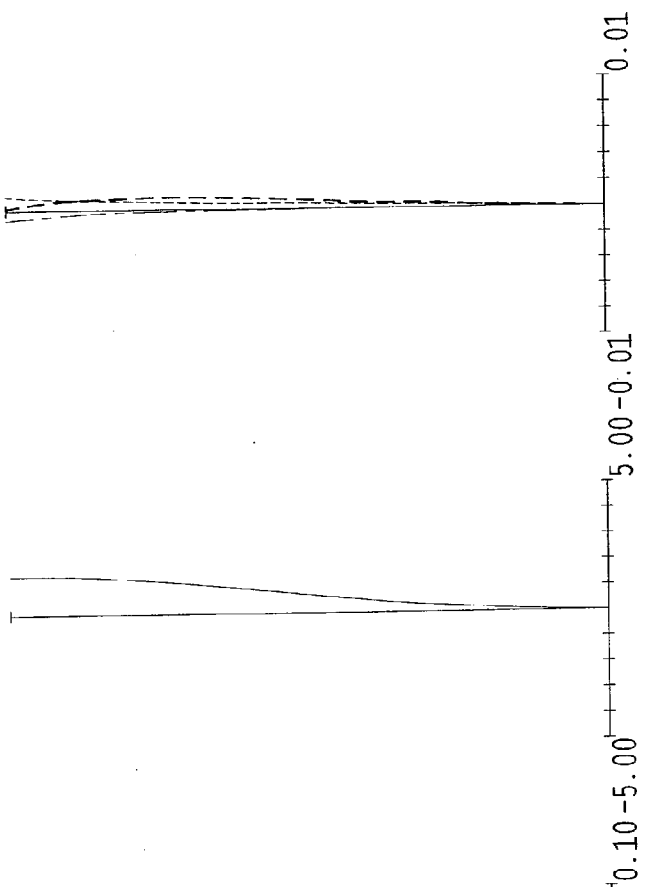

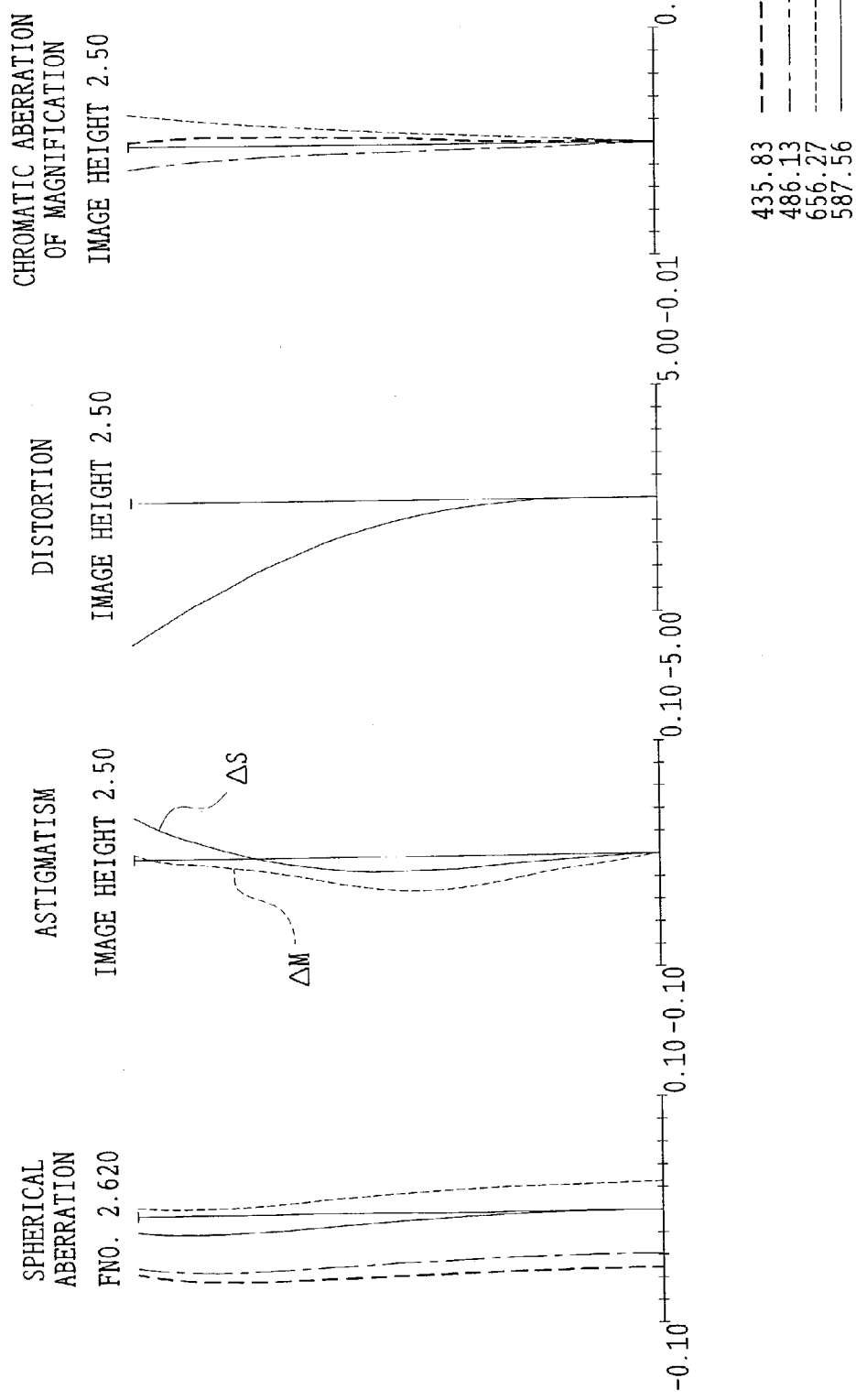

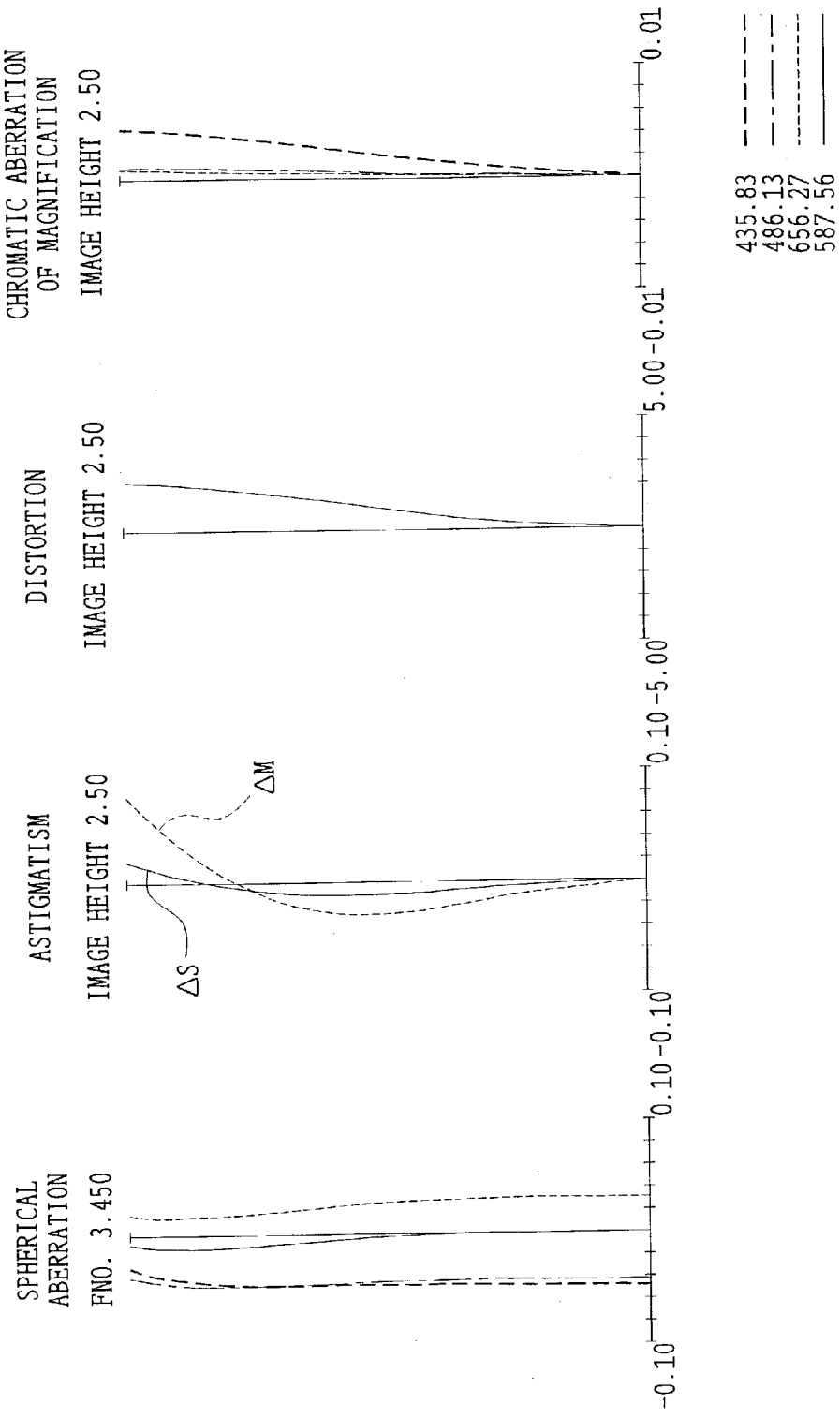

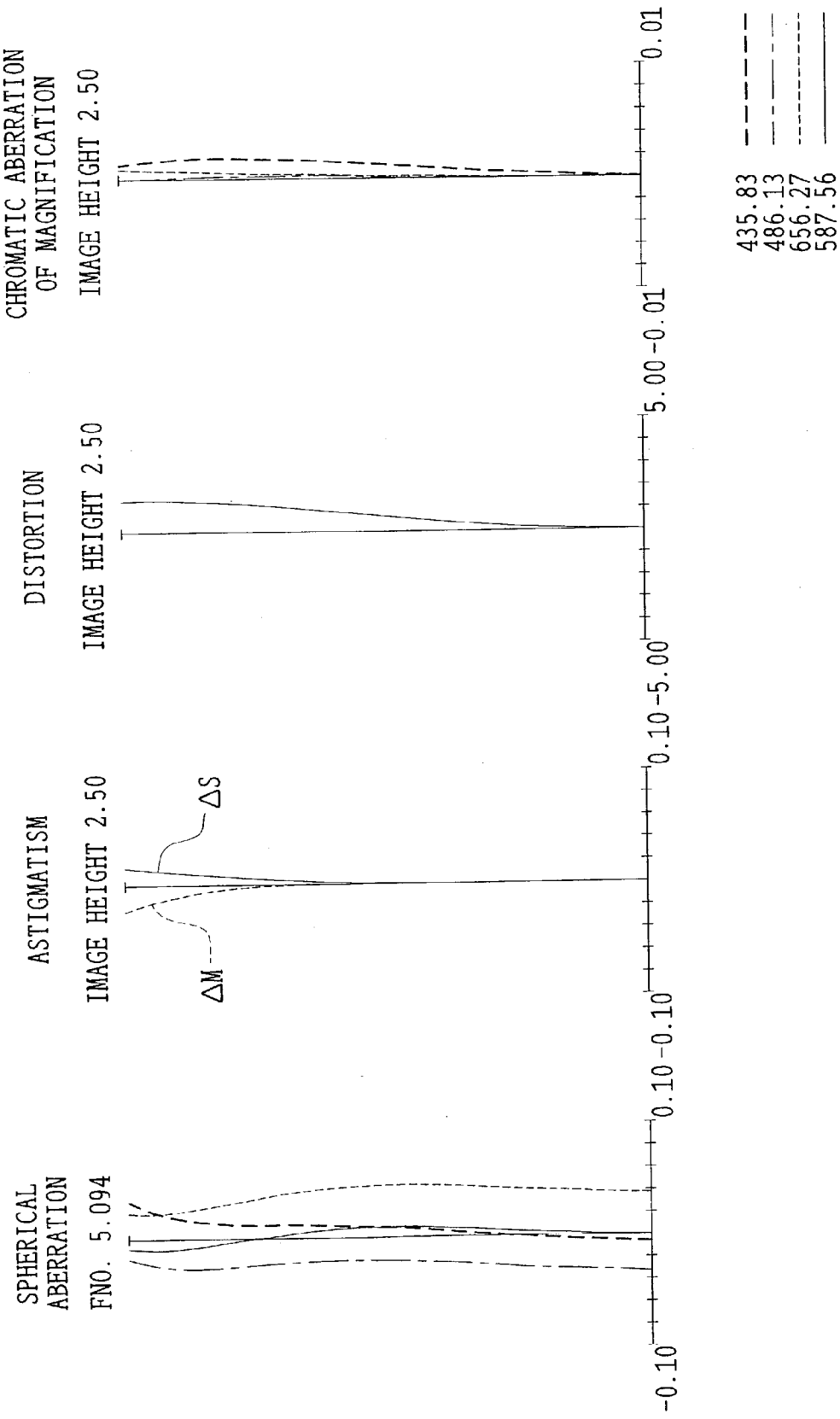

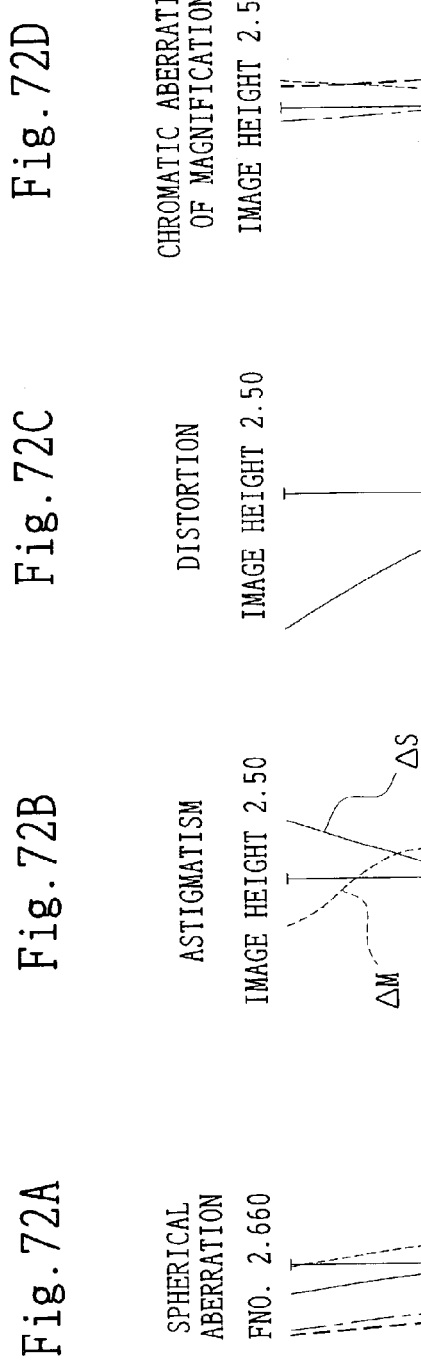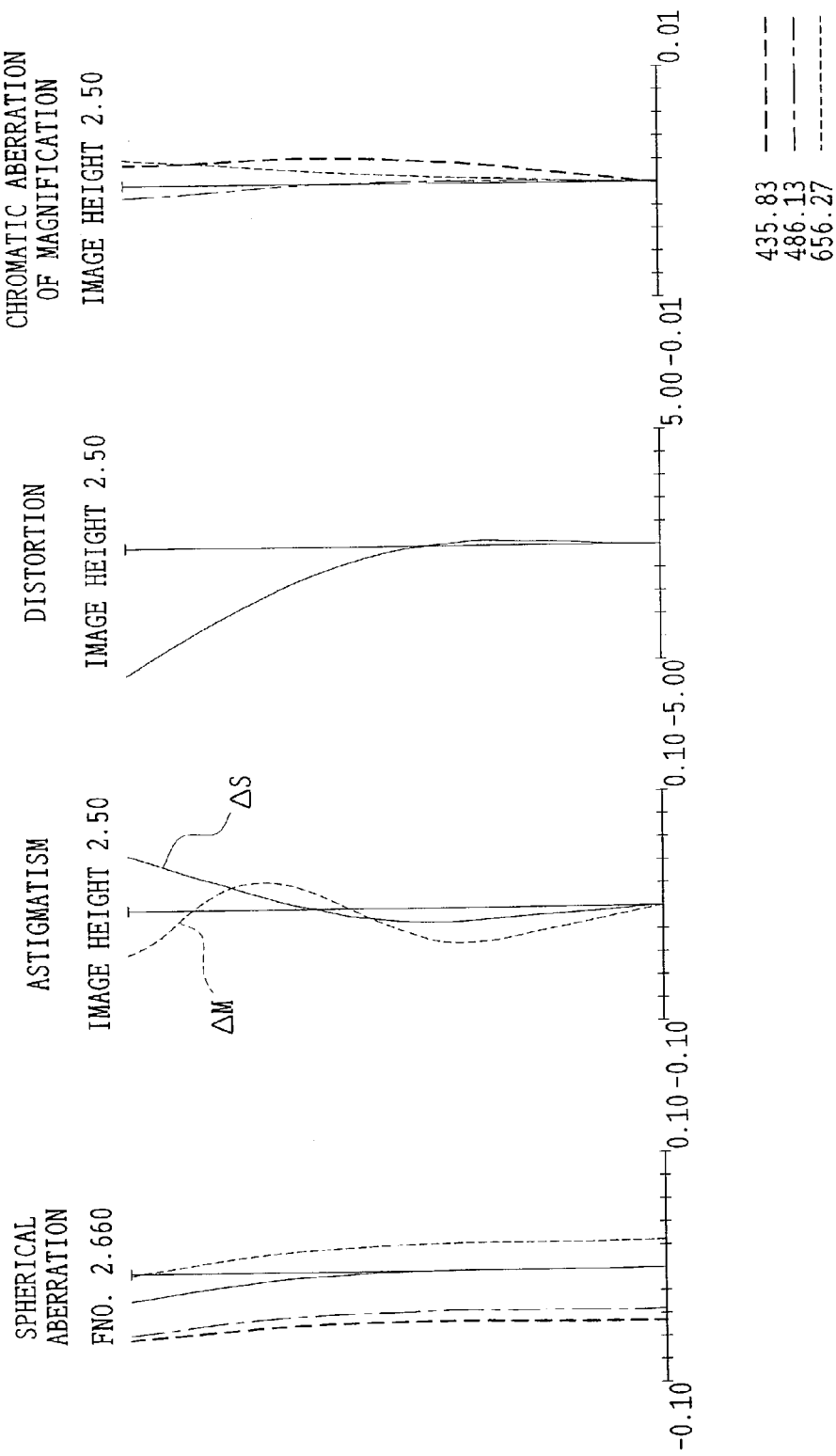

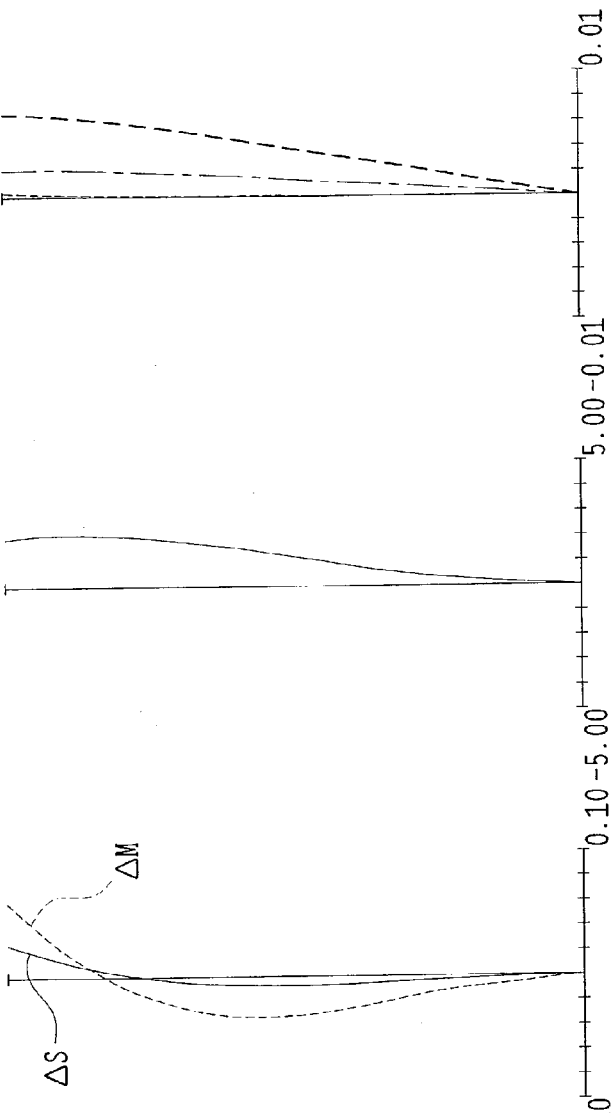

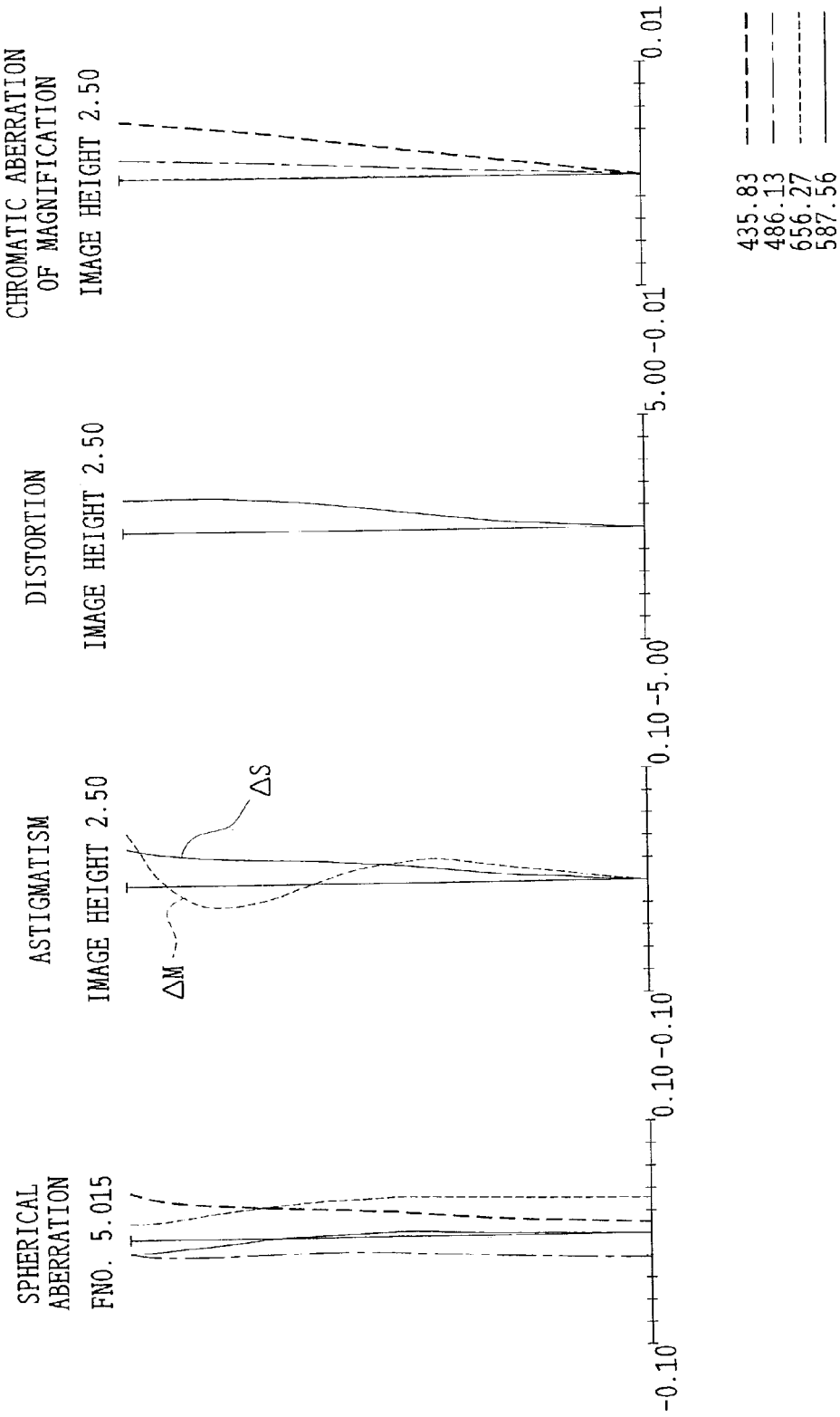

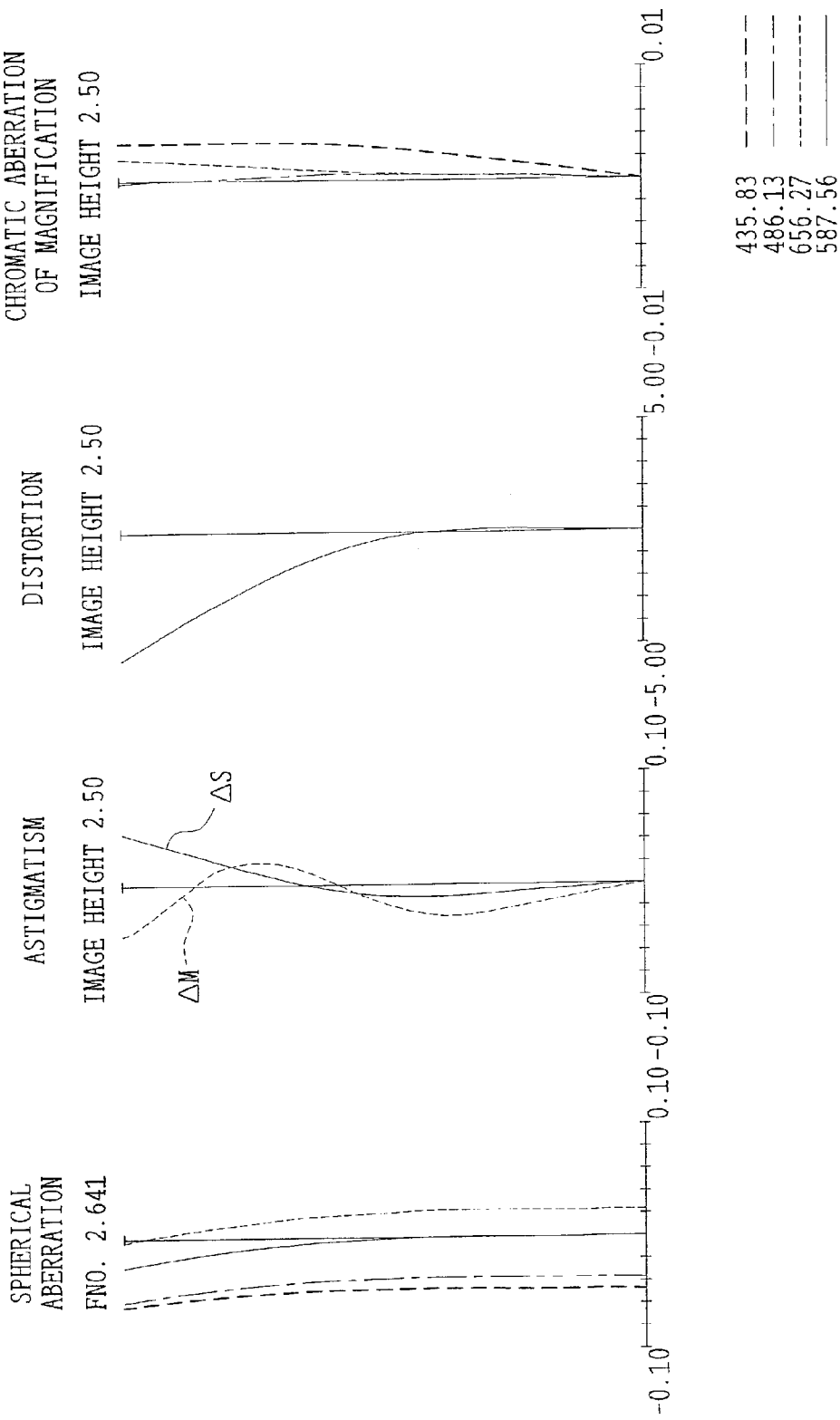

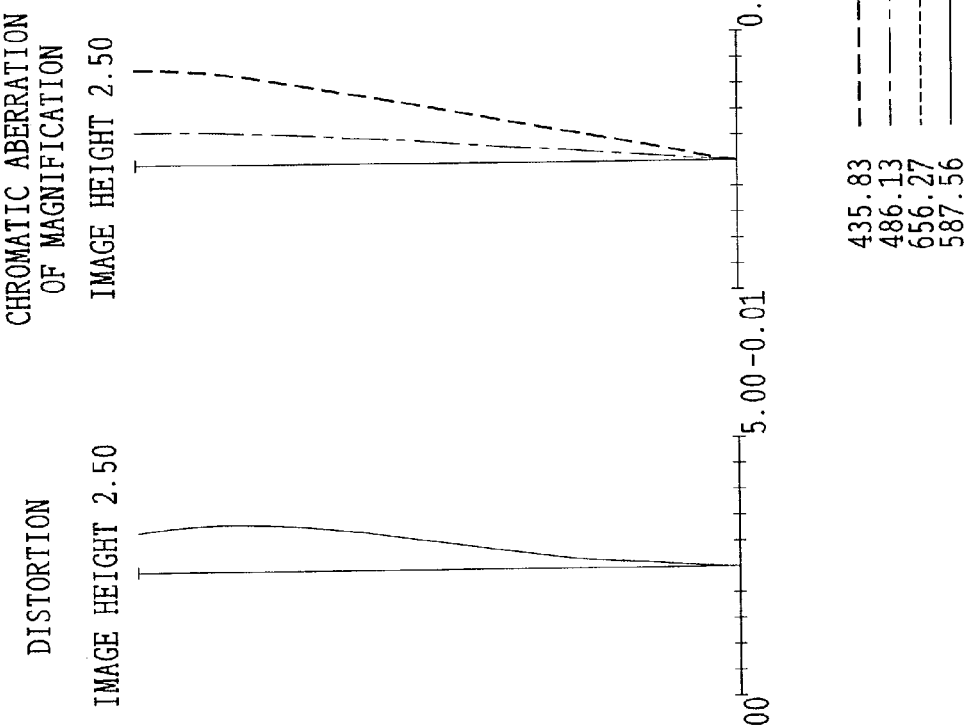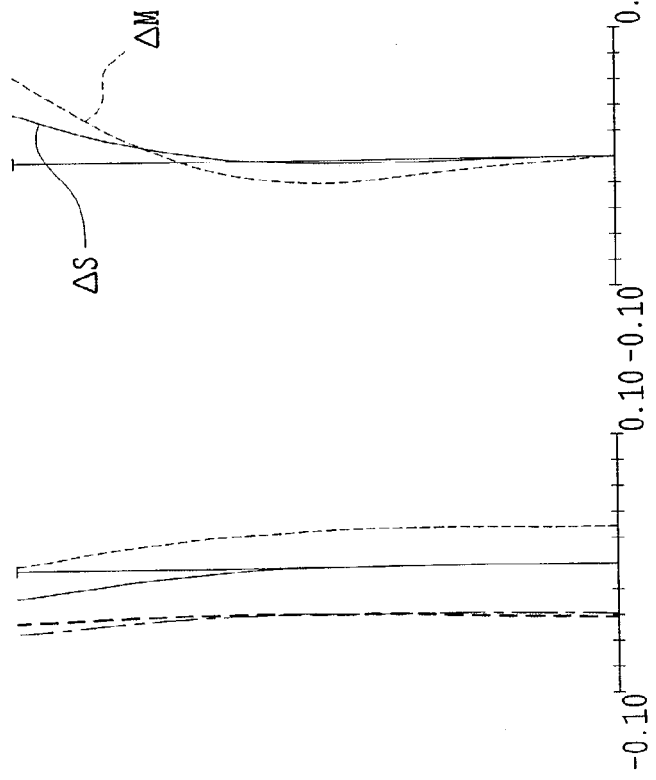

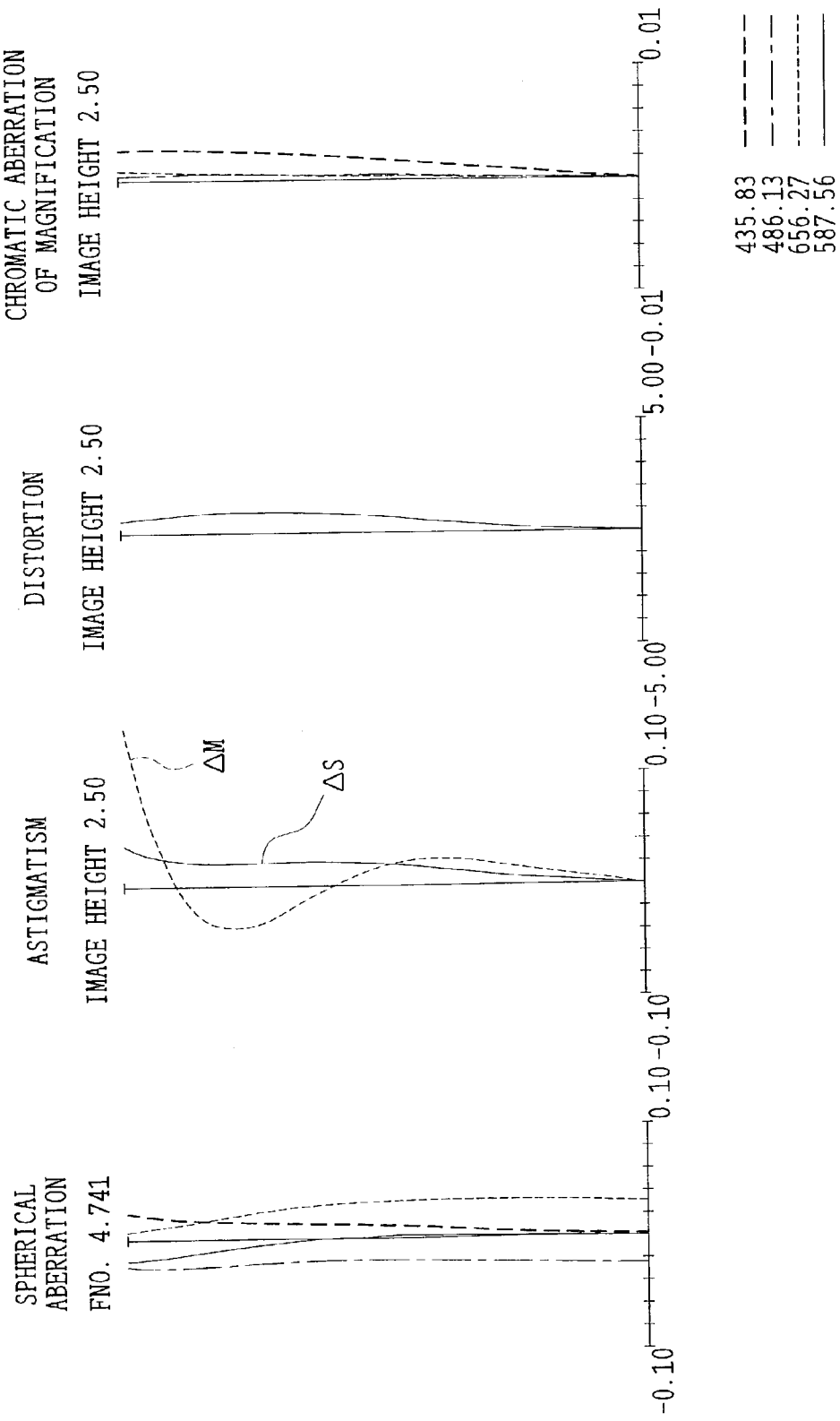

COMPLEMENTARY MOSAIC COLOR FILTER

C : CYAN  M : MAGENTA
Ye : YELLOW  G : GREEN

WAVELENGTH (nm)

ZOOM LENS AND ELECTRONIC IMAGING DEVICE HAVING THE SAME

BACKGROUND OF THE INVENTION

1. Field of the Invention

The present invention relates to a zoom lens and an electronic imaging device having this zoom lens, and in particular, to a zoom lens which allows a slim design of a video camera, a digital camera, or any other electronic imaging device.

2. Description of Related Art

Recently, as the next generation camera of an alternative to a silver halide 35 mm film (135 format) camera, special attention has been devoted to a digital camera (an electronic camera). Such digital cameras have come to have many categories in a wide range from a high-function type for business use to a popular portable type.

The thickness of an optical system, notably a zoom lens system, from the most object-side surface to an imaging plane constitutes a chief obstacle to a reduction in depth of a camera.

The slim design technique of a camera body chiefly used in recent years adopts a so-called collapsible lens barrel that although the optical system protrudes from the front side of the camera body in photography, it is incorporated in the camera body when the camera is not used.

Examples of optical systems having possibilities that the collapsible lens barrel is used and the slim design can be effectively achieved are set forth in Japanese Patent Kokai Nos. Hei 11-194274, Hei 11-287953, and 2000-9997. Each of the optical systems includes, in order form the object side, a first lens unit with negative refracting power and a second lens unit with positive refracting power so that when the magnification of the optical system is changed, both the first lens unit and the second lens unit are moved.

The adoption of the collapsible lens barrel, however, requires much time to bring lenses into a working state from an incorporating state, which is unfavorable for use. Furthermore, the design that the most object-side lens unit is moved is unfavorable for water and dust proof. Also, there is physical restriction of fabrication limit size as to the direction of thickness of a lens part. The length of the collapsible lens barrel is governed by the thicknesses of lens parts, and thus even though further compactness of an image sensor is achieved in the future, the slim design of the camera in its depth according to the compactness cannot be expected.

On the other hand, in order to obtain a camera which does not have rising time (lens shifting time) required to bring the camera into the working state like the collapsible lens barrel, is favorable for water and dust proof, and is extremely small in depth, it is conceivable that the optical system is constructed so that the optical path (optical axis) is bent by a reflective optical component such as a mirror. In this case, even though the depth can be made small, the overall length of the optical path after being bent is increased, and hence dimensions other than that of the depth tend to become large. In this construction that the optical path is bent, however, it can be expected that when further compactness of the image sensor is realized in the future, the depth can be made small in accordance with the compactness. On the other hand, however, account must be taken of the influence of diffraction due to the compactness of the image sensor.

SUMMARY OF THE INVENTION

The zoom lens according to the present invention includes, at least, a most object-side lens unit located at a most object-side position, remaining fixed on the optical axis when the magnification of the zoom lens is changed and a focusing operation is performed; a most image-side lens unit located at a most image-side position, remaining fixed on the optical axis when the focusing operation is performed; and moving lens units lying between the most object-side lens unit and the most image-side lens unit, moved along the optical axis when the magnification is changed. The most object-side lens unit includes, in order from the object side, a negative lens component, a front surface mirror having a reflecting surface for bending the optical path, and a positive lens component. The most image-side lens unit has at least one aspherical surface.

The zoom lens according to the present invention has, in order from the object side, a first lens unit including a positive lens component, constructed as a most object-side lens unit remaining fixed when the magnification is changed; a second lens unit with negative refracting power, constructed as a first moving lens unit moved along the optical axis when the magnification is changed; a third lens unit with positive refracting power, constructed as a second moving lens unit moved along the optical axis when the magnification is changed; and a most image-side lens unit located at a most image-side position. The first lens unit includes a negative lens component and a front surface mirror having a reflecting surface for bending the optical path, arranged in this order from the object side, and the reflecting surface is deformable.

According to the present invention, when the magnification is changed, extending from the wide-angle position to the telephoto position, in focusing of an infinite object point, the second lens unit is constructed so that it is moved back and forth along the optical axis on the image side, following a convex path.

According to the present invention, the profile of the reflecting surface is changed and thereby the focusing operation is performed.

According to the present invention, the reflecting surface is constructed with a thin film with which a metal or dielectric is coated, and the thin film is connected to a power source through a plurality of electrodes and variable resistors. An arithmetical unit controlling the resistance values of the variable resistors is provided to control the distribution of electrostatic forces applied to the thin film. Whereby, the profile of the reflecting surface can be changed.

The zoom lens according to the present invention includes, in order from the object side, a first lens unit having a reflective optical component with a reflecting surface for bending the optical path, constructed as a most object-side lens unit remaining fixed when the magnification is changed; a second lens unit with negative refracting power, constructed as a first moving lens unit moved along the optical axis when the magnification is changed; a third lens unit with positive refracting power, constructed as a second moving lens unit moved along the optical axis when the magnification is changed; and a most image-side lens unit located at a most image-side position. In this case, when the magnification is changed, extending from the wide-angle position to the telephoto position, in focusing of the infinite object point, the second lens unit is constructed so that it is moved back and forth along the optical axis on the image side, following a convex path.

According to the present invention, in the focusing operation of a short-distance object point, the second lens unit is shifted to the object side.

According to the present invention, a lens unit moved along the optical axis in the focusing operation of the short-distance object point is interposed between the third lens unit and the most image-side lens unit.

According to the present invention, the third lens unit includes a cemented lens component with a positive lens and a negative lens, and a single lens component. It is moved toward only the object side when the magnification is changed, extending from the wide-angle position to the telephoto position.

The electronic imaging device according to the present invention has any zoom lens mentioned above and an electronic image sensor placed on the image side thereof.

These and other objects as well as the features and advantages of the present invention will become apparent from the following detailed description of the preferred embodiments when taken in conjunction with the accompanying drawings.

BRIEF DESCRIPTION OF THE DRAWINGS

FIG. 1 is a sectional view showing an optical arrangement, developed along the optical axis, at the wide-angle position where the optical path is bent in focusing of the infinite object point, in a first embodiment of the zoom lens according to the present invention;

FIGS. 3A, 3B, 3C, and 3D are diagrams showing aberration characteristics at the wide-angle position, in focusing of the infinite object point, of the zoom lens in the first embodiment;

FIGS. 4A, 4B, 4C, and 4D are diagrams showing aberration characteristics at the middle position, in focusing of the infinite object point, of the zoom lens in the first embodiment;

FIGS. 5A, 5B, 5C, and 5D are diagrams showing aberration characteristics at the telephoto position, in focusing of the infinite object point, of the zoom lens in the first embodiment;

FIG. 6 is a sectional view showing an optical arrangement, developed along the optical axis, at the wide-angle position where the optical path is bent in focusing of the infinite object point, in a second embodiment of the zoom lens according to the present invention;

FIGS. 10A, 10B, 10C, and 10D are diagrams showing aberration characteristics at the wide-angle position, in focusing of the infinite object point, of the zoom lens in the third embodiment;

FIGS. 11A, 11B, 11C, and 11D are diagrams showing aberration characteristics at the middle position, in focusing of the infinite object point, of the zoom lens in the third embodiment;

FIGS. 12A, 12B, 12C, and 12D are diagrams showing aberration characteristics at the telephoto position, in focusing of the infinite object point, of the zoom lens in the third embodiment;

FIGS. 15A, 15B, 15C, and 15D are diagrams showing aberration characteristics at the wide-angle position, in focusing of the infinite object point, of the zoom lens in the fourth embodiment;

FIGS. 17A, 17B, 17C, and 17D are diagrams showing aberration characteristics at the telephoto position, in focusing of the infinite object point, of the zoom lens in the fourth embodiment;

FIG. 24 is a sectional view showing an optical arrangement, developed along the optical axis, at the wide-angle position where the optical path is bent in focusing of the infinite object point, in an eighth embodiment of the zoom lens according to the present invention;

FIGS. 27A, 27B, 27C, and 27D are diagrams showing aberration characteristics at the middle position, in focusing of the infinite object point, of the zoom lens in the eighth embodiment;

FIGS. 28A, 28B, 28C, and 28D are diagrams showing aberration characteristics at the telephoto position, in focusing of the infinite object point, of the zoom lens in the eighth embodiment;

FIGS. 29A, 29B, 29C, and 29D are diagrams showing aberration characteristics at the wide-angle position, in focusing of the short-distance object point, of the zoom lens in the eighth embodiment;

FIGS. 30A, 30B, 30C, and 30D are diagrams showing aberration characteristics at the middle position, in focusing of the short-distance object point, of the zoom lens in the eighth embodiment;

FIGS. 31A, 31B, 31C, and 31D are diagrams showing aberration characteristics at the telephoto position, in focusing of the short-distance object point, of the zoom lens in the eighth embodiment;

FIGS. 34A, 34B, 34C, and 34D are diagrams showing aberration characteristics at the wide-angle position, in focusing of the infinite object point, of the zoom lens in the ninth embodiment;

FIGS. 35A, 35B, 35C, and 35D are diagrams showing aberration characteristics at the middle position, in focusing of the infinite object point, of the zoom lens in the ninth embodiment;

FIGS. 36A, 36B, 36C, and 36D are diagrams showing aberration characteristics at the telephoto position, in focusing of the infinite object point, of the zoom lens in the ninth embodiment;

FIGS. 38A, 38B, 38C, and 38D are diagrams showing aberration characteristics at the middle position, in focusing of the short-distance object point, of the zoom lens in the ninth embodiment;

FIGS. 39A, 39B, 39C, and 39D are diagrams showing aberration characteristics at the telephoto position, in focusing of the short-distance object point, of the zoom lens in the ninth embodiment;

FIGS. 44A, 44B, 44C, and 44D are diagrams showing aberration characteristics at the wide-angle position, in focusing of the infinite object point, of the zoom lens in the eleventh embodiment;

FIGS. 45A, 45B, 45C, and 45D are diagrams showing aberration characteristics at the middle position, in focusing of the infinite object point, of the zoom lens in the eleventh embodiment;

FIGS. 46A, 46B, 46C, and 46D are diagrams showing aberration characteristics at the telephoto position, in focusing of the infinite object point, of the zoom lens in the eleventh embodiment;

FIGS. 47A, 47B, 47C, and 47D are diagrams showing aberration characteristics at the wide-angle position, in focusing of the short-distance object point, of the zoom lens in the eleventh embodiment;

FIGS. 48A, 48B, 48C, and 48D are diagrams showing aberration characteristics at the middle position, in focusing of the short-distance object point, of the zoom lens in the eleventh embodiment;

FIGS. 49A, 49B, 49C, and 49D are diagrams showing aberration characteristics at the telephoto position, in focusing of the short-distance object point, of the zoom lens in the eleventh embodiment;

FIGS. 52A, 52B, 52C, and 52D are diagrams showing aberration characteristics at the wide-angle position, in focusing of the infinite object point, of the zoom lens in the twelfth embodiment;

FIGS. 53A, 53B, 53C, and 53D are diagrams showing aberration characteristics at the middle position, in focusing of the infinite object point, of the zoom lens in the twelfth embodiment;

FIGS. 54A, 54B, 54C, and 54D are diagrams showing aberration characteristics at the telephoto position, in focusing of the infinite object point, of the zoom lens in the twelfth embodiment;

FIGS. 55A, 55B, 55C, and 55D are diagrams showing aberration characteristics at the wide-angle position, in focusing of the short-distance object point, of the zoom lens in the twelfth embodiment;

FIGS. 56A, 56B, 56C, and 56D are diagrams showing aberration characteristics at the middle position, in focusing of the short-distance object point, of the zoom lens in the twelfth embodiment;

FIGS. 57A, 57B, 57C, and 57D are diagrams showing aberration characteristics at the telephoto position, in focusing of the short-distance object point, of the zoom lens in the twelfth embodiment;

FIGS. 60A, 60B, 60C, and 60D are diagrams showing aberration characteristics at the wide-angle position, in focusing of the infinite object point, of the zoom lens in the thirteenth embodiment;

FIGS. 61A, 61B, 61C, and 61D are diagrams showing aberration characteristics at the middle position, in focusing of the infinite object point, of the zoom lens in the thirteenth embodiment;

FIGS. 62A, 62B, 62C, and 62D are diagrams showing aberration characteristics at the telephoto position, in focusing of the infinite object point, of the zoom lens in the thirteenth embodiment;

FIGS. 63A, 63B, 63C, and 63D are diagrams showing aberration characteristics at the wide-angle position, in focusing of the short-distance object point, of the zoom lens in the thirteenth embodiment;

FIGS. 64A, 64B, 64C, and 64D are diagrams showing aberration characteristics at the middle position, in focusing of the short-distance object point, of the zoom lens in the thirteenth embodiment;

FIGS. 65A, 65B, 65C, and 65D are diagrams showing aberration characteristics at the telephoto position, in focusing of the short-distance object point, of the zoom lens in the thirteenth embodiment;

FIGS. 72A, 72B, 72C, and 72D are diagrams showing aberration characteristics at the wide-angle position, in focusing of the infinite object point, of the zoom lens in the sixteenth embodiment;

FIGS. 73A, 73B, 73C, and 73D are diagrams showing aberration characteristics at the middle position, in focusing of the infinite object point, of the zoom lens in the sixteenth embodiment;

FIGS. 74A, 74B, 74C, and 74D are diagrams showing aberration characteristics at the telephoto position, in focusing of the infinite object point, of the zoom lens in the sixteenth embodiment;

FIGS. 75A, 75B, 75C, and 75D are diagrams showing aberration characteristics at the wide-angle position, in focusing of the short-distance object point, of the zoom lens in the sixteenth embodiment;

FIGS. 76A, 76B, 76C, and 76D are diagrams showing aberration characteristics at the middle position, in focusing of the short-distance object point, of the zoom lens in the sixteenth embodiment;

FIGS. 77A, 77B, 77C, and 77D are diagrams showing aberration characteristics at the telephoto position, in focusing of the short-distance object point, of the zoom lens in the sixteenth embodiment;

DETAILED DESCRIPTION OF THE PREFERRED EMBODIMENTS

Figure 2A:
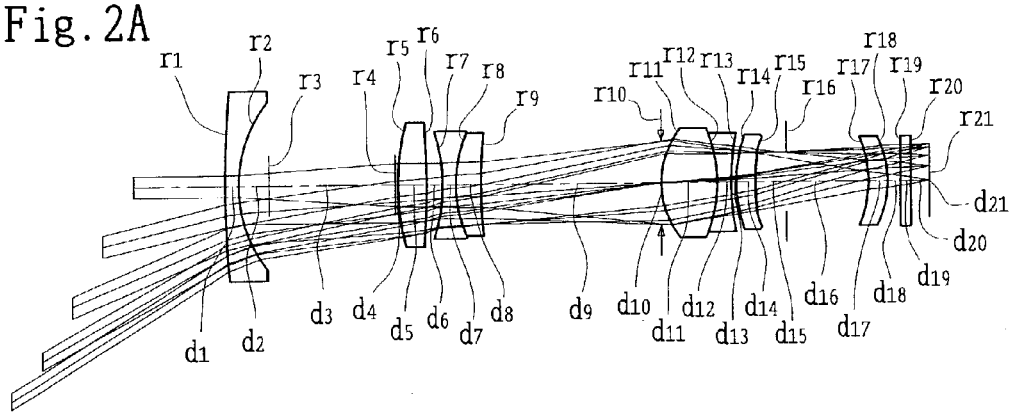
FIGS. 2A, 2B, and 2C are sectional views showing optical arrangements, developed along the optical axis, at wide-angle, middle, and telephoto positions, respectively, in focusing of the infinite object point, of the zoom lens in the first embodiment.

Before undertaking the description of the embodiments, the construction of function of the present invention will be explained.

In the imaging device of the present invention, the construction that the optical path (optical axis) of a zoom lens system is bent by a reflective optical component, such as a mirror or a prism, is adopted and various devices are used for its compactness.

The zoom lens system of the present invention has a fundamental arrangement that a most object-side lens unit (hereinafter referred to as a first lens unit) includes, in order from the object side, a negative lens component, a reflecting surface (front surface mirror) for bending the optical path, and a positive lens component so that these remain fixed when the magnification of the zoom lens system is changed and the focusing operation is performed, while a most image-side lens unit (hereinafter referred to as a last lens unit) has an aspherical surface so that the lens unit remains fixed when the focusing operation is performed, and other lens units moved for changing the magnification are interposed between the above two lens units. (Also, in the present invention, a lens component refers to a lens in which only the most object-side lens surface and the most image-side lens surface come in contact with air and air is not interposed between them. A single lens or a cemented lens is assumed to be one unit.)

However, when the reflecting surface (front surface mirror) for bending the optical path is placed in the first lens unit, the following two problems arise.

First, the distance to the entrance pupil is increased and individual lens elements constituting the first lens unit which have originally large diameters are further bulked. Consequently, it becomes difficult to determine whether the arrangement for bending the optical path can be used.

Second, a combined variable magnification ratio of individual lens units, each located on the image side of the first lens unit and exercising a variable magnification function, approaches zero and becomes low for the amount of movement of the lens units.

Here, a description is given of conditions for accomplishing path bending.

When the reflecting surface (front surface mirror) for bending the optical path is placed in the first lens unit, there is a tendency that the distance to the entrance pupil is necessarily increased, so that the diameter or size of each of optical elements constituting the first lens unit is bulked and it becomes hard to physically accomplish the path bending.

The first lens unit is thus constructed with, in order from the object side, the negative lens with a convex surface directed toward the object side, the reflecting surface (front surface mirror) for bending the optical path, and the positive lens, and thereby the distance to the entrance pupil is reduced.

Hence, in order to ensure a space for the path bending, the negative lens component and the positive lens component of the first lens unit are arranged at a distance from each other while having strong powers of some degree. Consequently, off-axis aberration, such as coma, astigmatism, or distortion, is naturally deteriorated, but such aberration can be corrected by introducing an aspherical surface into the last lens unit.

On the other hand, the amount of correction of off-axis aberration by the aspherical surface of the last lens unit is conspicuously large, and when it is used in rear focusing, the off-axis aberration fluctuates considerably. It is thus desirable that the last lens unit is made to remain fixed in focusing, and another path bending element in the system is used in such a way that, for example, the shape of the reflecting surface (front surface mirror) for bending the optical path is changed and controlled.

In order to physically accomplish the path bending, it is desirable to satisfy Conditions (1) and (2), preferably Conditions (3) and (4), described below.

$$1.0 < -f11/\sqrt{(fw \cdot fT)} < 2.5 \qquad (1)$$

$$1.4 < f12/\sqrt{(fw \cdot fT)} < 3.2 \qquad (2)$$

$$0.7 < d/L < 2.0 \qquad (3)$$

$$1.55 < npri \qquad (4)$$

where f11 is the focal length of the negative lens component in the most object-side lens unit, f12 is the focal length of the positive lens component in the most object-side lens unit, fw is the focal length of the entire system at the wide-angle position of the zoom lens, fT is the focal length of the entire system at the telephoto position of the zoom lens, d is an air-equivalent length measured along the optical axis from the image-side vertex of the negative lens component to the object-side vertex of the positive lens component in the most object-side lens unit, L is the diagonal length of an effective imaging area of an electronic image sensor, and npri is the refractive index of a medium at the d line in the case where the reflective optical component for bending the optical path in the first lens unit is a prism. (Also, in the present invention, a lens component refers to a lens in which only the most object-side lens surface and the most image-side lens surface come in contact with air and air is not interposed between them. A single lens or a cemented lens is assumed to be one unit.)

In order to reduce the distance to the entrance pupil to make the path bending physically possible, it is desirable to satisfy Conditions (1) and (2) so that the powers of lens elements on both sides of the first lens unit are strengthened.

If the upper limit of each of Conditions (1) and (2) is overstepped, the distance to the entrance pupil will remain long, and thus when an attempt is made to ensure a field angle to some degree, the diameter or size of each of optical elements constituting the first lens unit is bulked and it becomes hard to physically accomplish the path bending.

Below the lower limit of each of Conditions (1) and (2), the diameter of the positive lens component of the first lens unit is bulked, and correction for off-axis aberration, such as coma, astigmatism, or distortion, becomes difficult.

Condition (3) defines a length measured along the optical axis which is required to provide the reflecting surface (front surface mirror) for bending the optical path. It is favorable that the value of Condition (3) is as small as possible. Below the lower limit, the path bending is not accomplished or a light beam contributing to image formation on an image periphery fails to satisfactorily reach the image plane. In addition, ghost is easily produced.

Beyond the upper limit of Condition (3), on the other hand, correction for off-axis aberration becomes difficult, like the case of Conditions (1) and (2).

From the above viewpoint, in order to reduce the air-equivalent length d of Condition (3), it is desirable that the path bending element of the first lens unit is constructed as a prism in which the entrance surface and the exit surface are flat or which has surfaces of curvatures different from those of lens surfaces of lenses located on both sides thereof, and the refractive index of its medium satisfies Condition (4).

Below the lower limit of Condition (4), it becomes hard to physically accomplish the path bending, or correction for off-axis aberration becomes difficult.

However, it is desirable that the upper limit of Condition (4) is taken as 1.9 and this value is not exceeded. Beyond the upper limit of 1.9, a prism of costly material must be used.

It is more desirable to satisfy at least one of the following conditions:

$$1.2 < -f11/\sqrt{(fw \cdot fT)} < 2.2 \qquad (1')$$

$$1.5 < f12/\sqrt{(fw \cdot fT)} < 3.0 \qquad (2')$$

$$0.8 < d/L < 1.8 \qquad (3')$$

$$1.65 < npri \qquad (4')$$

It is most desirable to satisfy at least one of the following conditions:

$$1.4 < -f11/\sqrt{(fw \cdot fT)} < 1.9 \qquad (1'')$$

$$1.6 < f12/\sqrt{(fw \cdot fT)} < 2.8 \qquad (2'')$$

$$0.9 < d/L < 1.6 \qquad (3'')$$

$$1.75 < npri \qquad (4'')$$

As mentioned above, when the negative lens component and the positive lens component of the first lens unit are arranged at a distance from each other while having strong powers of some degree, there is a tendency that the amount of fluctuation of chromatic aberration of magnification caused by the magnification change is increased. It is, therefore, favorable to satisfy the following conditions:

$$26 < v1N \qquad (5)$$

$$-0.15 < \sqrt{(fw \cdot fT)}/f1 < 0.5 \qquad (6)$$

where v1N is the Abbe's number, at the d line, of the medium of the negative lens component located on the object side of the first lens unit and f1 is the focal length of the first lens unit.

Below the lower limit of Condition (5), the fluctuation of chromatic aberration of magnification where the magnification is changed becomes prominent, which is unfavorable. Also, the upper limit of Condition (5) is not restricted.

Beyond the upper limit of Condition (6), correction for off-axis aberration or chromatic aberration becomes difficult, and in particular, even when Condition (5) is satisfied, correction for chromatic aberration of magnification may become difficult.

Below the lower limit of Condition (6), the fluctuation of aberration caused by the movement of the lens unit for the magnification change may become prominent.

It is more favorable to satisfy one of the following conditions:

$$30 < v1N \qquad (5')$$

$$-0.1 < \sqrt{(fw \cdot fT)}/f1 < 0.4 \qquad (6')$$

It is most favorable to satisfy one of the following conditions:

$$33 < v1N \qquad (5'')$$

$$0.05 < \sqrt{(fw \cdot fT)}/f1 < 0.3 \qquad (6'')$$

From the above description, it is desirable that the zoom lens of the present invention is constructed so that the most object-side lens unit remains fixed when the magnification is changed and the focusing operation is performed, and includes, in order from the object side, the negative lens component, the reflective optical component for bending the optical path, and the positive lens component, while the most image-side lens unit has an aspherical surface and remains fixed when the focusing operation is performed, and lens units moved for changing the magnification are interposed between the above two lens units.

Subsequently, reference is made to the techniques of the magnification change and the focusing operation of the zoom lens which has the reflective optical component (front surface mirror) for bending the optical path. For the magnification change, the following three systems are considered.

1. A zoom system comprising, in order from the object side, a first lens unit with negative refracting power, including a reflective optical component (front surface mirror) and remaining fixed; a second lens unit with positive refracting power, moved toward only the object side when the magnification is changed, extending from the wide-angle position to the telephoto position; a third lens unit (which can be moved when the magnification is changed and the focusing operation is performed) moved to differ from the second lens unit when the magnification is changed; and a last lens unit having an aspherical surface and remaining fixed.

2. A zoom system comprising, in order from the object side, a first lens unit with positive refracting power, including a reflective optical component (front surface mirror) and remaining fixed; a second lens unit with negative refracting power, moved toward only the image side when the magnification is changed, extending from the wide-angle position to the telephoto position; a third lens unit moved in only a direction opposite to that of the second lens unit when the magnification is changed; and a last lens unit which can be moved when the focusing operation is performed.

3. A zoom system comprising, in order from the object side, a first lens unit with positive refracting power, including a reflective optical component (front surface mirror) and remaining fixed; a second lens unit with negative refracting power, moved back and forth on the image side to follow a convex path, when the magnification is changed, extending from the wide-angle position to the telephoto position; a third lens unit with positive refracting power, moved toward only the object side when the magnification is changed, extending from the wide-angle position to the telephoto position; and a last lens unit having an aspherical surface and remaining fixed.

The system 1 has the disadvantage that, in order to ensure the variable magnification ratio, it is hard to impart the power to the third lens unit and the amount of movement is extremely increased. An increase of the amount of movement renders focusing slow and raises power consumption. Consequently, in the present invention, the system 2 or 3 is adopted.

The system 2 has a difficulty about a reduction in the distance to the entrance pupil or correction for off-axis aberrations or chromatic aberration of magnification because the power of the negative lens component located on the object side of the first lens unit is weak or the power of the positive lens component on the image side of the first lens unit is extremely strong.

The system 3, by contrast, has no problem of correction for aberration, zooming, or size with the exception of the case where it is necessary to ensure the space for moving the second lens unit in focusing. For focusing, the profile of the surface of the reflective optical component (front surface mirror) for bending the optical path is changed and controlled, and thereby its defect can be obviated.

Thus, in the present invention, the system 3 is adopted. Specifically, the zoom lens has, in order from the object side, the first lens unit provided with the reflective optical component for bending the optical path, remaining fixed when the magnification is changed; the second lens unit with negative refracting power, moved when the magnification is changed; the third lens unit with positive refracting power, moved when the magnification is changed; and the last lens unit. When the magnification is changed, extending from the wide-angle position to the telephoto position, in focusing of the infinite object point, the second lens unit is constructed so that it is moved (back and forth) along the optical axis on the image side to follow a convex path. By doing so, the defects of the systems 2 and 3 can be obviated.

It is further desirable to satisfy the following conditions:

$$0.3 < -\beta Rw < 0.8 \tag{7}$$

$$0.8 < fRw/\sqrt{(fw \cdot fT)} < 1.8 \tag{8}$$

where $\beta Rw$ is a combined magnification of the third lens unit and the lens unit subsequent thereto at the wide-angle position in focusing of the infinite object point and $fRw$ is a combined focal length of the third lens unit and the lens unit subsequent thereto at the wide-angle position in focusing of the infinite object point.

Below the lower limit of Condition (7), the variable magnification ratio which is high enough in the entire system of the zoom lens is not obtained, or the space for lens movement becomes extremely wide and the size is bulked.

Beyond the upper limit of Condition (7), although of great rarity in theory, a wide space for lens movement is required.

Below the lower limit of Condition (8), the combined magnification of the third lens unit and the lens unit subsequent thereto is lowered and thereby variable magnification efficiency is impaired.

Beyond the upper limit of Condition (8), on the other hand, the combined focal length of the third lens unit and the lens unit subsequent thereto is increased and thereby variable magnification efficiency is impaired.

It is more desirable to satisfy one of the following conditions:

$$0.35 < -\beta Rw < 0.75 \tag{7'}$$

$$0.9 < fRw/<\sqrt{(fw \cdot fT)} < 1.6 \tag{8'}$$

It is most desirable to satisfy one of the following conditions:

$$0.4 < -\beta Rw < 0.7 \tag{7''}$$

$$1.0 < fRw/\sqrt{(fw \cdot fT)} < 1.5 \tag{8''}$$

Also, although the focusing operation in the zoom lens of the present invention may be usually performed by moving any lens unit of the zoom lens, it is favorable that the focusing operation is performed by changing and controlling the shape of the reflecting surface in the first lens unit in order to decrease the amount of drive of the lens units in the lens barrel of the zoom lens to bring compactness.

For example, it is desirable that the reflecting surface is constructed with a thin film with which a metal or dielectric is coated; the thin film is connected to a power source through a plurality of electrodes and variable resistors; an arithmetical unit controlling the resistance values of the variable resistors is provided to control the distribution of electrostatic forces applied to the thin film; and thereby the profile of the reflecting surface can be changed. It is advantageous that a deformable reflecting surface is small in view of its productivity and controllability.

In the focusing technique relative to the short-distance object point, it is desirable that the second lens unit is shifted to the object side, or another lens unit moved for focusing is provided between the third lens unit and the most image-side lens unit and is moved along the optical axis.

Where the second lens unit is shifted to the object side as the focusing technique relative to the short-distance object point, it is favorable to satisfy the following condition:

$$0.16 < D12min/\sqrt{(fw \cdot fT)} < 0.26 \quad (9)$$

where D12 min is a minimum value available between the first lens unit and the second lens unit in focusing of the infinite object point.

The second lens unit is capable of focusing on a considerable short-distance object point with a slight amount of movement. Below the lower limit of Condition (9), however, a space required to move the second lens unit for focusing becomes insufficient, and the second lens unit interferes with the first lens unit or ceases to focus on a shorter-distance object point.

Beyond the upper limit of Condition (9), on the other hand, the distance to the entrance pupil is liable to be increased, and correction for aberration and the maintenance of magnification may be obstructed in an attempt to reduce the distance.

It is more favorable to satisfy the following condition:

$$0.17 < D12min/\sqrt{(fw \cdot fT)} < 0.24 \quad (9')$$

It is most favorable to satisfy the following condition:

$$0.18 < D12min/\sqrt{(fw \cdot fT)} < 0.22 \quad (9'')$$

Where another lens unit moved for focusing is provided between the third lens unit and the most image-side lens unit and is moved along the optical axis, it is desirable to satisfy the following condition:

$$1.0 < |fF|/\sqrt{(fw \cdot fT)} < 6.0 \quad (10)$$

where fF is the focal length of a lens unit moved along the optical axis in the focusing operation of the short-distance object point, interposed between the third lens unit and the most image-side lens unit.

Beyond the upper limit of Condition (10), the amount of movement of the lens unit moved in focusing is increased, which is unfavorable.

Below the lower limit of Condition (10), on the other hand, correction for off-axis aberrations becomes difficult, or the amount of fluctuation of the position of the entrance pupil is exceedingly increased. Consequently, shading is liable to be produced.

It is more desirable to satisfy the following condition:

$$1.5 < |fT|/\sqrt{(fw \cdot fT)} < 5.0 \quad (10')$$

It is still more desirable to satisfy the following condition:

$$2.0 < |fT|/\sqrt{(fw \cdot fT)} < 4.0 \quad (10'')$$

Subsequently, a description is given of techniques for favorably achieving the maintenance of magnification and correction for aberration.

The arrangement of the third lens unit is deeply concerned with these. A larger number of lenses, although advantageous, offer an obstacle in the way of compactness to be achieved for the most useful purpose. Hence, it is important that the lens unit is constructed with the smallest possible number of lenses. The third lens unit, which has the variable magnification function, is moved toward only the object side when the magnification is changed, extending from the wide-angle position to the telephoto position. In correction for aberration, three lenses including one positive lens and one negative lens are enough for the number of lenses required for constituting the third lens unit. However, a decentering sensitivity of the negative lens (the increment of aberration to the amount of unit decenteration) is high. Consequently, it is desirable that the negative lens is cemented to either positive lens in the third lens unit.

Thus, there are the following three ways that the third lens unit is constructed with, in order from the object side, A. a single lens and a cemented lens component with a positive lens and a negative lens, B. a cemented lens component with a positive lens and a negative lens, and a single lens, or C. a three-cemented-lens component with a positive lens, a negative lens, and a positive lens.

In order to minimize spaces for movement of the second lens unit and the third lens unit, moved when the magnification is changed, it is desirable that the magnification of the third lens unit is −1× at the middle focusing distance. However, when the first lens unit of the present invention is constructed as mentioned above, the image point produced by the system before the third lens unit, namely the object point relative to the third lens unit, is necessarily moved farther away, toward the object side, than in a usual state. As a result, the magnification of the third lens unit approaches zero, and much space for movement is required.

However, when the third lens unit is constructed like Item A, there is the advantage that the primary principal point is located closer to the object side and thus its defect can be obviated. Similarly, the secondary principal point is also located closer to the object side and thus unnecessary space is not provided in the rear of the third lens unit. As such, a length in the rear of the path bending element can be effectively reduced.

When the third lens unit is constructed like Item A, on the other hand, there are advantages that the exit pupil tends to become closer and the amount of change of the F value by the magnification change is so large that the lens unit is liable to undergo the influence of diffraction at the telephoto position.

Thus, when the third lens unit is constructed like Item A, this lens unit is easily downsized and is suitable for use of a largish image sensor.

On the other hand, when the third lens unit is constructed like Item B or C, the length conversely becomes longer than in Item A, but the lens unit has advantages for the position of the exit pupil and the change of the F value where the magnification is changed, and thus is suitable for use of a smallish image sensor.

Also, it is desirable to satisfy Condition (11A) described below when the third lens unit is constructed like Item A and Condition (11B) described below when the third lens unit is constructed like Item B.

$$0.4 < R_{C3}/R_{C1} < 0.85 \quad (11A)$$

$$0.8 < R_{C3}/R_{C1} < 1.3 \quad (11B)$$

where $RC_3$ is the radius of curvature, on the optical axis, of the most image-side surface of a cemented lens component in the third lens unit and $R_{C1}$ is the radius of curvature, on the optical axis, of the most object-side surface of the cemented lens component in the third lens unit.

Beyond the upper limit of each of Conditions (11A) and (11B), the lens unit is advantageous for correction for spherical aberration, coma, or astigmatism in the entire system, but it has little effect of the moderation of the decentering sensitivity on cementation.

Below the lower limit of each of Conditions (11A) and (11B), correction for spherical aberration, coma, or astigmatism in the entire system is liable to become difficult.

Also, it is more desirable to satisfy Condition (11'A) described below when the third lens unit is constructed like Item A and Condition (11'B) described below when the third lens unit is constructed like Item B.

$$0.5 < R_{C3}/R_{C1} < 0.8 \tag{11'A}$$

$$0.85 < R_{C3}/R_{C1} < 1.2 \tag{11'B}$$

It is most desirable to satisfy Condition (11"A) described below when the third lens unit is constructed like Item A and Condition (11"B) described below when the third lens unit is constructed like Item B.

$$0.6 < R_{C3}/R_{C1} < 0.7 \tag{11"A}$$

$$0.9 < R_{C3}/R_{C1} < 1.1 \tag{11"B}$$

In correction for chromatic aberration, it is favorable to satisfy Conditions (12A) and (13A) described below (when the third lens unit is constructed like Item A), or Conditions (12B) and (13B) described below (when the third lens unit is constructed like Item B).

$$-0.3 < L/R_{C2} < 1.0 \tag{12A}$$

$$15 < \nu_{CP} - \nu_{CN} \tag{13A}$$

$$-0.1 < L/R_{C2} < 0.8 \tag{12B}$$

$$15 < \nu_{CP} - \nu_{CN} \tag{13B}$$

where L is the diagonal length (mm) of an image sensor used. Also, it is premised that the image sensor is used in such a way that the field angle at the wide-angle position is 50° or more. $R_{C2}$ is the radius of curvature, on the optical axis, of the interface of the cemented lens component in the third lens unit, $\nu_{CP}$ is the Abbe's number of the medium of the positive lens of the cemented lens component in the third lens unit, and $\nu_{CN}$ is the Abbe's number of the medium of the negative lens of the cemented lens component in the third lens unit.

Below the lower limit of each of Conditions (12A) and (12B), the lens unit is advantageous for correction for axial chromatic aberration or chromatic aberration of magnification, but spherical aberration or chromatic aberration is liable to be produced. In particular, although spherical aberration at a reference wavelength can be favorably corrected, spherical aberration at a short wavelength is overcorrected, giving rise to a blotted image of color, which is unfavorable.

Below the lower limit of each of Conditions (12A) and (12B), axial chromatic aberration or chromatic aberration of magnification is insufficiently corrected, and spherical aberration at the short wavelength is liable to be undercorrected.

Below the lower limit of Condition (13A) or (13B), axial chromatic aberration is liable to be undercorrected.

Also, a combination of media such as to exceed the upper limit of Condition (13A) or (13B) does not exist in the natural world.

It is more favorable to satisfy at least one of Conditions (12'A) and (13'A) described below when the third lens unit is constructed like Item A, or at least one of Conditions (12'B) and (13'B) described below when the third lens unit is constructed like Item B.

$$-0.1 < L/R_{C2} < 0.8 \tag{12'A}$$

$$20 < \nu_{CP} - \nu_{CN} \tag{13'A}$$

$$0 < L/R_{C2} < 0.6 \tag{12'B}$$

$$20 < \nu_{CP} - \nu_{CN} \tag{13'B}$$

It is most favorable to satisfy at least one of Conditions (12"A) and (13"A) described below when the third lens unit is constructed like Item A, or at least one of Conditions (12"B) and (13"B) described below when the third lens unit is constructed like Item B.

$$0.1 < L/R_{C2} < 0.6 \tag{12"A}$$

$$25 < \nu_{CP} - \nu_{CN} \tag{13"A}$$

$$0.15 < L/R_{C2} < 0.4 \tag{12"B}$$

$$25 < \nu_{CP} - \nu_{CN} \tag{13"B}$$

Each of Conditions (13A), (13'A), (13"A), (13B), (13'B), and (13"B) may be set so that the value of $\nu_{CP} - \nu_{CN}$ does not exceed 90. A combination of media such as to exceed the upper limit of 90 does not exist in the natural world.

It is further favorable to set the condition so that the value of $\nu_{CP} - \nu_{CN}$ does not exceed 60. If the upper limit of 60 is exceeded, a material used becomes expensive.

On the other hand, when the third lens unit is constructed like Item C, it is desirable to satisfy at least one of Conditions (14)–(18) described below.

$$-4.0 < (R_{CF} + R_{CR})/(R_{CF} - R_{CR}) < 0 \tag{14}$$

where $R_{CF}$ is the radius of curvature, on the optical axis, of the most object-side surface of the three-cemented-lens component and $R_{CR}$ is the radius of curvature, on the optical axis, of the most image-side surface of the three-cemented-lens component.

$$0.6 < Dc/fw < 1.8 \tag{15}$$

where Dc is a distance measured along the optical axis, form the most object-side surface of the three-cemented-lens component to the most image-side surface thereof.

$$0.002/mm^2 < \Sigma |(1/Rci) - (1/Rca)|^2 < 0.05/mm^2 \tag{16}$$

where Rci is the radius of curvature, on the optical axis, of the i-th interface of the three-cemented-lens component from the object side and Rca is $m/\Sigma|(1/Rci)|(i=1 \ldots m$, where m is 2 of the number of interfaces).

$$5 \times 10^{-5} < \Sigma|(1/\nu cj+1) - (1/\nu cj)|^2 < 4 \times 10^{-3} \tag{17}$$

where $\nu cj$ is the Abbe's number, at the d line, of the i-th medium of the three-cemented-lens component from the object side (j=1 . . . n−1, where n is 3 of the number of lenses to be cemented).

$$0.005 < \Sigma |ncj+1 - ncj|^2 < 0.5 \tag{18}$$

where ncj is the refractive index, at the d line, of the i-th medium of the three-cemented-lens component from the object side.

Condition (14) defines a condition of the shape factor of a cemented lens component which has m interfaces (m≧2) in the lens units moved when the magnification is changed.

Below the lower limit of Condition (14), it becomes difficult to ensure the variable magnification ratio or to reduce the entire length in a working state (which is related to a volume where the lens barrel is collapsed). Beyond the upper limit of Condition (14), even though an aspherical surface is introduced, correction for spherical aberration or coma becomes difficult.

Condition (15) defines a condition of a distance (thickness), along the optical axis, between the most object-side surface and the most image-side surface of a cemented lens component which has m interfaces (m≧2) in the lens units moved when the magnification is changed.

Beyond the upper limit of Condition (15), the thickness of the entire system where the lens barrel is collapsed is not reduced. Below the lower limit of Condition (15), the radius of curvature of each interface cannot be reduced, and the effect of cementation (for instance, correction for chromatic aberration) cannot be brought about.

Condition (16) defines a condition for bringing about the effect of correction for aberration in each interface.

Beyond the upper limit of Condition (16), this is advantageous for correction for aberration, but makes the system liable to exceed the upper limit of Condition (15). Below the lower limit of Condition (16), this is advantageous for reducing the thickness of the lens system, but the effects of correction for aberrations are mutually cancelled, which is unfavorable.

Condition (17) defines a condition of correction for chromatic aberration of a cemented lens component which has m interfaces (m≧2) in the lens units moved when the magnification is changed.

Below the lower limit of Condition (17), correction for chromatic aberration becomes insufficient. Beyond the upper limit of Condition (17), chromatic aberration may be overcorrected.

Condition (18) defines a condition of correction for spherical aberration, coma, or curvature of field of a cemented lens component which has m interfaces (m≧2) in the lens units moved when the magnification is changed.

Below the lower limit of Condition (18), correction for spherical aberration or coma becomes insufficient, and the Petzval sum is liable to take a large negative value. Beyond the upper limit of Condition (18), the high-order component of spherical aberration or coma is liable to be produced, and the Petzval sum is liable to take a large positive value.

Also, Condition (17) or (18) serves to define the case where the refractive index is low and the Abbe's number is high with respect to the positive lens or the negative lens.

Instead of Conditions (14)–(18), when the following conditions are set, a slimmer design and higher performance can be achieved:

$$-3.0 < (R_{CF}+R_{CR})/(R_{CF}-R_{CR}) < -0.3 \quad (14')$$

$$0.8 < Dc/fw < 1.6 \quad (15')$$

$$0.004/\text{mm}^2 < \Sigma|(1/Rci)-(1/Rca)|^2 < 0.04/\text{mm}^2 \quad (16')$$

$$1 \times 10^{-4} < \Sigma|(1/\nu cj+1)-(1/\nu cj)|^2 < 3 \times 10^{-3} \quad (17')$$

$$0.01 < \Sigma|ncj+1-ncj|^2 < 0.4 \quad (18')$$

Instead of Conditions (14)–(18), when the following conditions are further set, the slimmest design and highest performance can be achieved:

$$-2.0 < (R_{CF}+R_{CR})/(R_{CF}-R_{CR}) < -0.5 \quad (14'')$$

$$1.0 < Dc/fw < 1.4 \quad (15'')$$

$$0.006/\text{mm}^2 < \Sigma|(1/Rci)-(1/Rca)|^2 < 0.03/\text{mm}^2 \quad (16'')$$

$$2 \times 10^{-4} < \Sigma|(1/\nu cj+1)-(1/\nu cj)|^2 < 2 \times 10^{-3} \quad (17'')$$

$$0.02 < \Sigma|ncj+1-ncj|^2 < 0.3 \quad (18'')$$

In the zoom lens of the present invention, it is desirable that an aspherical surface is introduced into the negative lens component located on the object side in the first lens unit.

It is desirable that the positive lens component located on the image side in the first lens unit satisfies the following condition:

$$-2.0 < (R_{1PF}+R_{1PR})/(R_{1PF}-R_{1PR}) < 1.0 \quad (19)$$

where $R_{1PF}$ is the radius of curvature, on the optical axis, of the object-side surface of the positive lens component of the most object-side lens unit and $R_{1PR}$ is the radius of curvature, on the optical axis, of the image-side surface of the positive lens component of the most object-side lens unit.

Beyond the upper limit of Condition (19), high-order chromatic aberration of magnification is liable to be produced. Below the lower limit of Condition (19), the distance to the entrance pupil is liable to be increased.

It is more desirable to satisfy the following condition:

$$-1.7 < (R_{1PF}+R_{1PR})/(R_{1PF}-R_{1PR}) < 0.5 \quad (19')$$

It is most desirable to satisfy the following conditions:

$$-1.4 < (R_{1PF}+R_{1PR})/(R_{1PF}-R_{1PR}) < 0.1 \quad (19'')$$

In the second lens unit, the focal length is long, and thus the construction of two lens components, a negative lens component and a positive lens component, arranged in this order form the object side, is satisfactory. Moreover, lens cementation allows the decentering sensitivity to be reduced, which is favorable. It is desirable that the cemented lens component satisfies the following condition:

$$-1.5 < (R_{2F}+R_{2R})/(R_{2F}-R_{2R}) < 0.8 \quad (20)$$

where $R_{2F}$ is the radius of curvature, on the optical axis, of the most object-side surface of the second lens unit (the cemented lens component) and $R_{2R}$ is the radius of curvature, on the optical axis, of the most image-side surface of the second lens unit (the cemented lens component).

Beyond the upper limit of Condition (20), the distance to the entrance pupil is liable to be increased. Below the lower limit of Condition (20), various off-axis aberrations are liable to be produced. It is more desirable to satisfy the following condition:

$$-1.2 < (R_{2F}+R_{2R})/(R_{2F}-R_{2R}) < 0.5 \quad (20')$$

It is most desirable to satisfy the following condition:

$$-0.9 < (R_{2F}+R_{2R})/(R_{2F}-R_{2R}) < 0.2 \quad (20'')$$

In the zoom lens of the system of bending the optical path as in the present invention, the degree of a compact design of the optical system involved in compactness of the image sensor is higher than in the zoom lens of the lens barrel collapsing system.

Thus, in order to make the camera slimmer, it is effective that the zoom lens of the present invention is used by applying a small electronic image sensor such as to have a relationship satisfying the following condition:

$$F \geq a \quad (21)$$

with respect to a horizontal pixel pitch a (μm) and an open F value at the wide-angle position of the zoom lens. In this case, the following consideration is more effective.

As the image sensor becomes small, the pixel pitch also becomes proportionally small, and the deterioration of image quality by the influence of diffraction ceases to be negligible. In particular, when the image sensor is reduced in size so that the relationship between the open F value at the wide-angle position and the horizontal pixel pitch a (μm) of the electronic image sensor used satisfies Condition (21), only the open F value can be used.

Hence, the aperture stop determining the F value is designed so that its inside diameter is made constant and an insertion in, or removal from, the optical path, or replacement is not made. In addition, the aperture stop is placed so that at least one of refracting surfaces adjacent to the aperture stop is a convex surface directed toward the aperture stop (in the present invention, a refracting surface adjacent to the aperture stop on the image side corresponds thereto), and the point of intersection of a perpendicular line drawn to the optical axis from the aperture stop with the optical axis is located 0.5 mm or less from the vertex of the convex surface, or the convex surface intersects or comes in contact with the inside diameter portion of an aperture stop member including the back surface of the aperture stop. By doing so, much space for the aperture stop, formerly would have been required, becomes unnecessary and the space can be considerably saved. This largely contributes to compactness.

For the adjustment of the amount of light, it is good practice to use a variable transmittance means instead of the aperture stop. The variable transmittance means can be introduced into any position of the optical path, and thus it is favorable to place the means in originally sufficient space. In particular, in the present invention, it is favorable to insert the means between the lens unit moved for the magnification change and the image sensor. For the variable transmittance means, the means in which the transmittance can be changed by the voltage may be used, or a plurality of filters having different transmittances may be combined by an insertion in, or removal from, the optical path, or replacement. It is desirable that a shutter which adjusts light-receiving time of a light beam introduced into the electronic image sensor is placed in space independent of that of the aperture stop.

In the relationship between the open F value at the wide-angle position and the horizontal pixel pitch a (μm) of the electronic image sensor used, when Condition (21) is satisfied, an optical low-pass filter may be eliminated. That is, any medium on the optical path interposed between the zoom lens system and the image sensor may be thought of as air or a non-crystalline medium. This is because there is little frequency component which is capable of producing return strain because of the deterioration of imaging characteristics by diffraction and geometrical aberration. Alternatively, each optical element interposed between the zoom lens system and the image sensor may be constructed so that any medium interface is nearly flat and the optical system has no converting function of spatial frequency characteristics like the optical low-path filter.

Also, it is desirable that the zoom lens used in the present invention satisfies the following condition:

$$1.8 < fT/fw \qquad (22)$$

Below the lower limit of Condition (22), the variable magnification ratio of the entire zoom lens system becomes smaller than 1.8. It is more desirable that the value of fT/fw does not exceed 5.5. Beyond 5.5, the variable magnification ratio is increased, and the amount of movement of the lens unit moved when the magnification is changed becomes so large that oversizing is caused in a direction in which the optical path is bent and a compact imaging device ceases to be achievable.

The electronic image sensor used in the present invention is designed on the premise that the full field angle at the wide-angle position is 55° or more. An angle of 55° is the full field angle at the wide-angle position usually required for the electronic imaging device.

It is desirable that the field angle at the wide-angle position in the electronic imaging device is 80° or less. If the field angle at the wide-angle position exceeds 80°, distortion will be liable to be produced, and it becomes difficult to design the first lens unit to be compact. Consequently, a slim design of the electronic imaging device becomes difficult.

Subsequently, reference is made to requirements for reducing the thickness of an infrared cutoff filter.

In the electronic imaging device, the infrared absorbing filter of constant thickness is usually placed on the object side of the image sensor so that infrared light is not incident on the imaging plane.

Consider the infrared absorbing filter to be replaced with a coating having no thickness in order to make the optical system short or slim. In this case, of course, the thickness is reduced accordingly, but there is the secondary effect.

When a near-infrared sharp-cutoff coat in which a transmittance is 80% or more at a wavelength of 600 nm and the transmittance is 8% or less at a wavelength of 700 nm is introduced on the object side of the image sensor located behind the zoom lens system, the transmittance in a near-infrared region of more than 700 nm wavelengths becomes lower than in the absorbing type and the transmittance on the red side becomes relatively high. The tendency of magenta on the blue-violet side which is a defect of a solid-state image sensor, such as a CCD, having a complementary mosaic color filter is moderated by gain adjustment, and color reproduction like a solid-state image sensor, such as a CCD, having a primary-color filter can be obtained. Moreover, color reproduction that has a high reflectance in the near-infrared region, like plants or human skin, is improved.

That is, it is desirable to satisfy the following conditions:

$$\tau 600/\tau 550 \geq 0.8 \qquad (23)$$

$$\tau 700/\tau 550 \leq 0.08 \qquad (24)$$

where τ600 is a transmittance at a wavelength of 600 nm, τ550 is a transmittance at a wavelength of 550 nm, and τ700 is a transmittance at a wavelength of 700 nm.

It is more desirable to satisfy the following conditions:

$$\tau 600/\tau 550 \geq 0.85 \qquad (23')$$

$$\tau 700/\tau 550 \leq 0.05 \qquad (24')$$

It is most desirable to satisfy the following conditions:

$$\tau 600/\tau 550 \geq 0.9 \qquad (23'')$$

$$\tau 700/\tau 550 \leq 0.03 \qquad (24'')$$

Another defect of the solid-state image sensor, such as the CCD, is that the sensitivity to a wavelength of 550 nm in a near-ultraviolet region is much higher than that of the human eye. This gives rise to a considerable color blot at the edge of an image due to chromatic aberration in the near-ultraviolet region. In particular, when the optical system is downsized, a vital result is brought about. Thus, when an absorber or reflector such that the ratio of the transmittance (τ400) at a wavelength of 400 nm to the transmittance (τ550) at a wavelength of 550 nm is below 0.08, and the ratio of the transmittance (τ440) at a wavelength of 440 nm to the transmittance (τ550) at a wavelength of 550 nm is above 0.4, is introduced into the optical path, a noise, such as the color blot, is lessened significantly without losing the wavelength region required for color reproduction (while holding good color reproduction).

That is, it is desirable to satisfy the following conditions:

$$\tau 400/\tau 550 \geq 0.08 \quad (25)$$

$$\tau 440/\tau 550 \leq 0.4 \quad (26)$$

It is more desirable to satisfy the following conditions:

$$\tau 400/\tau 550 \geq 0.06 \quad (25')$$

$$\tau 440/\tau 550 \leq 0.5 \quad (26')$$

It is most desirable to satisfy the following conditions:

$$\tau 400/\tau 550 \geq 0.04 \quad (25'')$$

$$\tau 440/\tau 550 \leq 0.6 \quad (26'')$$

Also, it is favorable that such a filter is located between the imaging optical system and the image sensor.

On the other hand, in the complementary color filter, because of the magnitude of transmission light energy, a substantial sensitivity is higher than in a CCD with a primary-color filter and resolution is advantageous. Hence, there is a great merit where a small-sized CCD is used.

Also, by properly combining the above conditions and arrangements, a good electronic imaging device can be constructed.

In each of the above conditions, only the upper limit or lower limit may be set to a corresponding upper limit or lower limit of a more favorable condition. A corresponding value of each of conditions in the embodiments mentioned later may be set to the upper or lower limit.

In accordance with the drawings, the embodiments of the present invention will be described below.

First Embodiment

Figure 2B:
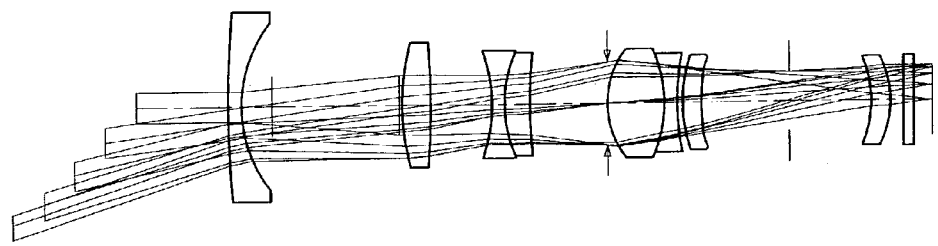
Figure 2C:
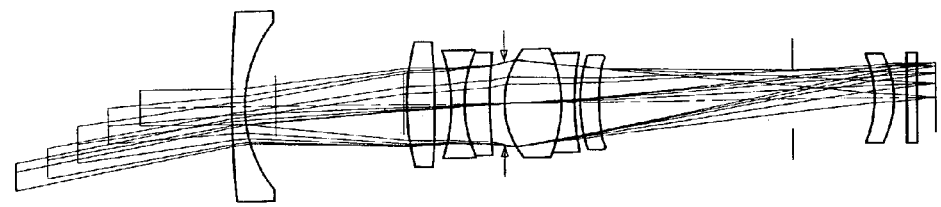

FIG. 1 shows an optical arrangement of the first embodiment of the zoom lens according to the present invention. FIGS. 2A, 2B, and 2C show optical arrangements at wide-angle, middle, and telephoto positions, respectively, in the first embodiment. FIGS. 3A–3D show aberration characteristics at the wide-angle position in the first embodiment. FIGS. 4A–4D show aberration characteristics at the middle position in the first embodiment. FIGS. 5A–5D show aberration characteristics at the telephoto position in the first embodiment.

The electronic imaging device shown in FIG. 1 has, in order from the object side, a zoom lens and a CCD which is an electronic image sensor. In this figure, reference symbol I represents the imaging plane of the CCD. A plane-parallel CCD cover glass CG is interposed between the zoom lens and the imaging plane I.

The zoom lens comprises, in order from the object side, a first lens unit G1, a second lens unit G2 which is a first moving lens unit, an aperture stop S, a third lens unit G3 which is a second moving lens unit, and a fourth lens unit G4.

The first lens unit G1 includes, in order from the object side, a negative meniscus lens $L1_1$, with a convex surface directed toward the object side, a reflective optical component R1 having a reflecting surface for bending the optical path, and a biconvex positive lens $L1_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of an effective imaging area in each of the embodiments of the present invention is 3:4, and the optical path is laterally bent.

The second lens unit G2 includes, in order from the object side, a cemented lens with a biconcave negative lens $L2_1$ and a positive meniscus lens $L2_2$ with a convex surface directed toward the object side, having negative refracting power as a whole.

The third lens unit G3 includes, in order from the object side, a cemented lens with a biconvex positive lens $L3_1$ and a biconcave negative lens $L3_2$, and a positive meniscus lens $L3_3$ with a convex surface directed toward the object side, having positive refracting power as a whole.

The fourth lens unit G4 includes a positive meniscus lens $L4_1$ with a concave surface directed toward the object side.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, both surfaces of the positive meniscus lens $L3_3$ with a convex surface directed toward the object side in the third lens unit G3, and the image-side surface of the positive meniscus lens $L4_1$ with a concave surface directed toward the object side, constituting the fourth lens unit G4.

Subsequently, numerical data of optical members constituting the zoom lens of the first embodiment are shown below.

Also, in the numerical data of the first embodiment, $r_1$, $r_2$, ... denote radii of curvature of individual lens surfaces; $d_1$, $d_2$, ... denote thicknesses of individual lenses or air spacings between them; $n_{d1}$, $n_{d2}$, ... denote refractive indices of individual lenses at the d line; $v_{d1}$, $v_{d2}$, ... denote Abbe's numbers of individual lenses; Fno denotes an F-number; f denotes the focal length of the entire system; and D0 denotes a distance from an object to a first surface.

Also, when z is taken as the coordinate in the direction of the optical axis, y is taken as the coordinate normal to the optical axis, K represents a conic coefficient, and $A_4$, $A_6$, $A_8$, and $A_{10}$ represent aspherical coefficients, the configuration of each of the aspherical surfaces is expressed by the following equation:

$$z=(y^2/r)/[1+\{1-(1+K)(y/r)^2\}^{1/2}]+A_4 y^4+A_6 y^6+A_8 y^8+A_{10} y^{10}$$

These symbols hold for the numerical data of the embodiments to be described later.

Also, the third and fourth surfaces in the numerical data are given as virtual planes. A prism with a refractive index of 1 is assumed as the reflective optical component having the reflecting surface for bending the optical path and is designed to have an entrance surface and an exit surface, but actually it is air spacing.

Numerical data 1

| | | | |
|---|---|---|---|
| $r_1 = 61.5439$ | $d_1 = 0.7000$ | $n_{d1} = 1.80610$ | $v_{d1} = 40.92$ |
| $r_2 = 6.2081$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = 12.7178$ | $d_5 = 1.5500$ | $n_{d5} = 1.72916$ | $v_{d5} = 54.68$ |
| $r_6 = -72.0943$ | $d_6 = D6$ | | |
| $r_7 = -9.2239$ | $d_7 = 0.7000$ | $n_{d7} = 1.69680$ | $v_{d7} = 55.53$ |
| $r_8 = 6.5000$ | $d_8 = 1.3500$ | $n_{d8} = 1.84666$ | $v_{d8} = 23.78$ |
| $r_9 = 18.7314$ | $d_9 = D9$ | | |
| $r_{10} = \infty$ (stop) | $d_{10} = 0$ | | |
| $r_{11} = 4.7900$ | $d_{11} = 3.0000$ | $n_{d11} = 1.74320$ | $v_{d11} = 49.34$ |
| $r_{12} = -8.0000$ | $d_{12} = 0.7000$ | $n_{d12} = 1.84666$ | $v_{d12} = 23.78$ |
| $r_{13} = 11.8703$ | $d_{13} = 0.3000$ | | |
| $r_{14} = 8.3986$ (aspherical) | $d_{14} = 1.0000$ | $n_{d14} = 1.69350$ | $v_{d14} = 53.21$ |
| $r_{15} = 19.5740$ (aspherical) | $d_{15} = D15$ | | |
| $r_{16} = \infty$ (position of variable transmittance means or shutter) | $d_{16} = 4.4000$ | | |
| $r_{17} = -6.4029$ | $d_{17} = 1.0000$ | $n_{d17} = 1.58313$ | $v_{d17} = 59.38$ |
| $r_{18} = -5.3597$ (aspherical) | $d_{18} = 0.7000$ | | |
| $r_{19} = \infty$ | $d_{19} = 0.6000$ | $n_{d19} = 1.51633$ | $v_{d19} = 64.14$ |
| $r_{20} = \infty$ | $d_{20} = D20$ | | |
| $r_{21} = \infty$ (imaging plane) | $d_{21} = 0$ | | |

Aspherical coefficients

Second surface $K = 0$
$A_2 = 0$   $A_4 = -6.3011 \times 10^{-4}$   $A_6 = 6.3666 \times 10^{-6}$
$A_8 = -6.2546 \times 10^{-7}$   $A_{10} = 0$ Fourteenth surface $K = 0$
$A_2 = 0$   $A_4 = 2.9509 \times 10^{-4}$   $A_6 = 5.8599 \times 10^{-5}$
$A_8 = 3.9534 \times 10^{-6}$   $A_{10} = 0$ Fifteenth surface $K = 0$
$A_2 = 0$   $A_4 = 4.1434 \times 10^{-3}$   $A_6 = 1.3121 \times 10^{-4}$
$A_8 = 4.6939 \times 10^{-5}$   $A_{10} = 0$ Eighteenth surface $K = 0$
$A_2 = 0$   $A_4 = 1.8250 \times 10^{-3}$   $A_6 = 1.0823 \times 10^{-4}$
$A_8 = -2.0337 \times 10^{-5}$   $A_{10} = 0$ Zoom Data When the Distance D0 is $\infty$,

| | Wide-angle | Middle | Telephoto |
|---|---|---|---|
| f (mm) | 3.24880 | 5.63959 | 9.74406 |
| Fno | 2.7241 | 3.4516 | 4.8572 |
| D0 | $\infty$ | $\infty$ | $\infty$ |
| D6 | 0.89800 | 3.28004 | 0.90004 |
| D9 | 9.70505 | 4.27059 | 0.89565 |
| D15 | 1.70893 | 4.75924 | 10.51630 |
| D20 | 1.00000 | 1.00000 | 1.00000 |

Second Embodiment

Figure 7A:
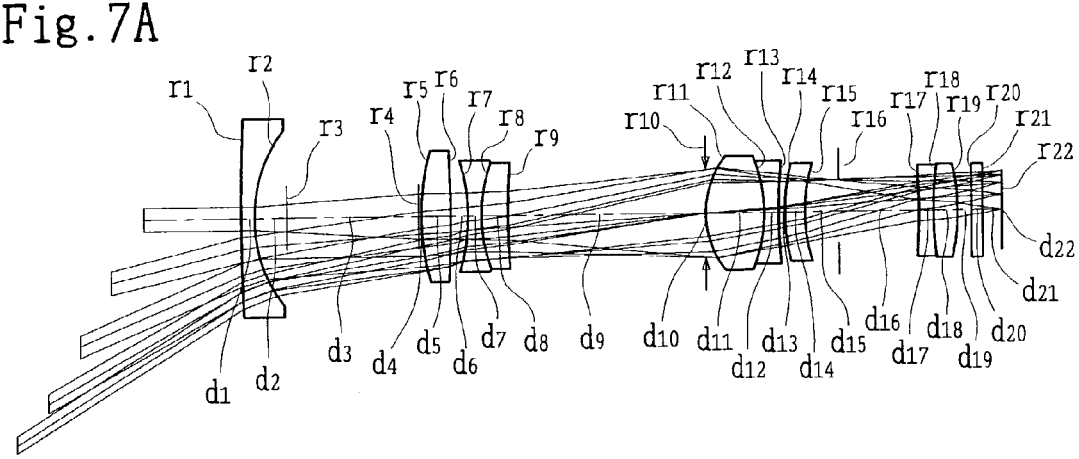
FIGS. 7A, 7B, and 7C are sectional views showing optical arrangements, developed along the optical axis, at wide-angle, middle, and telephoto positions, respectively, in focusing of the infinite object point, of the zoom lens in the second embodiment.
Figure 7B:
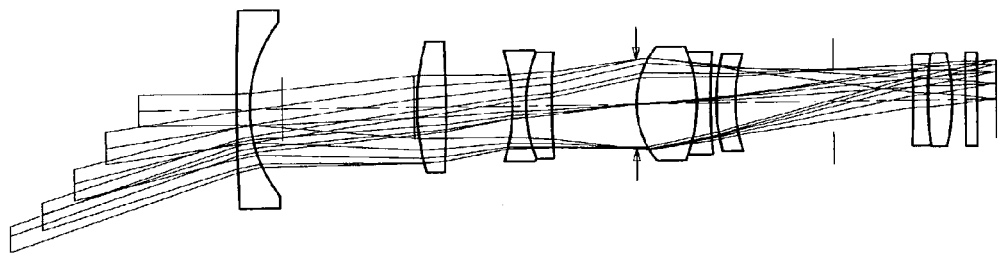
Figure 7C:
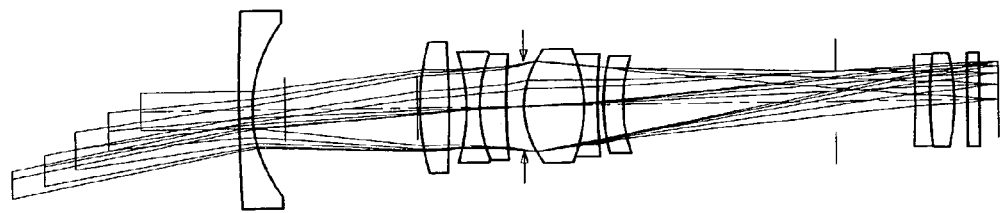

FIG. 6 shows an optical arrangement of the second embodiment of the zoom lens used in the electronic imaging device according to the present invention. FIGS. 7A, 7B, and 7C show optical arrangements at wide-angle, middle, and telephoto positions, respectively, in the second embodiment.

As shown in FIG. 6, the electronic imaging device of the second embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$, with a convex surface directed toward the object side, the reflective optical component R1 having a reflecting surface for bending the optical path, and the biconvex positive lens $L1_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the biconvex positive lens $L3_1$ and the biconcave negative lens $L3_2$, and the positive meniscus lens $L3_3$ with a convex surface directed toward the object side, having positive refracting power as a whole.

The fourth lens unit G4 includes, in order from the object side, a cemented lens with a biconcave negative lens $L4_1'$ and a biconvex positive lens $L4_2$.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$, with a convex surface directed toward the object side in the first lens unit G1, both surfaces of the positive meniscus lens $L3_3$ with a convex surface directed toward the object side in the third lens unit G3, and the image-side surface of the biconvex positive lens $L4_2$ in the fourth lens unit G4.

Subsequently, numerical data of optical members constituting the zoom lens of the second embodiment are shown below.

Numerical data 2

| | | | |
|---|---|---|---|
| $r_1 = 74.4969$ | $d_1 = 0.7000$ | $n_{d1} = 1.80610$ | $\nu_{d1} = 40.92$ |
| $r_2 = 6.3385$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = 12.2080$ | $d_5 = 1.5500$ | $n_{d5} = 1.72916$ | $\nu_{d5} = 54.68$ |
| $r_6 = -169.5645$ | $d_6 = D6$ | | |
| $r_7 = -9.7882$ | $d_7 = 0.7000$ | $n_{d7} = 1.72916$ | $\nu_{d7} = 54.68$ |
| $r_8 = 8.0000$ | $d_8 = 1.3500$ | $n_{d8} = 1.84666$ | $\nu_{d8} = 23.78$ |
| $r_9 = 27.1517$ | $d_9 = D9$ | | |
| $r_{10} = \infty$ (stop) | $d_{10} = 0$ | | |
| $r_{11} = 4.9532$ | $d_{11} = 3.0000$ | $n_{d11} = 1.72916$ | $\nu_{d11} = 54.68$ |
| $r_{12} = -9.0000$ | $d_{12} = 0.7000$ | $n_{d12} = 1.84666$ | $\nu_{d12} = 23.78$ |
| $r_{13} = 24.5762$ | $d_{13} = 0.3000$ | | |
| $r_{14} = 10.0773$ (aspherical) | $d_{14} = 1.0000$ | $n_{d14} = 1.69350$ | $\nu_{d14} = 53.21$ |
| $r_{15} = 12.2161$ (aspherical) | $d_{15} = D15$ | | |
| $r_{16} = \infty$ (position of variable transmittance means or shutter) | $d_{16} = 4.0000$ | | |
| $r_{17} = -44.4371$ | $d_{17} = 0.7000$ | $n_{d17} = 1.80518$ | $\nu_{d17} = 25.42$ |
| $r_{18} = 20.0000$ | $d_{18} = 1.2000$ | $n_{d18} = 1.58313$ | $\nu_{d18} = 59.38$ |
| $r_{19} = -10.5475$ (aspherical) | $d_{19} = 0.7000$ | | |
| $r_{20} = \infty$ | $d_{20} = 0.6000$ | $n_{d20} = 1.51633$ | $\nu_{d20} = 64.14$ |
| $r_{21} = \infty$ | $d_{21} = D21$ | | |
| $r_{22} = \infty$ (imaging plane) | $d_{22} = 0$ | | |

Aspherical coefficients

Second surface $K = 0$
$A_2 = 0$          $A_4 = -6.0504 \times 10^{-4}$     $A_6 = 4.3029 \times 10^{-6}$
$A_8 = -5.2183 \times 10^{-7}$    $A_{10} = 0$ Fourteenth surface $K = 0$
$A_2 = 0$          $A_4 = 6.6247 \times 10^{-4}$     $A_6 = -2.9526 \times 10^{-5}$
$A_8 = 3.3686 \times 10^{-6}$    $A_{10} = 0$ Fifteenth surface $K = 0$
$A_2 = 0$          $A_4 = 4.3514 \times 10^{-3}$     $A_6 = 2.7664 \times 10^{-5}$
$A_8 = 4.2826 \times 10^{-5}$    $A_{10} = 0$ Nineteenth surface $K = 0$
$A_2 = 0$          $A_4 = 9.6272 \times 10^{-4}$     $A_6 = 2.3883 \times 10^{-4}$
$A_8 = -3.0856 \times 10^{-5*}$   $A_{10} = 0$ Zoom Data When the Distance D0 is $\infty$,

| | Wide-angle | Middle | Telephoto |
|---|---|---|---|
| f (mm) | 3.25205 | 5.63896 | 9.74755 |
| Fno | 2.7329 | 3.4864 | 4.8975 |
| D0 | $\infty$ | $\infty$ | $\infty$ |
| D6 | 0.89877 | 3.34248 | 0.90062 |
| D9 | 9.99049 | 4.32715 | 0.89789 |
| D15 | 1.78776 | 5.00483 | 10.87853 |
| D21 | 1.00000 | 1.00000 | 1.00000 |

Third Embodiment

Figure 8:
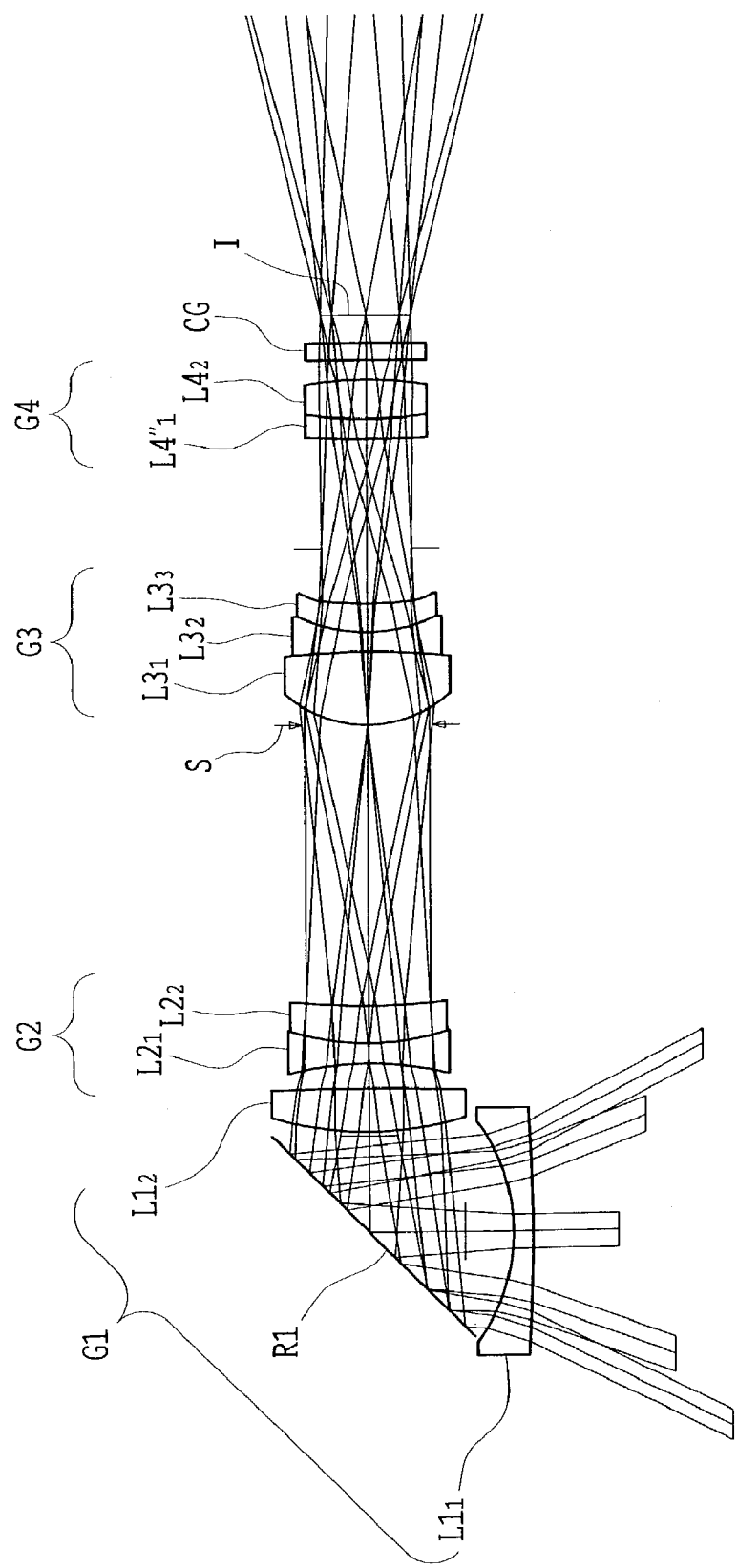
FIG. 8 is a sectional view showing an optical arrangement, developed along the optical axis, at the wide-angle position where the optical path is bent in focusing of the infinite object point, in a third embodiment of the zoom lens according to the present invention.
Figure 9A:
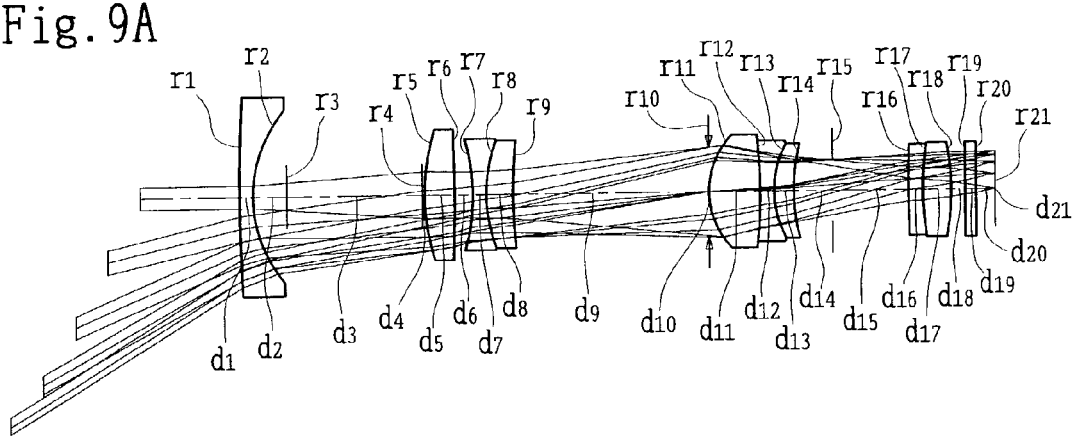
FIGS. 9A, 9B, and 9C are sectional views showing optical arrangements, developed along the optical axis, at wide-angle, middle, and telephoto positions, respectively, in focusing of the infinite object point, of the zoom lens in the third embodiment.
Figure 9B:
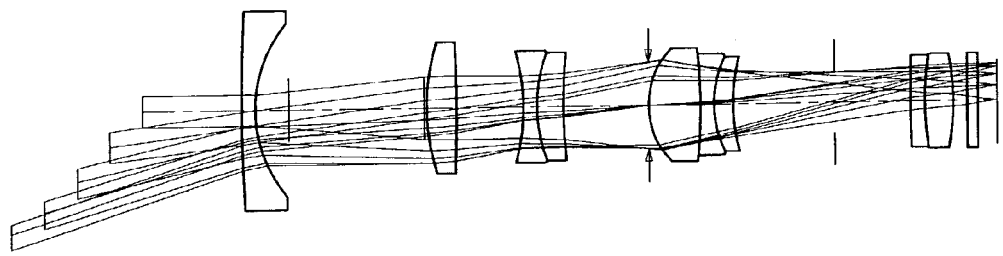
Figure 9C:
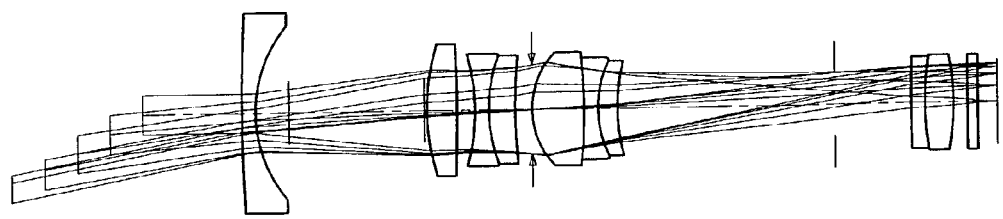

FIG. 8 shows an optical arrangement of the third embodiment of the zoom lens used in the electronic imaging device according to the present invention. FIGS. 9A, 9B, and 9C show optical arrangements at wide-angle, middle, and telephoto positions, respectively, in the third embodiment. FIGS. 10A–10D show aberration characteristics at the wide-angle position in the third embodiment. FIGS. 11A–11D show aberration characteristics at the middle position in the third embodiment. FIGS. 12A–12D show aberration characteristics at the telephoto position in the third embodiment.

As shown in FIG. 8, the electronic imaging device of the third embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens L1$_1$, with a convex surface directed toward the object side, the reflective optical component R1 having a reflecting surface for bending the optical path, and the biconvex positive lens L1$_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens L2$_1$ and the positive meniscus lens L2$_2$ with a convex surface directed toward the object side, having negative refracting power as a whole.

The third lens unit G3 includes, in order from the object side, a cemented lens with the biconvex positive lens L3$_1$, the biconcave negative lens L3$_2$, and the positive meniscus lens L3$_3$ with a convex surface directed toward the object side, having positive refracting power as a whole.

The fourth lens unit G4 includes, in order from the object side, a cemented lens with a negative meniscus lens L4$_1$" with a convex surface directed toward the object side and the biconvex positive lens L4$_2$.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens L1$_1$, with a convex surface directed toward the object side in the first lens unit G1, the object-side surface of the biconvex positive lens L3$_1$ and the image-side surface of the positive meniscus lens L3$_3$ with a convex surface directed toward the object side in the third lens unit G3, and the image-side surface of the biconvex positive lens L4$_2$ in the fourth lens unit G4.

Subsequently, numerical data of optical members constituting the zoom lens of the third embodiment are shown below.

Numerical data 3

| | | | |
|---|---|---|---|
| $r_1 = 59.7815$ | $d_1 = 0.7000$ | $n_{d1} = 1.80610$ | $v_{d1} = 40.92$ |
| $r_2 = 6.0756$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = 11.7992$ | $d_5 = 1.5500$ | $n_{d5} = 1.72916$ | $v_{d5} = 54.68$ |
| $r_6 = -179.5914$ | $d_6 = D6$ | | |
| $r_7 = -11.1399$ | $d_7 = 0.7000$ | $n_{d7} = 1.72916$ | $v_{d7} = 54.68$ |
| $r_8 = 8.0000$ | $d_8 = 1.3500$ | $n_{d8} = 1.84666$ | $v_{d8} = 23.78$ |
| $r_9 = 22.5506$ | $d_9 = D9$ | | |
| $r_{10} = \infty$ (stop) | $d_{10} = 0$ | | |
| $r_{11} = 4.4541$ (aspherical) | $d_{11} = 2.6000$ | $n_{d11} = 1.74320$ | $v_{d11} = 49.34$ |
| $r_{12} = -36.5357$ | $d_{12} = 0.7000$ | $n_{d12} = 1.84666$ | $v_{d12} = 23.78$ |
| $r_{13} = 5.8033$ | $d_{13} = 1.0000$ | $n_{d13} = 1.69350$ | $v_{d13} = 53.21$ |
| $r_{14} = 20.1908$ (aspherical) | $d_{14} = D14$ | | |
| $r_{15} = \infty$ (position of variable transmittance means or shutter) | $d_{15} = 3.9000$ | | |
| $r_{16} = 114.5613$ | $d_{16} = 0.7000$ | $n_{d16} = 1.84666$ | $v_{d16} = 23.78$ |
| $r_{17} = 15.0000$ | $d_{17} = 1.4000$ | $n_{d17} = 1.58313$ | $v_{d17} = 59.38$ |
| $r_{18} = -13.0230$ (aspherical) | $d_{18} = 0.7000$ | | |
| $r_{19} = \infty$ | $d_{19} = 0.6000$ | $n_{d19} = 1.51633$ | $v_{d19} = 64.14$ |
| $r_{20} = \infty$ | $d_{20} = D20$ | | |
| $r_{21} = \infty$ (imaging plane) | $d_{21} = 0$ | | |

Aspherical coefficients

Second surface $K = 0$
$A_2 = 0$  $A_4 = -5.8861 \times 10^{-4}$  $A_6 = 2.2837 \times 10^{-6}$
$A_8 = -5.4903 \times 10^{-7}$  $A_{10} = 0$ Eleventh surface $K = 0$
$A_2 = 0$  $A_4 = 7.8543 \times 10^{-5}$  $A_6 = 1.1512 \times 10^{-5}$
$A_8 = 1.2754 \times 10^{-6}$  $A_{10} = 0$ Fourteenth surface $K = 0$
$A_2 = 0$  $A_4 = 4.7308 \times 10^{-3}$  $A_6 = 1.0524 \times 10^{-4}$
$A_8 = 7.9868 \times 10^{-5}$  $A_{10} = 0$ Eighteenth surface $K = 0$
$A_2 = 0$  $A_4 = 5.4330 \times 10^{-4}$  $A_6 = 3.5735 \times 10^{-4}$
$A_8 = -4.3307 \times 10^{-5}$  $A_{10} = 0$ Zoom Data When the Distance D0 is ∞,

| | Wide-angle | Middle | Telephoto |
|---|---|---|---|
| f (mm) | 3.25322 | 5.63788 | 9.74711 |
| Fno | 2.6846 | 3.4315 | 4.8540 |
| D0 | ∞ | ∞ | ∞ |
| D6 | 0.89897 | 3.36572 | 0.90042 |
| D9 | 10.05921 | 4.38120 | 0.89765 |
| D14 | 1.97939 | 5.18949 | 11.14311 |
| D20 | 1.00000 | 1.00000 | 1.00000 |

Fourth Embodiment

Figure 13:
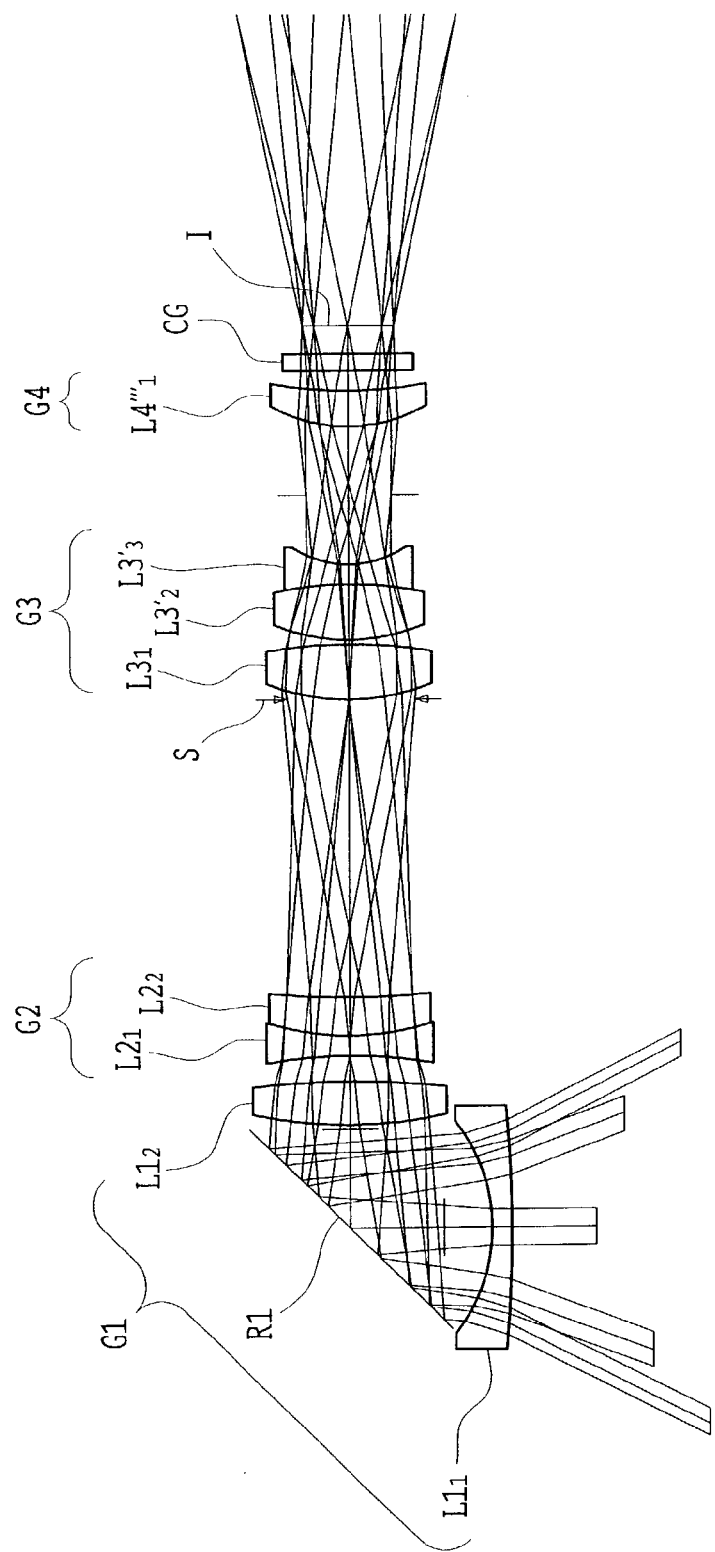
FIG. 13 is a sectional view showing an optical arrangement, developed along the optical axis, at the wide-angle position where the optical path is bent in focusing of the infinite object point, in a fourth embodiment of the zoom lens according to the present invention.
Figure 14A:
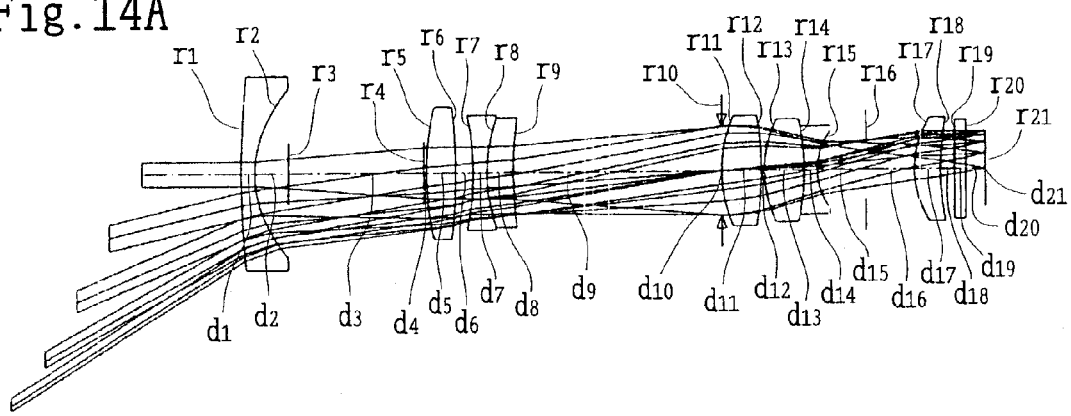
FIGS. 14A, 14B, and 14C are sectional views showing optical arrangements, developed along the optical axis, at wide-angle, middle, and telephoto positions, respectively, in focusing of the infinite object point, of the zoom lens in the fourth embodiment.
Figure 14B:
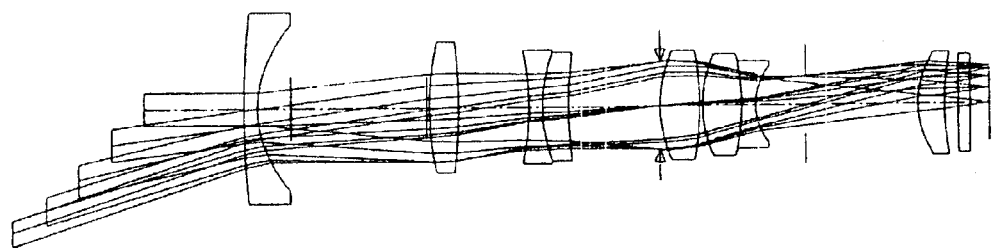
Figure 14C:
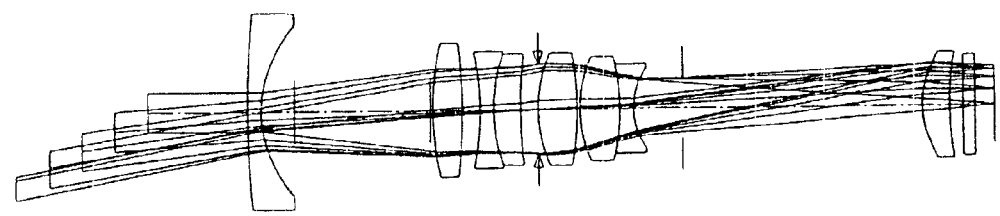
Figures 16A, 16B, 16C, 16D:
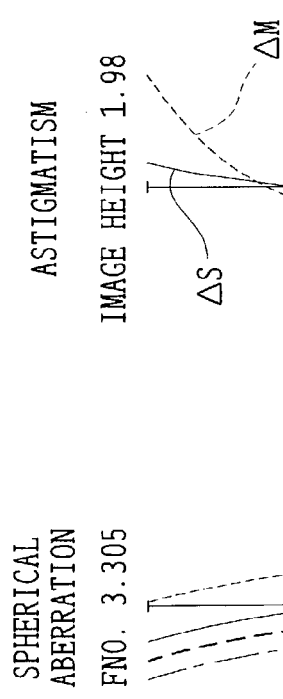
FIGS. 16A, 16B, 16C, and 16D are diagrams showing aberration characteristics at the middle position, in focusing of the infinite object point, of the zoom lens in the fourth embodiment.

FIG. 13 shows an optical arrangement of the fourth embodiment of the zoom lens used in the electronic imaging device according to the present invention. FIGS. 14A, 14B, and 14C show optical arrangements at wide-angle, middle, and telephoto positions, respectively, in the fourth embodiment. FIGS. 15A–15D show aberration characteristics at the wide-angle position in the fourth embodiment. FIGS. 16A–16D show aberration characteristics at the middle position in the fourth embodiment. FIGS. 17A–17D show aberration characteristics at the telephoto position in the fourth embodiment.

As shown in FIG. 13, the electronic imaging device of the fourth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$, with a convex surface directed toward the object side, the reflective optical component R1 having a reflecting surface for bending the optical path, and the biconvex positive lens $L1_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1$ and a cemented lens with a biconvex positive lens $L3_2'$ and a biconcave negative lens $L3_3'$, having positive refracting power as a whole.

The fourth lens unit G4 includes a positive meniscus lens $L4_1'''$ with a convex surface directed toward the object side.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$, with a convex surface directed toward the object side in the first lens unit G1, the object-side surface of the biconvex positive lens $L3_1$ in the third lens unit G3, and the object-side surface of the positive meniscus lens $L4_1'''$ with a convex surface directed toward the object side, constituting the fourth lens unit G4.

Subsequently, numerical data of optical members constituting the zoom lens of the fourth embodiment are shown below.

Numerical data 4

| | | | |
|---|---|---|---|
| $r_1 = 52.2760$ | $d_1 = 0.7000$ | $n_{d1} = 1.80610$ | $v_{d1} = 40.92$ |
| $r_2 = 5.7580$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = 16.0001$ | $d_5 = 1.5500$ | $n_{d5} = 1.72916$ | $v_{d5} = 54.68$ |
| $r_6 = -30.1872$ | $d_6 = D6$ | | |
| $r_7 = -14.5275$ | $d_7 = 0.7000$ | $n_{d7} = 1.72916$ | $v_{d7} = 54.68$ |
| $r_8 = 8.5000$ | $d_8 = 1.3500$ | $n_{d8} = 1.84666$ | $v_{d8} = 23.78$ |
| $r_9 = 22.8461$ | $d_9 = D9$ | | |
| $r_{10} = \infty$ (stop) | $d_{10} = 0$ | | |
| $r_{11} = 6.7921$ (aspherical) | $d_{11} = 2.0000$ | $n_{d11} = 1.74320$ | $v_{d11} = 49.34$ |
| $r_{12} = -17.1573$ | $d_{12} = 0.1500$ | | |
| $r_{13} = 6.6023$ | $d_{13} = 2.0000$ | $n_{d13} = 1.69680$ | $v_{d13} = 55.53$ |
| $r_{14} = -12.0000$ | $d_{14} = 0.7000$ | $n_{d14} = 1.80518$ | $v_{d14} = 25.42$ |
| $r_{15} = 3.4303$ | $d_{15} = 2.5000$ | | |
| $r_{16} = \infty$ (position of variable transmittance means or shutter) | $d_{16} = D16$ | | |
| $r_{17} = 5.2486$ (aspherical) | $d_{17} = 1.3000$ | $n_{d17} = 1.58313$ | $v_{d17} = 59.38$ |
| $r_{18} = 14.6752$ | $d_{18} = 0.7000$ | | |
| $r_{19} = \infty$ | $d_{19} = 0.6000$ | $n_{d19} = 1.51633$ | $v_{d19} = 64.14$ |
| $r_{20} = \infty$ | $d_{20} = D20$ | | |
| $r_{21} = \infty$ (imaging surface) | $d_{21} = 0$ | | |

Aspherical coefficients

Second surface $K = 0$
$A_2 = 0$  $A_4 = -7.5842 \times 10^{-4}$  $A_6 = 1.7230 \times 10^{-5}$
$A_8 = -1.0788 \times 10^{-6}$  $A_{10} = 0$ Eleventh surface $K = 0$
$A_2 = 0$  $A_4 = -6.3767 \times 10^{-4}$  $A_6 = -3.2039 \times 10^{-6}$
$A_8 = -1.8591 \times 10^{-7}$  $A_{10} = 0$ Seventeenth surface $K = 0$
$A_2 = 0$  $A_4 = -9.5208 \times 10^{-4}$  $A_6 = 1.7318 \times 10^{-4}$
$A_8 = -1.2845 \times 10^{-5}$  $A_{10} = 0$ Zoom Data When the Distance D0 is ∞,

| | Wide-angle | Middle | Telephoto |
|---|---|---|---|
| f (mm) | 3.24494 | 5.63626 | 9.75588 |
| Fno | 2.5243 | 3.3051 | 4.8453 |
| D0 | ∞ | ∞ | ∞ |
| D6 | 0.89968 | 3.58051 | 0.90275 |
| D9 | 10.64759 | 4.65512 | 0.90377 |
| D16 | 2.44627 | 5.75714 | 12.18681 |
| D20 | 1.00000 | 1.00000 | 1.00000 |

Fifth Embodiment

Figure 18:
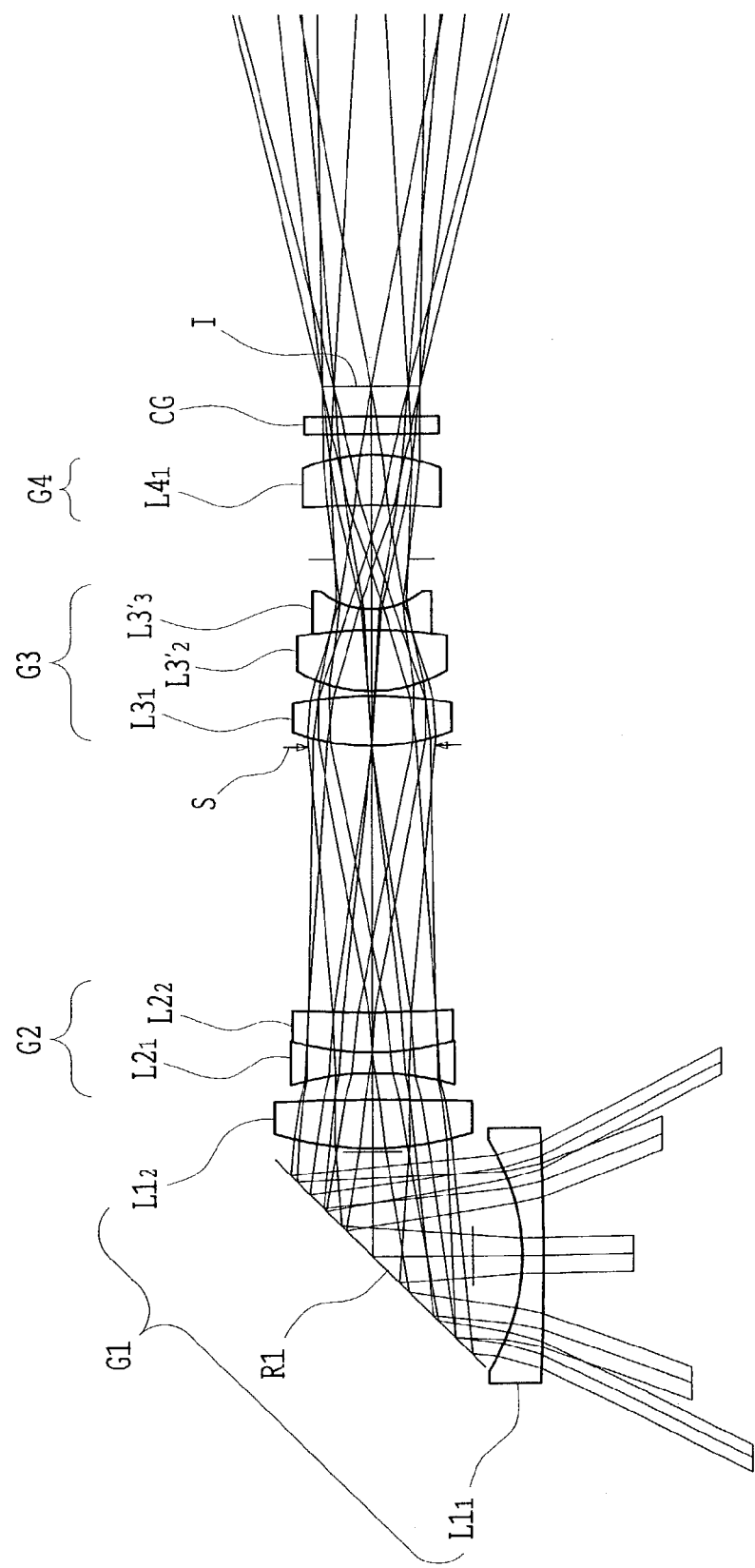
FIG. 18 is a sectional view showing an optical arrangement, developed along the optical axis, at the wide-angle position where the optical path is bent in focusing of the infinite object point, in a fifth embodiment of the zoom lens according to the present invention.
Figure 19A:
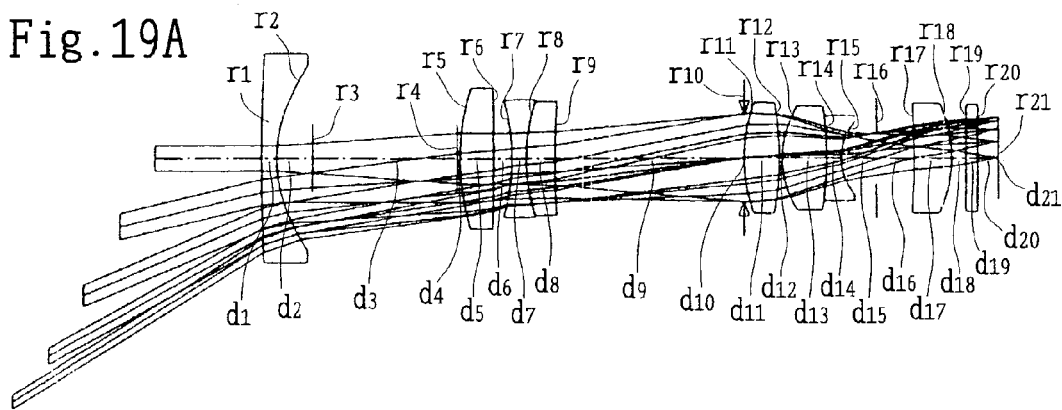
FIGS. 19A, 19B, and 19C are sectional views showing optical arrangements, developed along the optical axis, at wide-angle, middle, and telephoto positions, respectively, in focusing of the infinite object point, of the zoom lens in the fifth embodiment.
Figure 19B:
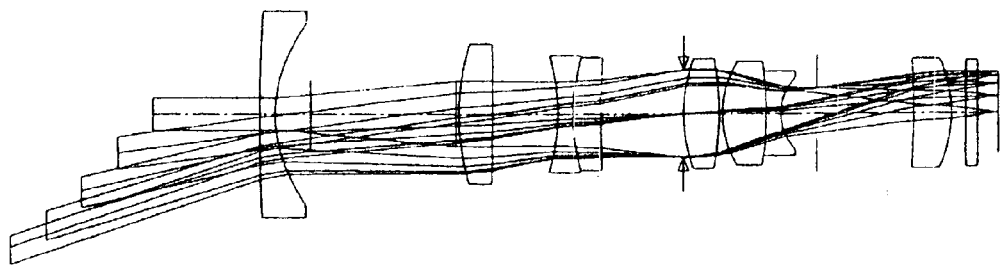
Figure 19C:
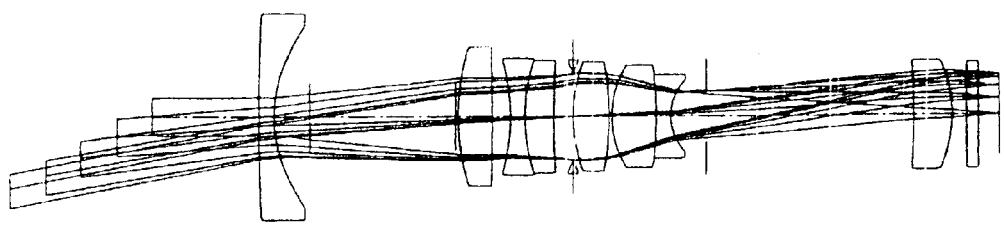

FIG. 18 shows an optical arrangement of the fifth embodiment of the zoom lens used in the electronic imaging device according to the present invention. FIGS. 19A, 19B, and 19C show optical arrangements at wide-angle, middle, and telephoto positions, respectively, in the fifth embodiment.

As shown in FIG. 18, the electronic imaging device of the fifth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the biconvex positive lens $L1_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1$ and the cemented lens with the biconvex positive lens $L3_2'$ and the biconcave negative lens $L3_3'$, having positive refracting power as a whole.

The fourth lens unit G4 includes the positive meniscus lens $L4_1$ with a concave surface directed toward the object side.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the biconvex positive lens $L3_1$ in the third lens unit G3, and the image-side surface of the positive meniscus lens $L4_1$ with a concave surface directed toward the object side, constituting the fourth lens unit G4.

Subsequently, numerical data of optical members constituting the zoom lens of the fifth embodiment are shown below.

Numerical data 5

| | | | |
|---|---|---|---|
| $r_1 = 102.2644$ | $d_1 = 0.7000$ | $n_{d1} = 1.80610$ | $v_{d1} = 40.92$ |
| $r_2 = 6.4583$ (aspherical) | $d_2 = 1.7000$ | | |
| $r_3 = \infty$ | $d_3 = 6.8000$ | | |
| $r_4 = \infty$ | $d_4 = 0.1500$ | | |
| $r_5 = 11.8116$ | $d_5 = 1.6000$ | $n_{d5} = 1.72916$ | $v_{d5} = 54.68$ |
| $r_6 = -211.6601$ | $d_6 = D6$ | | |
| $r_7 = -9.9617$ | $d_7 = 0.7000$ | $n_{d7} = 1.72916$ | $v_{d7} = 54.68$ |

-continued

| | | | |
|---|---|---|---|
| $r_8 = 9.5000$ | $d_8 = 1.3000$ | $n_{d8} = 1.84666$ | $\nu_{d8} = 23.78$ |
| $r_9 = 41.0310$ | $d_9 = D9$ | | |
| $r_{10} = \infty$ (stop) | $d_{10} = 0$ | | |
| $r_{11} = 7.0537$ (aspherical) | $d_{11} = 1.7000$ | $n_{d11} = 1.74320$ | $\nu_{d11} = 49.34$ |
| $r_{12} = -15.1973$ | $d_{12} = 0.1500$ | | |
| $r_{13} = 4.7737$ | $d_{13} = 2.1000$ | $n_{d13} = 1.74320$ | $\nu_{d13} = 49.34$ |
| $r_{14} = -17.0000$ | $d_{14} = 0.7000$ | $n_{d14} = 1.84666$ | $\nu_{d14} = 23.78$ |
| $r_{15} = 2.5724$ | $d_{15} = 1.7000$ | | |
| $r_{16} = \infty$ (position of variable transmittance means or shutter) | $d_{16} = D16$ | | |
| $r_{17} = -34.4280$ | $d_{17} = 1.7000$ | $n_{d17} = 1.57099$ | $\nu_{d17} = 50.80$ |
| $r_{18} = -5.8134$ (aspherical) | $d_{18} = 0.7000$ | | |
| $r_{19} = \infty$ | $d_{19} = 0.6000$ | $n_{d19} = 1.51633$ | $\nu_{d19} = 64.14$ |
| $r_{20} = \infty$ | $d_{20} = D20$ | | |
| $r_{21} = \infty$ (imaging plane) | $d_{21} = 0$ | | |

Aspherical coefficients

Second surface $K = 0$
$A_2 = 0$       $A_4 = -5.0036 \times 10^{-4}$       $A_6 = 3.1904 \times 10^{-6}$
$A_8 = -4.2907 \times 10^{-7}$       $A_{10} = 0$ Eleventh surface $K = 0$
$A_2 = 0$       $A_4 = -6.6405 \times 10^{-4}$       $A_6 = -7.9814 \times 10^{-7}$
$A_8 = -1.7621 \times 10^{-7}$       $A_{10} = 0$ Eighteenth surface $K = 0$
$A_2 = 0$       $A_4 = 2.0836 \times 10^{-3}$       $A_6 = 8.7260 \times 10^{-5}$
$A_8 = -1.9733 \times 10^{-5}$       $A_{10} = 0$ Zoom Data When the Distance D0 is ∞,

| | Wide-angle | Middle | Telephoto |
|---|---|---|---|
| f (mm) | 3.25606 | 5.63818 | 9.75165 |
| Fno | 2.7198 | 3.6329 | 5.3468 |
| D0 | ∞ | ∞ | ∞ |
| D6 | 0.90008 | 3.07797 | 0.90116 |
| D9 | 8.98407 | 3.96139 | 0.90291 |
| D16 | 1.81805 | 4.66415 | 9.89808 |
| D20 | 1.00000 | 1.00000 | 1.00000 |

Sixth Embodiment

Figure 20:
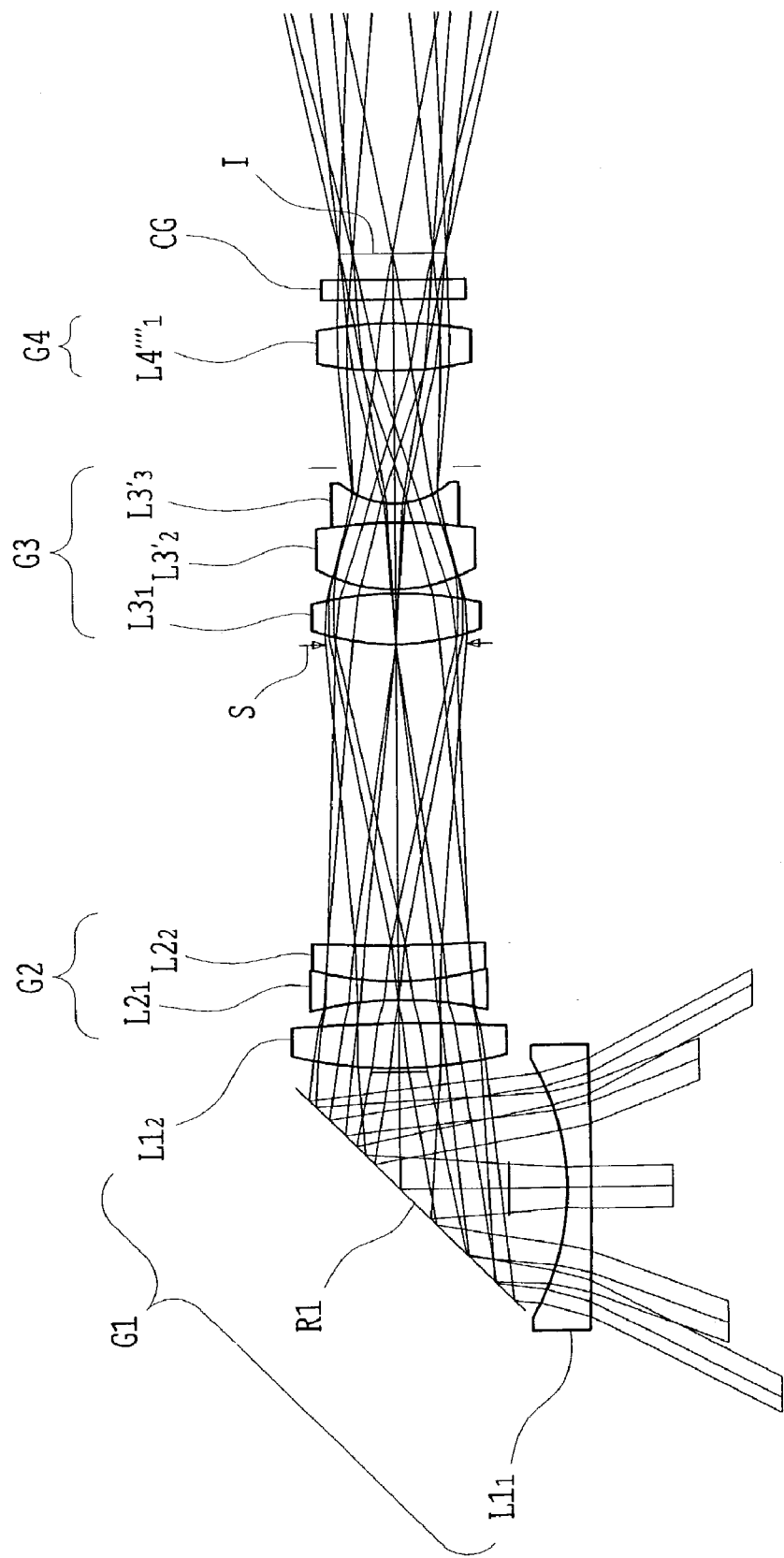
FIG. 20 is a sectional view showing an optical arrangement, developed along the optical axis, at the wide-angle position where the optical path is bent in focusing of the infinite object point, in a sixth embodiment of the zoom lens according to the present invention.
Figure 21A:
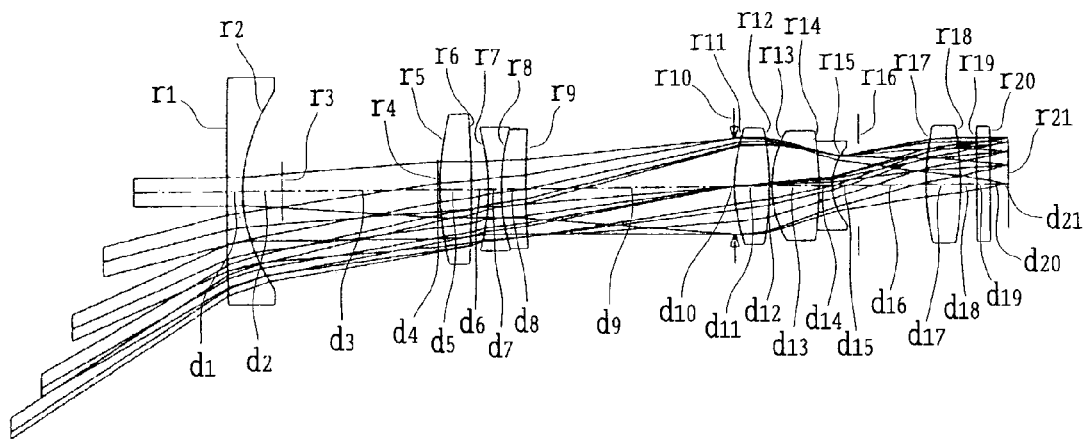
FIGS. 21A, 21B, and 21C are sectional views showing optical arrangements, developed along the optical axis, at wide-angle, middle, and telephoto positions, respectively, in focusing of the infinite object point, of the zoom lens in the sixth embodiment.
Figure 21B:
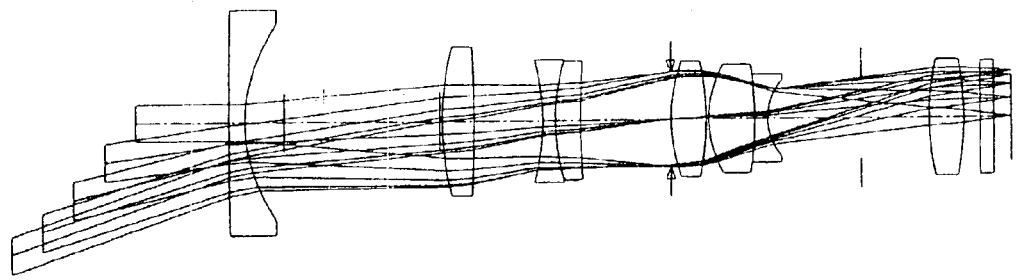
Figure 21C:
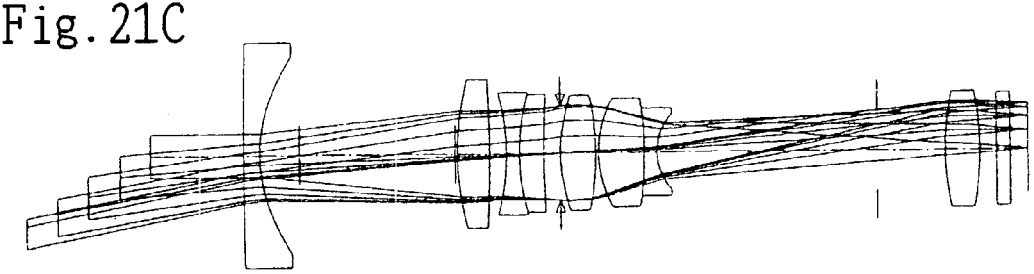

FIG. 20 shows an optical arrangement of the sixth embodiment of the zoom lens used in the electronic imaging device according to the present invention. FIGS. 21A, 21B, and 21C show optical arrangements at wide-angle, middle, and telephoto positions, respectively, in the sixth embodiment.

As shown in FIG. 20, the electronic imaging device of the sixth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$, with a convex surface directed toward the object side, the reflective optical component R1 having a reflecting surface for bending the optical path, and the biconvex positive lens $L1_2$.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1$ and the cemented lens with the biconvex positive lens $L3_2'$ and the biconcave negative lens $L3_3'$, having positive refracting power as a whole.

The fourth lens unit G4 includes the biconvex positive lens $L4_1''''$.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$, with a convex surface directed toward the object side in the first lens unit G1, both surfaces of the biconvex positive lens $L3_1$ in the third lens unit G3, and the image-side surface of the biconvex positive lens $L4_1''''$ constituting the fourth lens unit G4.

Subsequently, numerical data of optical members constituting the zoom lens of the sixth embodiment are shown below.

Numerical data 6

| | | | |
|---|---|---|---|
| $r_1 = 287.7208$ | $d_1 = 0.9000$ | $n_{d1} = 1.80610$ | $\nu_{d1} = 40.92$ |
| $r_2 = 8.5536$ (aspherical) | $d_2 = 2.1000$ | | |
| $r_3 = \infty$ | $d_3 = 8.4000$ | | |
| $r_4 = \infty$ | $d_4 = 0.1500$ | | |
| $r_5 = 16.2840$ | $d_5 = 1.7000$ | $n_{d5} = 1.73400$ | $\nu_{d5} = 51.47$ |
| $r_6 = -87.4861$ | $d_6 = D6$ | | |
| $r_7 = -12.9420$ | $d_7 = 0.7000$ | $n_{d7} = 1.72916$ | $\nu_{d7} = 54.68$ |
| $r_8 = 11.5000$ | $d_8 = 1.3500$ | $n_{d8} = 1.84666$ | $\nu_{d8} = 23.78$ |
| $r_9 = 47.4193$ | $d_9 = D9$ | | |
| $r_{10} = \infty$ (stop) | $d_{10} = 0$ | | |
| $r_{11} = 8.0948$ (aspherical) | $d_{11} = 1.9000$ | $n_{d11} = 1.74320$ | $\nu_{d11} = 49.34$ |
| $r_{12} = -18.2182$ (aspherical) | $d_{12} = 0.1500$ | | |
| $r_{13} = 6.1759$ | $d_{13} = 2.5000$ | $n_{d13} = 1.74320$ | $\nu_{d13} = 49.34$ |
| $r_{14} = -20.0000$ | $d_{14} = 0.7000$ | $n_{d14} = 1.84666$ | $\nu_{d14} = 23.78$ |
| $r_{15} = 3.1875$ | $d_{15} = D15$ | | |
| $r_{16} = \infty$ (position of variable transmittance means or shutter) | $d_{16} = 3.6250$ | | |

-continued $r_{17} = 15.0796$    $d_{17} = 1.8000$    $n_{d17} = 1.57099$    $v_{d17} = 50.80$
$r_{18} = -14.9993$ (aspherical)    $d_{18} = 0.8750$
$r_{19} = \infty$    $d_{19} = 0.7500$    $n_{d19} = 1.51633$    $v_{d19} = 64.14$
$r_{20} = \infty$    $d_{20} = D20$
$r_{21} = \infty$ (imaging plane)    $d_{21} = 0$ Aspherical coefficients Second surface $K = 0$
$A_2 = 0$        $A_4 = -2.9216 \times 10^{-4}$    $A_6 = 2.7058 \times 10^{-6}$
$A_8 = -1.0174 \times 10^{-7}$    $A_{10} = 0$ Eleventh surface $K = 0$
$A_2 = 0$        $A_4 = -5.4278 \times 10^{-4}$    $A_6 = -4.6715 \times 10^{-5}$
$A_8 = -4.4895 \times 10^{-7}$    $A_{10} = 0$ Twelfth surface $K = 0$
$A_2 = 0$        $A_4 = -1.6294 \times 10^{-4}$    $A_6 = -5.7124 \times 10^{-5}$
$A_8 = 7.4143 \times 10^{-7}$    $A_{10} = 0$ Eighteen surface $K = 0$
$A_2 = 0$        $A_4 = 5.3686 \times 10^{-4}$    $A_6 = 7.2927 \times 10^{-6}$
$A_8 = -2.1769 \times 10^{-6}$    $A_{10} = 0$ Zoom Data When the Distance D0 is $\infty$,

|  | Wide-angle | Middle | Telephoto |
|---|---|---|---|
| f (mm) | 4.00038 | 6.92729 | 12.00247 |
| Fno | 2.5763 | 3.4177 | 5.0414 |
| D0 | $\infty$ | $\infty$ | $\infty$ |
| D6 | 0.89975 | 3.74456 | 0.90123 |
| D9 | 11.36100 | 4.89989 | 0.90214 |
| D15 | 1.36578 | 4.98133 | 11.82310 |
| D20 | 1.00000 | 1.00000 | 1.00000 |

Seventh Embodiment

Figure 22:
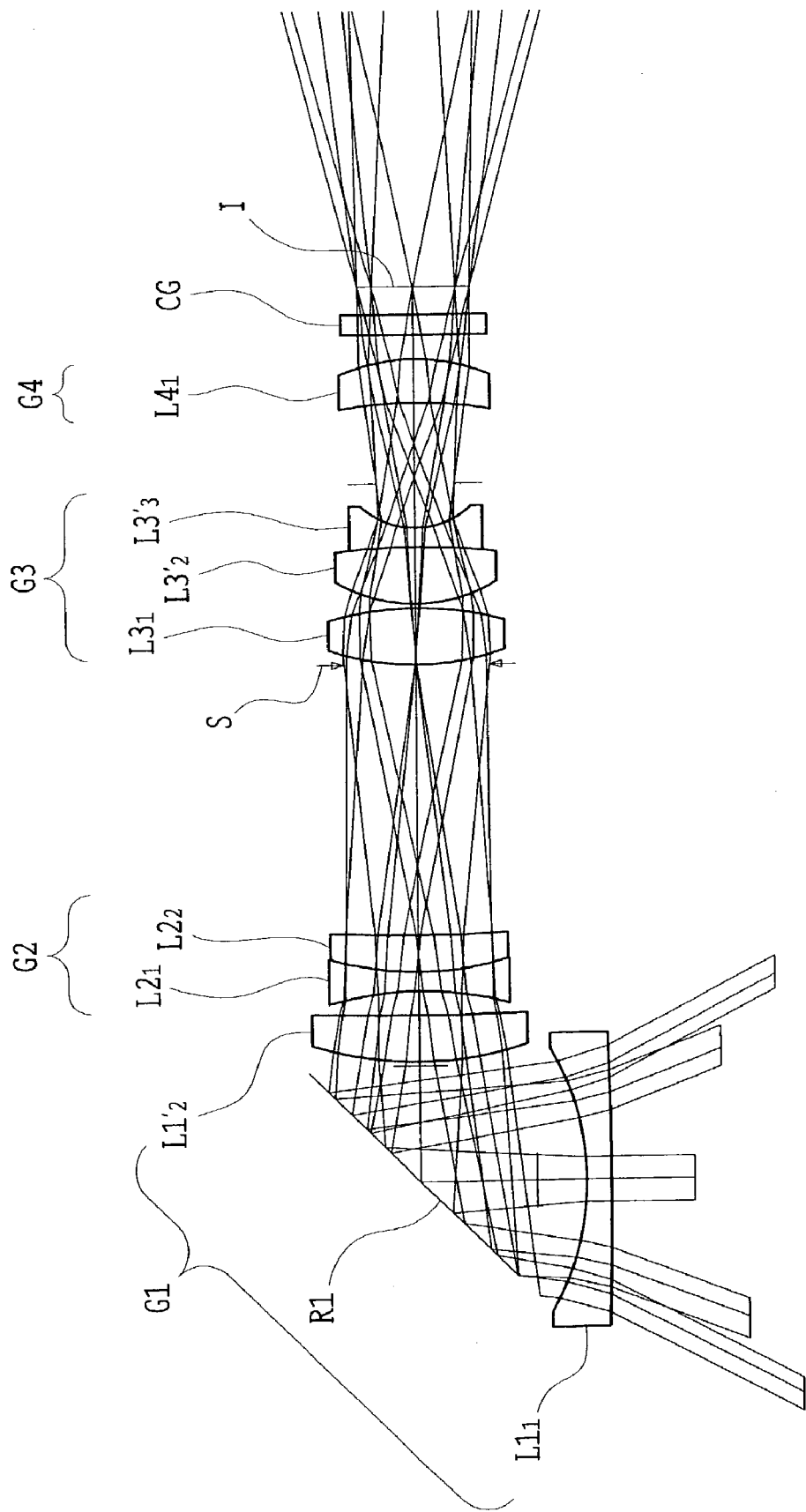
FIG. 22 is a sectional view showing an optical arrangement, developed along the optical axis, at the wide-angle position where the optical path is bent in focusing of the infinite object point, in a seventh embodiment of the zoom lens according to the present invention.
Figure 23A:
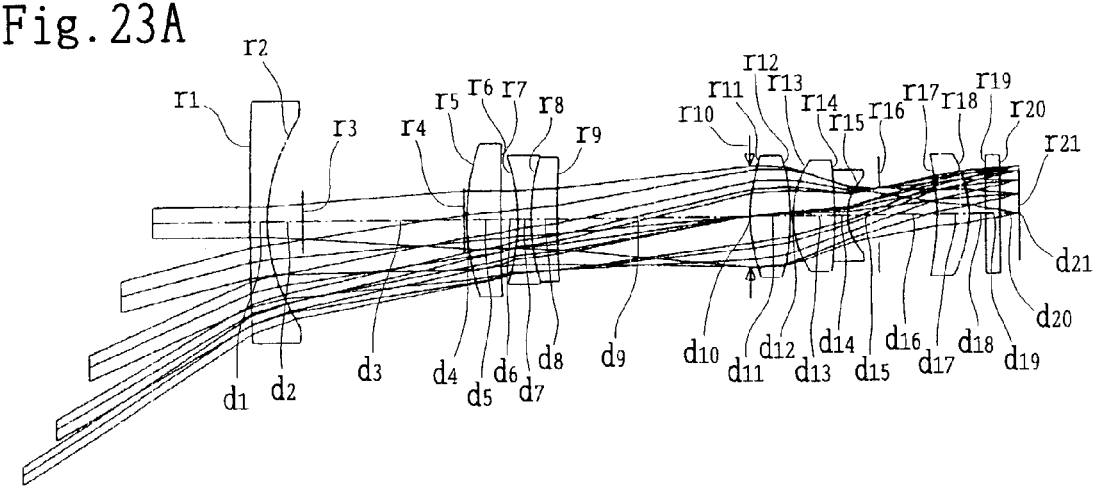
FIGS. 23A, 23B, and 23C are sectional views showing optical arrangements, developed along the optical axis, at wide-angle, middle, and telephoto positions, respectively, in focusing of the infinite object point, of the zoom lens in the seventh embodiment.
Figure 23B:
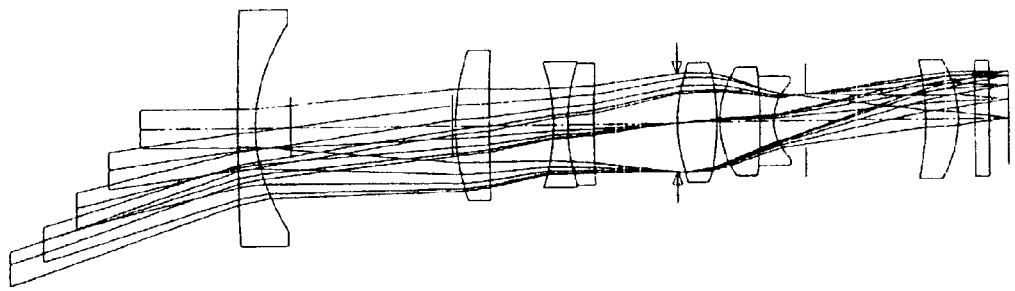
Figure 23C:
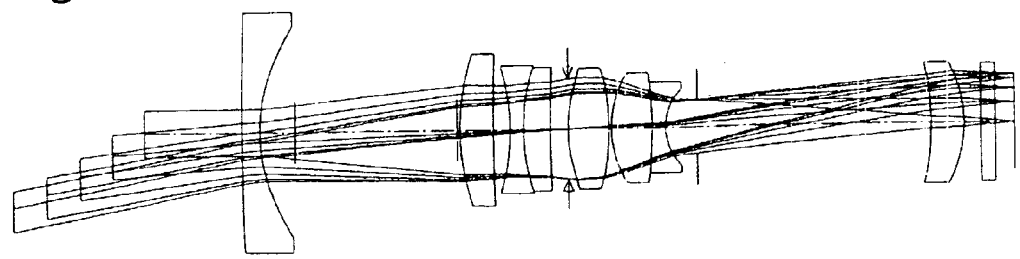

FIG. 22 shows an optical arrangement of the seventh embodiment of the zoom lens used in the electronic imaging device according to the present invention. FIGS. 23A, 23B, and 23C show optical arrangements at wide-angle, middle, and telephoto positions, respectively, in the seventh embodiment.

As shown in FIG. 22, the electronic imaging device of the seventh embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and a positive meniscus lens $L1_2'$ with a convex surface directed toward the object side.

The reflective optical component R1 is constructed as a front surface mirror bending the optical path by 90°. The reflecting surface of the front surface mirror is designed to be deformable so that the profile of the reflecting surface is changed and thereby the focusing operation is performed.

Also, the aspect ratio of the effective imaging area in each of the embodiments of the present invention is 3:4, and the optical path is laterally bent.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1$ and the cemented lens with the biconvex positive lens $L3_2'$ and the biconcave negative lens $L3_3'$, having positive refracting power as a whole.

The fourth lens unit G4 includes the positive meniscus lens $L4_1$ with a concave surface directed toward the object side.

When the magnification of the zoom lens is changed, extending from the wide-angle position to the telephoto position, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

The first lens unit G1 and the fourth lens unit G4 remain fixed even when the focusing operation is performed.

Aspherical surfaces are provided to the image-side surface of the negative meniscus lens $L1_1$, with a convex surface directed toward the object side in the first lens unit G1, both surfaces of the biconvex positive lens $L3_1$ in the third lens unit G3, and the image-side surface of the positive meniscus lens $L4_1$ with a concave surface directed toward the object side, constituting the fourth lens unit G4.

Subsequently, numerical data of optical members constituting the zoom lens of the seventh embodiment are shown below.

Numerical data 7

$r_1 = 179.9734$    $d_1 = 0.9000$    $n_{d1} = 1.80610$    $v_{d1} = 40.92$
$r_2 = 8.7645$ (aspherical)    $d_2 = 1.8000$
$r_3 = \infty$    $d_3 = 8.4000$
$r_4 = \infty$    $d_4 = 0.1500$
$r_5 = 12.7792$    $d_5 = 1.7000$    $n_{d5} = 1.73400$    $v_{d5} = 51.47$
$r_6 = 112.8775$    $d_6 = D6$
$r_7 = -10.6752$    $d_7 = 0.7000$    $n_{d7} = 1.72916$    $v_{d7} = 54.68$
$r_8 = 11.0000$    $d_8 = 1.3500$    $n_{d8} = 1.84666$    $v_{d8} = 23.78$
$r_9 = 57.4122$    $d_9 = D9$
$r_{10} = \infty$ (stop)    $d_{10} = 0$
$r_{11} = 7.5375$ (aspherical)    $d_{11} = 2.1000$    $n_{d11} = 1.74320$    $v_{d11} = 49.34$
$r_{12} = -14.2059$ (aspherical)    $d_{12} = 0.1500$
$r_{13} = 5.4153$    $d_{13} = 2.1000$    $n_{d13} = 1.74300$    $v_{d13} = 51.47$
$r_{14} = -25.0000$    $d_{14} = 0.7000$    $n_{d14} = 1.84666$    $v_{d14} = 23.78$
$r_{15} = 2.8519$    $d_{15} = 1.6250$
$r_{16} = \infty$ (position of variable transmittance means or shutter)    $d_{16} = D16$
$r_{17} = -13.9912$    $d_{17} = 1.6000$    $n_{d17} = 1.68893$    $v_{d17} = 31.07$
$r_{18} = -6.0274$ (aspherical)    $d_{18} = 0.8750$ -continued

| | | |
|---|---|---|
| $r_{19} = \infty$ | $d_{19} = 0.7500$ | $n_{d19} = 1.51633$  $\nu_{d19} = 64.14$ |
| $r_{20} = \infty$ | $d_{20} = D20$ | |
| $r_{21} = \infty$ (imaging plane) | $d_{21} = 0$ | |

Aspherical coefficients

Second surface $K = 0$
$A_2 = 0$  $A_4 = -2.6082 \times 10^{-4}$  $A_6 = 2.1812 \times 10^{-6}$
$A_8 = -9.2869 \times 10^{-8}$  $A_{10} = 0$ Eleventh surface $K = 0$
$A_2 = 0$  $A_4 = -4.8935 \times 10^{-4}$  $A_6 = -8.2602 \times 10^{-5}$
$A_8 = -1.6349 \times 10^{-6}$  $A_{10} = 0$ Twelfth surface $K = 0$
$A_2 = 0$  $A_4 = 1.4604 \times 10^{-4}$  $A_6 = -1.1504 \times 10^{-4}$
$A_8 = 1.4427 \times 10^{-6}$  $A_{10} = 0$ Eighteenth surface $K = 0$
$A_2 = 0$  $A_4 = 1.6159 \times 10^{-3}$  $A_6 = -3.5024 \times 10^{-5}$
$A_8 = -2.8372 \times 10^{-7}$  $A_{10} = 0$ Zoom Data When the Distance D0 is $\infty$,

| | Wide-angle | Middle | Telephoto |
|---|---|---|---|
| f (mm) | 4.00059 | 6.92436 | 12.00132 |
| Fno | 2.5241 | 3.3645 | 4.9430 |
| D0 | $\infty$ | $\infty$ | $\infty$ |
| D6 | 0.89971 | 3.35716 | 0.90160 |
| D9 | 10.02202 | 4.33848 | 0.90196 |
| D16 | 2.97093 | 6.19241 | 12.08905 |
| D20 | 1.00000 | 1.00000 | 1.00000 |

Subsequently, the values of parameters of the conditions in the first to seventh embodiments are listed in Tables 1 and 2.

TABLE 1

| | 1st embodiment | 2nd embodiment | 3rd embodiment |
|---|---|---|---|
| Lens data | Numerical data 1 | Numerical data 2 | Numerical data 3 |
| Type of the third lens unit | B | B | C |
| Half field angle at wide-angle position | 33.0° | 33.0° | 33.0° |
| Half field angle at middle position | 19.3° | 19.3° | 19.3° |
| Half field angle at telephoto position | 11.4° | 11.4° | 11.4° |
| L | 4.0 | 4.0 | 4.0 |
| a | 1.85 | 1.85 | 2.0 |
| $f11/\sqrt{(fw \cdot fT)}$ | -1.53101 | -1.52589 | -1.49860 |
| $f12/\sqrt{(fw \cdot fT)}$ | 2.65560 | 2.78401 | 2.70575 |
| d/L | 2.16250 | 2.16250 | 2.16250 |
| $\nu 1N$ | 40.92 | 40.92 | 40.92 |
| $\sqrt{(fw \cdot fT)}/fT$ | 0.10554 | 0.06659 | 0.08163 |
| $\beta Rw$ | -0.58149 | -0.56103 | -0.53898 |
| $fRw/\sqrt{(fw \cdot fT)}$ | 1.52856 | 1.54866 | 1.54772 |
| $R_{C3}/R_{C1}$ | 2.47814 | 4.96168 | — |
| $L/R_{C2}$ | -0.5 | -0.44444 | — |
| $\nu_{CP} - \nu_{CN}$ | 25.56 | 30.90 | — |
| $(R_{CF} + R_{CR})/(R_{CF} - R_{CR})$ | — | — | -1.56608 |
| $D_C/fw$ | — | — | 1.32177 |
| $\Sigma\{(1/Rci) - (1/Rca)\}^2$ | — | — | 0.01994 |
| $\Sigma\{(1/\nu cj + 1) - (1/\nu cj)\}^2$ | — | — | $1.0155 \times 10^{-3}$ |
| $\Sigma \{ncj + 1 - ncj\}^2$ | — | — | 0.03416 |
| $(R_{1PF} + R_{1PR})/(R_{1PF} - R_{1PR})$ | -0.70009 | -0.86568 | -0.87670 |
| $(R_{2F} + R_{2R})/(R_{2F} - R_{2R})$ | -0.34010 | -0.47005 | -0.33869 |
| fT/fw | 2.99928 | 2.99736 | 2.99614 |
| $\tau 400/\tau 550$ | 0.0 | 0.0 | 0.0 |
| $\tau 440/\tau 550$ | 1.06 | 1.06 | 1.06 |
| $\tau 600/\tau 550$ | 1.0 | 1.0 | 1.0 |
| $\tau 700/\tau 550$ | 0.04 | 0.04 | 0.04 |
| Bending point | 3.3 | 3.3 | 3.4 |
| Minimum distance for photography | 160 mm | 160 mm | 160 mm |
| Radius of curvature R of reflecting surface at minimum distance | -578 | -576 | -576 |

TABLE 2

| | 4th embodiment | 5th embodiment | 6th embodiment | 7th embodiment |
|---|---|---|---|---|
| Lens data | Numerical data 4 | Numerical data 5 | Numerical data 6 | Numerical data 7 |
| Type of the third lens unit | A | A | A | A |
| Half field angle at wide-angle position | 33.1° | 33.0° | 33.4° | 33.4° |
| Half field angle at middle position | 19.3° | 19.2° | 19.5° | 19.5° |
| Half field angle at telephoto position | 11.4° | 11.4° | 11.6° | 11.6° |
| L | 4.0 | 4.0 | 5.0 | 5.0 |
| a | 1.85 | 2.0 | 2.0 | 2.0 |
| $f11/\sqrt{(fw \cdot fT)}$ | -1.43633 | -1.52262 | -1.58055 | -1.65335 |
| $f12/\sqrt{(fw \cdot fT)}$ | 2.58556 | 2.73107 | 2.71813 | 2.81321 |
| d/L | 2.16250 | 2.16250 | 2.13000 | 2.07000 |
| $\nu 1N$ | 40.92 | 40.92 | 40.92 | 40.92 |
| $\sqrt{(fw \cdot fT)}/fT$ | 0.11728 | 0.07952 | 0.09765 | 0.06712 |

TABLE 2-continued

|  | 4th embodiment | 5th embodiment | 6th embodiment | 7th embodiment |
|---|---|---|---|---|
| BRw | −0.43339 | −0.48720 | −0.45061 | −0.50793 |
| $fRw/\sqrt{(fw \cdot fT)}$ | 1.54825 | 1.46665 | 1.46393 | 1.39741 |
| $R_{C3}/R_{C1}$ | 0.51956 | 0.53887 | 0.51612 | 0.52663 |
| $L/R_{C2}$ | −0.33333 | −0.23529 | −0.25000 | −0.20000 |
| $\nu_{CP} - \nu_{CN}$ | 30.11 | 25.56 | 25.56 | 27.69 |
| $(R_{CF} + R_{CR})/(R_{CF} - R_{CR})$ | — | — | — | — |
| $D_C/fw$ | — | — | — | — |
| $\Sigma\{(1/Rci) - (1/Rca)\}^2$ | — | — | — | — |
| $\Sigma\{(1/\nu cj + 1) - (1/\nu cj)\}^2$ | — | — | — | — |
| $\Sigma\{ncj + 1 - ncj\}^2$ | — | — | — | — |
| $(R_{1PF} + R_{1PR})/(R_{1PF} - R_{1PR})$ | −0.30716 | −0.89429 | −0.68615 | −1.25533 |
| $(R_{2F} + R_{2R})/(R_{2F} - R_{2R})$ | −0.22258 | −0.60929 | −0.57118 | −0.68643 |
| fT/fw | 3.0065 | 2.99492 | 3.00033 | 2.99989 |
| τ400/τ550 | 0.0 | 0.0 | 0.0 | 0.0 |
| τ440/τ550 | 1.06 | 1.06 | 1.06 | 1.06 |
| τ600/τ550 | 1.0 | 1.0 | 1.0 | 1.0 |
| τ700/τ550 | 0.04 | 0.04 | 0.04 | 0.04 |
| Bending point | 3.3 | 3.3 | 4.0 | 4.2 |
| Minimum distance for photography | 160 mm | 160 mm | 200 mm | 200 mm |
| Radius of curvature R of reflecting surface at minimum distance | −600 | −577 | −717 | −670 |

Eighth Embodiment

Figure 25A:
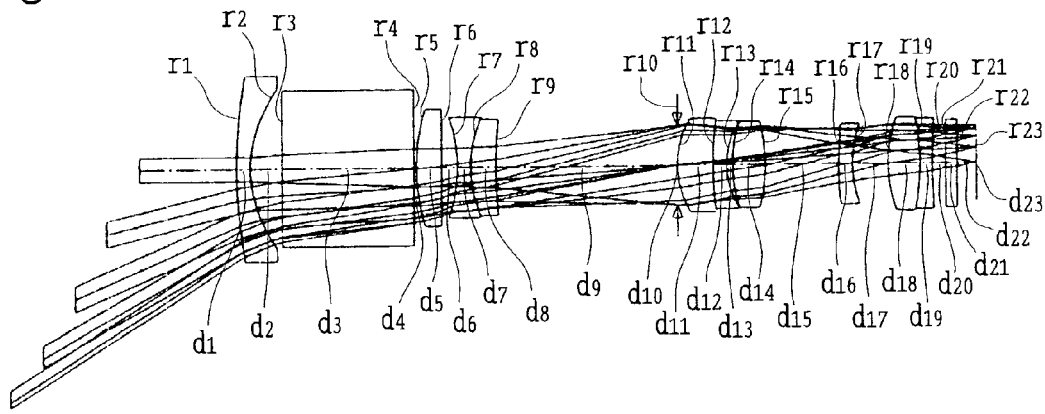
FIGS. 25A, 25B, and 25C are sectional views showing optical arrangements, developed along the optical axis, at wide-angle, middle, and telephoto positions, respectively, in focusing of the infinite object point, of the zoom lens in the eighth embodiment.
Figure 25B:
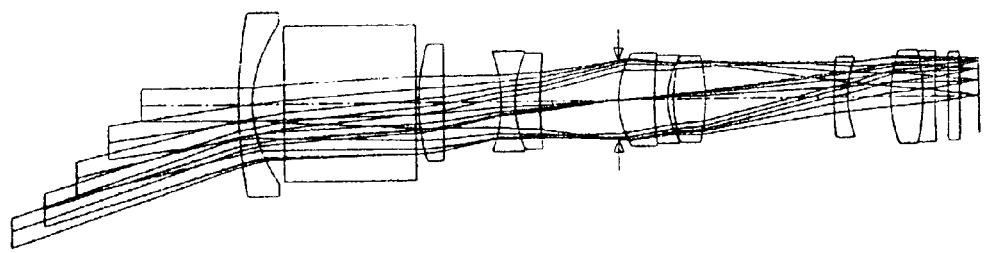
Figure 25C:
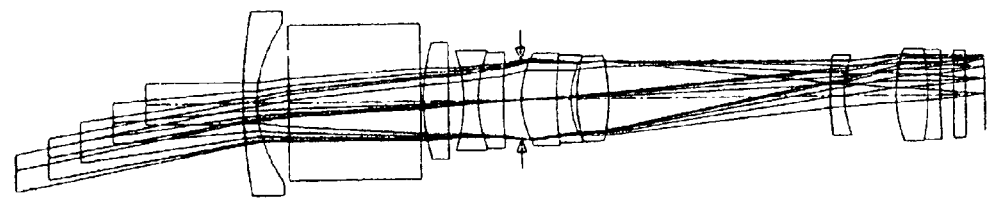
Figures 26A, 26B, 26C, 26D:
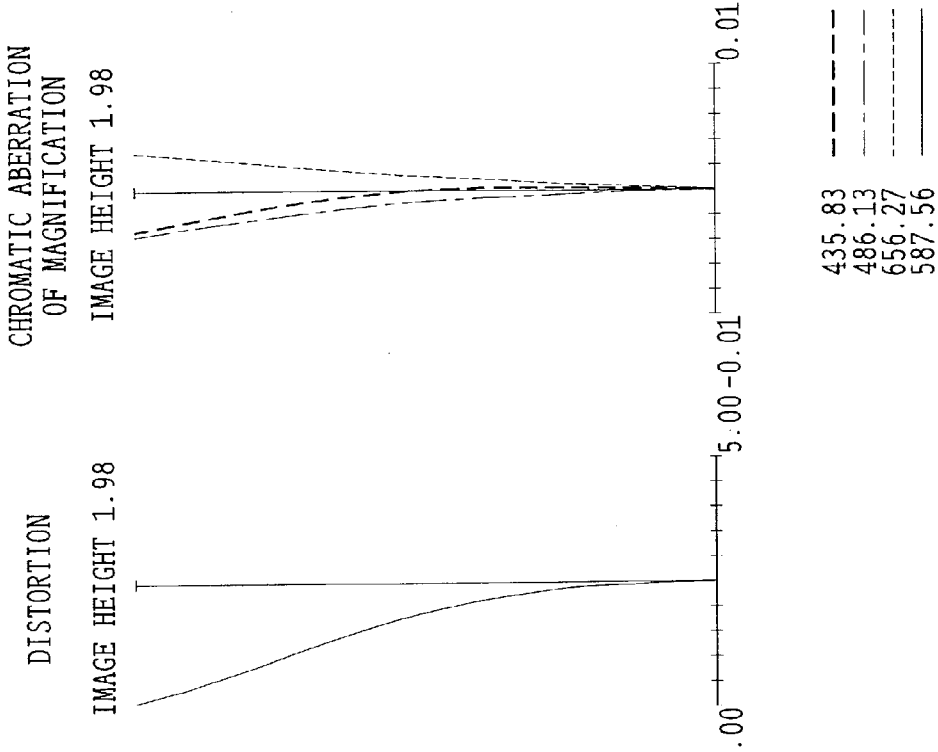
FIGS. 26A, 26B, 26C, and 26D are diagrams showing aberration characteristics at the wide-angle position, in focusing of the infinite object point, of the zoom lens in the eighth embodiment.

FIG. 24 shows an optical arrangement of the eighth embodiment of the zoom lens used in the electronic imaging device according to the present invention. FIGS. 25A, 25B, and 25C show optical arrangements at wide-angle, middle, and telephoto positions, respectively, in the eighth embodiment. FIGS. 26A–26D show aberration characteristics at the wide-angle position, in focusing of the infinite object point, of the zoom lens in the eighth embodiment. FIGS. 27A–27D show aberration characteristics at the middle position, in focusing of the infinite object point, of the zoom lens in the eighth embodiment. FIGS. 28A–28D show aberration characteristics at the telephoto position, in focusing of the infinite object point, of the zoom lens in the eighth embodiment. FIGS. 29A–29D show aberration characteristics at the wide-angle position, in focusing of the short-distance object point, of the zoom lens in the eighth embodiment. FIGS. 30A–30D show aberration characteristics at the middle position, in focusing of the short-distance object point, of the zoom lens in the eighth embodiment. FIGS. 31A–31D show aberration characteristics at the telephoto position, in focusing of the short-distance object point, of the zoom lens in the eighth embodiment.

As shown in FIG. 24, the electronic imaging device of the eighth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, the fourth lens unit G4, and a fifth lens unit G5.

The first lens unit G1 includes, in order from the object side, the negative meniscus lens $L1_1$ with a convex surface directed toward the object side, the reflective optical component R1 having a reflecting surface for bending the optical path, and the biconvex positive lens $L1_2$, having positive refracting power as a whole.

The reflective optical component R1 is constructed as a reflecting prism bending the optical path by 90°.

The second lens unit 62 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the positive meniscus lens $L3_1$ with a convex surface directed toward the object side and the negative meniscus lens $L3_2$ with a convex surface directed toward the object side, and the biconvex positive lens $L3_3$, having positive refracting power as a whole.

The fourth lens unit G4 includes the negative meniscus lens $L4_1$ with a convex surface directed toward the object side.

The fifth lens unit G5 includes, in order from the object side, a cemented lens with a biconvex positive lens $L5_1$ and a biconcave negative lens $L5_2$.

When the magnification of the zoom lens is changed, extending from the wide-angle position to the telephoto position, in focusing of the infinite object point, the first lens unit G1 and the fifth lens unit G5 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side, and the fourth lens unit G4 is moved along the optical axis.

The first lens unit G1 and the fifth lens unit G5 remain fixed even when the focusing operation is performed.

Aspherical surfaces are provided to the image-side surface of the negative meniscus lens $L1_1$, with a convex surface directed toward the object side in the first lens unit G1, the object-side surface of the positive meniscus lens $L3_1$ with a convex surface directed toward the object side in the third lens unit G3, and the object-side surface of the biconvex positive lens $L5_1$ in the fifth lens unit G5.

Subsequently, numerical data of optical members constituting the zoom lens of the eighth embodiment are shown below.

Numerical data 8

| | | | |
|---|---|---|---|
| $r_1 = 27.7123$ | $d_1 = 0.7000$ | $n_{d1} = 1.80610$ | $v_{d1} = 40.92$ |
| $r_2 = 5.9116$ (aspherical) | $d_2 = 1.7000$ | | |
| $r_3 = \infty$ | $d_3 = 6.8000$ | $n_{d3} = 1.80610$ | $v_{d3} = 40.92$ |
| $r_4 = \infty$ | $d_4 = 0.1500$ | | |
| $r_5 = 11.2199$ | $d_5 = 1.3000$ | $n_{d5} = 1.72916$ | $v_{d5} = 54.68$ |
| $r_6 = -569.8906$ | $d_6 = D6$ | | |
| $r_7 = -8.0963$ | $d_7 = 0.7000$ | $n_{d7} = 1.72916$ | $v_{d7} = 54.68$ |
| $r_8 = 6.5000$ | $d_8 = 1.3000$ | $n_{d8} = 1.84666$ | $v_{d8} = 23.78$ |
| $r_9 = 24.9922$ | $d_9 = D9$ | | |
| $r_{10} = \infty$ (stop) | $d_{10} = 0$ | | |
| $r_{11} = 4.5958$ (aspherical) | $d_{11} = 1.8000$ | $n_{d11} = 1.74320$ | $v_{d11} = 49.34$ |
| $r_{12} = 20.0000$ | $d_{12} = 0.7000$ | $n_{d12} = 1.84666$ | $v_{d12} = 23.78$ |
| $r_{13} = 4.4049$ | $d_{13} = 0.3000$ | | |
| $r_{14} = 7.9947$ | $d_{14} = 1.6000$ | $n_{d14} = 1.72916$ | $v_{d14} = 54.68$ |
| $r_{15} = -10.0877$ | $d_{15} = D15$ | | |
| $r_{16} = 19.9833$ | $d_{16} = 0.7000$ | $n_{d16} = 1.48749$ | $v_{d16} = 70.23$ |
| $r_{17} = 6.0725$ | $d_{17} = D17$ | | |
| $r_{18} = 7.4083$ (aspherical) | $d_{18} = 1.6000$ | $n_{d18} = 1.74320$ | $v_{d18} = 49.34$ |
| $r_{19} = -12.0000$ | $d_{19} = 0.7000$ | $n_{d19} = 1.84666$ | $v_{d19} = 23.78$ |
| $r_{20} = 40.3531$ | $d_{20} = 0.7000$ | | |
| $r_{21} = \infty$ | $d_{21} = 0.6000$ | $n_{d21} = 1.51633$ | $v_{d21} = 64.14$ |
| $r_{22} = \infty$ | $d_{22} = D22$ | | |
| $r_{23} = \infty$ (imaging plane) | $d_{23} = 0$ | | |

Aspherical coefficients

Second surface $K = 0$
$A_2 = 0$  $A_4 = -6.4155 \times 10^{-4}$  $A_6 = 2.5228 \times 10^{-6}$
$A_8 = -8.7694 \times 10^{-7}$  $A_{10} = 0$ Eleventh surface $K = 0$
$A_2 = 0$  $A_4 = -1.0160 \times 10^{-3}$  $A_6 = 4.6636 \times 10^{-6}$
$A_8 = -1.0125 \times 10^{-6}$  $A_{10} = 0$ Eighteenth surface $K = 0$
$A_2 = 0$  $A_4 = -9.6507 \times 10^{-5}$  $A_6 = -5.2496 \times 10^{-5}$
$A_8 = 4.9151 \times 10^{-6}$  $A_{10} = 0$ Zoom Data When the Distance D0 is $\infty$,

| | Wide-angle | Middle | Telephoto |
|---|---|---|---|
| f (mm) | 3.25089 | 5.63716 | 9.74797 |
| Fno | 2.6146 | 3.2986 | 4.4792 |
| D0 | $\infty$ | $\infty$ | $\infty$ |
| D6 | 0.79869 | 2.93966 | 0.79967 |
| D9 | 9.23582 | 3.96028 | 0.89698 |
| D15 | 3.71237 | 6.47491 | 11.24992 |
| D17 | 1.81385 | 2.18422 | 2.61424 |
| D22 | 1.00000 | 1.00000 | 1.00000 |

When the Distance D0 is Short (16 cm),

| | Wide-angle | Middle | Telephoto |
|---|---|---|---|
| D0 | 162.6560 | 162.6560 | 162.6560 |
| D6 | 0.79869 | 2.93966 | 0.79967 |
| D9 | 9.23582 | 3.96028 | 0.89698 |
| D15 | 3.86053 | 6.90038 | 12.50997 |

-continued

| | Wide-angle | Middle | Telephoto |
|---|---|---|---|
| D17 | 1.66569 | 1.75875 | 1.35418 |
| D22 | 1.00000 | 1.00000 | 1.00000 |

Ninth Embodiment

Figure 32:
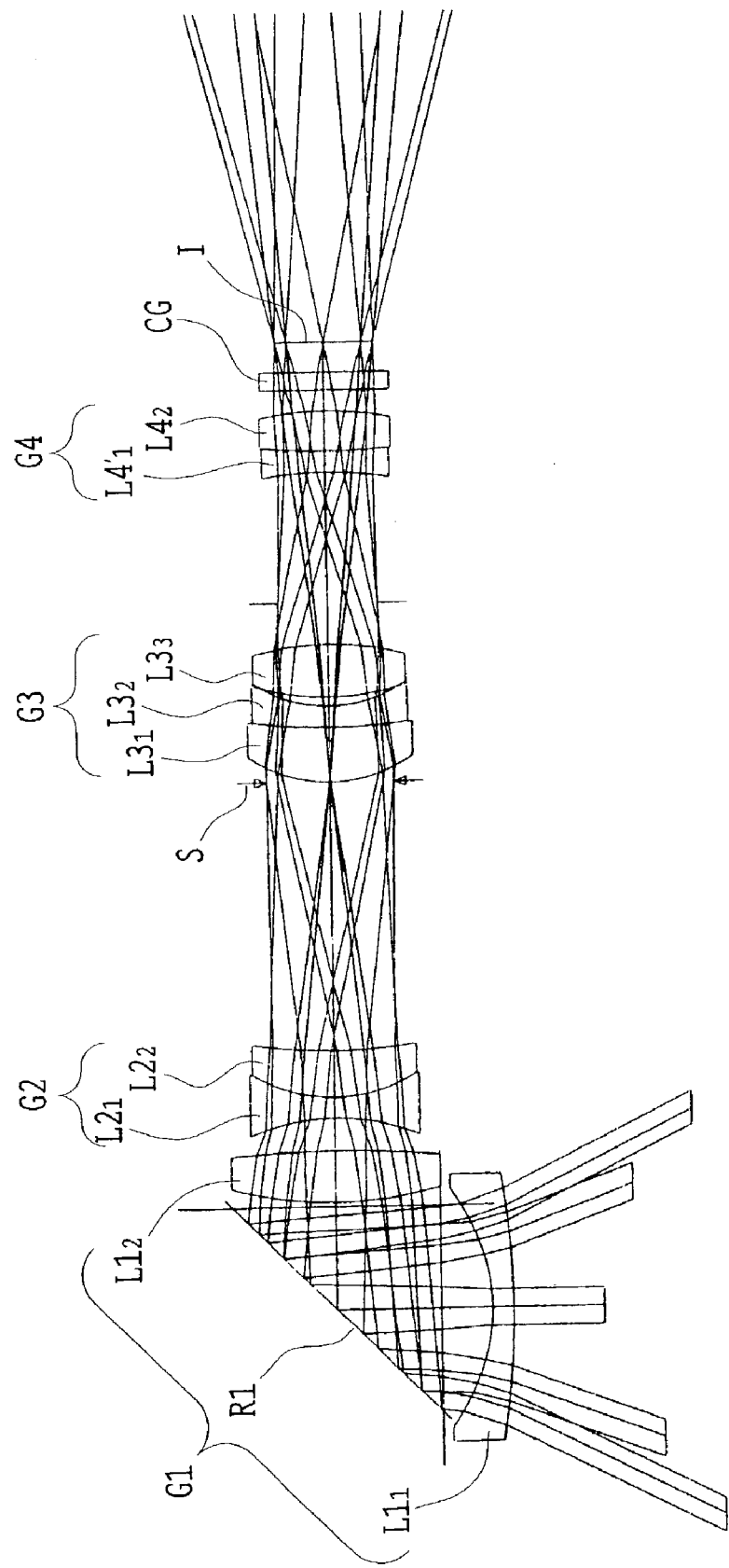
FIG. 32 is a sectional view showing an optical arrangement, developed along the optical axis, at the wide-angle position where the optical path is bent in focusing of the infinite object point, in a ninth embodiment of the zoom lens according to the present invention.
Figure 33A:
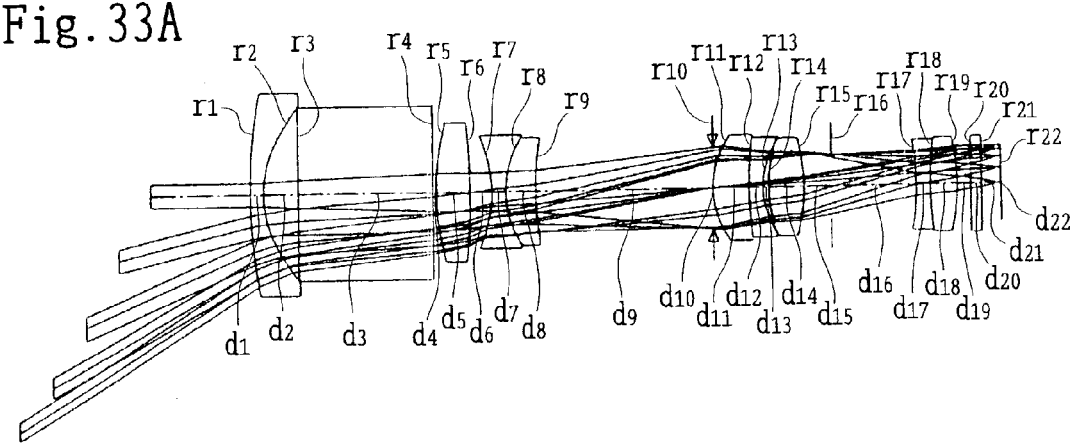
FIGS. 33A, 33B, and 33C are sectional views showing optical arrangements, developed along the optical axis, at wide-angle, middle, and telephoto positions, respectively, in focusing of the infinite object point, of the zoom lens in the ninth embodiment.
Figure 33B:
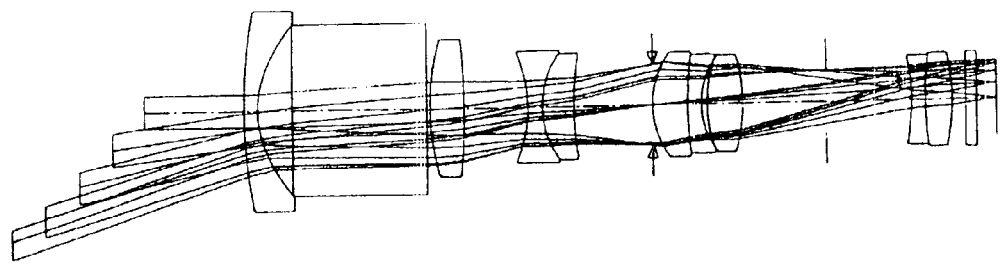
Figure 33C:
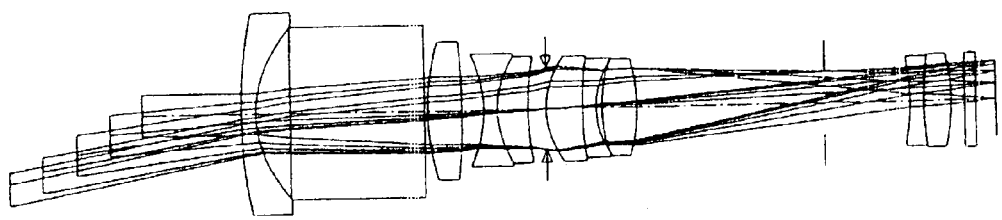
Figures 37A, 37B, 37C, 37D:
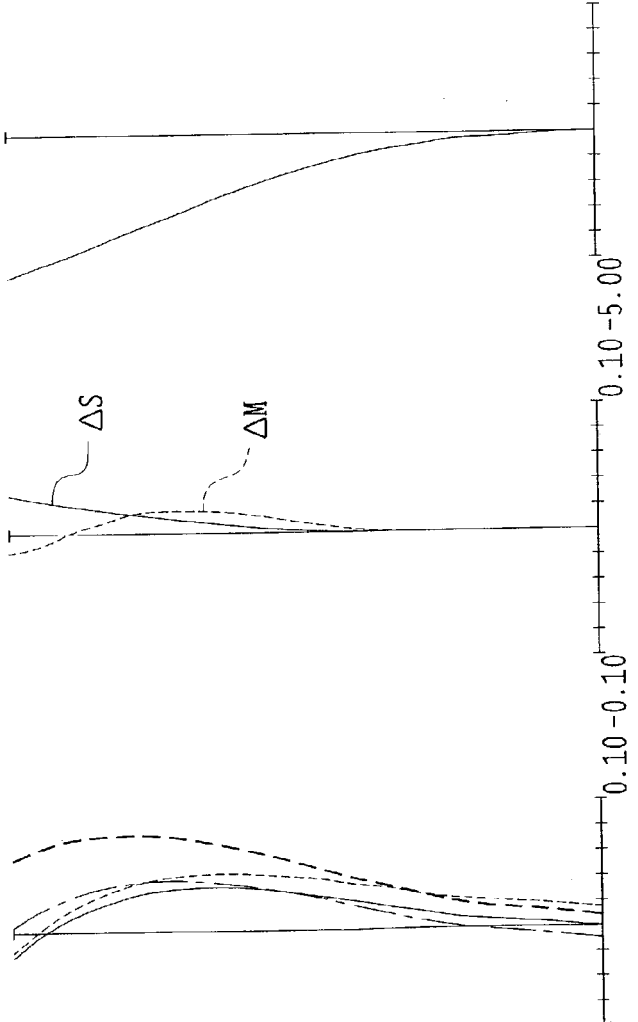
FIGS. 37A, 37B, 37C, and 37D are diagrams showing aberration characteristics at the wide-angle position, in focusing of the short-distance object point, of the zoom lens in the ninth embodiment.

FIG. 32 shows an optical arrangement of the ninth embodiment of the zoom lens used in the electronic imaging device according to the present invention. FIGS. 33A, 33B, and 33C show optical arrangements at wide-angle, middle, and telephoto positions, respectively, in the ninth embodiment. FIGS. 34A–34D show aberration characteristics at the wide-angle position, in focusing of the infinite object point, of the zoom lens in the ninth embodiment. FIGS. 35A–35D show aberration characteristics at the middle position, in focusing of the infinite object point, of the zoom lens in the ninth embodiment. FIGS. 36A–36D show aberration characteristics at the telephoto position, in focusing of the infinite object point, of the zoom lens in the ninth embodiment. FIGS. 37A–37D show aberration characteristics at the wide-angle position, in focusing of the short-distance object point, of the zoom lens in the ninth embodiment. FIGS. 38A–38D show aberration characteristics at the middle position, in focusing of the short-distance object point, of the zoom lens in the ninth embodiment. FIGS. 39A–39D show aberration characteristics at the telephoto position, in focusing of the short-distance object point, of the zoom lens in the ninth embodiment.

As shown in FIG. 32, the electronic imaging device of the ninth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$, with a convex surface directed toward the object side, the reflective optical component R1 having a reflecting surface for bending the optical path, and the biconvex positive lens $L1_2$.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the positive meniscus lens $L3_1$ with a convex surface directed toward the object side and the negative meniscus lens $L3_2$ with a convex surface directed toward the object side, and the biconvex positive lens $L3_3$, having positive refracting power as a whole.

The fourth lens unit G4 includes a cemented lens with the biconcave negative lens $L4_1'$ and the biconvex positive lens $L4_2$.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

The first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the positive meniscus lens $L3_1$ with a convex surface directed toward the object side in the third lens unit G3, and the image-side surface of the biconvex positive lens $L4_2$ in the fourth lens unit G4.

Subsequently, numerical data of optical members constituting the zoom lens of the ninth embodiment are shown below.

Numerical data 9

| | | | |
|---|---|---|---|
| $r_1 = 26.5948$ | $d_1 = 0.7000$ | $n_{d1} = 1.80610$ | $v_{d1} = 40.92$ |
| $r_2 = 5.6908$ (aspherical) | $d_2 = 1.7000$ | | |
| $r_3 = \infty$ | $d_3 = 6.8000$ | $n_{d3} = 1.80610$ | $v_{d3} = 40.92$ |
| $r_4 = \infty$ | $d_4 = 0.1500$ | | |
| $r_5 = 12.8103$ | $d_5 = 1.7000$ | $n_{d5} = 1.72916$ | $v_{d5} = 54.68$ |
| $r_6 = -36.8350$ | $d_6 = D6$ | | |
| $r_7 = -6.9505$ | $d_7 = 0.7000$ | $n_{d7} = 1.69700$ | $v_{d7} = 48.52$ |
| $r_8 = 5.0000$ | $d_8 = 1.5500$ | $n_{d8} = 1.84666$ | $v_{d8} = 23.78$ |
| $r_9 = 16.5460$ | $d_9 = D9$ | | |
| $r_{10} = \infty$ (stop) | $d_{10} = 0$ | | |
| $r_{11} = 4.4396$ (aspherical) | $d_{11} = 1.8000$ | $n_{d11} = 1.74320$ | $v_{d11} = 49.34$ |
| $r_{12} = 19.0000$ | $d_{12} = 0.7000$ | $n_{d12} = 1.84666$ | $v_{d12} = 23.78$ |
| $r_{13} = 4.3099$ | $d_{13} = 0.3000$ | | |
| $r_{14} = 7.9340$ | $d_{14} = 1.7500$ | $n_{d14} = 1.72916$ | $v_{d14} = 54.68$ |
| $r_{15} = -9.4658$ | $d_{15} = D15$ | | |
| $r_{16} = \infty$ (position of variable transmittance means or shutter) | $d_{16} = 4.4000$ | | |
| $r_{17} = -11.5780$ | $d_{17} = 0.7000$ | $n_{d17} = 1.80100$ | $v_{d17} = 34.97$ |
| $r_{18} = 20.0000$ | $d_{18} = 1.3500$ | $n_{d18} = 1.74320$ | $v_{d18} = 49.34$ |
| $r_{19} = -9.3722$ (aspherical) | $d_{19} = 0.7000$ | | |
| $r_{20} = \infty$ | $d_{20} = 0.6000$ | $n_{d20} = 1.51633$ | $v_{d20} = 64.14$ |
| $r_{21} = \infty$ | $d_{21} = D21$ | | |
| $r_{22} = \infty$ (imaging plane) | $d_{22} = 0$ | | |

Aspherical coefficients

Second surface $K = 0$
$A_2 = 0$    $A_4 = -6.2873 \times 10^{-4}$    $A_6 = -4.6849 \times 10^{-7}$
$A_8 = -9.5321 \times 10^{-7}$    $A_{10} = 0$ Eleventh surface $K = 0$
$A_2 = 0$    $A_4 = -1.1790 \times 10^{-3}$    $A_6 = 2.6964 \times 10^{-6}$
$A_8 = -1.5144 \times 10^{-6}$    $A_{10} = 0$ Nineteenth surface $K = 0$
$A_2 = 0$    $A_4 = 1.3503 \times 10^{-3}$    $A_6 = -5.7711 \times 10^{-5}$
$A_8 = 1.1904 \times 10^{-5}$    $A_{10} = 0$ Zoom Data When the Distance D0 is ∞,

| | Wide-angle | Middle | Telephoto |
|---|---|---|---|
| f (mm) | 3.26135 | 5.63695 | 9.74271 |
| Fno | 2.6987 | 3.3411 | 4.5499 |
| D0 | ∞ | ∞ | ∞ |
| D6 | 1.09530 | 3.25443 | 1.09175 |
| D9 | 8.94170 | 3.96767 | 0.88424 |
| D15 | 1.39037 | 4.20559 | 9.45200 |
| D21 | 1.00000 | 1.00000 | 1.00000 |

When the Distance D0 is Short (16 cm),

| | Wide-angle | Middle | Telephoto |
|---|---|---|---|
| D0 | 162.6560 | 162.6560 | 162.6560 |
| D6 | 0.92755 | 3.08080 | 0.92401 |
| D9 | 9.10945 | 4.14131 | 1.05198 |
| D15 | 1.39037 | 4.20559 | 9.45200 |
| D21 | 1.00000 | 1.00000 | 1.00000 |

Tenth Embodiment

Figure 40:
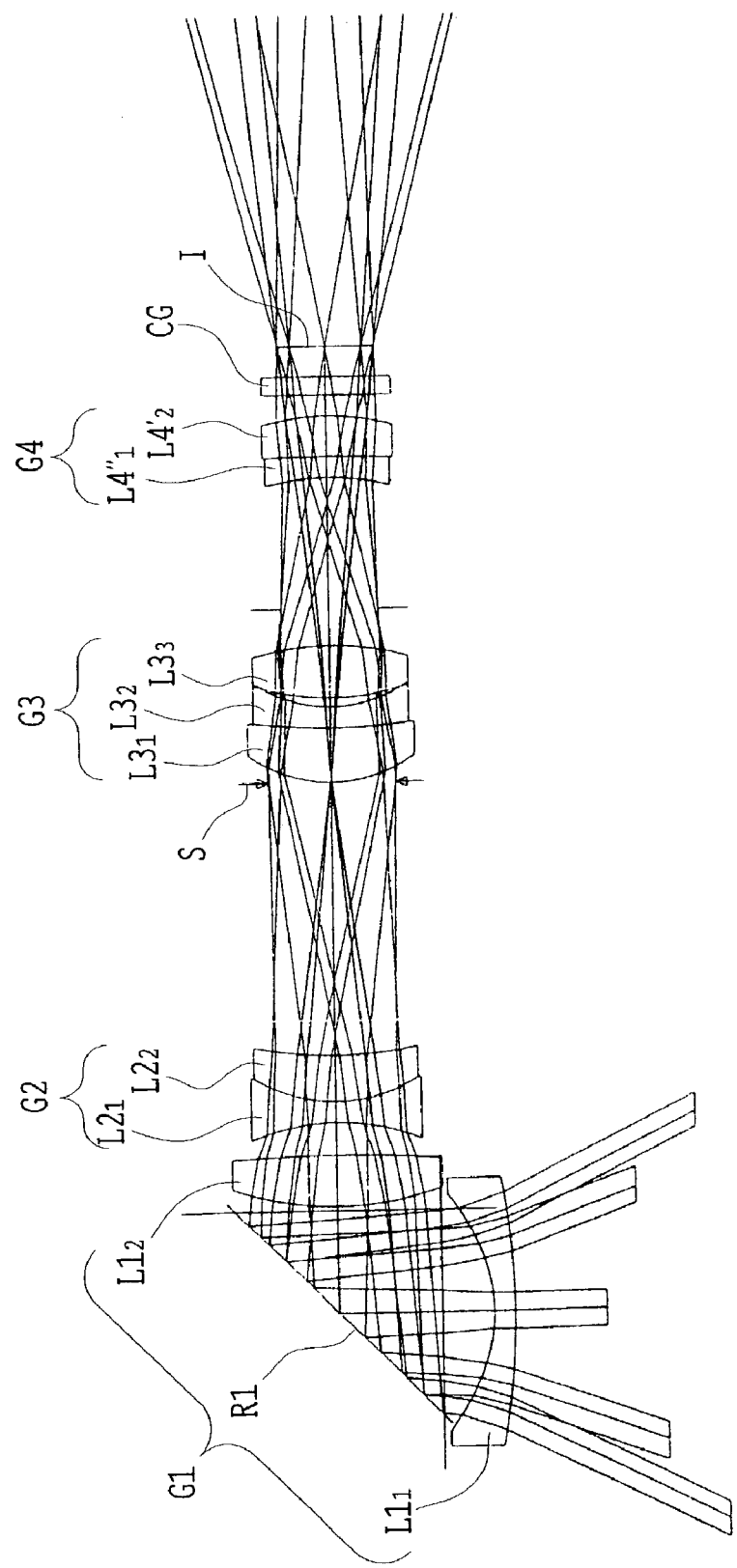
FIG. 40 is a sectional view showing an optical arrangement, developed along the optical axis, at the wide-angle position where the optical path is bent in focusing of the infinite object point, in a tenth embodiment of the zoom lens according to the present invention.
Figure 41A:
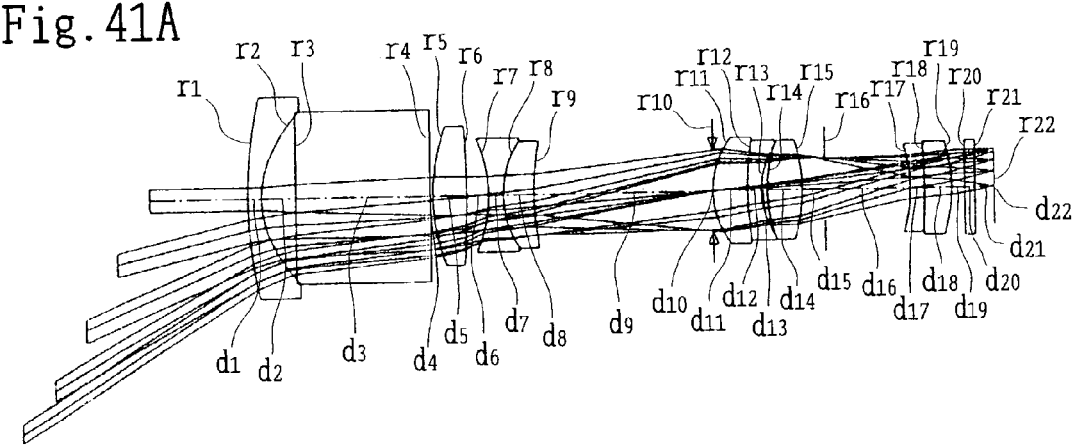
FIGS. 41A, 41B, and 41C are sectional views showing optical arrangements, developed along the optical axis, at wide-angle, middle, and telephoto positions, respectively, in focusing of the infinite object point, of the zoom lens in the tenth embodiment.
Figure 41B:
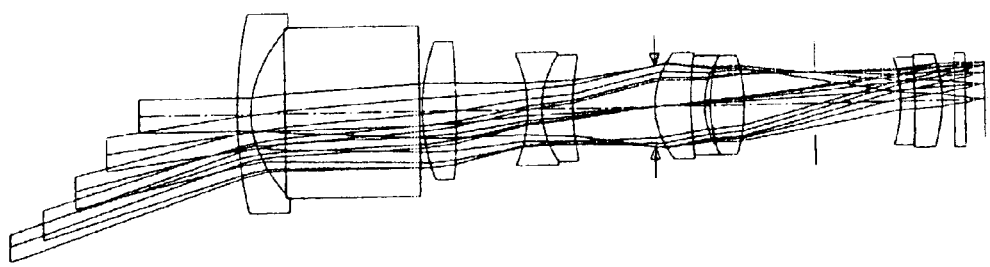
Figure 41C:
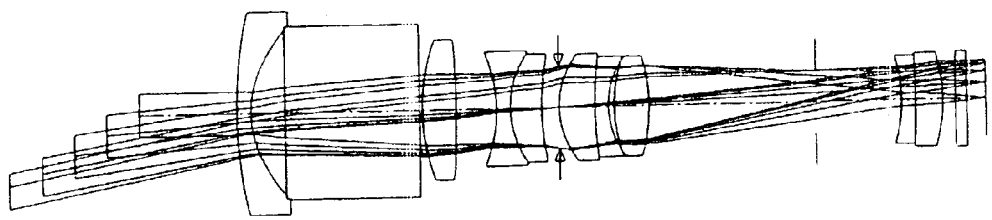

FIG. 40 shows an optical arrangement of the tenth embodiment of the zoom lens used in the electronic imaging device according to the present invention. FIGS. 41A, 41B, and 41C show optical arrangements at wide-angle, middle, and telephoto positions, respectively, in the tenth embodiment.

As shown in FIG. 40, the electronic imaging device of the tenth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the biconvex positive lens $L1_2$, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the positive meniscus lens $L3_1$ with a convex surface directed toward the object side and the negative meniscus lens $L3_2$ with a convex surface directed toward the object side, and the biconvex positive lens $L3_3$, having positive refracting power as a whole.

The fourth lens unit G4 includes a cemented lens with the negative meniscus lens $L4_1''$ with a concave surface directed toward the object side and a positive meniscus lens $L4_2'$ with a concave surface directed toward the object side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

The first lens unit G1 and the fourth lens unit G4 remain fixed even when the focusing operation is performed.

Aspherical surfaces are provided to the image-side surface of the negative meniscus lens $L1_1$, with a convex surface directed toward the object side in the first lens unit G1, the object-side surface of the positive meniscus lens $L3_1$ with a convex surface directed toward the object side in the third lens unit G3, and the image-side surface of the positive meniscus lens $L4_2'$ with a concave surface directed toward the object side in the fourth lens unit G4.

Subsequently, numerical data of optical members constituting the zoom lens of the tenth embodiment are shown below.

Numerical data 10

| | | | |
|---|---|---|---|
| $r_1 = 23.5093$ | $d_1 = 0.7000$ | $n_{d1} = 1.80100$ | $v_{d1} = 34.97$ |
| $r_2 = 5.3202$ (aspherical) | $d_2 = 1.7000$ | | |
| $r_3 = \infty$ | $d_3 = 6.8000$ | $n_{d3} = 1.80610$ | $v_{d3} = 40.92$ |
| $r_4 = \infty$ | $d_4 = 0.1500$ | | |
| $r_5 = 10.3647$ | $d_5 = 1.7000$ | $n_{d5} = 1.72916$ | $v_{d5} = 54.68$ |
| $r_6 = -47.4421$ | $d_6 = D6$ | | |
| $r_7 = -7.2232$ | $d_7 = 0.7000$ | $n_{d7} = 1.69680$ | $v_{d7} = 55.53$ |
| $r_8 = 5.0000$ | $d_8 = 1.5500$ | $n_{d8} = 1.84666$ | $v_{d8} = 23.78$ |
| $r_9 = 13.6636$ | $d_9 = D9$ | | |
| $r_{10} = \infty$ (stop) | $d_{10} = 0$ | | |
| $r_{11} = 4.2851$ (aspherical) | $d_{11} = 1.8000$ | $n_{d11} = 1.69350$ | $v_{d11} = 53.21$ |
| $r_{12} = 19.0000$ | $d_{12} = 0.7000$ | $n_{d12} = 1.84666$ | $v_{d12} = 23.78$ |
| $r_{13} = 4.3542$ | $d_{13} = 0.3000$ | | |
| $r_{14} = 7.5927$ | $d_{14} = 1.7500$ | $n_{d14} = 1.72916$ | $v_{d14} = 54.68$ |
| $r_{15} = -9.0883$ | $d_{15} = D15$ | | |
| $r_{16} = \infty$ (position of variable transmittance means or shutter) | $d_{16} = 4.4000$ | | |
| $r_{17} = -7.8172$ | $d_{17} = 0.7000$ | $n_{d17} = 1.84666$ | $v_{d17} = 23.78$ |
| $r_{18} = -50.0000$ | $d_{18} = 1.3500$ | $n_{d18} = 1.74320$ | $v_{d18} = 49.34$ |
| $r_{19} = -7.2821$ (aspherical) | $d_{19} = 0.7000$ | | |
| $r_{20} = \infty$ | $d_{20} = 0.6000$ | $n_{d20} = 1.51633$ | $v_{d20} = 64.14$ |
| $r_{21} = \infty$ | $d_{21} = D21$ | | |
| $r_{22} = \infty$ (imaging plane) | $d_{22} = 0$ | | |

Aspherical coefficients

Second surface $K = 0$
$A_2 = 0$  $A_4 = -7.4556 \times 10^{-4}$  $A_6 = 3.8977 \times 10^{-6}$
$A_8 = -1.6059 \times 10^{-6}$  $A_{10} = 0$ Eleventh surface $K = 0$
$A_2 = 0$  $A_4 = -1.4222 \times 10^{-3}$  $A_6 = -8.4545 \times 10^{-7}$
$A_8 = -1.7364 \times 10^{-6}$  $A_{10} = 0$ Nineteenth surface $K = 0$
$A_2 = 0$  $A_4 = 1.5497 \times 10^{-3}$  $A_6 = -1.9296 \times 10^{-4}$
$A_8 = 3.0021 \times 10^{-5}$  $A_{10} = 0$ Zoom Data When the Distance D0 is $\infty$,

| | Wide-angle | Middle | Telephoto |
|---|---|---|---|
| f (mm) | 3.26990 | 5.62502 | 9.73871 |
| Fno | 2.7015 | 3.2638 | 4.4073 |
| D0 | $\infty$ | $\infty$ | $\infty$ |
| D6 | 1.09108 | 3.56834 | 1.99910 |
| D9 | 9.07726 | 4.16755 | 0.88213 |
| D15 | 1.21117 | 3.63605 | 8.49846 |
| D21 | 1.00000 | 1.00000 | 1.00000 |

When the Distance D0 is Short (16 cm),

| | Wide-angle | Middle | Telephoto |
|---|---|---|---|
| D0 | 162.6560 | 162.6560 | 162.6560 |
| D6 | 0.92058 | 3.38281 | 1.82331 |
| D9 | 9.24776 | 4.35308 | 1.05792 |
| D15 | 1.21117 | 3.63605 | 8.49846 |
| D21 | 1.00000 | 1.00000 | 1.00000 |

Eleventh Embodiment

Figure 42:
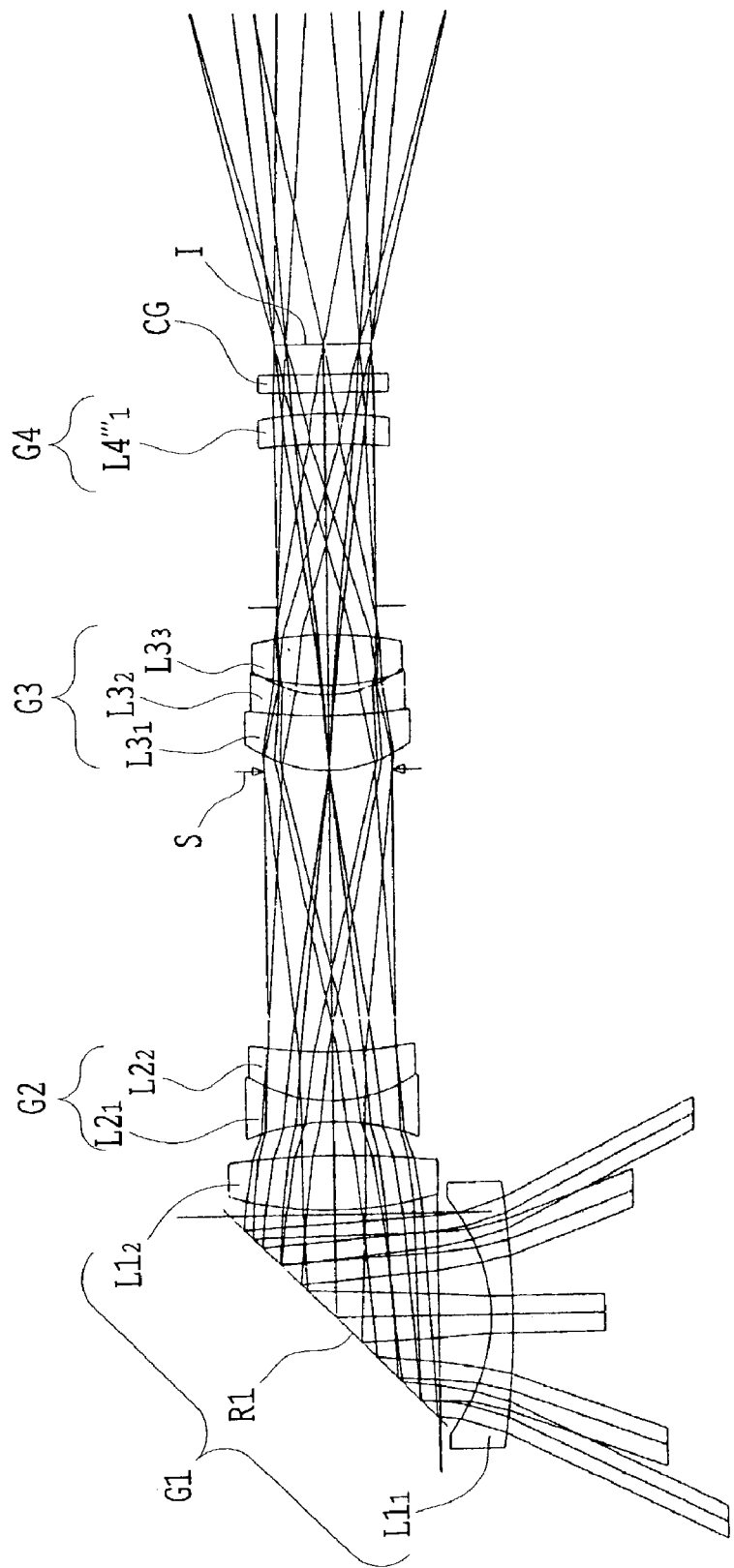
FIG. 42 is a sectional view showing an optical arrangement, developed along the optical axis, at the wide-angle position where the optical path is bent in focusing of the infinite object point, in an eleventh embodiment of the zoom lens according to the present invention.
Figure 43A:
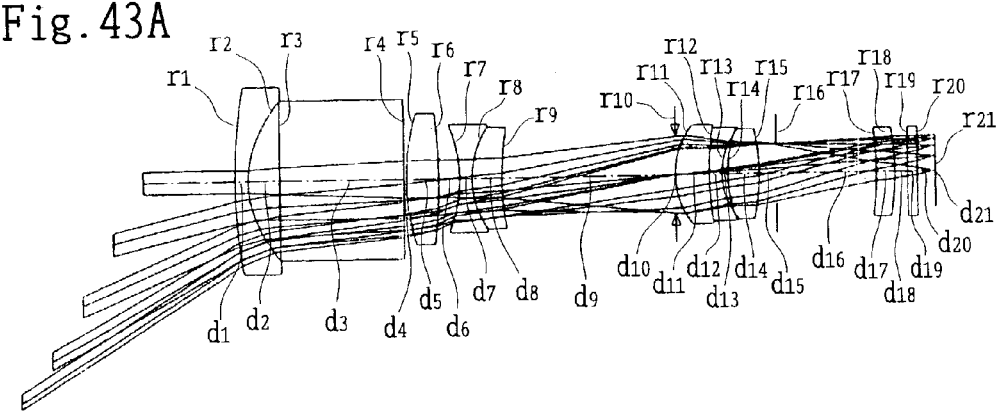
FIGS. 43A, 43B, and 43C are sectional views showing optical arrangements, developed along the optical axis, at wide-angle, middle, and telephoto positions, respectively, in focusing of the infinite object point, of the zoom lens in the eleventh embodiment.
Figure 43B:
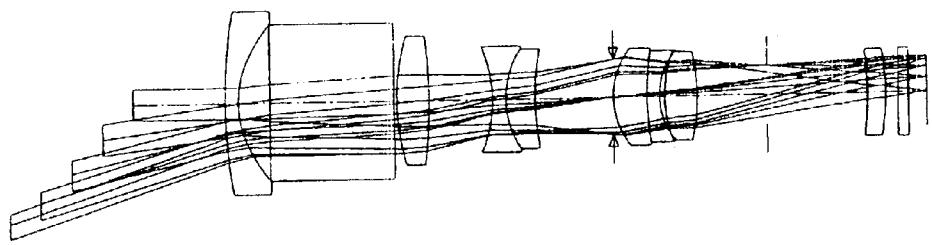
Figure 43C:
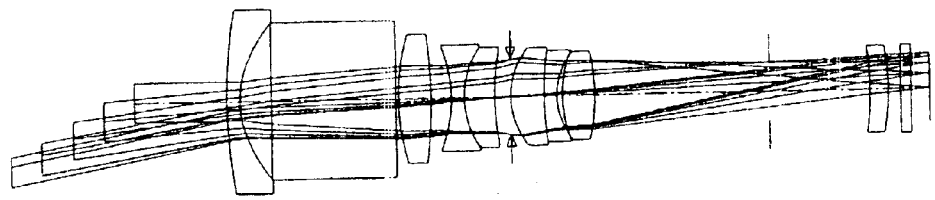

FIG. 42 shows an optical arrangement of the eleventh embodiment of the zoom lens used in the electronic imaging device according to the present invention. FIGS. 43A, 43B, and 43C show optical arrangements at wide-angle, middle, and telephoto positions, respectively, in the eleventh embodiment. FIGS. 44A–44D show aberration characteristics at the wide-angle position, in focusing of the infinite object point, of the zoom lens in the eleventh embodiment. FIGS. 45A–45D show aberration characteristics at the middle position, in focusing of the infinite object point, of the zoom lens in the eleventh embodiment. FIGS. 46A–46D show aberration characteristics at the telephoto position, in focusing of the infinite object point, of the zoom lens in the eleventh embodiment. FIGS. 47A–47D show aberration characteristics at the wide-angle position, in focusing of the short-distance object point, of the zoom lens in the eleventh embodiment. FIGS. 48A–48D show aberration characteristics at the middle position, in focusing of the short-distance object point, of the zoom lens in the eleventh embodiment. FIGS. 49A–49D show aberration characteristics at the telephoto position, in focusing of the short-distance object point, of the zoom lens in the eleventh embodiment.

As shown in FIG. 42, the electronic imaging device of the eleventh embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the biconvex positive lens $L1_2$, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the positive meniscus lens $L3_1$ with a convex surface directed toward the object side and the negative meniscus lens $L3_2$ with a convex surface directed toward the object side, and the biconvex positive lens $L3_3$, having positive refracting power as a whole.

The fourth lens unit G4 includes a positive meniscus lens $L4_1'''$ with a concave surface directed toward the object side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

The first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the positive meniscus lens $L3_1$ with a convex surface directed toward the object side in the third lens unit G3, and the image-side surface of the positive meniscus lens $L4_1'''$ with a concave surface directed toward the object side, constituting the fourth lens unit G4.

Subsequently, numerical data of optical members constituting the zoom lens of the eleventh embodiment are shown below.

Numerical data 11

| | | | |
|---|---|---|---|
| $r_1 = 29.7756$ | $d_1 = 0.7000$ | $n_{d1} = 1.80610$ | $v_{d1} = 40.92$ |
| $r_2 = 5.5894$ (aspherical) | $d_2 = 1.7000$ | | |
| $r_3 = \infty$ | $d_3 = 6.8000$ | $n_{d3} = 1.80610$ | $v_{d3} = 40.92$ |
| $r_4 = \infty$ | $d_4 = 0.1500$ | | |
| $r_5 = 12.5603$ | $d_5 = 1.7500$ | $n_{d5} = 1.72916$ | $v_{d5} = 54.68$ |
| $r_6 = -28.7102$ | $d_6 = D6$ | | |
| $r_7 = -7.7962$ | $d_7 = 0.7000$ | $n_{d7} = 1.69700$ | $v_{d7} = 48.52$ |
| $r_8 = 5.0000$ | $d_8 = 1.6000$ | $n_{d8} = 1.84666$ | $v_{d8} = 23.78$ |
| $r_9 = 15.2398$ | $d_9 = D9$ | | |
| $r_{10} = \infty$ (stop) | $d_{10} = 0$ | | |
| $r_{11} = 4.2660$ (aspherical) | $d_{11} = 1.8000$ | $n_{d11} = 1.74320$ | $v_{d11} = 49.34$ |
| $r_{12} = 17.0000$ | $d_{12} = 0.7000$ | $n_{d12} = 1.84666$ | $v_{d12} = 23.78$ |
| $r_{13} = 3.9877$ | $d_{13} = 0.3000$ | | |
| $r_{14} = 7.3491$ | $d_{14} = 1.7000$ | $n_{d14} = 1.72916$ | $v_{d14} = 54.68$ |
| $r_{15} = -11.3337$ | $d_{15} = 0.9338$ | | |
| $r_{16} = \infty$ (position of variable transmittance means or shutter) | $d_{16} = 5.4000$ | | |
| $r_{17} = -20.8118$ | $d_{17} = 1.0000$ | $n_{d17} = 1.58313$ | $v_{d17} = 59.38$ |
| $r_{18} = -11.2032$ (aspherical) | $d_{18} = 0.7000$ | | |
| $r_{19} = \infty$ | $d_{19} = 0.6000$ | $n_{d19} = 1.51633$ | $v_{d19} = 64.14$ |
| $r_{20} = \infty$ | $d_{20} = D20$ | | |
| $r_{22} = \infty$ (imaging plane) | $d_{22} = 0$ | | |

-continued

Aspherical coefficients

Second surface $K = 0$
$A_2 = 0$           $A_4 = -6.3979 \times 10^{-4}$    $A_6 = -7.5270 \times 10^{-7}$
$A_8 = -9.7517 \times 10^{-7}$   $A_{10} = 0$ Eleventh surface $K = 0$
$A_2 = 0$           $A_4 = -1.0377 \times 10^{-3}$    $A_6 = -2.4735 \times 10^{-6}$
$A_8 = -2.0035 \times 10^{-6}$   $A_{10} = 0$ Eighteenth surface $K = 0$
$A_2 = 0$           $A_4 = 1.1850 \times 10^{-3}$    $A_6 = 1.2885 \times 10^{-4}$
$A_8 = -1.2384 \times 10^{-5}$   $A_{10} = 0$ Zoom Data When the Distance D0 is $\infty$,

| | Wide-angle | Middle | Telephoto |
|---|---|---|---|
| f (mm) | 3.25682 | 5.63853 | 9.74463 |
| Fno | 2.6426 | 3.2679 | 4.5140 |
| D0 | $\infty$ | $\infty$ | $\infty$ |
| D6 | 1.09607 | 3.39481 | 1.09365 |
| D9 | 9.37627 | 4.21600 | 0.88753 |
| D15 | 0.93379 | 3.79716 | 9.42548 |
| D21 | 1.00000 | 1.00000 | 1.00000 |

When the Distance D0 is Short (16 cm),

| | Wide-angle | Middle | Telephoto |
|---|---|---|---|
| D0 | 162.6560 | 162.6560 | 162.6560 |
| D6 | 0.89495 | 3.18037 | 0.89254 |
| D9 | 9.57739 | 4.43044 | 1.08864 |
| D15 | 0.93379 | 3.79716 | 9.42548 |
| D21 | 1.00000 | 1.00000 | 1.00000 |

Twelfth Embodiment

Figure 50:
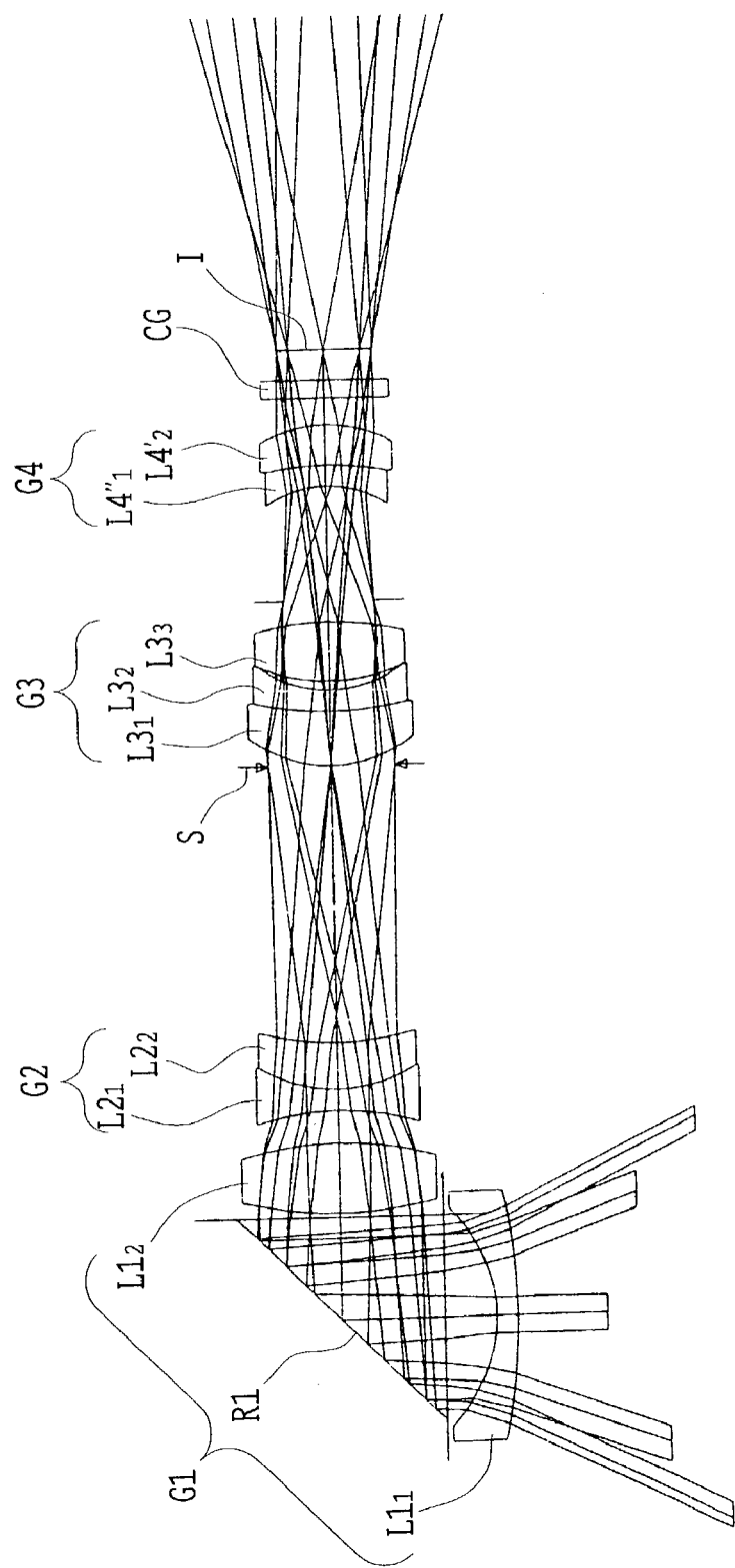
FIG. 50 is a sectional view showing an optical arrangement, developed along the optical axis, at the wide-angle position where the optical path is bent in focusing of the infinite object point, in a twelfth embodiment of the zoom lens according to the present invention.
Figure 51A:
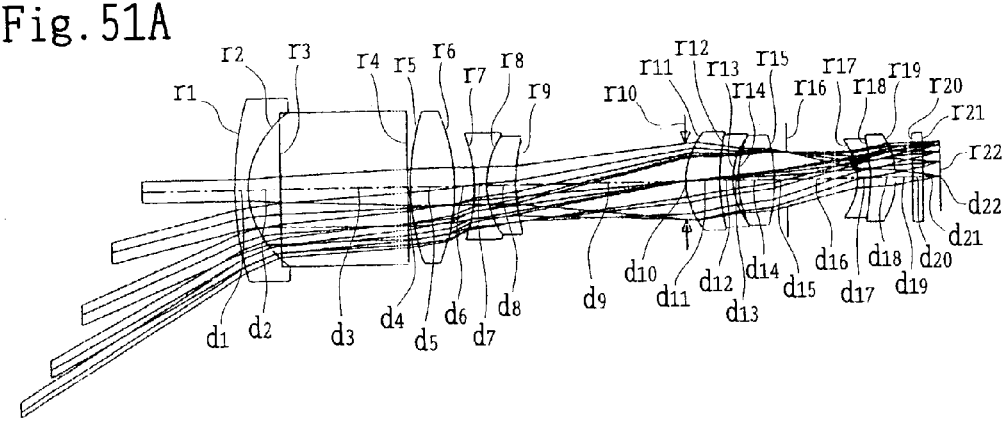
FIGS. 51A, 51B, and 51C are sectional views showing optical arrangements, developed along the optical axis, at wide-angle, middle, and telephoto positions, respectively, in focusing of the infinite object point, of the zoom lens in the twelfth embodiment
Figure 51B:
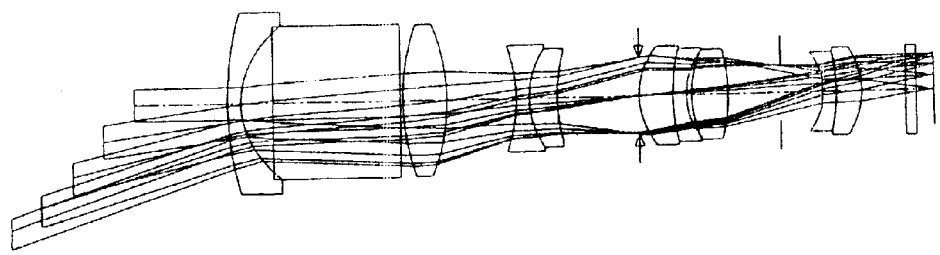
Figure 51C:
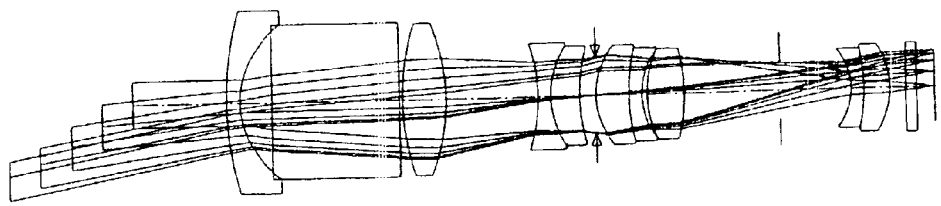

FIG. 50 shows an optical arrangement of the twelfth embodiment of the zoom lens used in the electronic imaging device according to the present invention. FIGS. 51A, 51B, and 51C show optical arrangements at wide-angle, middle, and telephoto positions, respectively, in the twelfth embodiment. FIGS. 52A–52D show aberration characteristics at the wide-angle position, in focusing of the infinite object point, of the zoom lens in the twelfth embodiment. FIGS. 53A–53D show aberration characteristics at the middle position, in focusing of the infinite object point, of the zoom lens in the twelfth embodiment. FIGS. 54A–54D show aberration characteristics at the telephoto position, in focusing of the infinite object point, of the zoom lens in the twelfth embodiment. FIGS. 55A–55D show aberration characteristics at the wide-angle position, in focusing of the short-distance object point, of the zoom lens in the twelfth embodiment. FIGS. 56A–56D show aberration characteristics at the middle position, in focusing of the short-distance object point, of the zoom lens in the twelfth embodiment. FIGS. 57A–57D show aberration characteristics at the telephoto position, in focusing of the short-distance object point, of the zoom lens in the twelfth embodiment.

As shown in FIG. 50, the electronic imaging device of the twelfth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$, with a convex surface directed toward the object side, the reflective optical component R1 having a reflecting surface for bending the optical path, and the biconvex positive lens $L1_2$, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the cemented lens with the positive meniscus lens $L3_1$ with a convex surface directed toward the object side and the negative meniscus lens $L3_2$ with a convex surface directed toward the object side, and the biconvex positive lens $L3_3$, having positive refracting power as a whole.

The fourth lens unit G4 includes the cemented lens with the negative meniscus lens $L4_1''$ with a concave surface directed toward the object side and the positive meniscus lens $L4_2'$ with a concave surface directed toward the object side.

When the magnification of the zoom lens is changed, extending from the wide-angle position to the telephoto position, in focusing of the infinite object point, the first lens unit G1 remains fixed; the second lens unit G2 is moved toward the object side only; the third lens unit G3 is moved toward the object side only, together with the aperture stop S; and the fourth lens unit G4 is moved back and forth on the image side to follow a convex path (that is, after being moved toward the object side to widen once spacing between the fourth lens unit G4 and the CCD cover glass CG, narrows the spacing while moving toward the image side).

In focusing of the short-distance object point, the second lens unit G2 is shifted to the object side.

Also, when the first lens unit G1 and the fourth lens unit G4 remain fixed when the focusing operation is performed.

Aspherical surfaces are provided to the image-side surface of the negative meniscus lens $L1_1$ with a convex surface directed toward the object side in the first lens unit G1, the object-side surface of the positive meniscus lens $L3_1$ with a convex surface directed toward the object side in the third lens unit G3, and the image-side surface of the positive meniscus lens $L4_2'$ with a concave surface directed toward the object side in the fourth lens unit G4.

Subsequently, numerical data of optical members constituting the zoom lens of the twelfth embodiment are shown below.

Numerical data 12

| | | |
|---|---|---|
| $r_1 = 18.8862$ | $d_1 = 0.7000$ | $n_{d1} = 1.80100$ $\nu_{d1} = 34.97$ |
| $r_2 = 4.8033$ (aspherical) | $d_2 = 1.7000$ | |
| $r_3 = \infty$ | $d_3 = 6.8000$ | $n_{d3} = 1.80610$ $\nu_{d3} = 40.92$ |
| $r_4 = \infty$ | $d_4 = 0.1500$ | |
| $r_5 = 13.4964$ | $d_5 = 2.3000$ | $n_{d5} = 1.61800$ $\nu_{d5} = 63.33$ |
| $r_6 = -11.1385$ | $d_6 = D6$ | |
| $r_7 = -8.8071$ | $d_7 = 0.7000$ | $n_{d7} = 1.69680$ $\nu_{d7} = 55.53$ |
| $r_8 = 4.9069$ | $d_8 = 1.5500$ | $n_{d8} = 1.84666$ $\nu_{d8} = 23.78$ |
| $r_9 = 9.5429$ | $d_9 = D9$ | |
| $r_{10} = \infty$ (stop) | $d_{10} = 0$ | |
| $r_{11} = 4.0853$ (aspherical) | $d_{11} = 1.8000$ | $n_{d11} = 1.69350$ $\nu_{d11} = 53.21$ |
| $r_{12} = 11.0960$ | $d_{12} = 0.7000$ | $n_{d12} = 1.84666$ $\nu_{d12} = 23.78$ |
| $r_{13} = 3.9813$ | $d_{13} = 0.3000$ | |
| $r_{14} = 5.9541$ | $d_{14} = 1.9500$ | $n_{d14} = 1.72916$ $\nu_{d14} = 54.68$ |
| $r_{15} = -9.8112$ | $d_{15} = D15$ | |
| $r_{16} = \infty$ (position of variable transmittance means or shutter) | $d_{16} = D16$ | |
| $r_{17} = -3.5444$ | $d_{17} = 0.7000$ | $n_{d17} = 1.84666$ $\nu_{d17} = 23.78$ |
| $r_{18} = -10.0000$ | $d_{18} = 1.3500$ | $n_{d18} = 1.74320$ $\nu_{d18} = 49.34$ |
| $r_{19} = -4.2449$ (aspherical) | $d_{19} = D19$ | |
| $r_{20} = \infty$ | $d_{20} = 0.6000$ | $n_{d20} = 1.51633$ $\nu_{d20} = 64.14$ |
| $r_{21} = \infty$ | $d_{21} = D21$ | |
| $r_{22} = \infty$ (imaging plane) | $d_{22} = 0$ | |

Aspherical coefficients

Second surface $K = 0$
$A_2 = 0$    $A_4 = -5.1721 \times 10^{-4}$    $A_6 = -1.0392 \times 10^{-6}$
$A_8 = -2.0432 \times 10^{-6}$    $A_{10} = 0$ Eleventh surface $K = 0$
$A_2 = 0$    $A_4 = -1.4943 \times 10^{-3}$    $A_6 = -5.7721 \times 10^{-6}$
$A_8 = -3.1513 \times 10^{-6}$    $A_{10} = 0$ Nineteenth surface $K = 0$
$A_2 = 0$    $A_4 = 4.5325 \times 10^{-4}$    $A_6 = 2.3664 \times 10^{-4}$
$A_8 = -1.3755 \times 10^{-5}$    $A_{10} = 0$ Zoom Data When the Distance D0 is ∞,

| | Wide-angle | Middle | Telephoto |
|---|---|---|---|
| f (mm) | 3.29281 | 5.63775 | 9.72059 |
| Fno | 2.7263 | 3.1514 | 3.8592 |
| D0 | ∞ | ∞ | ∞ |
| D6 | 1.08448 | 3.76500 | 4.99556 |
| D9 | 9.23562 | 4.42709 | 0.86778 |
| D15 | 0.70863 | 2.83776 | 5.16580 |
| D16 | 3.84796 | 2.38541 | 3.84796 |
| D19 | 0.89838 | 2.35813 | 0.88807 |
| D21 | 1.00000 | 1.00000 | 1.00000 |

When the Distance D0 is Short (16 cm),

| | Wide-angle | Middle | Telephoto |
|---|---|---|---|
| D0 | 162.6560 | 162.6560 | 162.6560 |
| D6 | 0.89908 | 3.53214 | 4.73441 |
| D9 | 9.42102 | 4.65996 | 1.12893 |
| D15 | 0.70863 | 2.83776 | 5.16580 |
| D16 | 3.84796 | 2.38541 | 3.85876 |

-continued

|  | Wide-angle | Middle | Telephoto |
|---|---|---|---|
| D19 | 0.89838 | 2.35813 | 0.88807 |
| D21 | 1.00000 | 1.00000 | 1.00000 |

Thirteenth Embodiment

Figure 58:
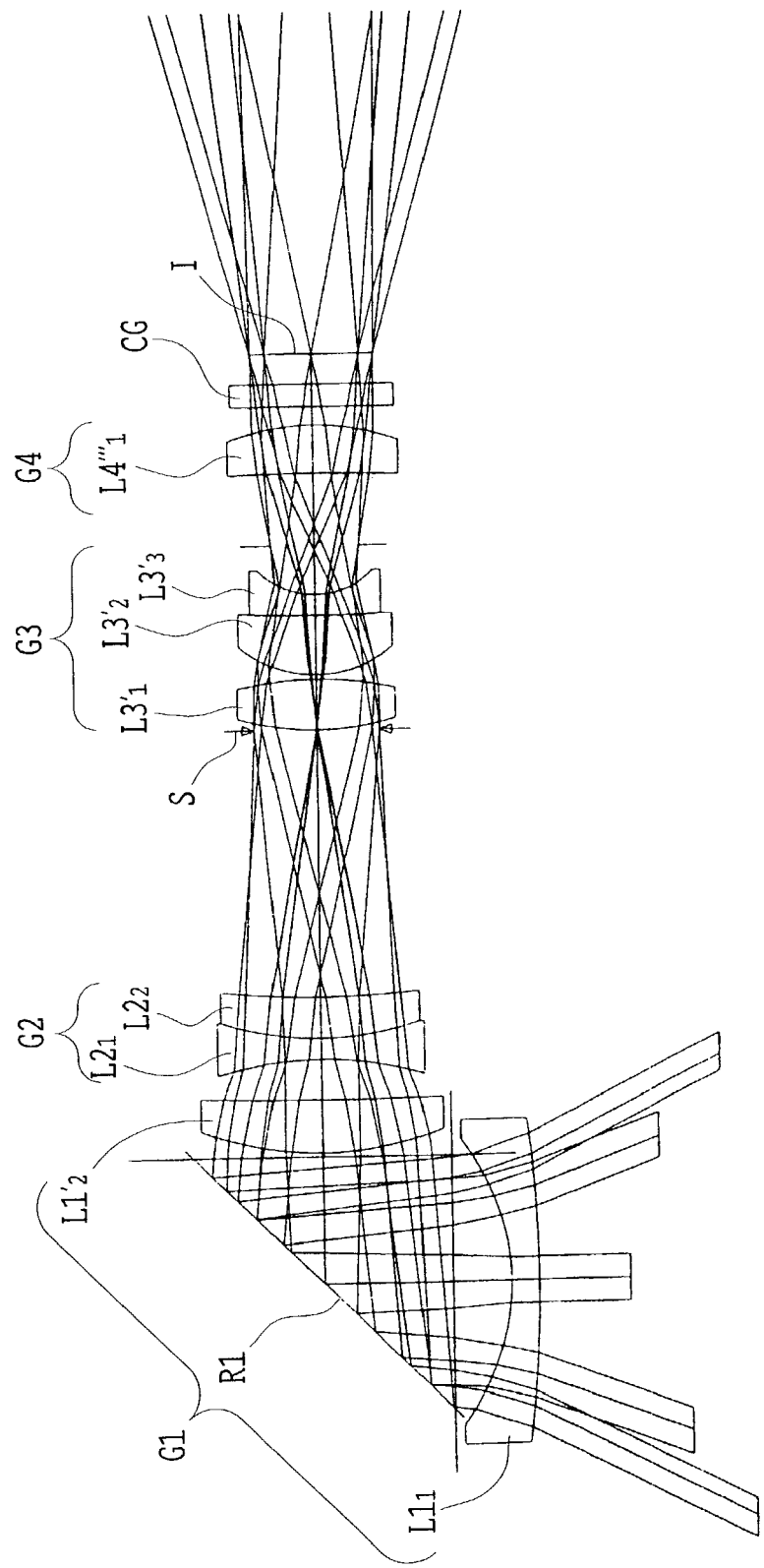
FIG. 58 is a sectional view showing an optical arrangement, developed along the optical axis, at the wide-angle position where the optical path is bent in focusing of the infinite object point, in a thirteenth embodiment of the zoom lens according to the present invention.
Figure 59A:
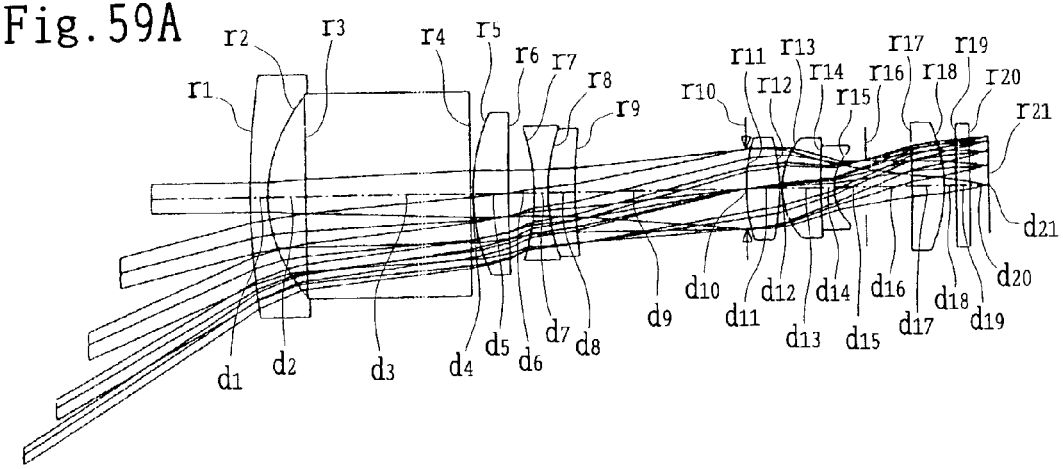
FIGS. 59A, 59B, and 59C are sectional views showing optical arrangements, developed along the optical axis, at wide-angle, middle, and telephoto positions, respectively, in focusing of the infinite object point, of the zoom lens in the thirteenth embodiment.
Figure 59B:
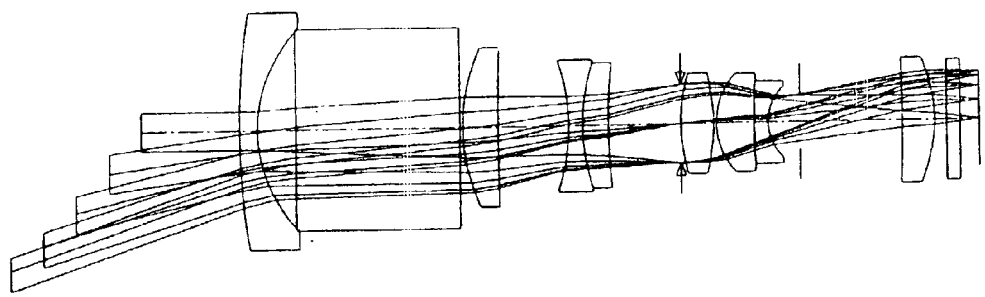
Figure 59C:
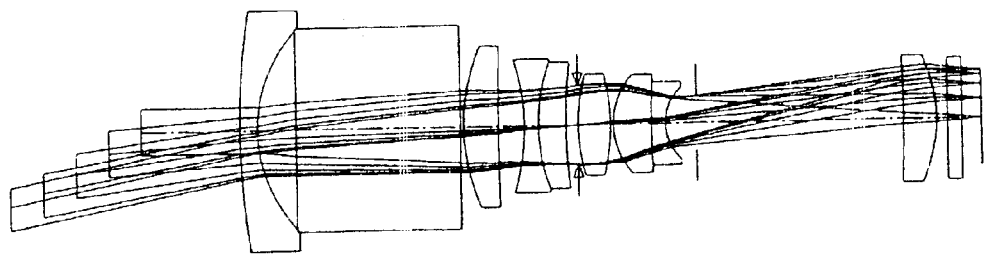

FIG. 58 shows an optical arrangement of the thirteenth embodiment of the zoom lens used in the electronic imaging device according to the present invention. FIGS. 59A, 59B, and 59C show optical arrangements at wide-angle, middle, and telephoto positions, respectively, in the thirteenth embodiment. FIGS. 60A–60D show aberration characteristics at the wide-angle position, in focusing of the infinite object point, of the zoom lens in the thirteenth embodiment. FIGS. 61A–61D show aberration characteristics at the middle position, in focusing of the infinite object point, of the zoom lens in the thirteenth embodiment. FIGS. 62A–62D show aberration characteristics at the telephoto position, in focusing of the infinite object point, of the zoom lens in the thirteenth embodiment. FIGS. 63A–63D show aberration characteristics at the wide-angle position, in focusing of the short-distance object point, of the zoom lens in the thirteenth embodiment. FIGS. 64A–64D show aberration characteristics at the middle position, in focusing of the short-distance object point, of the zoom lens in the thirteenth embodiment. FIGS. 65A–65D show aberration characteristics at the telephoto position, in focusing of the short-distance object point, of the zoom lens in the thirteenth embodiment.

As shown in FIG. 58, the electronic imaging device of the thirteenth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the positive meniscus lens $L1_2'$ with a convex surface directed toward the object side, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1'$ and the cemented lens with the positive meniscus lens $L3_2'$ with a convex surface directed toward the object side and the negative meniscus lens $L3_3'$ with a convex surface directed toward the object side, having positive refracting power as a whole.

The fourth lens unit G4 includes the positive meniscus lens $L4_1'''$ with a concave surface directed toward the object side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

Also, when the first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the image-side surface of the biconvex positive lens $L3_1'$ in the third lens unit G3, and the image-side surface of the positive meniscus lens $L4_1'41$ with a concave surface directed toward the object side, constituting the fourth lens unit G4.

Subsequently, numerical data of optical members constituting the zoom lens of the thirteenth embodiment are shown below.

Numerical data 13

| | | | |
|---|---|---|---|
| $r_1 = 39.8371$ | $d_1 = 0.9000$ | $n_{d1} = 1.74320$ | $v_{d1} = 49.34$ |
| $r_2 = 7.0363$ (aspherical) | $d_2 = 1.9500$ | | |
| $r_3 = \infty$ | $d_3 = 8.4000$ | $n_{d3} = 1.80610$ | $v_{d3} = 40.92$ |
| $r_4 = \infty$ | $d_4 = 0.1500$ | | |
| $r_5 = 10.7443$ | $d_5 = 1.7500$ | $n_{d5} = 1.72916$ | $v_{d5} = 54.68$ |
| $r_6 = 117.6949$ | $d_6 = D6$ | | |
| $r_7 = -11.0080$ | $d_7 = 0.7000$ | $n_{d7} = 1.72916$ | $v_{d7} = 54.68$ |
| $r_8 = 10.0000$ | $d_8 = 1.3500$ | $n_{d8} = 1.84666$ | $v_{d8} = 23.78$ |
| $r_9 = 29.9687$ | $d_9 = D9$ | | |
| $r_{10} = \infty$ (stop) | $d_{10} = 0$ | | |
| $r_{11} = 8.9151$ | $d_{11} = 1.7000$ | $n_{d11} = 1.58313$ | $v_{d11} = 59.38$ |
| $r_{12} = -9.9490$ (aspherical) | $d_{12} = 0.1500$ | | |
| $r_{13} = 3.8299$ | $d_{13} = 1.9500$ | $n_{d13} = 1.69350$ | $v_{d13} = 53.21$ |
| $r_{14} = 40.000$ | $d_{14} = 0.7000$ | $n_{d14} = 1.78740$ | $v_{d14} = 26.29$ |
| $r_{15} = 2.5278$ | $d_{15} = 1.6250$ | | |
| $r_{16} = \infty$ (position of variable transmittance means or shutter) | $d_{16} = D16$ | | |
| $r_{17} = -75.2976$ | $d_{17} = 1.6000$ | $n_{d17} = 1.68893$ | $v_{d17} = 31.07$ |
| $r_{18} = -6.9567$ (aspherical) | $d_{18} = 0.6000$ | | |
| $r_{19} = \infty$ | $d_{19} = 0.7500$ | $n_{d19} = 1.51633$ | $v_{d19} = 64.14$ |
| $r_{20} = \infty$ | $d_{20} = D20$ | | |
| $r_{21} = \infty$ (imaging plane) | $d_{21} = 0$ | | |

Aspherical coefficients

Second surface $K = 0$
$A_2 = 0$       $A_4 = -3.2095 \times 10^{-4}$    $A_6 = 3.5914 \times 10^{-6}$
$A_8 = -2.3288 \times 10^{-7}$    $A_{10} = 0$ Twelfth surface $K = 0$
$A_2 = 0$       $A_4 = 7.8959 \times 10^{-4}$    $A_6 = -8.1489 \times 10^{-6}$
$A_8 = 8.1947 \times 10^{-7}$    $A_{10} = 0$ Eighteenth surface $K = 0$
$A_2 = 0$       $A_4 = 1.5904 \times 10^{-3}$    $A_6 = -7.4738 \times 10^{-5}$
$A_8 = 1.6824 \times 10^{-6}$    $A_{10} = 0$ Zoom Data When the Distance D0 is ∞,

|  | Wide-angle | Middle | Telephoto |
|---|---|---|---|
| f (mm) | 4.00704 | 6.93144 | 11.99933 |
| Fno | 2.6299 | 3.4603 | 5.0206 |
| D0 | ∞ | ∞ | ∞ |
| D6 | 1.33984 | 3.55821 | 1.33955 |
| D9 | 8.82987 | 3.72328 | 0.59893 |
| D16 | 2.39220 | 5.27920 | 10.62359 |
| D20 | 1.00000 | 1.00000 | 1.00000 |

When the Distance D0 is Short (20 cm),

|  | Wide-angle | Middle | Telephoto |
|---|---|---|---|
| D0 | 200.0000 | 200.0000 | 200.0000 |
| D6 | 0.99920 | 3.20721 | 0.99891 |
| D9 | 9.17052 | 4.07428 | 0.93957 |
| D16 | 2.39220 | 5.27920 | 10.62359 |
| D20 | 1.00000 | 1.00000 | 1.00000 |

Fourteenth Embodiment

Figure 66:
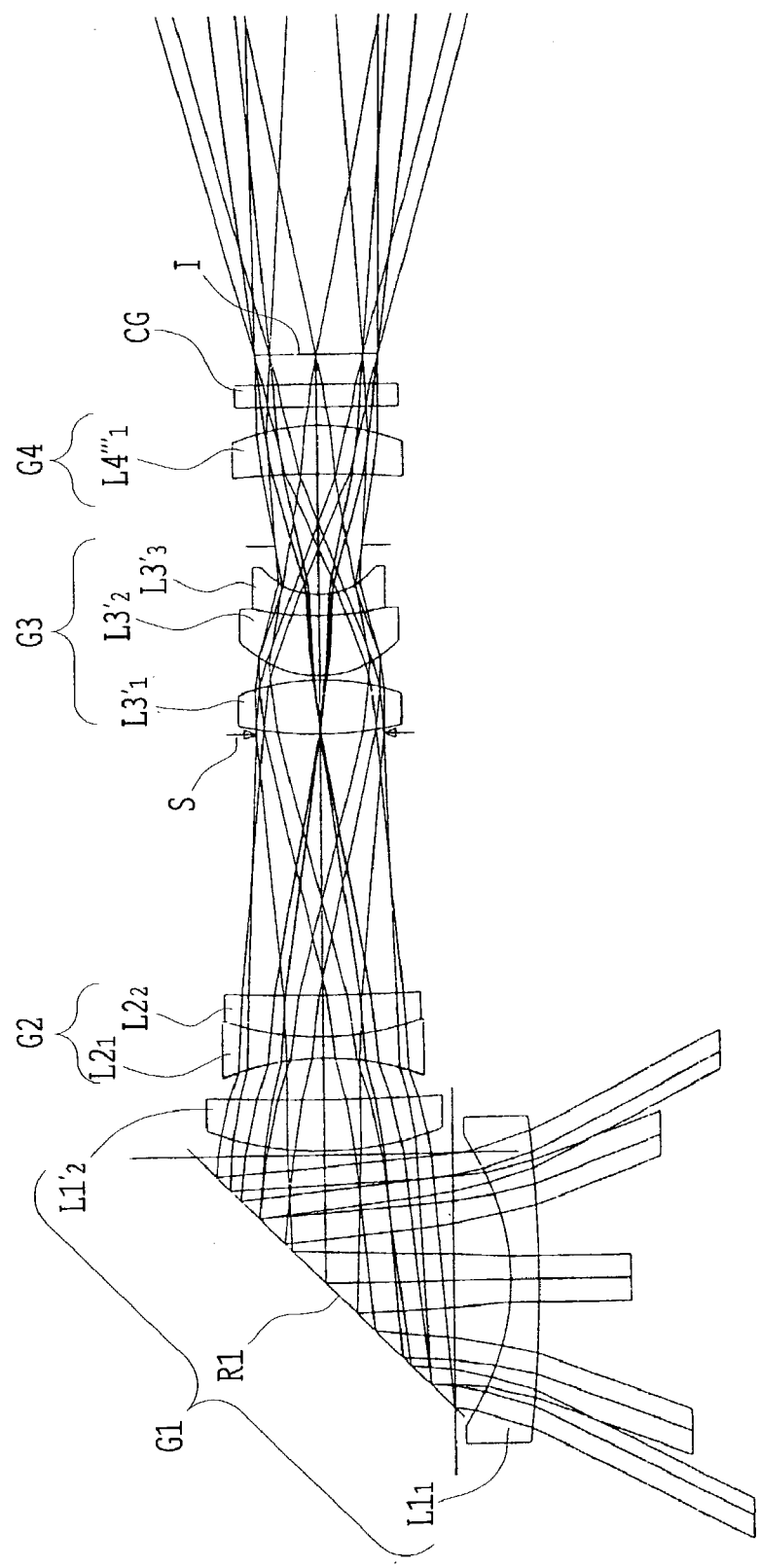
FIG. 66 is a sectional view showing an optical arrangement, developed along the optical axis, at the wide-angle position where the optical path is bent in focusing of the infinite object point, in a fourteenth embodiment of the zoom lens according to the present invention.
Figure 67A:
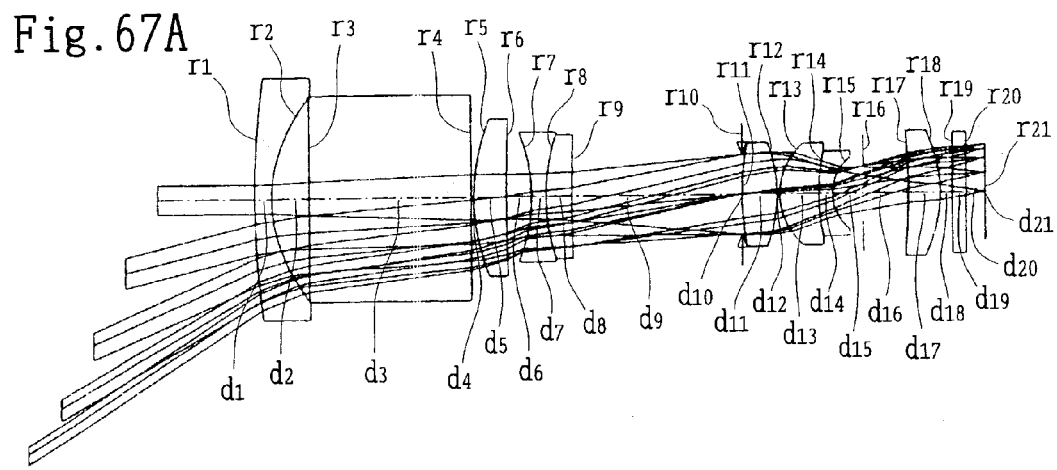
FIGS. 67A, 67B, and 67C are sectional views showing optical arrangements, developed along the optical axis, at wide-angle, middle, and telephoto positions, respectively, in focusing of the infinite object point, of the zoom lens in the fourteenth embodiment.
Figure 67B:
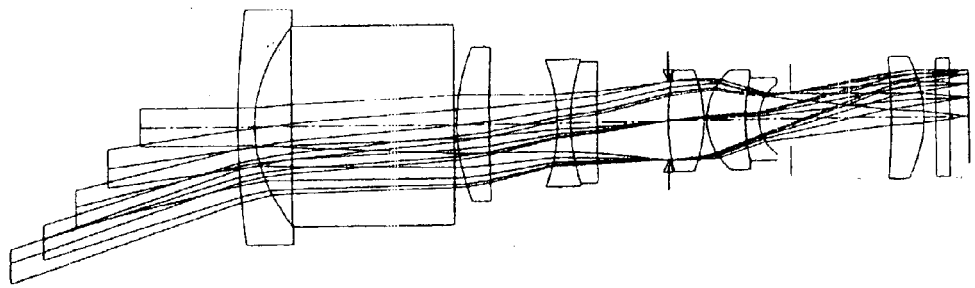
Figure 67C:
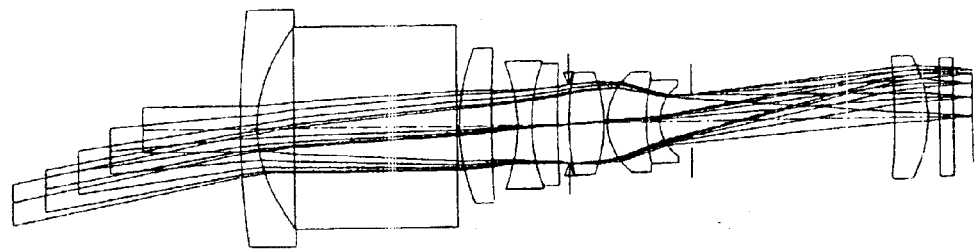

FIG. 66 shows an optical arrangement of the fourteenth embodiment of the zoom lens used in the electronic imaging device according to the present invention. FIGS. 67A, 67B, and 67C show optical arrangements at wide-angle, middle, and telephoto positions, respectively, in the fourteenth embodiment.

As shown in FIG. 66, the electronic imaging device of the fourteenth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the positive meniscus lens $L1_2'$ with a convex surface directed toward the object side, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1'$ and the cemented lens with the positive meniscus lens $L3_2'$ with a convex surface directed toward the object side and the negative meniscus lens $L3_3'$ with a convex surface directed toward the object side, having positive refracting power as a whole.

The fourth lens unit G4 includes the positive meniscus lens $L4_1'''$ with a concave surface directed toward the object side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

Also, when the first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the positive meniscus lens $L3_2'$ with a convex surface directed toward the object side in the third lens unit G3, and the image-side surface of the positive meniscus lens $L4_1'''$ with a concave surface directed toward the object side, constituting the fourth lens unit G4.

Subsequently, numerical data of optical members constituting the zoom lens of the fourteenth embodiment are shown below.

Numerical data 14

$r_1 = 46.4345$  $d_1 = 0.9000$  $n_{d1} = 1.74320$  $v_{d1} = 49.34$
$r_2 = 7.4800$ (aspherical)  $d_2 = 1.9000$
$r_3 = \infty$  $d_3 = 8.4000$  $n_{d3} = 1.80610$  $v_{d3} = 40.92$
$r_4 = \infty$  $d_4 = 0.1500$
$r_5 = 10.9290$  $d_5 = 1.7000$  $n_{d5} = 1.72916$  $v_{d5} = 54.68$
$r_6 = 79.8760$  $d_6 = D6$
$r_7 = -9.0602$  $d_7 = 0.7000$  $n_{d7} = 1.72916$  $v_{d7} = 54.68$
$r_8 = 10.0000$  $d_8 = 1.3500$  $n_{d8} = 1.80518$  $v_{d8} = 25.42$
$r_9 = 79.0547$  $d_9 = D9$
$r_{10} = \infty$ (stop)  $d_{10} = 0$
$r_{11} = 12.8072$  $d_{11} = 1.8000$  $n_{d11} = 1.48749$  $v_{d11} = 70.23$
$r_{12} = -7.7890$  $d_{12} = 0.1500$
$r_{13} = 3.3563$ (aspherical)  $d_{13} = 2.0000$  $n_{d13} = 1.74320$  $v_{d13} = 49.34$
$r_{14} = 10.0000$  $d_{14} = 0.7000$  $n_{d14} = 1.84666$  $v_{d14} = 23.78$
$r_{15} = 2.3358$  $d_{15} = 1.6250$
$r_{16} = \infty$ (position of variable transmittance means or shutter)  $d_{16} = D16$
$r_{17} = -32.6186$  $d_{17} = 1.6000$  $n_{d17} = 1.68893$  $v_{d17} = 31.07$
$r_{18} = -6.3725$ (aspherical)  $d_{18} = 0.6000$
$r_{19} = \infty$  $d_{19} = 0.7500$  $n_{d19} = 1.51633$  $v_{d19} = 64.14$
$r_{20} = \infty$  $d_{20} = D20$
$r_{21} = \infty$ (imaging plane)  $d_{21} = 0$ Aspherical coefficients Second surface $K = 0$
$A_2 = 0$  $A_4 = -3.0741 \times 10^{-4}$  $A_6 = 2.9868 \times 10^{-6}$
$A_8 = -2.2074 \times 10^{-7}$  $A_{10} = 0$ Thirteenth surface $K = 0$
$A_2 = 0$  $A_4 = -8.6447 \times 10^{-4}$  $A_6 = -2.3383 \times 10^{-5}$
$A_8 = -1.1764 \times 10^{-5}$  $A_{10} = 0$ Eighteenth surface $K = 0$
$A_2 = 0$  $A_4 = 1.7917 \times 10^{-3}$  $A_6 = -8.0795 \times 10^{-5}$
$A_8 = 2.0929 \times 10^{-6}$  $A_{10} = 0$ Zoom Data When the Distance D0 is ∞,

|  | Wide-angle | Middle | Telephoto |
| --- | --- | --- | --- |
| f (mm) | 4.00365 | 6.92795 | 12.00080 |
| Fno | 2.6033 | 3.4480 | 5.0024 |
| D0 | ∞ | ∞ | ∞ |
| D6 | 1.32737 | 3.52064 | 1.32840 |
| D9 | 8.76178 | 3.65332 | 0.60135 |
| D16 | 2.39254 | 5.30046 | 10.55195 |
| D20 | 1.00000 | 1.00000 | 1.00000 |

When the Distance D0 is Short (20 cm),

|  | Wide-angle | Middle | Telephoto |
| --- | --- | --- | --- |
| D0 | 200.0000 | 200.0000 | 200.0000 |
| D6 | 0.99975 | 3.18799 | 1.00078 |
| D9 | 9.08940 | 3.98598 | 0.92898 |
| D16 | 2.39254 | 5.30046 | 10.55195 |
| D20 | 1.00000 | 1.00000 | 1.00000 |

Fifteenth Embodiment

Figure 68:
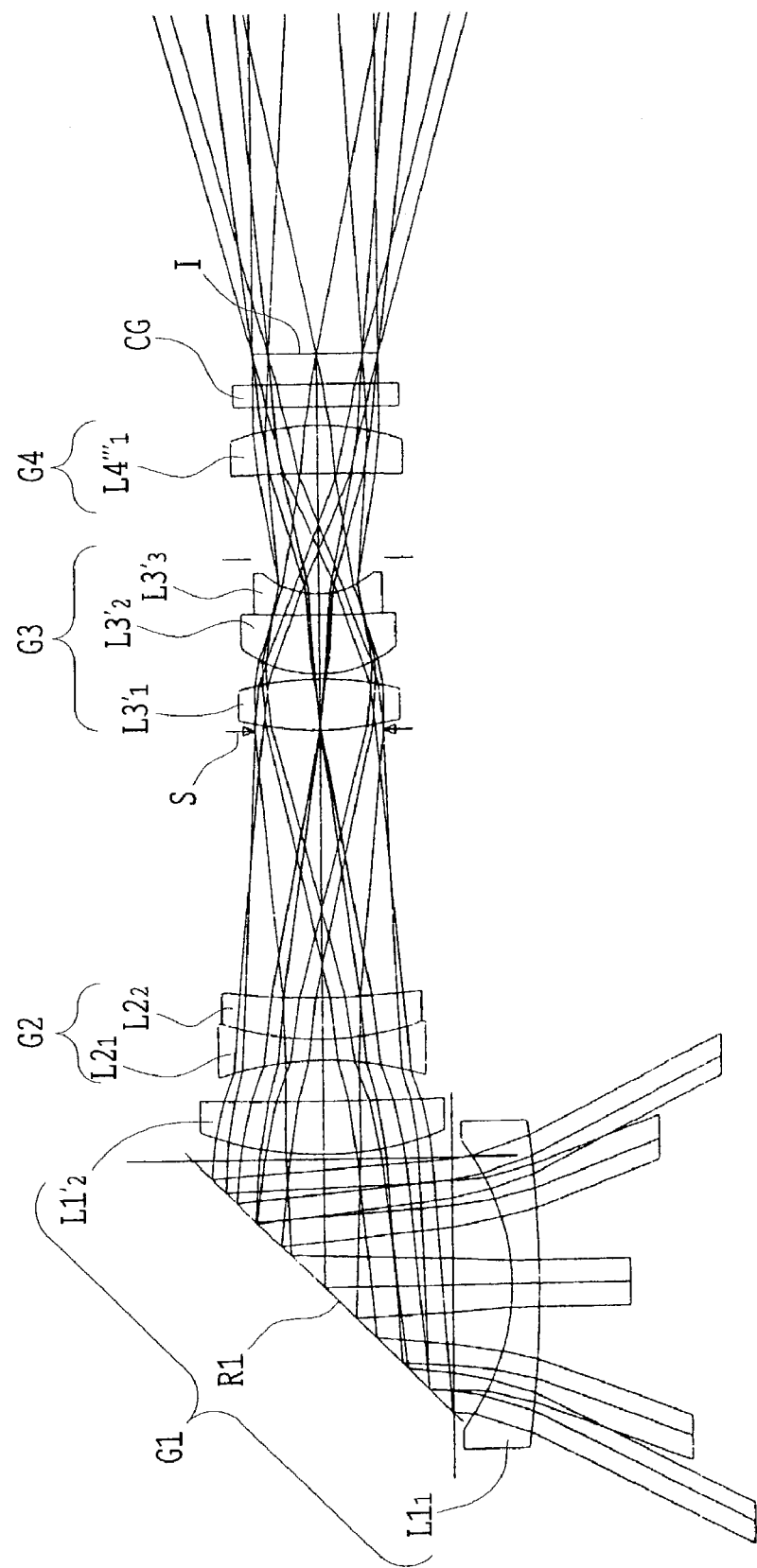
FIG. 68 is a sectional view showing an optical arrangement, developed along the optical axis, at the wide-angle position where the optical path is bent in focusing of the infinite object point, in a fifteenth embodiment of the zoom lens according to the present invention.
Figure 69A:
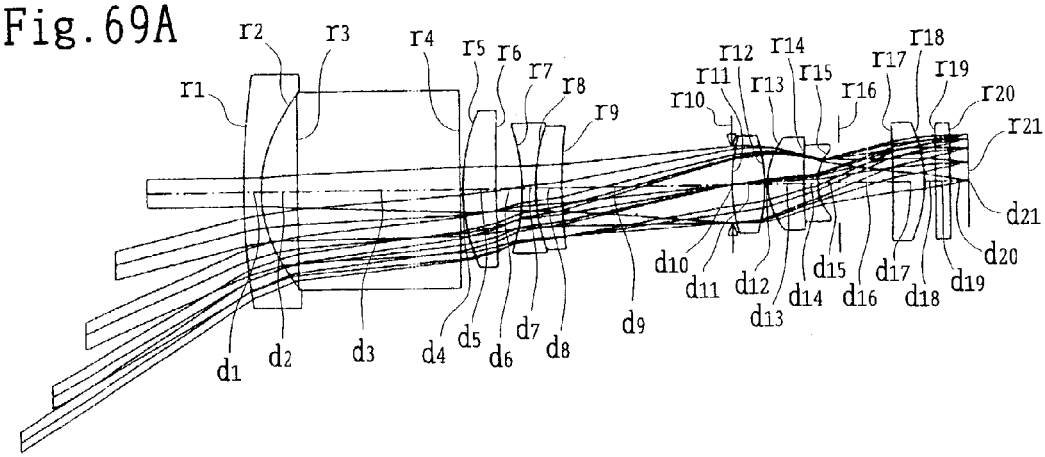
FIGS. 69A, 69B, and 69C are sectional views showing optical arrangements, developed along the optical axis, at wide-angle, middle, and telephoto positions, respectively, in focusing of the infinite object point, of the zoom lens in the fifteenth embodiment.
Figure 69B:
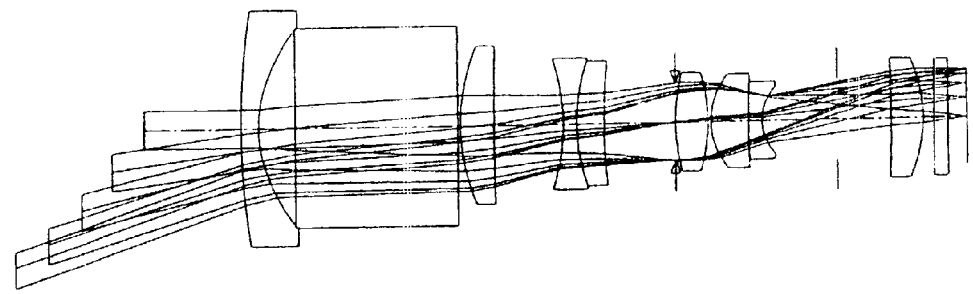
Figure 69C:
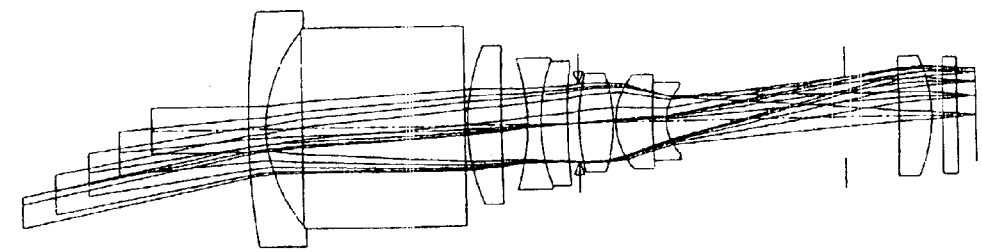

FIG. 68 shows an optical arrangement of the fifteenth embodiment of the zoom lens used in the electronic imaging device according to the present invention. FIGS. 69A, 69B, and 69C show optical arrangements at wide-angle, middle, and telephoto positions, respectively, in the fifteenth embodiment.

As shown in FIG. 68, the electronic imaging device of the fifteenth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the positive meniscus lens $L1_2'$ with a convex surface directed toward the object side, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1'$ and the cemented lens with the positive meniscus lens $L3_2'$ with a convex surface directed toward the object side and the negative meniscus lens $L3_3'$ with a convex surface directed toward the object side, having positive refracting power as a whole.

The fourth lens unit G4 includes the positive meniscus lens $L4_1'''$ with a concave surface directed toward the object side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

Also, when the first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the biconvex positive lens $L3_1'$ in the third lens unit G3, and the image-side surface of the positive meniscus lens $L4_1'''$ with a concave surface directed toward the object side, constituting the fourth lens unit G4.

Subsequently, numerical data of optical members constituting the zoom lens of the fifteenth embodiment are shown below.

| Numerical data 15 | | | |
| --- | --- | --- | --- |
| $r_1 = 39.9121$ | $d_1 = 0.9000$ | $n_{d1} = 1.74320$ | $v_{d1} = 49.34$ |
| $r_2 = 7.0006$ (aspherical) | $d_2 = 1.9500$ | | |
| $r_3 = \infty$ | $d_3 = 8.4000$ | $n_{d3} = 1.80610$ | $v_{d3} = 40.92$ |
| $r_4 = \infty$ | $d_4 = 0.1500$ | | |
| $r_5 = 10.6090$ | $d_5 = 1.7500$ | $n_{d5} = 1.72916$ | $v_{d5} = 54.68$ |
| $r_6 = 147.0043$ | $d_6 = D6$ | | |
| $r_7 = -10.9916$ | $d_7 = 0.7000$ | $n_{d7} = 1.72916$ | $v_{d7} = 54.68$ |
| $r_8 = 10.0000$ | $d_8 = 1.3500$ | $n_{d8} = 1.84666$ | $v_{d8} = 23.78$ |
| $r_9 = 28.2731$ | $d_9 = D9$ | | |
| $r_{10} = \infty$ (aspherical) | $d_{10} = 0$ | | |
| $r_{11} = 9.1551$ (aspherical) | $d_{11} = 1.7000$ | $n_{d11} = 1.58313$ | $v_{d11} = 59.38$ |
| $r_{12} = -9.4402$ | $d_{12} = 0.1500$ | | |
| $r_{13} = 3.8548$ | $d_{13} = 1.9500$ | $n_{d13} = 1.69350$ | $v_{d13} = 53.21$ |
| $r_{14} = 40.0000$ | $d_{14} = 0.7000$ | $n_{d14} = 1.78470$ | $v_{d14} = 26.29$ |
| $r_{15} = 2.5225$ | $d_{15} = D15$ | | |
| $r_{16} = \infty$ (position of variable transmittance means or shutter) | $d_{16} = 2.8250$ | | |
| $r_{17} = -85.1906$ | $d_{17} = 1.6000$ | $n_{d17} = 1.68893$ | $v_{d17} = 31.07$ |
| $r_{18} = -7.0057$ (aspherical) | $d_{18} = 0.6000$ | | |
| $r_{19} = \infty$ | $d_{19} = 0.7500$ | $n_{d19} = 1.51633$ | $v_{d19} = 64.14$ |
| $r_{20} = \infty$ | $d_{20} = D20$ | | |
| $r_{21} = \infty$ (imaging plane) | $d_{21} = 0$ | | |

| Aspherical coefficients |
| --- |
| Second surface |

$K = 0$
$A_2 = 0$     $A_4 = -3.2240 \times 10^{-4}$     $A_6 = 3.7049 \times 10^{-6}$
$A_8 = -2.5408 \times 10^{-7}$     $A_{10} = 0$ Eleventh surface $K = 0$
$A_2 = 0$     $A_4 = -7.8694 \times 10^{-4}$     $A_6 = 5.1170 \times 10^{-6}$
$A_8 = -2.0804 \times 10^{-7}$     $A_{10} = 0$ Eighteenth surface $K = 0$
$A_2 = 0$     $A_4 = 1.5375 \times 10^{-3}$     $A_6 = -6.5569 \times 10^{-5}$
$A_8 = 1.0698 \times 10^{-6}$     $A_{10} = 0$ Zoom Data When the Distance D0 is ∞,

|  | Wide-angle | Middle | Telephoto |
|---|---|---|---|
| f (mm) | 4.00716 | 6.92905 | 12.00056 |
| Fno | 2.6214 | 3.4396 | 5.0196 |
| D0 | ∞ | ∞ | ∞ |
| D6 | 1.34278 | 3.57165 | 1.34265 |
| D9 | 8.82741 | 3.75134 | 0.59749 |
| D15 | 1.18816 | 4.03385 | 9.41834 |
| D20 | 1.00000 | 1.00000 | 1.00000 |

When the Distance D0 is Short (20 cm),

|  | Wide-angle | Middle | Telephoto |
|---|---|---|---|
| D0 | 200.0000 | 200.0000 | 200.0000 |
| D6 | 0.99949 | 3.21410 | 0.99936 |
| D9 | 9.17070 | 4.10889 | 0.94079 |
| D15 | 1.18816 | 4.03385 | 9.41834 |
| D20 | 1.00000 | 1.00000 | 1.00000 |

Sixteenth Embodiment

Figure 70:
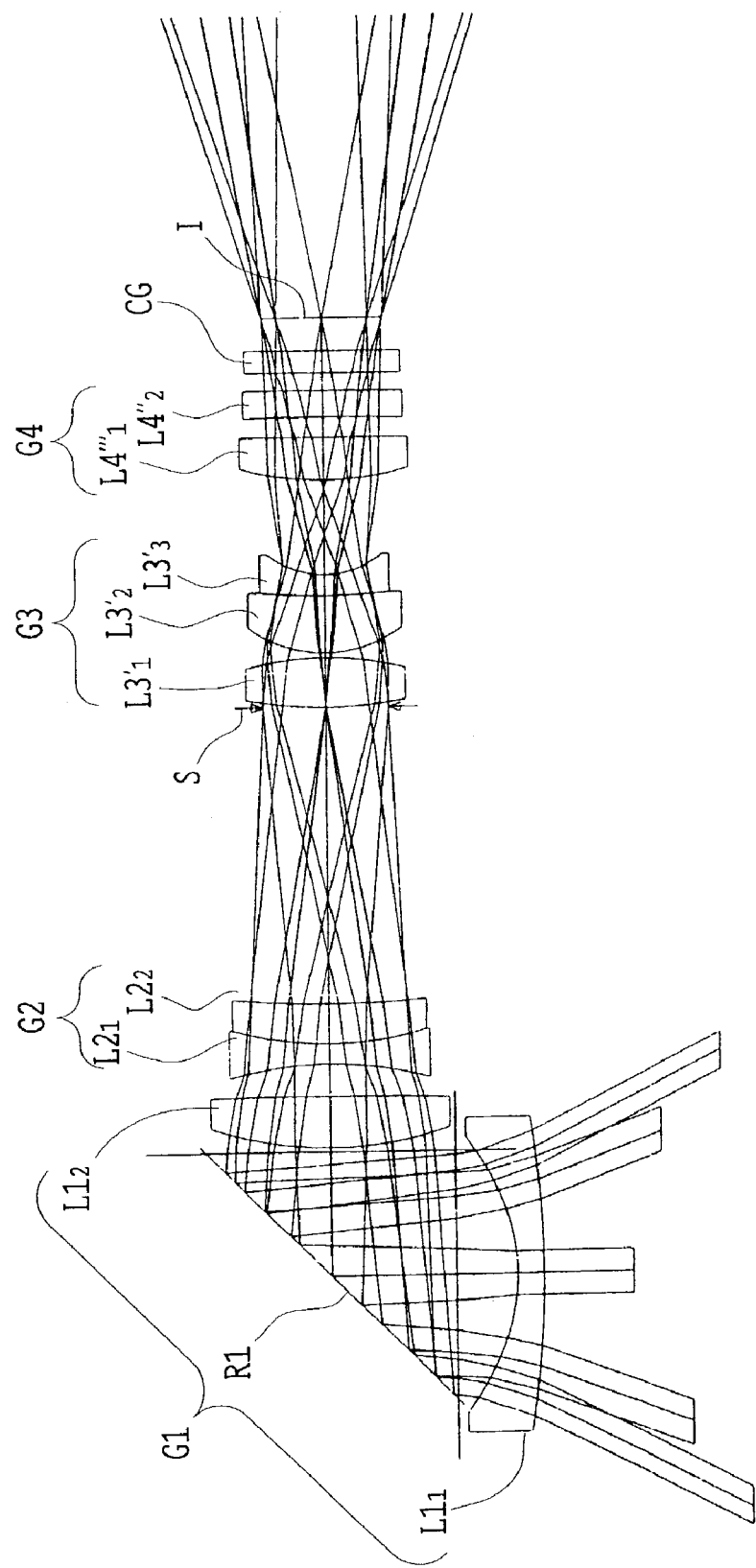
FIG. 70 is a sectional view showing an optical arrangement, developed along the optical axis, at the wide-angle position where the optical path is bent in focusing of the infinite object point, in a sixteenth embodiment of the zoom lens according to the present invention.
Figure 71A:
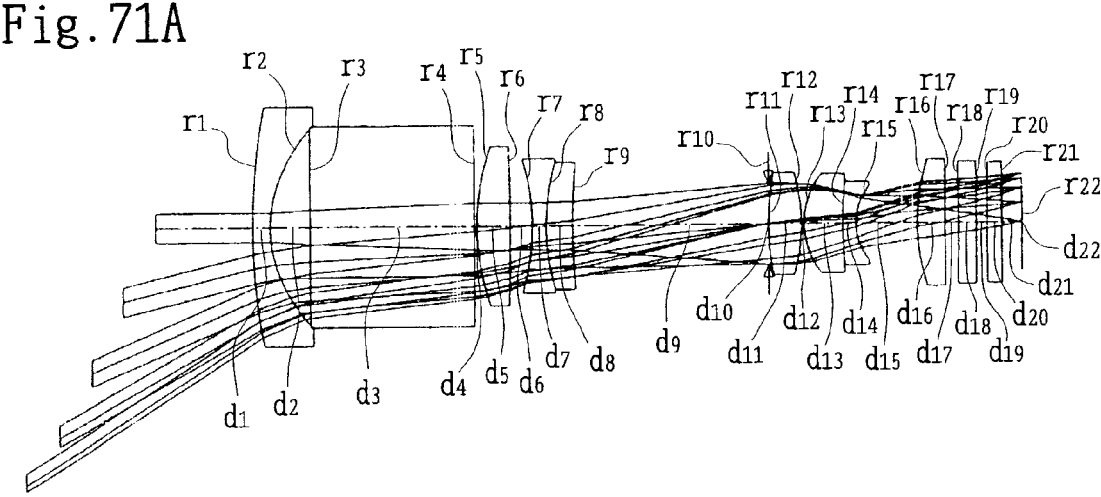
FIGS. 71A, 71B, and 71C are sectional views showing optical arrangements, developed along the optical axis, at wide-angle, middle, and telephoto positions, respectively, in focusing of the infinite object point, of the zoom lens in the sixteenth embodiment.
Figure 71B:
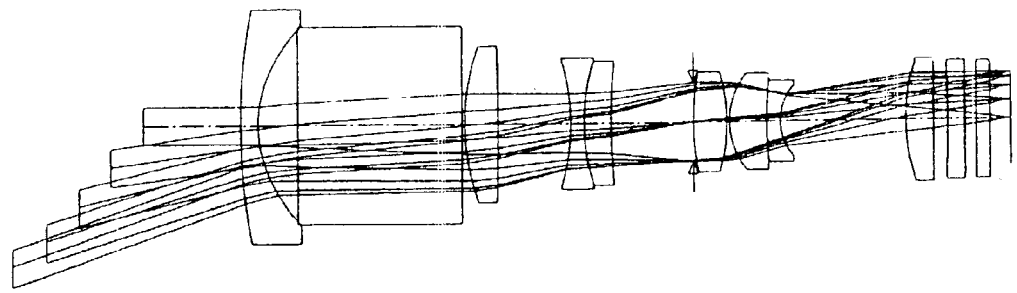
Figure 71C:
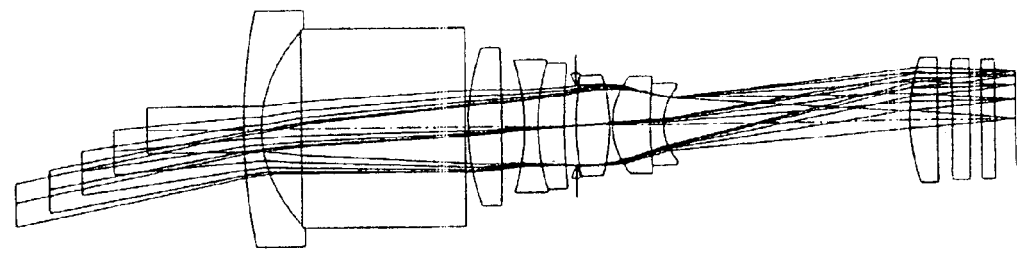

FIG. 70 shows an optical arrangement of the sixteenth embodiment of the zoom lens used in the electronic imaging device according to the present invention. FIGS. 71A, 71B, and 71C show optical arrangements at wide-angle, middle, and telephoto positions, respectively, in the sixteenth embodiment. FIGS. 72A–72D show aberration characteristics at the wide-angle position, in focusing of the infinite object point, of the zoom lens in the sixteenth embodiment. FIGS. 73A–73D show aberration characteristics at the middle position, in focusing of the infinite object point, of the zoom lens in the sixteenth embodiment. FIGS. 74A–74D show aberration characteristics at the telephoto position, in focusing of the infinite object point, of the zoom lens in the sixteenth embodiment. FIGS. 75A–75D show aberration characteristics at the wide-angle position, in focusing of the short-distance object point, of the zoom lens in the sixteenth embodiment. FIGS. 76A–76D show aberration characteristics at the middle position, in focusing of the short-distance object point, of the zoom lens in the sixteenth embodiment. FIGS. 77A–77D show aberration characteristics at the telephoto position, in focusing of the short-distance object point, of the zoom lens in the sixteenth embodiment.

As shown in FIG. 70, the electronic imaging device of the sixteenth embodiment has, in order from the object side, a zoom lens and a CCD which is an electronic image sensor. In this figure, again, reference symbol I represents the imaging plane of the CCD. The plane-parallel CCD cover glass CG is interposed between the zoom lens and the imaging plane I.

The zoom lens comprises, in order from the object side, the first lens unit G1, the second lens unit G2 which is the first moving lens unit, the aperture stop S, the third lens unit G3 which is the second moving lens unit, and the fourth lens unit G4.

The first lens unit G1 includes, in order from the object side, the negative meniscus lens $L1_1$ with a convex surface directed toward the object side, the reflective optical component R1 having a reflecting surface for bending the optical path, and the biconvex positive lens $L1_2$, having positive refracting power as a whole.

The reflective optical component R1 is constructed as a reflecting prism bending the optical path by 90°.

The second lens unit G2 includes, in order from the object side, the cemented lens with the biconcave negative lens $L2_1$ and the positive meniscus lens $L2_2$ with a convex surface directed toward the object side, having negative refracting power as a whole.

The third lens unit G3 includes, in order from the object side, the biconvex positive lens $L3_1'$ and the cemented lens with the positive meniscus lens $L3_2'$ with a convex surface directed toward the object side and the negative meniscus lens $L3_3'$ with a convex surface directed toward the object side, having positive refracting power as a whole.

The fourth lens unit G4 includes the positive meniscus lens $L4_1'$ with a convex surface directed toward the object side and a negative lens $L4_2''$ having a concave surface on the object side and a flat surface on the image side.

When the magnification of the zoom lens is changed, extending from the wide-angle position to the telephoto position, in focusing of the infinite object point, the first lens unit G1 and the fourth lens unit G4 remain fixed; the second lens unit G2 is moved back and forth on the image side to follow a convex path (that is, after being moved toward the image side to widen once spacing between the first lens unit G1 and the second lens unit G2, narrows the spacing while moving toward the object side); and the third lens unit G3 is moved toward the object side only, together with the aperture stop S.

In focusing of the short-distance object point, the second lens unit G2 is shifted to the object side.

Also, when the first lens unit G1 and the fourth lens unit G4 remain fixed even when the focusing operation is performed.

Aspherical surfaces are provided to the image-side surface of the negative meniscus lens $L1_1$ with a convex surface directed toward the object side in the first lens unit G1, the object-side surface of the biconvex positive lens $L3_1'$ in the third lens unit G3, and the object-side surface of the positive meniscus lens $L4_1'''$ with a convex surface directed toward the object side and the object-side surface of the negative lens $L4_2''$ having a concave surface on the object side and a flat surface on the image side in the fourth lens unit G4.

Subsequently, numerical data of optical members constituting the zoom lens of the sixteenth embodiment are shown below.

| Numerical data 16 | | | |
|---|---|---|---|
| $r_1$ = 31.8167 | $d_1$ = 0.9000 | $n_{d1}$ = 1.74320 | $v_{d1}$ = 49.34 |
| $r_2$ = 6.5130 (aspherical) | $d_2$ = 2.0500 | | |
| $r_3$ = ∞ | $d_3$ = 8.4000 | $n_{d3}$ = 1.80610 | $v_{d3}$ = 40.92 |
| $r_4$ = ∞ | $d_4$ = 0.1500 | | |
| $r_5$ = 12.2002 | $d_5$ = 1.7500 | $n_{d5}$ = 1.72916 | $v_{d5}$ = 54.68 |
| $r_6$ = −176.2299 | $d_6$ = D6 | | |
| $r_7$ = −12.2304 | $d_7$ = 0.7000 | $n_{d7}$ = 1.72916 | $v_{d7}$ = 54.68 |
| $r_8$ = 11.5000 | $d_8$ = 1.3500 | $n_{d8}$ = 1.84666 | $v_{d8}$ = 23.78 |
| $r_9$ = 32.1701 | $d_9$ = D9 | | |
| $r_{10}$ = ∞ (stop) | $d_{10}$ = 0 | | |
| $r_{11}$ = 12.3535 (aspherical) | $d_{11}$ = 1.7000 | $n_{d11}$ = 1.58313 | $v_{d11}$ = 59.38 |
| $r_{12}$ = −9.7878 | $d_{12}$ = 0.1500 | | |
| $r_{13}$ = 4.1265 | $d_{13}$ = 1.9500 | $n_{d13}$ = 1.69350 | $v_{d13}$ = 53.21 |

-continued

| | | |
|---|---|---|
| $r_{14} = -22.0000$ | $d_{14} = 0.7000$  $n_{d14} = 1.78470$ | $\nu_{d14} = 26.29$ |
| $r_{15} = 2.9294$ | $d_{15} = D15$ | |
| $r_{16} = 10.1130$ (aspherical) | $d_{16} = 1.4500$  $n_{d16} = 1.58313$ | $\nu_{d16} = 59.38$ |
| $r_{17} = 2083.7929$ | $d_{17} = D17$ | |
| $r_{18} = -216.5126$ (aspherical) | $d_{18} = 0.9000$  $n_{d18} = 1.52542$ | $\nu_{d18} = 55.78$ |
| $r_{19} = \infty$ | $d_{19} = 0.6000$ | |
| $r_{20} = \infty$ | $d_{20} = 0.7500$  $n_{d20} = 1.51633$ | $\nu_{d20} = 64.14$ |
| $r_{21} = \infty$ | $d_{21} = D21$ | |
| $r_{22} = \infty$ (imaging plane) | $d_{22} = 0$ | |

Aspherical coefficients

Second surface $K = 0$
$A_2 = 0$   $A_4 = -4.7792 \times 10^{-4}$   $A_6 = 8.5290 \times 10^{-6}$
$A_8 = -4.3636 \times 10^{-7}$   $A_{10} = 0$ Eleventh surface $K = 0$
$A_2 = 0$   $A_4 = -5.7279 \times 10^{-4}$   $A_6 = 5.4469 \times 10^{-6}$
$A_8 = -3.8768 \times 10^{-7}$   $A_{10} = 0$ Sixteenth surface $K = 0$
$A_2 = 0$   $A_4 = -4.2891 \times 10^{-5}$   $A_6 = 9.1978 \times 10^{-5}$
$A_8 = -1.0100 \times 10^{-5}$   $A_{10} = 0$ Eighteenth $K = 0$
$A_2 = 0$   $A_4 = -1.1036 \times 10^{-3}$   $A_6 = 2.0641 \times 10^{-5}$
$A_8 = 9.2983 \times 10^{-6}$   $A_{10} = 0$ Zoom Data When the Distance D0 is $\infty$,

| | Wide-angle | Middle | Telephoto |
|---|---|---|---|
| f (mm) | 4.00153 | 6.92963 | 12.00205 |
| Fno | 2.6604 | 3.4644 | 5.0148 |
| D0 | $\infty$ | $\infty$ | $\infty$ |
| D6 | 1.10093 | 3.68362 | 1.10192 |
| D9 | 10.12509 | 4.25142 | 0.60401 |
| D15 | 3.24220 | 6.53134 | 12.76221 |
| D17 | 0.70000 | 0.70000 | 0.70000 |
| D21 | 1.00000 | 1.00000 | 1.00000 |

When the Distance D0 is Short (20 cm),

| | Wide-angle | Middle | Telephoto |
|---|---|---|---|
| D0 | 200.0000 | 200.0000 | 200.0000 |
| D6 | 1.10093 | 3.68362 | 1.10192 |
| D9 | 10.12509 | 4.25142 | 0.60401 |
| D15 | 3.07343 | 6.04460 | 11.44083 |
| D17 | 0.86877 | 1.18674 | 2.02138 |
| D21 | 1.00000 | 1.00000 | 1.00000 |

Subsequently, the values of parameters of the conditions in the eighth to sixteenth embodiments are listed in Tables 3–5.

TABLE 3

| | 8th embodiment | 9th embodiment | 10th embodiment |
|---|---|---|---|
| Lens data | Numerical data 8 | Numerical data 9 | Numerical data 10 |
| Type of the third lens unit | B | B | B |
| Half field angle at wide-angle position | 32.6 | 32.5 | 32.4 |
| Half field angle at middle position | 19.1 | 19.1 | 19.1 |
| Half field angle at telephoto position | 11.3 | 11.3 | 11.3 |
| L | 3.96 | 3.96 | 3.96 |
| $f1_1/\sqrt{(fw \cdot fT)}$ | −1.69849 | −1.61753 | −1.54777 |
| $f1_2/\sqrt{(fw \cdot fT)}$ | 2.68319 | 2.34639 | 2.09325 |
| d/L | 1.41793 | 1.41793 | 1.41793 |
| npri | 1.80610 | 1.80610 | 1.80610 |
| ν1N | 40.92 | 40.92 | 34.97 |
| $\sqrt{(fw \cdot fT)}/fT$ | −0.00099 | 0.07744 | 0.14219 |
| βRW | −0.55510 | −0.60998 | −0.60966 |
| $fRW/\sqrt{(fw \cdot fT)}$ | 1.39721 | 1.39226 | 1.39071 |
| $D12\ min/\sqrt{(fw \cdot fT)}$ | — | 0.19368 | 0.19335 |
| $fF/\sqrt{(fw \cdot fT)}$ | −3.23206 | — | — |
| $R_{C3}/R_{C1}$ | 0.95846 | 0.97079 | 1.01613 |
| $L/R_{C2}$ | 0.19800 | 0.20842 | 0.20842 |
| $\nu_{CP} - \nu_{CN}$ | 25.56 | 25.56 | 29.43 |
| $(R_{1PF} + R_{1PR})/(R_{1PF} - R_{1PR})$ | −0.96138 | −0.48393 | −0.64140 |
| $(R_{2F} + R_{2R})/(R_{2F} - R_{2R})$ | −0.51063 | −0.40838 | −0.30835 |
| fT/fw | 2.99856 | 2.98732 | 2.97829 |
| τ600/τ550 | 1.0 | 1.0 | 1.0 |
| τ700/τ550 | 0.04 | 0.04 | 0.04 |
| τ400/τ550 | 0.0 | 0.0 | 0.0 |
| τ440/τ550 | 1.06 | 1.06 | 1.06 |

TABLE 4

|  | 11th embodiment | 12th embodiment | 13th embodiment |
|---|---|---|---|
| Lens data | Numerical data 11 | Numerical data 12 | Numerical data 13 |
| Type of the third lens unit | B | B | A |
| Half field angle at wide-angle position | 32.6 | 32.3 | 33.4 |
| Half field angle at middle position | 19.1 | 19.1 | 19.3 |
| Half field angle at telephoto position | 11.3 | 11.3 | 11.6 |
| L | 3.96 | 3.96 | 5.0 |
| $f11/\sqrt{fw \cdot fT}$ | −1.53510 | −1.45358 | −1.67788 |
| $f12/\sqrt{fw \cdot fT}$ | 2.16588 | 1.80986 | 2.32249 |
| d/L | 1.41793 | 1.41793 | 1.35018 |
| npri | 1.80610 | 1.80610 | 1.80610 |
| ν1N | 40.92 | 34.97 | 49.34 |
| $\sqrt{fw \cdot fT}/f1$ | 0.12196 | 0.28698 | 0.07654 |
| βRW | −0.55821 | −0.60428 | −0.47307 |
| $fRW/\sqrt{fw \cdot fT}$ | 1.40791 | 1.39707 | 1.21583 |
| $D12\ min/\sqrt{fw \cdot fT}$ | 0.19413 | 0.19169 | 0.19318 |
| $fF/\sqrt{fw \cdot fT}$ | — | — | — |
| $R_{C3}/R_{C1}$ | 0.93476 | 0.97454 | 0.66002 |
| $L/R_{C2}$ | 0.23294 | 0.35689 | 0.12500 |
| $\nu_{CP} - \nu_{CN}$ | 25.56 | 29.43 | 26.92 |
| $(R_{1PF} + R_{1PR})/(R_{1PF} - R_{1PR})$ | −0.39132 | +0.09571 | −1.20092 |
| $(R_{2F} + R_{2R})/(R_{2F} - R_{2R})$ | −0.32313 | −0.04010 | −0.46272 |
| fT/fw | 2.99207 | 2.95207 | 2.99456 |
| τ600/τ550 | 1.0 | 1.0 | 1.0 |
| τ700/τ550 | 0.04 | 0.04 | 0.04 |
| τ400/τ550 | 0.0 | 0.0 | 0.0 |
| τ440/τ550 | 1.06 | 1.06 | 1.06 |

TABLE 5

|  | 14th embodiment | 15th embodiment | 16th embodiment |
|---|---|---|---|
| Lens data | Numerical data 14 | Numerical data 15 | Numerical data 16 |
| Type of the third lens unit | A | A | A |
| Half field angle at wide-angle position | 33.3 | 33.3 | 33.5 |
| Half field angle at middle position | 19.3 | 19.4 | 19.5 |
| Half field angle at telephoto position | 11.6 | 11.6 | 11.6 |
| L | 5.0 | 5.0 | 5.0 |
| $f11/\sqrt{fw \cdot fT}$ | −1.74801 | −1.66671 | −1.61450 |
| $f12/\sqrt{fw \cdot fT}$ | 2.47933 | 2.24917 | 2.26694 |
| d/L | 1.34018 | 1.35018 | 1.37018 |
| npri | 1.80610 | 1.80610 | 1.80610 |
| ν1N | 49.34 | 49.34 | 49.34 |
| $\sqrt{fw \cdot fT}/f1$ | 0.04585 | 0.09703 | 0.089115 |
| βRW | −0.48124 | −0.47213 | −0.43431 |
| $fRW/\sqrt{fw \cdot fT}$ | 1.22063 | 1.21369 | 1.11568 |
| $D12\ min/\sqrt{fw \cdot fT}$ | 0.19150 | 0.19362 | — |
| $fF/\sqrt{fw \cdot fT}$ | — | — | 2.51407 |
| $R_{C3}/R_{C1}$ | 0.69594 | 0.65438 | 0.70990 |
| $L/R_{C2}$ | 0.50000 | 0.12500 | 0.22727 |
| $\nu_{CP} - \nu_{CN}$ | 25.56 | 26.92 | 26.92 |
| $(R_{1PF} + R_{1PR})/(R_{1PF} - R_{1PR})$ | −1.31703 | −1.15556 | −0.87051 |
| $(R_{2F} + R_{2R})/(R_{2F} - R_{2R})$ | −0.79435 | −0.44013 | −0.44909 |
| fT/fw | 2.99746 | 2.99478 | 2.99937 |
| τ600/τ550 | 1.0 | 1.0 | 1.0 |
| τ700/τ550 | 0.04 | 0.04 | 0.04 |
| τ400/τ550 | 0.0 | 0.0 | 0.0 |
| τ440/τ550 | 1.06 | 1.06 | 1.06 |

In any of the embodiments of the present invention, the direction in which the optical path is bent is set in the direction of the major side (horizontal direction) of the electronic image sensor (CCD) as mentioned above. Since the optical path can also be bent in a vertical direction, a minimum space is required for bending, which is advantageous for compactness. If the optical path can also be bent in the direction of the minor side thereof, it will be bent in the direction of either the major or minor side, and the number of degrees of design freedom of a camera incorporating lenses will be increased, which is favorable.

Also, although in each embodiment a low-pass filter is not incorporated, it may be introduced into the optical path. In the horizontal pixel pitch a of the electronic image sensor, any of the values given in Table 6 may be used.

TABLE 6

| a (μm) | 4.0 | 3.7 | 3.4 | 3.1 | 2.8 | 2.6 | 2.4 | 2.2 | 2.0 | 1.8 |
|---|---|---|---|---|---|---|---|---|---|---|

In Tables 1 and 2, the bending point stands for a distance (of a 45° reflecting surface on the optical axis) from the front of the virtual plane (the third surface) of the lens data.

Also, in each embodiment, the reflecting surface in the numerical data becomes flat in focusing of the infinite object point and concave in focusing of the short-distance object point.

In view of the principle of a variable profile, it is desirable that even in focusing of the infinite object point, the reflecting surface is constructed to be somewhat concave, and in focusing of the short-distance object point, it is constructed as a concave surface which is stronger in curvature. The radius of curvature of the reflecting surface is measured at the point of intersection with the optical axis, and the reflecting surface may be aspherical.

Figure 78:
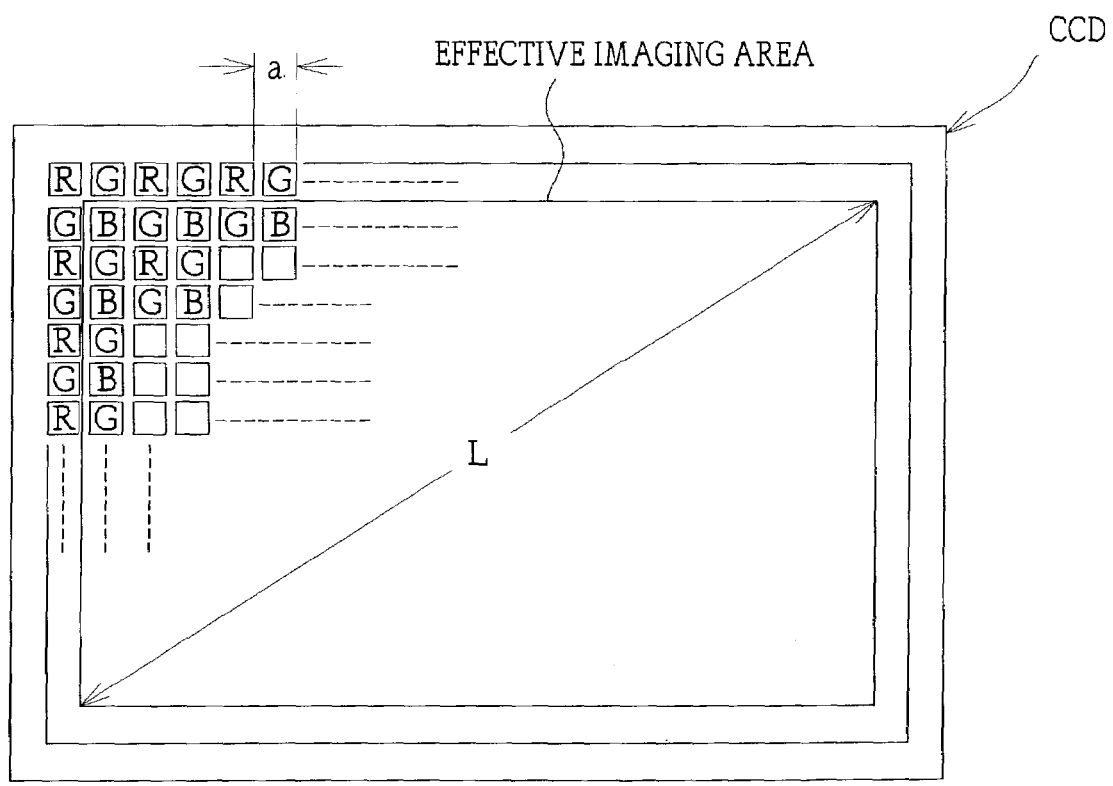
FIG. 78 is an explanatory view showing an example of a pixel array of an electronic image sensor used together with the zoom lens according to the present invention.

Here, reference is made to the diagonal length L of the effective imaging area and the pixel pitch a of the electronic image sensor. FIG. 78 shows an example of a pixel array of the electronic image sensor used in each embodiment of the present invention. At the pixel pitch a, pixels for R (red), G (green), and B (blue) or four-color pixels (FIG. 81) for cyan, magenta, yellow, and green are arrayed in a mosaic fashion. The effective imaging area refers to the area of a photoelectric conversion plane on the image sensor used for reproduction (display on the personal computer or printing by the printer) of a photographed image. The effective imaging area depicted in the figure is set in the area narrower than the entire photoelectric conversion plane of the image sensor to the performance of the optical system (an image circle that the performance of the optical system can be ensured). The diagonal length L of the effective imaging area is that of this effective imaging area. Also, the imaging area used for the reproduction of the image may be variously changed, but when the zoom lens of the present invention is used in an imaging device of such a function, the diagonal length L of the effective imaging area is changed. In such a case, the diagonal length L of the effective imaging area in the present invention is assumed to be the maximum value in a possible area.

In each embodiment mentioned above, a near-infrared cutoff filter is placed on the image side of the last lens unit, or a near-infrared cutoff coat is applied to the surface of the entrance-side of the CCD cover glass CG or another lens. The low-pass filter is not placed in the optical path from the entrance surface of the zoom lens to the imaging plane. The nearinfrared cutoff filter or the nearinfrared cutoff coat is designed so that the transmittance at a wavelength of 60 nm is more than 80% and the transmittance at a wavelength of 700 nm is less than 10%. Specifically, it has a multilayer film composed of 27 layers such as are described below. However, its design wavelength is 780 nm.

| Substrate | Material | Physical film thickness (nm) | λ/4 |
|---|---|---|---|
| 1st layer | Al$_2$O$_3$ | 58.96 | 0.50 |
| 2nd layer | TiO$_2$ | 84.19 | 1.00 |
| 3rd layer | SiO$_2$ | 134.14 | 1.00 |
| 4th layer | TiO$_2$ | 84.19 | 1.00 |
| 5th layer | SiO$_2$ | 134.14 | 1.00 |
| 6th layer | TiO$_2$ | 84.19 | 1.00 |
| 7th layer | SiO$_2$ | 134.14 | 1.00 |

-continued

| Substrate | Material | Physical film thickness (nm) | λ/4 |
|---|---|---|---|
| 8th layer | TiO$_2$ | 84.19 | 1.00 |
| 9th layer | SiO$_2$ | 134.14 | 1.00 |
| 10th layer | TiO$_2$ | 84.19 | 1.00 |
| 11th layer | SiO$_2$ | 134.14 | 1.00 |
| 12th layer | TiO$_2$ | 84.19 | 1.00 |
| 13th layer | SiO$_2$ | 134.14 | 1.00 |
| 14th layer | TiO$_2$ | 84.19 | 1.00 |
| 15th layer | SiO$_2$ | 178.41 | 1.33 |
| 16th layer | TiO$_2$ | 101.03 | 1.21 |
| 17th layer | SiO$_2$ | 167.67 | 1.25 |
| 18th layer | TiO$_2$ | 96.82 | 1.15 |
| 19th layer | SiO$_2$ | 147.55 | 1.05 |
| 20th layer | TiO$_2$ | 84.19 | 1.00 |
| 21st layer | SiO$_2$ | 160.97 | 1.20 |
| 22nd layer | TiO$_2$ | 84.19 | 1.00 |
| 23rd layer | SiO$_2$ | 154.26 | 1.15 |
| 24th layer | TiO$_2$ | 95.13 | 1.13 |
| 25th layer | SiO$_2$ | 160.97 | 1.20 |
| 26th layer | TiO$_2$ | 99.34 | 1.18 |
| 27th layer | SiO$_2$ | 87.19 | 0.65 |

Air

Figure 79:
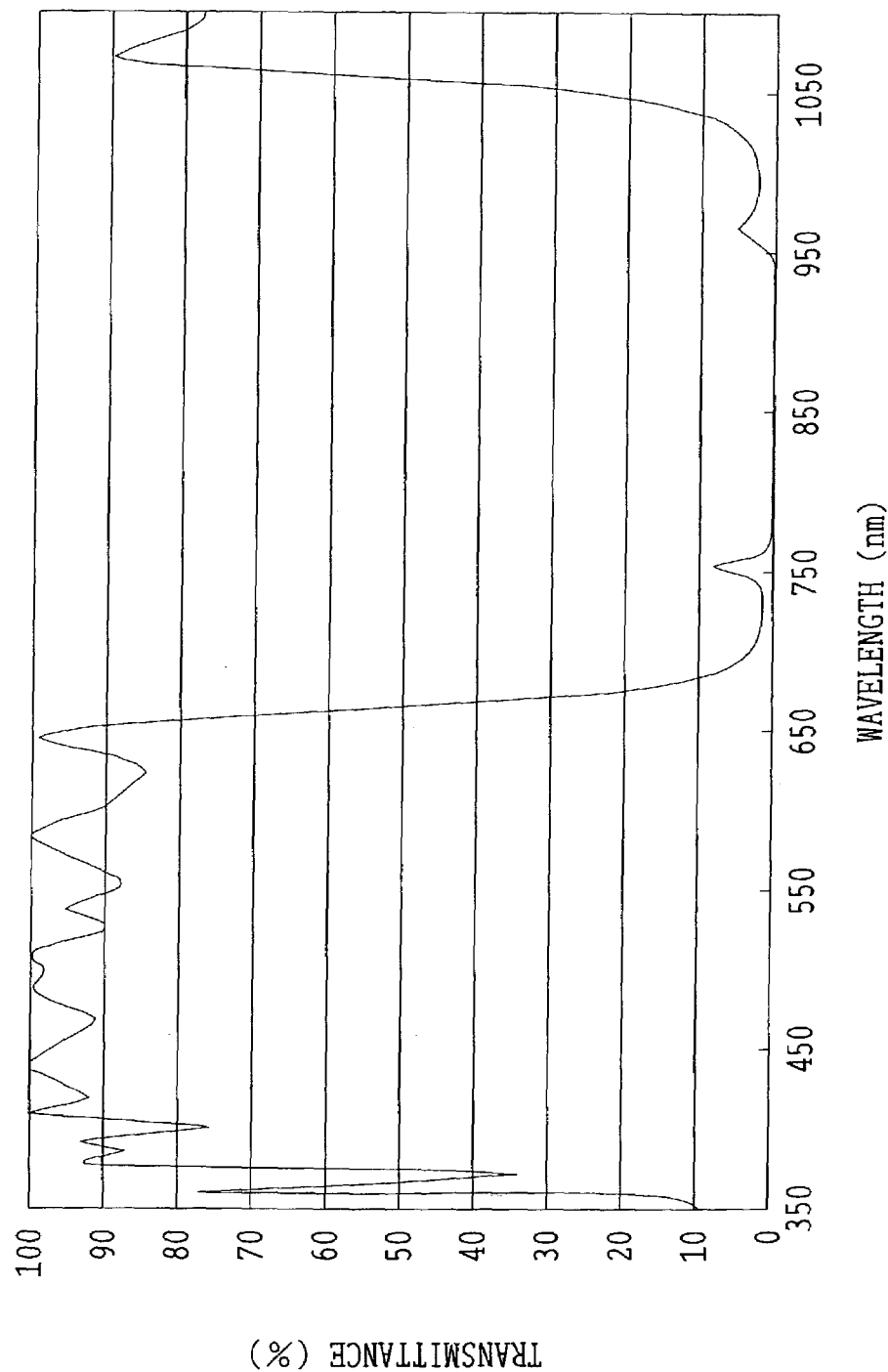
FIG. 79 is a graph showing the transmittance characteristics of an example of a near-infrared sharp-cutoff coat.
Figure 80:
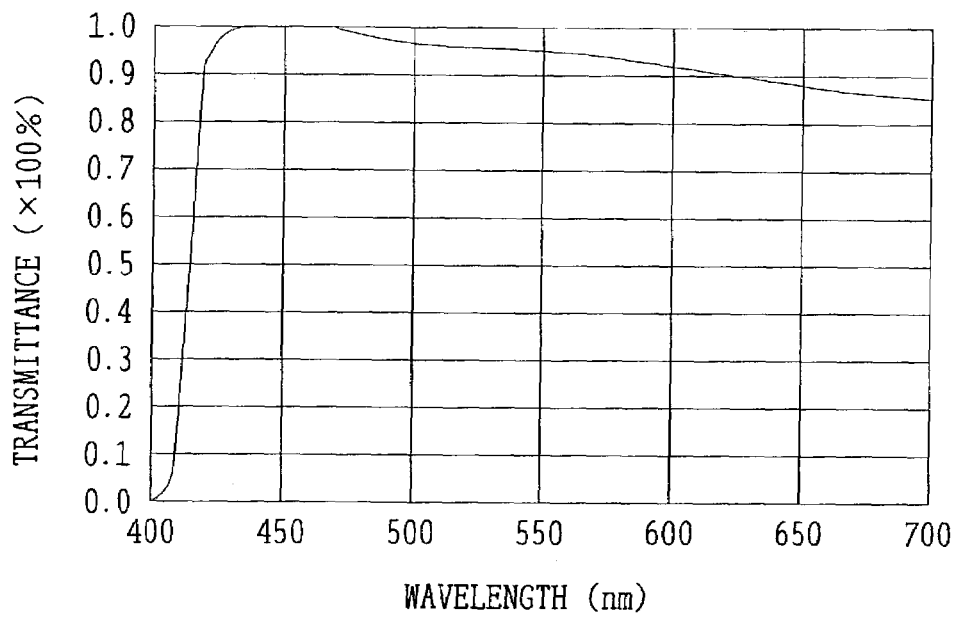
FIG. 80 is a graph showing the transmittance characteristics of an example of a color filter provided on the exit side of a CCD cover glass, or another lens, to which the near-infrared cutoff coat is applied.

The transmittance characteristics of the nearinfrared sharp cutoff coat are as shown in FIG. 79. A color filter reducing the transmission of color in the short-wavelength region such as that shown in FIG. 80 is provided on the side of the entrance surface of the CCD cover glass CG to which the nearinfrared cutoff coat is applied or another lens to which the nearinfrared cutoff coat is applied, or a coating is provided to the entrance surface. Whereby, color reproducibility of an electronic image is further improved.

Specifically, it is favorable that, owing to the nearinfrared cutoff filter or the nearinfrared cutoff coating, the ratio of the transmittance between the wavelength of the highest transmittance of wavelengths of 400–700 nm and a wavelength of 420 nm is more than 15% and the ratio of the transmittance between the wavelength of the highest transmittance and a wavelength of 400 nm is less than 6%.

Whereby, a shift between the recognition of the human eye to color and the color of an image produced and reproduced can be reduced. In other words, color on the short-wavelength side which is hard to be recognized with the human vision is easily recognized with the human eye, and the degradation of an image due thereto can be prevented. If the ratio of the transmittance of the wavelength of 400 nm exceeds 6%, short wavelengths which are hard to be recognized with the human eye will be reproduced to wavelengths which can be recognized. Conversely, if the ratio of the transmittance of the wavelength of 420 nm is below 15%, the reproduction of wavelengths which can be recognized with the human eye becomes difficult and a color balance will be impaired.

A means for limiting such wavelengths brings about an effect by using a complementary mosaic color filter in the imaging system.

In each embodiment mentioned above, as shown in FIG. 80, the coating is made so that the transmittance is 0% at a wavelength of 400 nm and 90% at a wavelength of 420 nm, and the peak of the transmittance is 100% at a wavelength of 440 nm.

By adding the function of the nearinfrared sharp cutoff coat, the color filter is such that, with a transmittance of 99% as a peak, the transmittance is 0% at a wavelength of 400 nm, 80% at a wavelength of 420 nm, 82% at a wavelength of 600 nm, and 2% at a wavelength of 700 nm. Whereby, more true color reproduction is made.

Figure 81:
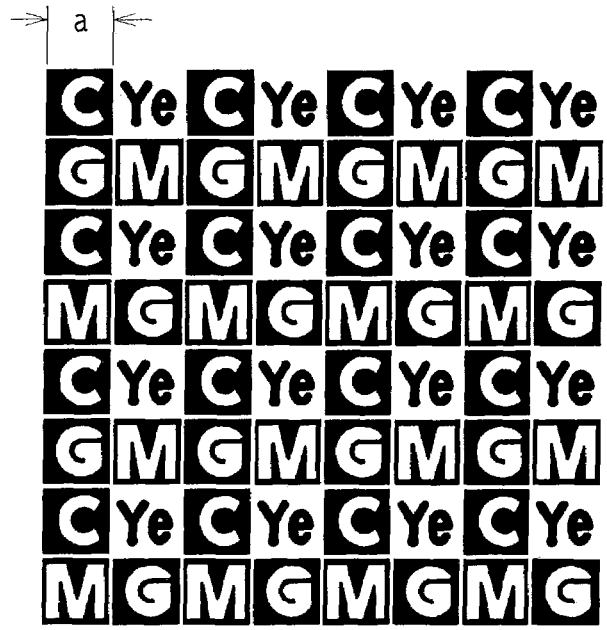
FIG. 81 is a view showing an array of color filter elements of a complementary mosaic color filter.

On the imaging plane I of the CCD, as illustrated in FIG. 81, is provided the complementary mosaic color filter in which four-color filter components of cyan, magenta, yellow, and green are arrayed in a mosaic fashion, corresponding to imaging pixels. These four-color filter components are arrayed in the mosaic fashion so that the number of individual color filter components is almost the same and adjacent pixels do not correspond to the same kind of color filter components. Whereby, more true color reproduction becomes possible.

Specifically, as shown in FIG. 81, it is desirable that the complementary mosaic color filter is constructed with at least four kinds of color filter components and the characteristics of the color filter components are as described below.

A color filter component G of green has the peak of a spectral intensity at a wavelength $G_P$, a color filter component $Y_e$ of yellow has the peak of the spectral intensity at a wavelength $Y_P$, a color filter component C of cyan has the peak of the spectral intensity at a wavelength $C_P$, and a color filter component M of magenta has peaks at wavelengths $M_{P1}$, and $M_{P2}$, satisfying the following conditions:

$$510 \text{ nm} < G_P < 540 \text{ nm}$$

$$5 \text{ nm} < Y_P - G_P < 35 \text{ nm}$$

$$-100 \text{ nm} < C_P - G_P < -5 \text{ nm}$$

$$450 \text{ nm} < M_{P1} < 480 \text{ nm}$$

$$580 \text{ nm} < M_{P2} < 640 \text{ nm}$$

Furthermore, it is favorable for the improvement of color reproducibility that each of the color filter components of green, yellow, and cyan has a spectral intensity of at least 80% at a wavelength of 530 nm with respect to the peak of the spectral intensity, and the color filter component of magenta has a spectral intensity of 10–50% at a wavelength of 530 nm with respect to the peak of the spectral intensity.

Figure 82:
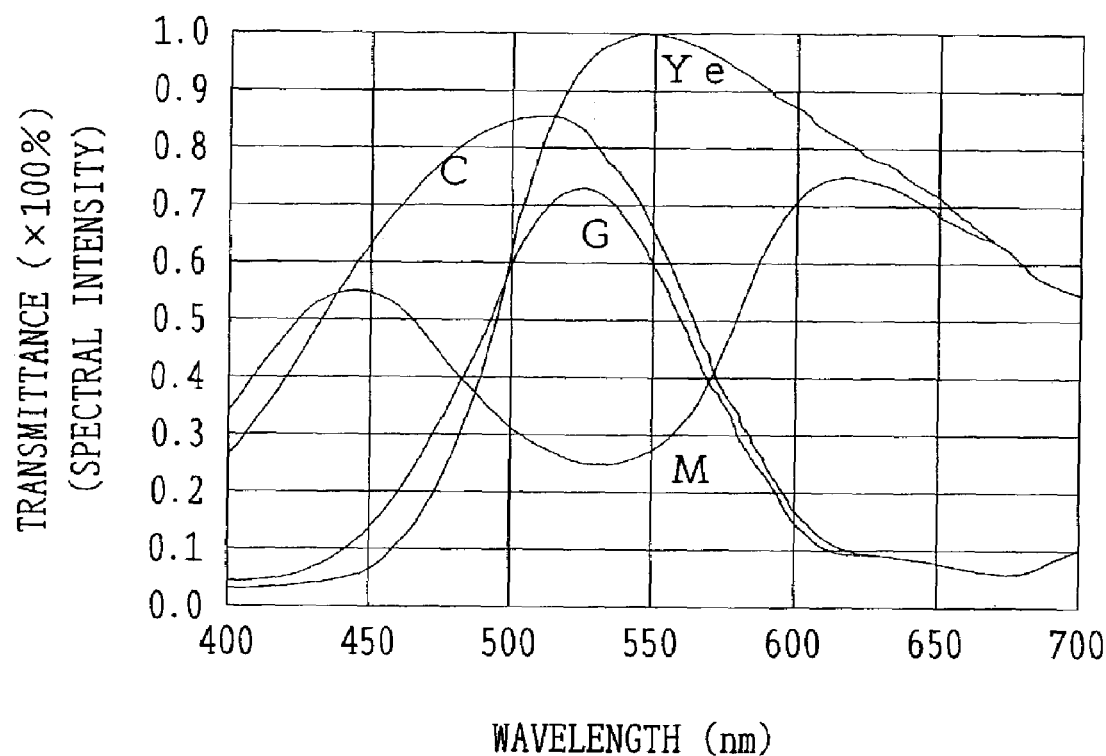
FIG. 82 is a graph showing an example of the wavelength characteristics of the complementary mosaic color filter.

An example of the wavelength characteristics of the color filter components in the above embodiments is shown in FIG. 82. The color filter component G of green has the peak of the spectral intensity at a wavelength of 525 nm. The color filter component $Y_e$ of yellow has the peak of the spectral intensity at a wavelength of 555 nm. The color filter component C of cyan has the peak of the spectral intensity at a wavelength of 510 nm. The color filter component M of magenta has the peaks at wavelengths of 440 nm and 620 nm. The spectral intensities of the color filter components at a wavelength of 530 nm are 90% for G, 95% for $Y_e$, 97% for C, and 38% for M with respect to the peaks of the spectral intensities.

In such a complementary mosaic color filter, colors of the color filter components are electrically converted into signals for R (red), G (green), and B (blue) by a controller, not shown, (or a controller used in a digital camera), through the following signal processing:

luminance signal $$Y = |G + M + Y_e + C \times \tfrac{1}{4}$$

color signals $$R - Y = (M + Y_e) - (G + C)|$$

$$B - Y = (M + C) - (G + Y_e)|$$

Also, the nearinfrared sharp cutoff coat may be located in any position on the optical path.

In the numerical data of each embodiment, the description that the spacing between the aperture stop S and the convex surface of the next lens on the image side is zero means that the position of the vertex of the convex surface of the lens is equal to the point of intersection of a perpendicular line drawn to the optical axis from the aperture stop with the optical axis.

Figure 83:
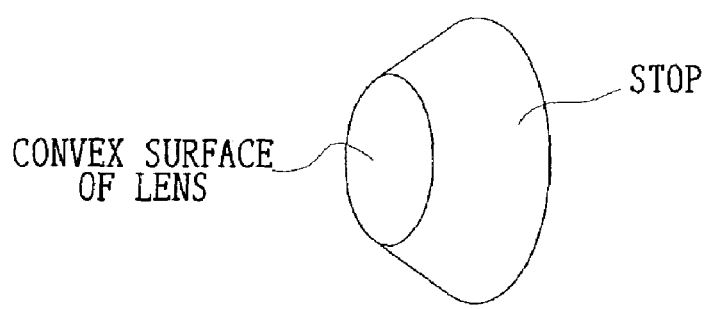
FIG. 83 is an explanatory view showing a modified example of a stop used in the electronic imaging device according to the present invention.

Also, although the stop S is constructed as a flat plate in each embodiment, a black painting member with a circular aperture may be used as another structure. Alternatively, a funnel-shaped stop, such as that shown in FIG. 83, may be covered along the inclination of the convex surface of the lens. A stop may also be provided to a frame supporting a lens.

Each embodiment described above is designed so that the variable transmittance means for adjusting the amount of light in the present invention or a shutter for adjusting light-receiving time can be placed in air spacing on the image side of the third lens unit G3.

Figure 84:
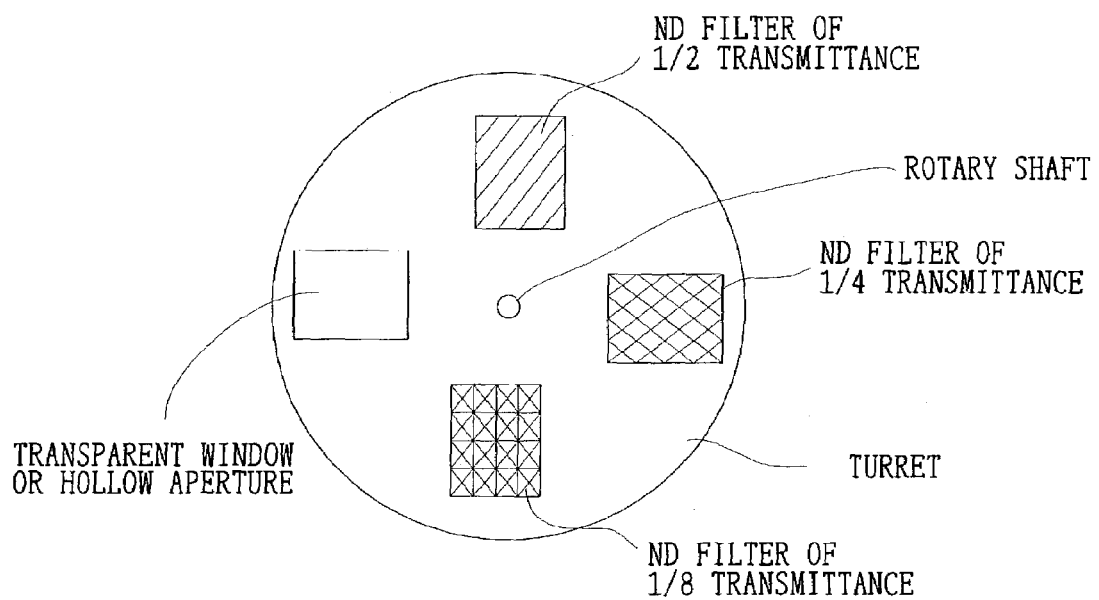
FIG. 84 is an explanatory view showing an example of a light-amount adjusting means used in the electronic imaging device according to the present invention.

The light-amount adjusting means, as shown in FIG. 84, can be used as a turret-like structure in which a transparent window or a hollow aperture, an ND filter of ½ transmittance, an ND filter of ¼ transmittance, and others are provided.

Figure 85:
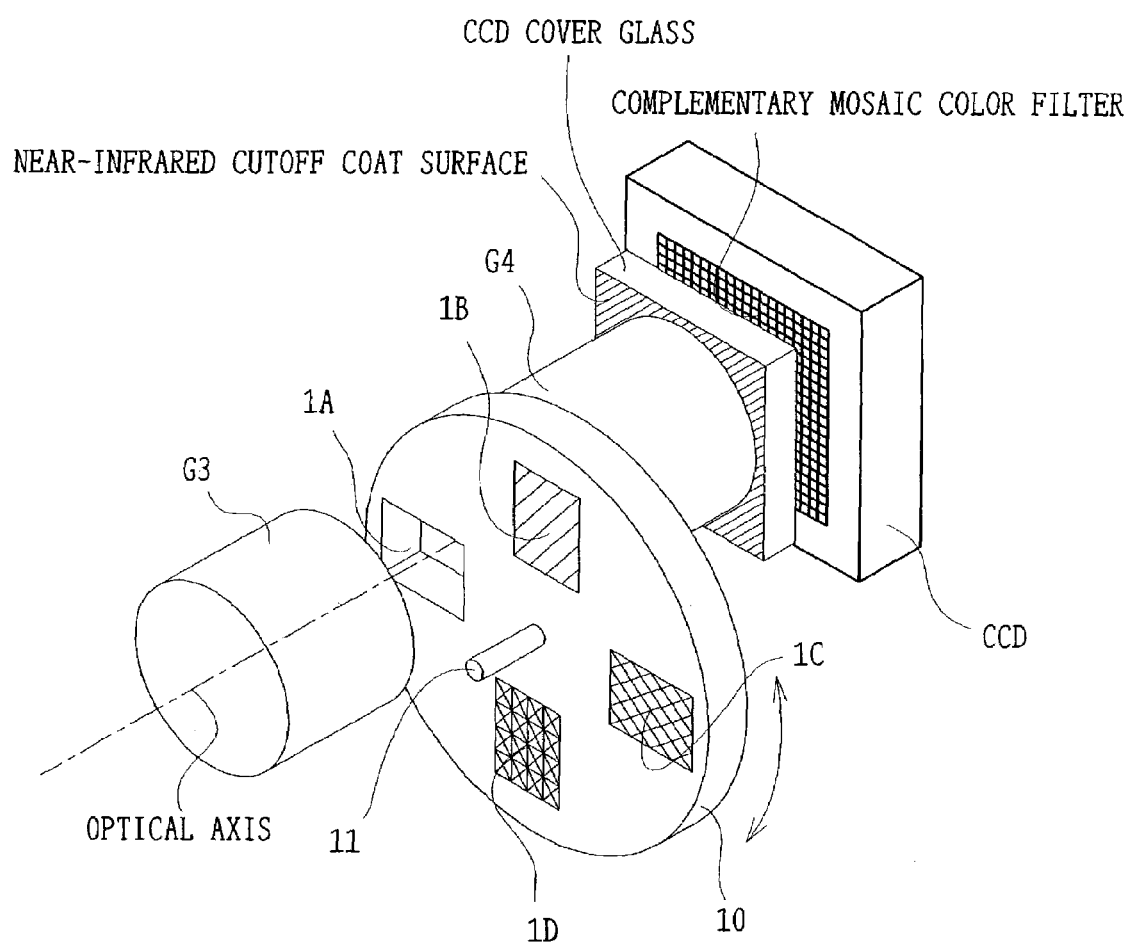
FIG. 85 is a perspective view showing a specific example where the light-amount adjusting means of FIG. 84 is applied to the electronic imaging device according to the present invention.

Its specific example is shown in FIG. 85. In this figure, however, the first and second lens units G1 and G2 are omitted for the sake of convenience. A turret 10, shown in FIG. 84, capable of adjusting brightness at a zero stage, a—first stage, a—second stage, and a—third stage is located on the optical axis between the third and fourth lens units G3 and G4. The turret 10 is provided with aperture sections 1A, 1B, 1C, and 1D having an ND filter of 100% transmittance, an ND filter of 50% transmittance, an ND filter of 25% transmittance, and an ND filter of 12.5% transmittance, respectively, with respect to the transmittance at a wavelength 550 nm in an area transmitting an effective light beam.

The turret 10 is rotated around a rotary axis 11 and any aperture section is located on the optical axis between the lens units which is spacing different from the position of the stop. Whereby, the light-amount adjustment is made.

Figure 86:
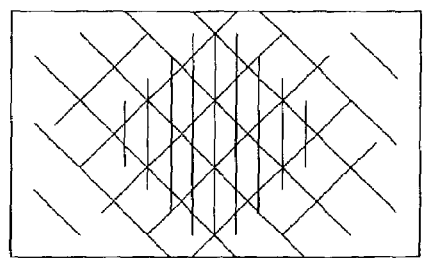
FIG. 86 is an explanatory view showing another example of the light-amount adjusting means applicable to the electronic imaging device according to the present invention.

For the light-amount adjusting means, as shown in FIG. 86, a filter surface in which the light-amount adjustment is possible may be provided so that variation in the amount of light is suppressed. The filter surface of FIG. 86 is constructed so that the transmittance is concentrically different and the amount of light decreases progressively in going to the center.

The filter surface may be placed and constructed so that the amount of light at the center is ensured in preference to others with respect to a dark object to uniform the transmittance, and variation in brightness is compensated with respect to a bright object alone.

In view of the slim design of the entire device, an electrooptical element which is capable of electrically controlling the transmittance can be used.

Figure 87:
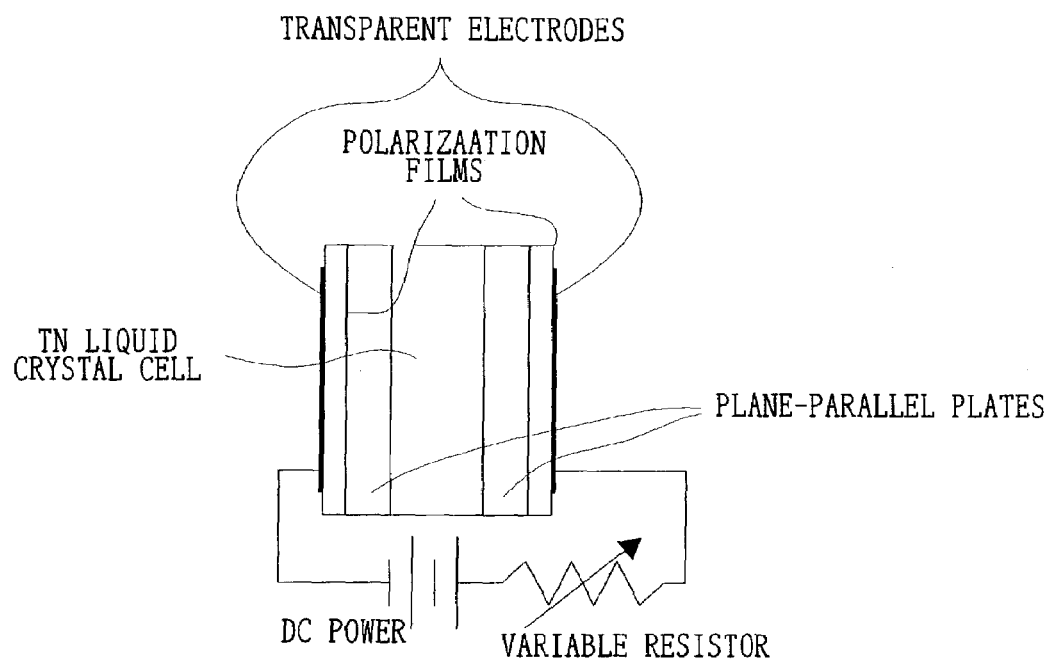
FIG. 87 is an explanatory view showing still another example of the light-amount adjusting means applicable to the electronic imaging device according to the present invention.

The electrooptical element, for example, as illustrated in FIG. 87, can be constructed with a liquid crystal filter in which a TN liquid crystal cell is sandwiched between two transparent electrodes, each having a polarization film which coincides in polarization direction with the transparent electrode, and voltages applied to the transparent electrodes are properly changed to thereby vary the polarization direction in the liquid crystal and adjust the amount of transmission light.

In this liquid crystal filter, the voltage applied to the TN liquid crystal cell is adjusted through a variable resistor, and thereby the orientation of the TN liquid crystal cell is changed.

Instead of various filters adjusting the transmittance, such as those described above, the shutter adjusting the light-receiving time may be provided as the light-amount adjusting means. Alternatively, the shutter may be placed together with the filters.

The shutter may be constructed as a focal-plane shutter with moving blades situated close to the image plane, or a two-blade lens shutter, a focal-plane shutter, or a liquid crystal shutter, provided on the optical path.

Figure 88A:
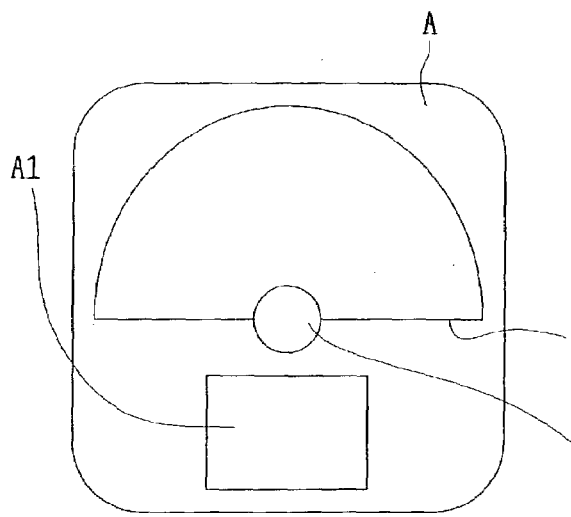
FIG. 88A is a view schematically showing the back side of a rotary focal-plane shutter adjusting light-receiving time, applicable to the electronic imaging device according to the present invention.
Figure 88B:
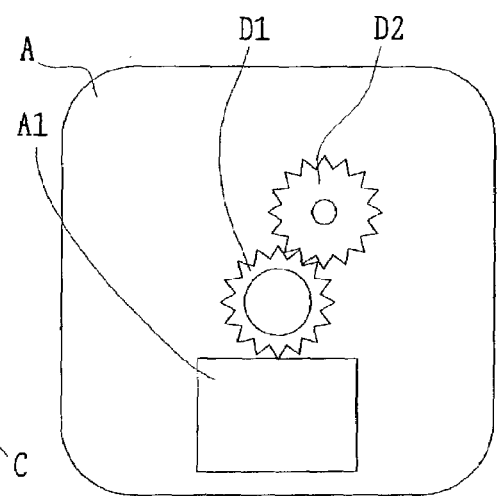
FIG. 88B is a view schematically showing the right side of the rotary focal-plane shutter of FIG. 88A.
Figure 89A:
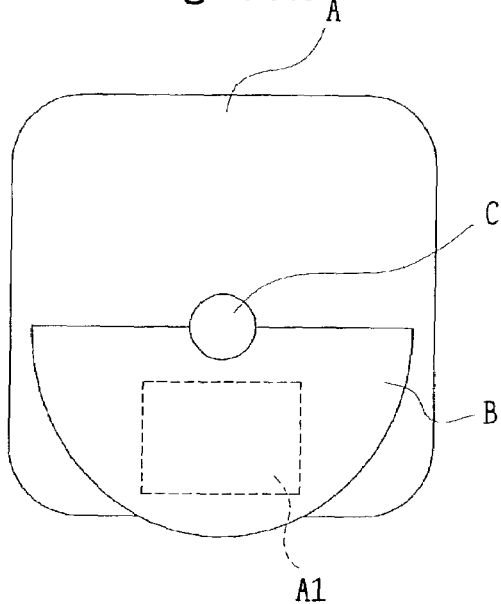
FIG. 89A is a view showing a state where an exposure aperture is completely covered by the blade of the rotary focal-plane shutter of FIG. 88A.
Figure 89B:
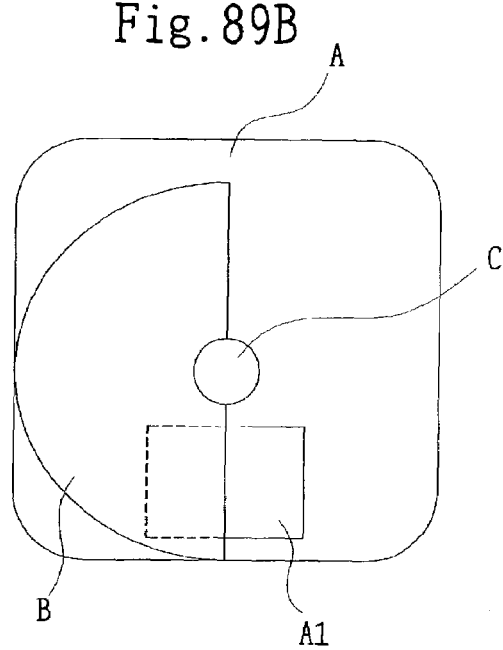
FIG. 89B is a view showing a state where the left half of the exposure aperture is covered by the blade of the rotary focal-plane shutter of FIG. 88A.
Figure 89C:
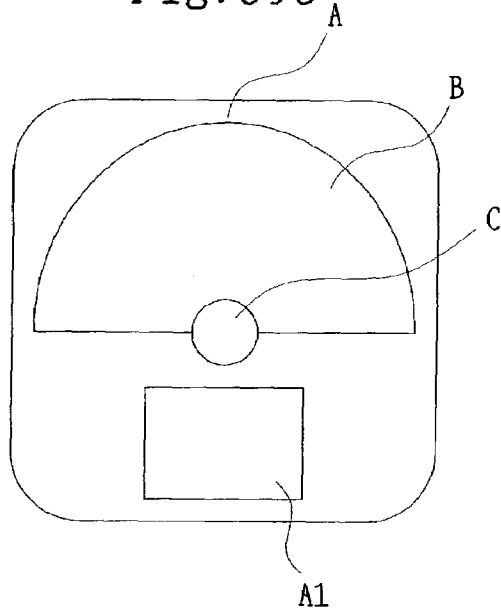
FIG. 89C is a view showing a state where the exposure aperture is fully opened by the blade of the rotary focal-plane shutter of FIG. 88A.
Figure 89D:
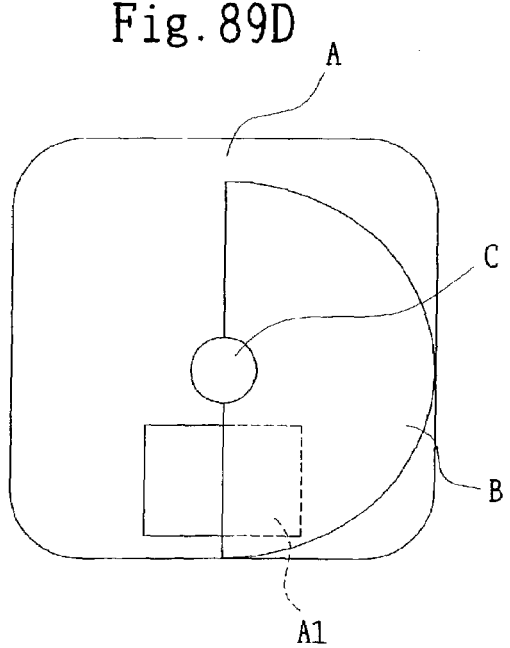
FIG. 89D is a view showing a state where the right half of the exposure aperture is covered by the blade of the rotary focal-plane shutter of FIG. 88A.

FIGS. 88A and 88B show an example of a rotary focal-plane shutter which is one focal-plane shutter adjusting the light-receiving time, applicable to the electronic imaging device of each embodiment in the present invention. FIGS. 89A–89D show states where a rotary shutter blade is turned.

In FIGS. 88A and 88B, reference symbol A represents a shutter base plate, B represents a rotary shutter blade, C represents a rotary shaft of the rotary shutter blade, and D1 and D2 represent gears.

The shutter base plate A is constructed so that it is placed immediately before the image plane, or on an arbitrary optical path, in the electronic imaging device of the present invention. The shutter base plate A is provided with an aperture A1 transmitting the effective light beam of the optical system. The rotary shutter blade B is configured into a semicircular shape. The rotary shaft C of the rotary shutter blade B is constructed integral with the rotary shutter blade B. The rotary shaft C is turned in regard of the shutter base plate A. The rotary shaft C is connected to the gears D1 and D2 provided on the right side of the shutter base plate A. The gears D1 and D2 are connected to a motor, not shown.

By the drive of the motor, not shown, the rotary shutter blade B is turned sequentially in the order of FIGS. 89A–89D, with the rotary shaft C as a center, through the gears D1 and D2 and the rotary shaft C.

The rotary shutter blade B is turned to thereby close and open the aperture A1 of the shutter base plate A, and plays the role of the shutter.

A shutter speed is adjusted by changing the turning speed of the rotary shutter blade B.

In the disclosure so far, reference has been made to the light-amount adjusting means. Such a shutter or variable transmittance filter is placed in each embodiment of the present invention, for example, at the sixteenth surface of each of the first and the eighth to fifteenth embodiments. The light-amount adjusting means may be located at another position if it is located at a position different from that of the aperture stop.

The electrooptical element may also be used as the shutter. This is more favorable for a reduction in the number of parts and compactness of the optical system.

Subsequently, a description is given of an example of a variable mirror applicable as a reflective optical component having the reflecting surface for bending the optical path in the zoom lens of the present invention.

Figure 90:
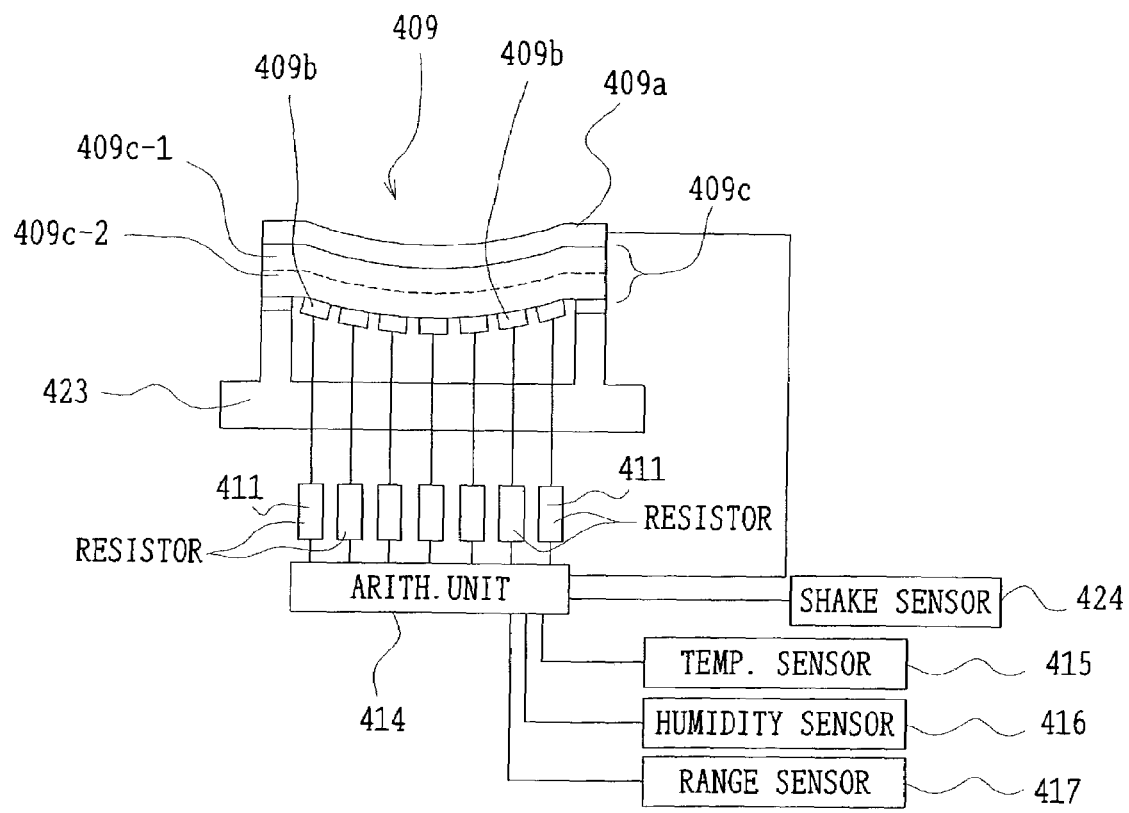
FIG. 90 is a view schematically showing one embodiment of a deformable mirror which is a reflective optical component used in the zoom lens of the present invention.

FIG. 90 shows one example of a deformable mirror 409 applicable as the reflective optical component having the reflecting surface for bending the optical path of the zoom lens of the present invention.

First, the basic construction of the deformable mirror 409 will be described.

The deformable mirror 409 refers to a variable optical-property deformable mirror (which is hereinafter simply called a deformable mirror) having a thin film (reflecting surface) 409 of an aluminum coating and a plurality of electrodes 409b. Reference numeral 411 denotes a plurality of variable resistors connected to the electrodes 409b, 414 denotes an arithmetical unit for controlling the resistance values of the plurality of variable resistors 411, and 415, 416, and 417 denote a temperature sensor, a humidity sensor, and a range sensor, respectively, connected to the arithmetical unit 414. These are arranged as shown in the figure to constitute one optical apparatus.

The deformable mirror need not necessarily be planar, and may have any shape such as a spherical or rotationally symmetrical aspherical surface; a spherical, planar, or rotationally symmetrical aspherical surface which has decentration with respect to the optical axis; an aspherical surface with symmetrical surfaces; an aspherical surface with only one symmetrical surface; an aspherical surface with no symmetrical surface; a free-formed surface; a surface with a nondifferentiable point or line; etc. Moreover, any surface which has some effect on light, such as a reflecting or refracting surface, is satisfactory. In general, such a surface is hereinafter referred as to an extended surface.

It is favorable that the profile of the reflecting surface of the deformable mirror is a free-formed surface. This is because correction for aberration can be facilitated, which is advantageous.

The free-formed surface used in the present invention is defined by the following equation. The Z axis in this defining equation constitutes an axis of the free-formed surface.

$$Z = cr^2 / \left[1 + \sqrt{\{1-(1+k)c^2r^2\}}\right] + \sum_{j=2}^{M} C_j X^m Y^n \quad (a)$$

where, the first term of this equation is a spherical surface term, and the second term is a free-formed surface term. M is a natural number of 2 or larer.

In the spherical surface term,
c: curvature of the vertex,
k: conic constant,
$r=\sqrt{(X^2+Y^2)}$ The free-formed surface term is as follows:

$$\sum_{j=2}^{M} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

where, $C_j$ (j is an integer of 2 or larger) is a coefficient.

The above-mentioned free-formed surface never generally has a symmetric surface for both the X-Z plane and the Y-Z plane. However, by bringing all odd-number order terms of X to 0, a free-formed surface having only one symmetrical surface parallel to the Y-Z plane is obtained. By bringing all odd-number order terms of Y to 0, a free-formed surface having only one symmetrical surface parallel to the X-Z plane is obtained.

Figure 91:
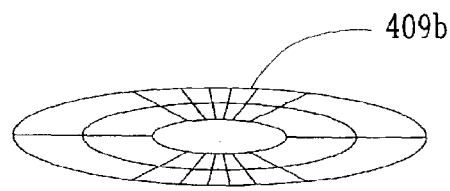
FIG. 91 is an explanatory view showing one aspect of electrodes used in the deformable mirror of FIG. 90.
Figure 92:
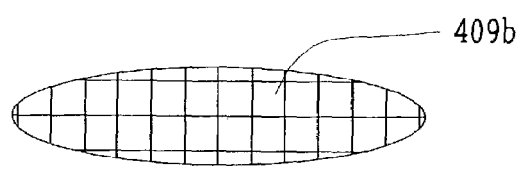
FIG. 92 is an explanatory view showing another aspect of electrodes used in the deformable mirror of FIG. 90.

In the deformable mirror of this example, as shown in FIG. 90, a piezoelectric element 409c is interposed between the thin film 409a and the plurality of electrodes 409b, and these are placed on the support 423. A voltage applied to the piezoelectric element 409c is changed in accordance with each of the electrodes 409b, and thereby the piezoelectric element 409c causes expansion and contraction which are partially different so that the shape of the thin film 409a can be changed. The configuration of the electrodes 409b, as illustrated in FIG. 91, may have a concentric division pattern, or as in FIG. 92, may be a rectangular division pattern. As other patterns, proper configurations can be chosen. In FIG. 90, reference numeral 424 represents a shake sensor connected to the arithmetical unit 414. The shake sensor 424, for example, detects the shake of a digital camera and changes the voltages applied to the electrodes 409b through the arithmetical unit 414 and variable resistors 411 in order to deform the thin film 409a to compensate for the blurring of an image caused by the shake. At this time, signals from the temperature sensor 415, the humidity sensor 416, and range sensor 417 are taken into account simultaneously, and focusing and compensation for temperature and humidity are performed. In this case, stress is applied to the thin film 409a by the deformation of the piezoelectric element 409c, and hence it is good practice to design the thin film 409a so that it has a moderate thickness and a proper strength.

Figure 93:
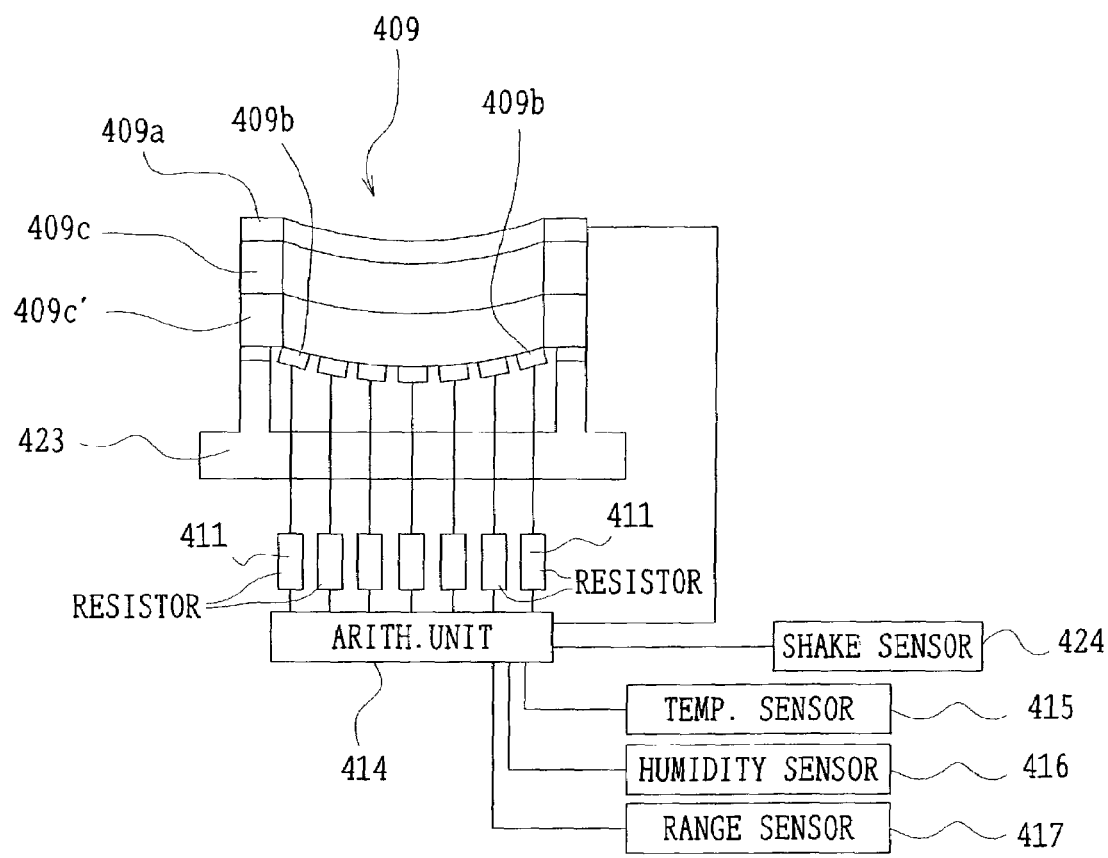
FIG. 93 is a view schematically showing another embodiment of the deformable mirror which is the reflective optical component used in the zoom lens of the present invention.

FIG. 93 shows another example of the deformable mirror 409 applicable as the reflective optical component having the reflecting surface for bending the optical path of the zoom lens of the present invention. The deformable mirror of this example has the same construction as the deformable mirror of FIG. 90 with the exception that two piezoelectric elements 409c and 409c' are interposed between the thin film 409a and the plurality of electrodes 409b and are made with substances having piezoelectric characteristics which are reversed in direction. Specifically, when the piezoelectric elements 409c and 409c' are made with ferroelectric crystals, they are arranged so that their crystal axes are reversed in direction with respect to each other. In this case, the piezoelectric elements 409c and 409c' expand or contract in a reverse direction when voltages are applied, and thus there is the advantage that a force for deforming the thin film (reflecting surface) 409a becomes stronger than in the example of FIG. 90, and as a result, the shape of the mirror surface can be considerably changed.

For substances used for the piezoelectric elements 409c and 409c', for example, there are piezoelectric substances such as barium titanate, Rochelle salt, quartz crystal, tourmaline, KDP, ADP, and lithium niobate; polycrystals or crystals of the piezoelectric substances; piezoelectric ceramics such as solid solutions of $PbZrO_3$ and $PbTiO_3$; organic piezoelectric substances such as PVDF; and other ferroelectrics. In particular, the organic piezoelectric substance has a small value of Young's modulus and brings about a considerable deformation at a low voltage, which is favorable. When these piezoelectric elements are used, it is also possible to properly deform the thin film 409a in each of the above examples if their thicknesses are made uneven.

As materials of the piezoelectric elements 409c and 409c', high-polymer piezoelectrics such as polyurethane, silicon rubber, acrylic elastomer, PZT, PLZT, and PVDF; vinylidene cyanide copolymer; and copolymer of vinylidene fluoride and trifluoroethylene are used.

The use of an organic substance, synthetic resin, or elastomer, having a piezoelectric property, brings about a considerable deformation of the surface of the deformable mirror, which is favorable.

Figure 94:
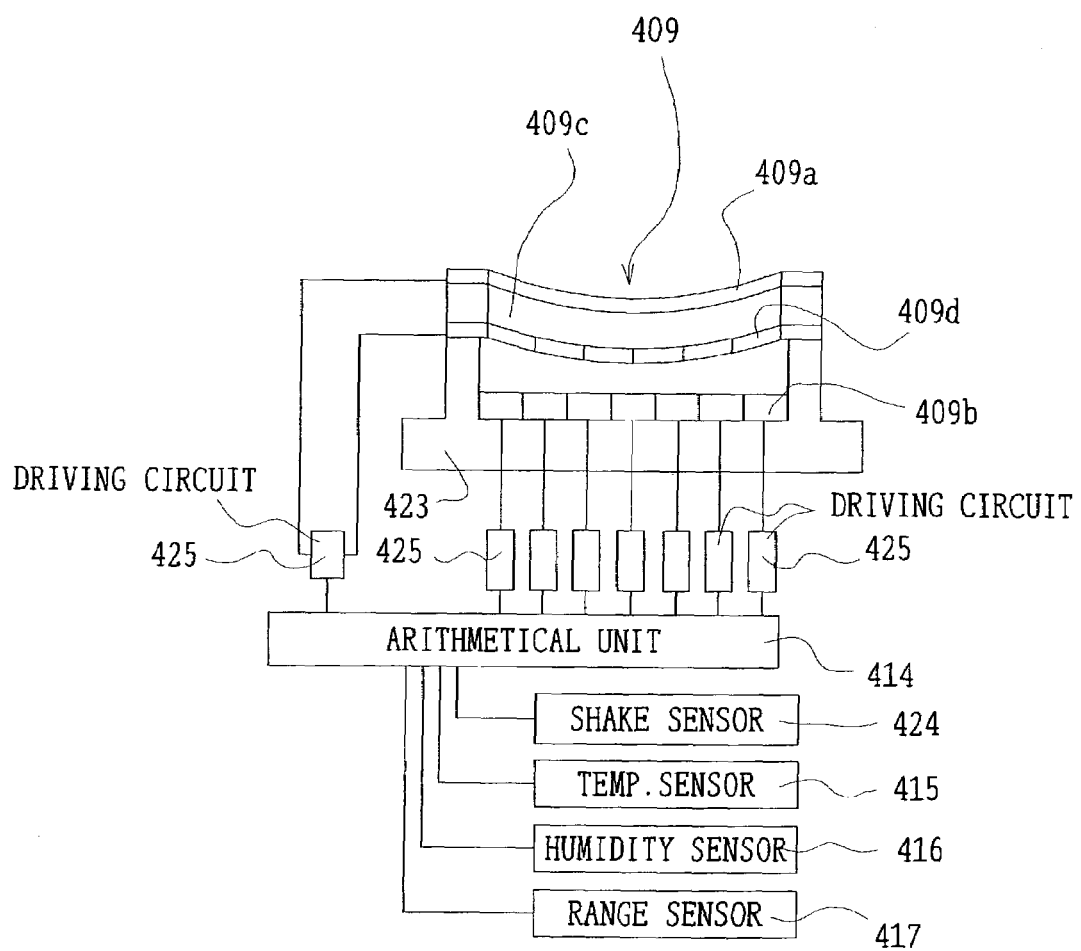
FIG. 94 is a view schematically showing still another embodiment of the deformable mirror which is the reflective optical component used in the zoom lens of the present invention.

When an electrostrictive substance, for example, acrylic elastomer or silicon rubber, is used for the piezoelectric element 409c shown in FIGS. 90 and 94, the piezoelectric element 409c, as indicated by a broken line in FIG. 90, may have the two-layer structure in which a substrate 409c-1 is cemented to an electrostrictive substance 409c-2.

FIG. 94 shows still another example of the deformable mirror 409 applicable as the reflective optical component having the reflecting surface for bending the optical path of the zoom lens of the present invention. The deformable mirror of this example is designed so that the piezoelectric element 409c is sandwiched between the thin film 409a and a plurality of electrodes 409d, and these are placed on the support 423. Voltages are applied to the piezoelectric element 409c between the thin film 409a and the electrodes 409d through a driving circuit 425a controlled by the arithmetical unit 414. Furthermore, apart from this, voltages are also applied to the plurality of electrodes 409b provided on a bottom surface inside the support 423, through driving circuits 425b controlled by the arithmetical unit 414. Therefore, the thin film 409a can be doubly deformed by electrostatic forces due to the voltages applied between the thin film 409a and the electrodes 409d and applied to the electrodes 409b. There are advantages that various deformation patterns can be provided and the response is quick, compared with any of the above examples.

By changing the signs of the voltages applied between the thin film 409a and the electrodes 409d, the thin film 409a of the deformable mirror 409 can be deformed into either a convex or concave surface. In this case, a considerable deformation may be performed by a piezoelectric effect, while a slight shape change may be carried out by the electrostatic force. Alternatively, the piezoelectric effect may be chiefly used for the deformation of the convex surface, while the electrostatic force may be used for the deformation of the concave surface. Also, the electrodes 409d may be constructed as a single electrode or a plurality of electrodes like the electrodes 409b. The condition of electrodes 409d constructed as the plurality of electrodes is shown in FIG. 94. In the description, all of the piezoelectric effect, the electrostrictive effect, and electrostriction are generally called the piezoelectric effect. Thus, it is assumed that the electrostrictive substance is included in the piezoelectric substance.

Figure 95:
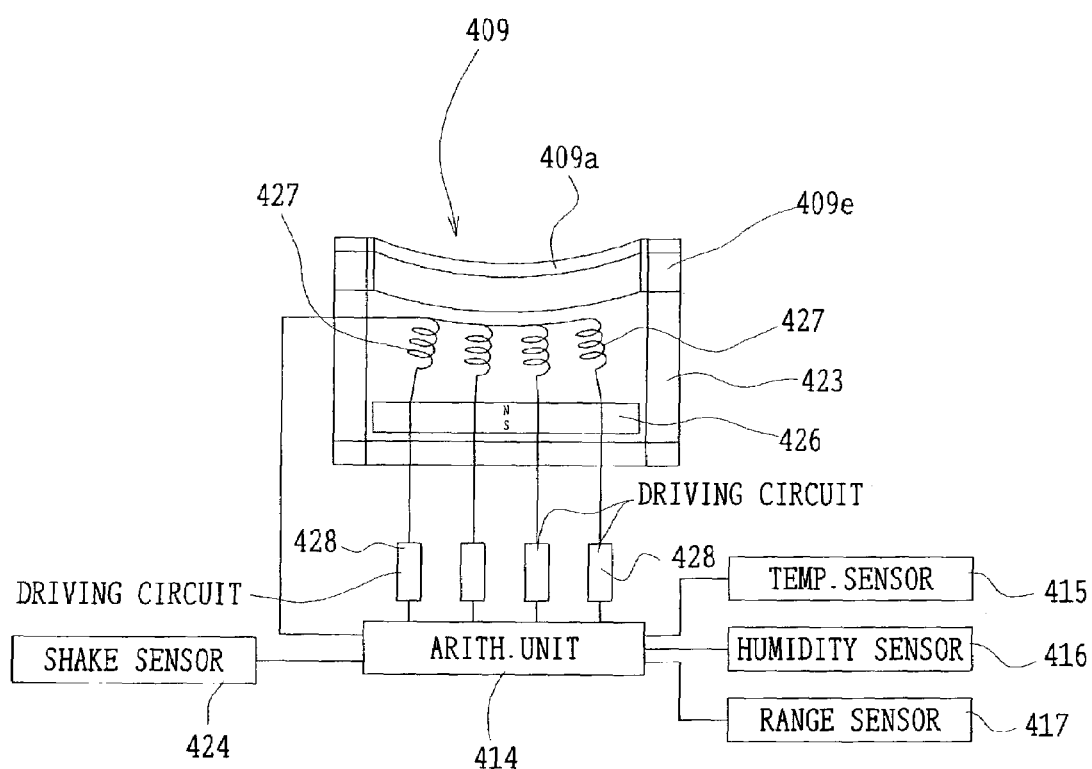
FIG. 95 is a view schematically showing a further embodiment of the deformable mirror which is the reflective optical component used in the zoom lens of the present invention.

FIG. 95 shows another embodiment of the deformable mirror 409 applicable as the reflective optical component having the reflecting surface for bending the optical path of the zoom lens of the present invention. The deformable mirror 409 of this embodiment is designed so that the shape of the reflecting surface can be changed by utilizing an electromagnetic force. A permanent magnet 426 is fixed on the bottom surface inside the support 423, and the periphery of a substrate 409e made with silicon nitride or polyimide is mounted and fixed on the top surface thereof. The thin film 409a with the coating of metal, such as aluminum, is deposited on the surface of the substrate 409e, thereby constituting the deformable mirror 409. Below the substrate 409e, a plurality of coils 427 are fixedly mounted and connected to the arithmetical unit 414 through driving circuits 428. In accordance with output signals from the arithmetical unit 414 corresponding to changes of the optical system obtained at the arithmetical unit 414 by signals from the sensor 415, 416, 417, and 424, proper electric currents are supplied from the driving circuits 428 to the coils 427. At this time, the coils 427 are repelled or attracted by the electromagnetic force with the permanent magnet 426 to deform the substrate 409e and the thin film 409a.

In this case, a different amount of current can also be caused to flow through each of the coils 427. A single coil 427 may be used. The permanent magnet 426 may be mounted on the lower surface of the substrate 409e so that the coils 427 are arranged on the bottom side in the support 423. It is desirable that the coils 427 are constructed as thin film coils by a lithography process. A ferromagnetic iron core may be encased in each of the coils 427.

Figure 96:
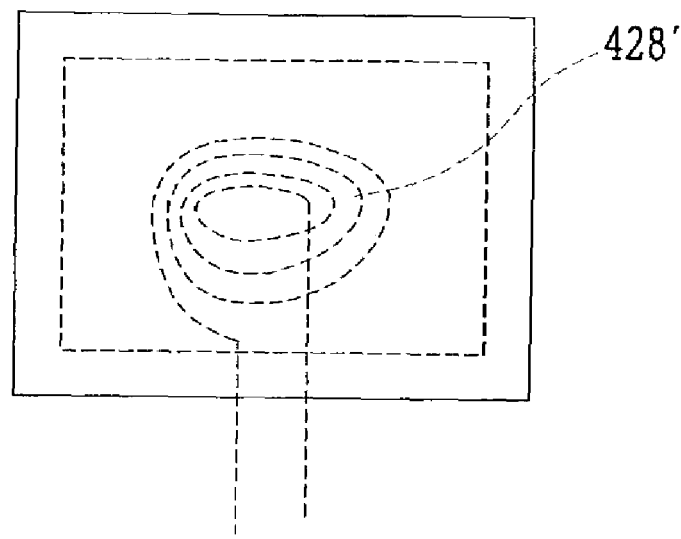
FIG. 96 is an explanatory view showing the winding density of a coil in the embodiment of FIG. 95.

In the thin film coils, each of the coils 427, as illustrated in FIG. 96, can be designed so that a coil density varies with the place of the lower surface of the substrate 409e, like a coil 428', and thereby a desired deformation is brought to the substrate 409e and the thin film 409a. A single coil 427 may be used, or a ferromagnetic iron core may be encased in each of the coils 427.

Figure 97:
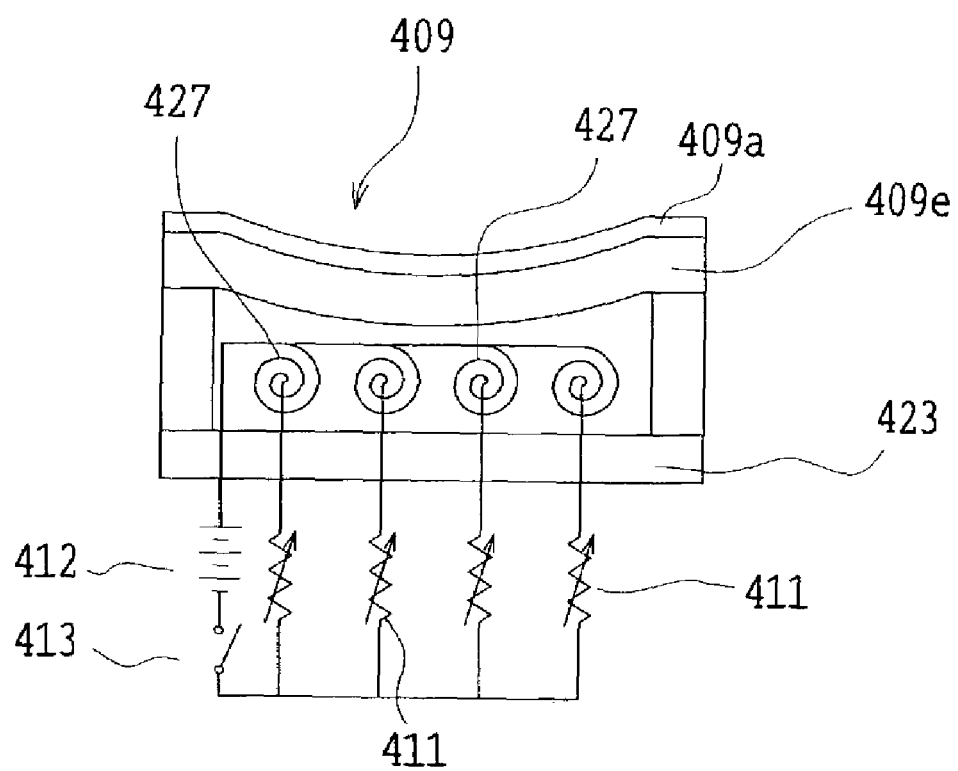
FIG. 97 is a view schematically showing another embodiment of the deformable mirror which is the reflective optical component used in the zoom lens of the present invention.

FIG. 97 shows another example of the deformable mirror 409 applicable as the reflective optical component having the reflecting surface for bending the optical path of the zoom lens of the present invention. In this figure, reference numeral 412 designates a power supply.

Figure 98:
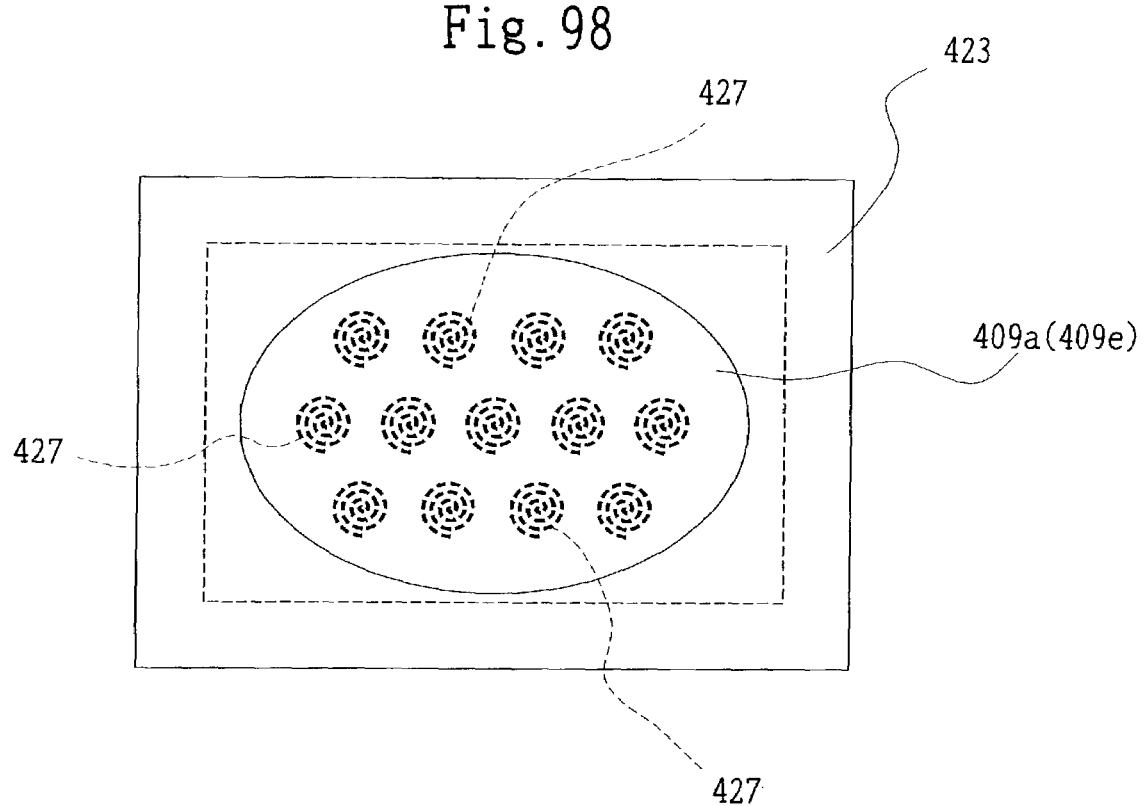
FIG. 98 is an explanatory view showing one example of an array of coils in the embodiment of FIG. 97.
Figure 99:
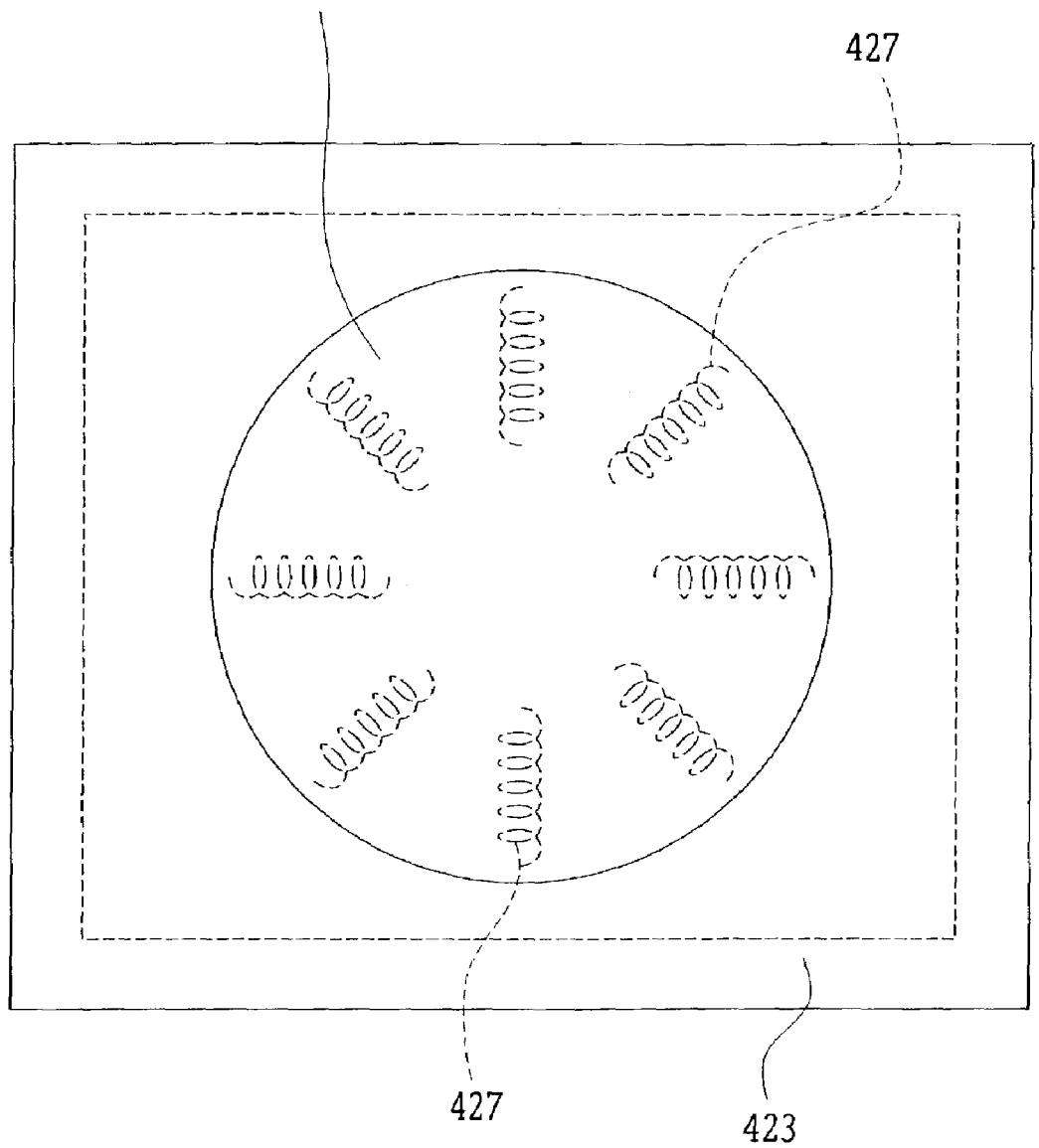
FIG. 99 is an explanatory view showing another example of an array of coils in the embodiment of FIG. 97.
Figure 100:
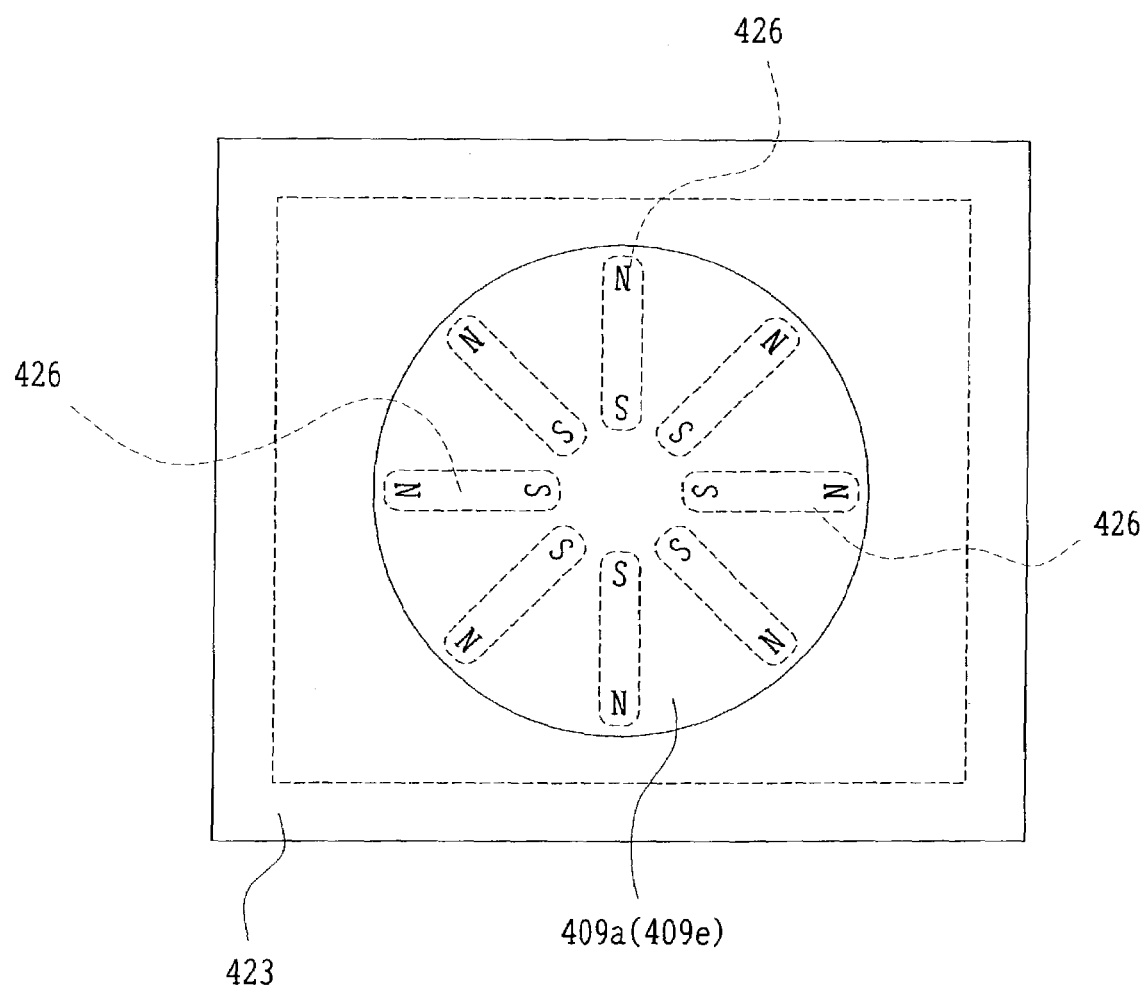
FIG. 100 is an explanatory view showing an array of permanent magnets suitable for the array of coils of FIG. 99 in the embodiment of FIG. 95.

In the deformable mirror 409 of this example, the substrate 409e is made with a ferromagnetic such as iron, and the thin film 409a as a reflecting film is made with aluminum. The periphery of the substrate 409e is mounted and fixed on the top surface of the support 423. The coils 427 are fixed on the bottom side in the support 423. In this case, since the thin film coils need not be provided beneath the substrate 409e, the structure is simple and the manufacturing cost can be reduced. If the power switch 413 is replaced with a changeover and power on-off switch, the directions of currents flowing through the coils 427 can be changed, and the configurations of the substrate 409e and the thin film 409a can be changed at will. FIG. 98 shows an example of an array of the coils 427 arranged with respect to the thin film 409a and the substrate 409e. FIG. 99 shows another example of the array of the coils 427. These arrays are also applicable to the example of FIG. 95. FIG. 100 shows an array of the permanent magnets 426 suitable for the case where the coils 427, as shown in FIG. 99, are radially arrayed. Specifically, when the bar-shaped permanent magnets 426, as shown in FIG. 100, are radially arrayed, a delicate deformation can be provided to the substrate 409e and the thin film 409a in contrast with the example of FIG. 95. As mentioned above, when the electromagnetic force is used to deform the substrate 409e and the thin film 409a (in the examples of FIGS. 95 and 97), there is the advantage that they can be driven at a lower voltage than in the case where the electrostatic force is used.

Some examples of the deformable mirrors have been described, but as shown in the example of FIG. 94, at least two kinds of forces may be used in order to change the shape of the mirror constructed with a thin film. Specifically, at least two of the electrostatic force, electromagnetic force, piezoelectric effect, magnetostriction, pressure of a fluid, electric field, magnetic field, temperature change, and electromagnetic wave, may be used simultaneously to deform the deformable mirror. That is, when at least two different driving techniques are used to make the variable optical-property element, a considerable deformation and a slight deformation can be realized simultaneously and a mirror surface with a high degree of accuracy can be obtained.

Figure 101:
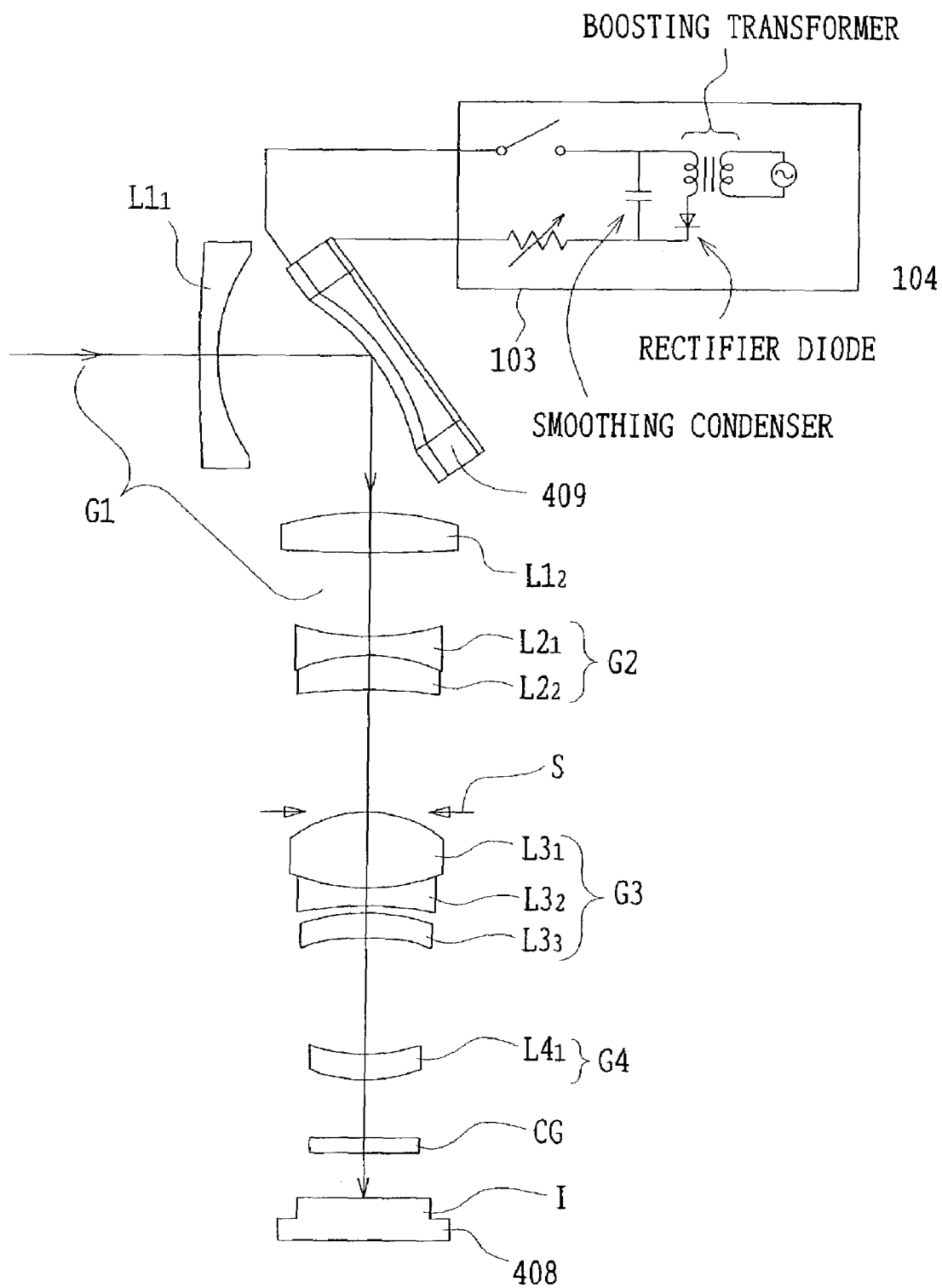
FIG. 101 is a view schematically showing an imaging system which uses the deformable mirror applicable as the reflective optical component having a reflecting surface for bending the optical path of the zoom lens in another embodiment of the present invention, for example, an imaging system used in a digital camera of a cellular phone, a capsule endoscope, an electronic endoscope, a digital camera for personal computers, or a digital camera for PDAs.

FIG. 101 shows an imaging system which uses the deformable mirror 409 applicable as the reflective optical component having the reflecting surface for bending the optical path of the zoom lens in another example of the present invention and is used, for example, in a digital camera of a cellular phone, a capsule endoscope, an electronic endoscope, a digital camera for personal computers, or a digital camera for PDAs.

In the imaging optical system of this example, the reflective optical component R1 in the optical system shown in the first embodiment is constructed as the deformable mirror 409. One imaging unit 104 is constructed with the zoom lens, the CCD 408 which is the electronic image sensor, and a control system 103. The imaging unit 104 of this example is designed so that light from an object passing through the negative meniscus lens $L1_1$ with a convex surface directed toward the object side is condensed by the deformable mirror 409 when reflected by the thin film (reflecting surface) of the deformable mirror 409, and is imaged on the CCD 408 which is the solid-state image sensor, through the biconvex positive lens $L1_2$, the second lens unit G2, the third lens unit G3, the fourth lens unit G4, and the CCD cover glass CG. The deformable mirror 409 is a kind of variable optical-property element and is also referred to as a variable focal-length mirror.

According to this example, even when the object distance is changed, the reflecting surface 409a of the deformable mirror 409 is deformed and thereby the object can be brought into a focus. The example need not move the lens 902 by using a motor and excels in compact and lightweight design and low power consumption. The imaging unit 104 can be used in any of the examples as the imaging optical system of the present invention. When a plurality of deformable mirrors 409 are used, an optical system, such as a zoom imaging optical system or a variable magnification imaging optical system, can be constructed.

In FIG. 32, an example of a control system is cited which includes the boosting circuit of a transformer using coils in the control system 103. When a laminated piezoelectric transformer is particularly used, a compact design is achieved. The boosting circuit can be used in the deformable mirror of the present invention which uses electricity, and is useful in particular for the deformable mirror which utilizes the electrostatic force or the piezoelectric effect. In order to use the deformable mirror 409 for focusing, it is only necessary, for example, to form an object image on the solid-state image sensor 408 and to find a state where the high-frequency component of the object image is maximized while changing the focal length of the deformable mirror 409. In order to detect the high-frequency component, it is only necessary, for example, to connect a processor including a microcomputer to the solid-state image sensor 408 and to detect the high-frequency component therein.

The electronic imaging device using such a path bending zoom lens in the present invention can be used in the imaging device in which an object image is formed by the imaging optical system such as the zoom lens, and this image is received by an image-forming element, such as the CCD or a silver halide film, to photograph, notably in a digital camera, a video camera, a personal computer or a telephone which is an example of an information processor, or a cellular phone which is handy to carry. Its embodiment is shown below.

Figure 102:
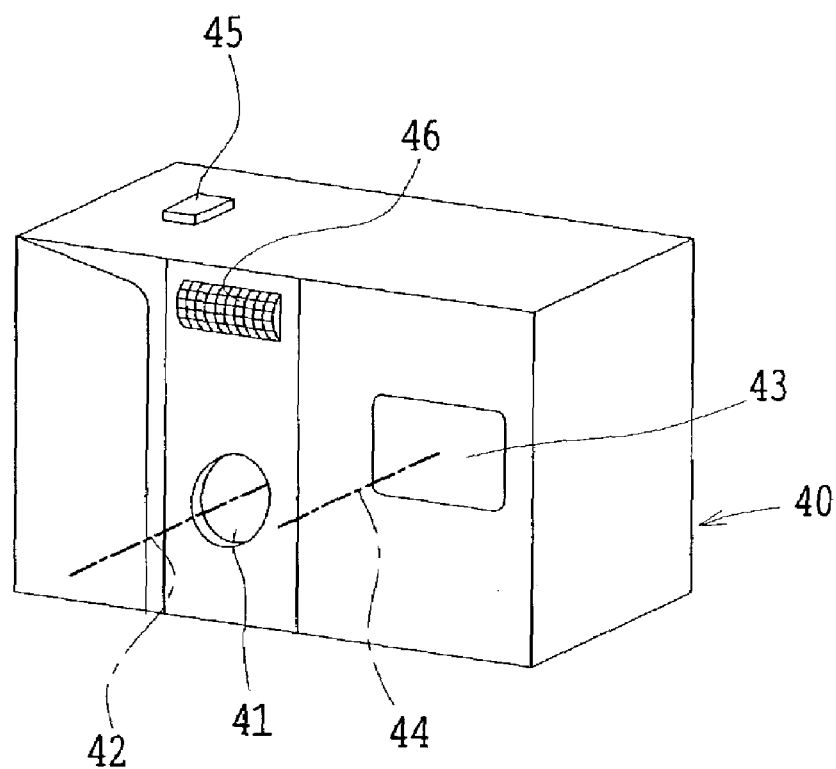
FIG. 102 is a perspective front view showing a digital camera incorporating the zoom lens of the present invention in a photographing optical system.
Figure 103:
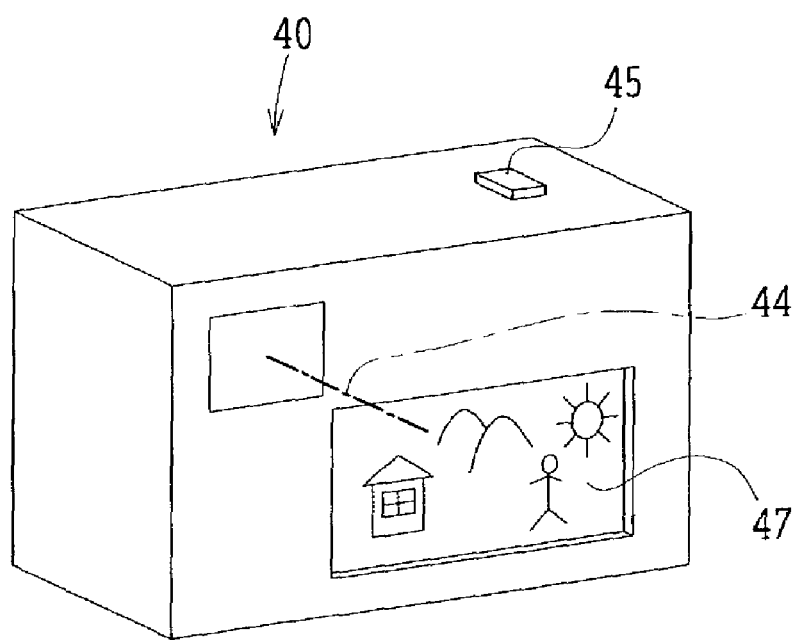
FIG. 103 is a perspective rear view showing the digital camera of FIG. 102.
Figure 104:
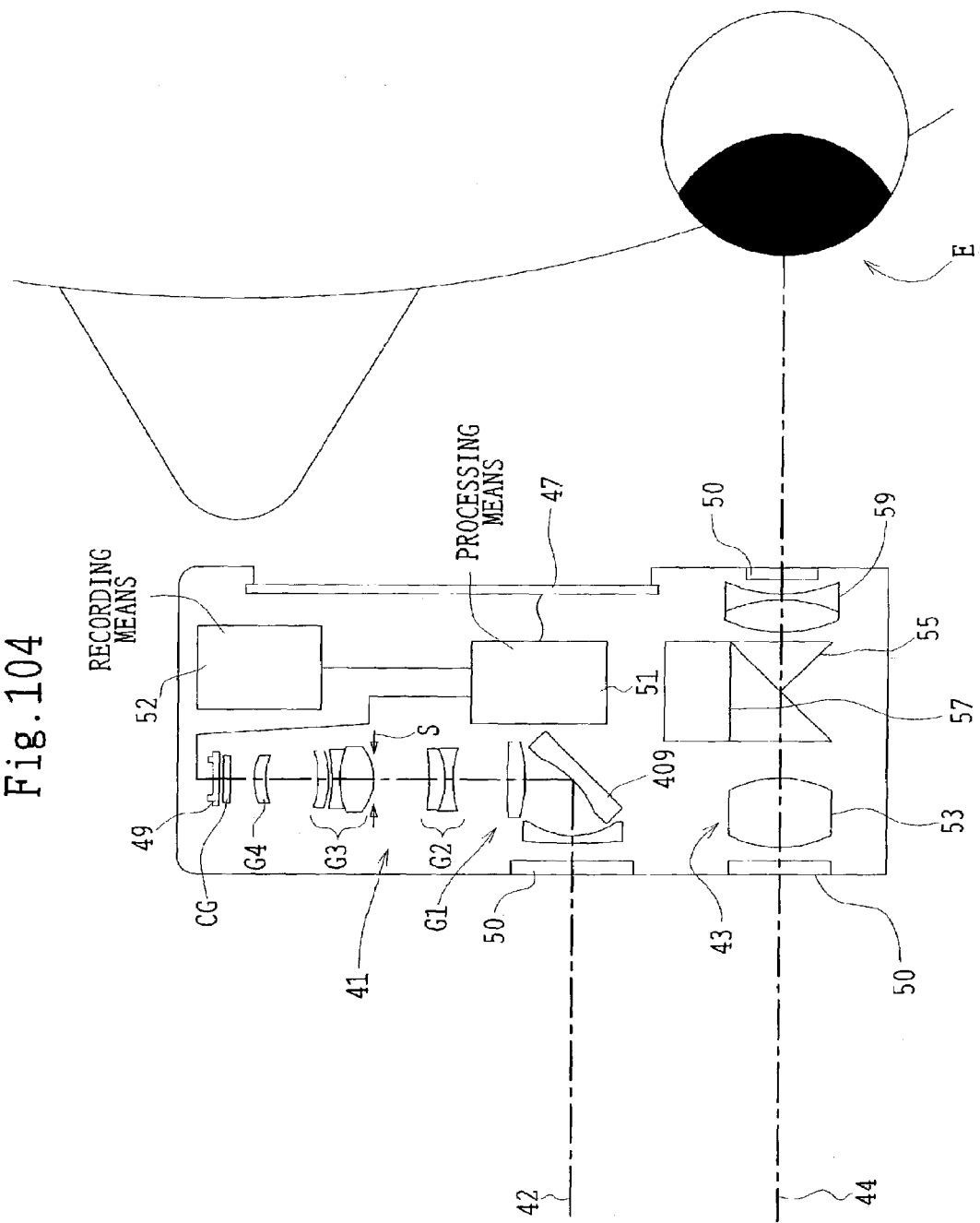
FIG. 104 is a sectional view showing the internal structure of the digital camera of FIG. 102.

FIGS. 102–104 show a digital camera in which the path bending zoom lens of the present invention is incorporated in a photographing optical system 41. In the digital camera of FIG. 104, an imaging optical path is bent in a longitudinal direction of a finder, and an observer's eye viewed from the upper side is shown.

A digital camera 40, in this example, includes the photographing optical system 41 having a photographing optical path 42, a finder optical system 43 having a finder optical path 44, a shutter 45, a flash lamp 46, and a liquid crystal display monitor 47. When the shutter 45 provided on the upper portion of the camera 40 is pushed, photographing is performed through the photographing optical system 41, for example, the path bending zoom lens of the first embodiment.

An object image formed by the photographing optical system 41 is provided on the imaging plane of a CCD 49 through the nearinfrared cutoff coat applied to the nearinfrared cutoff filter, the CCD cover glass, or another lens.

The object image received by the CCD 49 is displayed on the liquid crystal display monitor 47 provided on the back face of the camera as an electronic image through a processing means 51. A recording means 52 is connected to the processing means 51 and a photographed electronic image can be recorded. Also, the recording means 52 may be provided to be independent of the processing means 51, or may be constructed so that the image is electronically recorded and written by a floppy (trademark) disk, memory card, or MO. A silver halide film camera using a silver halide film instead of the CCD 49 may be employed.

A finder objective optical system 53 is located on the finder optical path 44. An object image formed by the finder objective optical system 53 is provided on a field frame 57 of a Porro prism 55 which is an image erecting member. Behind the Porro prism 55, an eyepiece optical system 59 introducing an erect image into an observer's eye E is located. Also, cover members 50 are placed on the entrance side of the photographing optical system 41 and the finder objective optical system 53 and on the exit side of the eyepiece optical system 59.

The digital camera 40 constructed as mentioned above has an effect on a slim design thereof by bending the optical path in the direction of the major side. Since the photographing optical system 41 is a zoom lens which has a wide field angle and a high variable magnification ratio, is favorable in aberration and bright, and is provided with a long back focal distance that the filter can be placed, high performance and a cost reduction can be realized.

Also, the photographing optical path of the digital camera 40 may be bent in the direction of the minor side of the finder. In this case, a stroboscopic lamp (or the flash lamp) is placed in the upper direction of the entrance surface of a photographic lens to bring about the layout that the influence of shading caused in strobo-photography of a person can be lessened.

In FIG. 104, plane-parallel plates are used as the cover members 50, but lenses with powers may be used.

Figure 105:
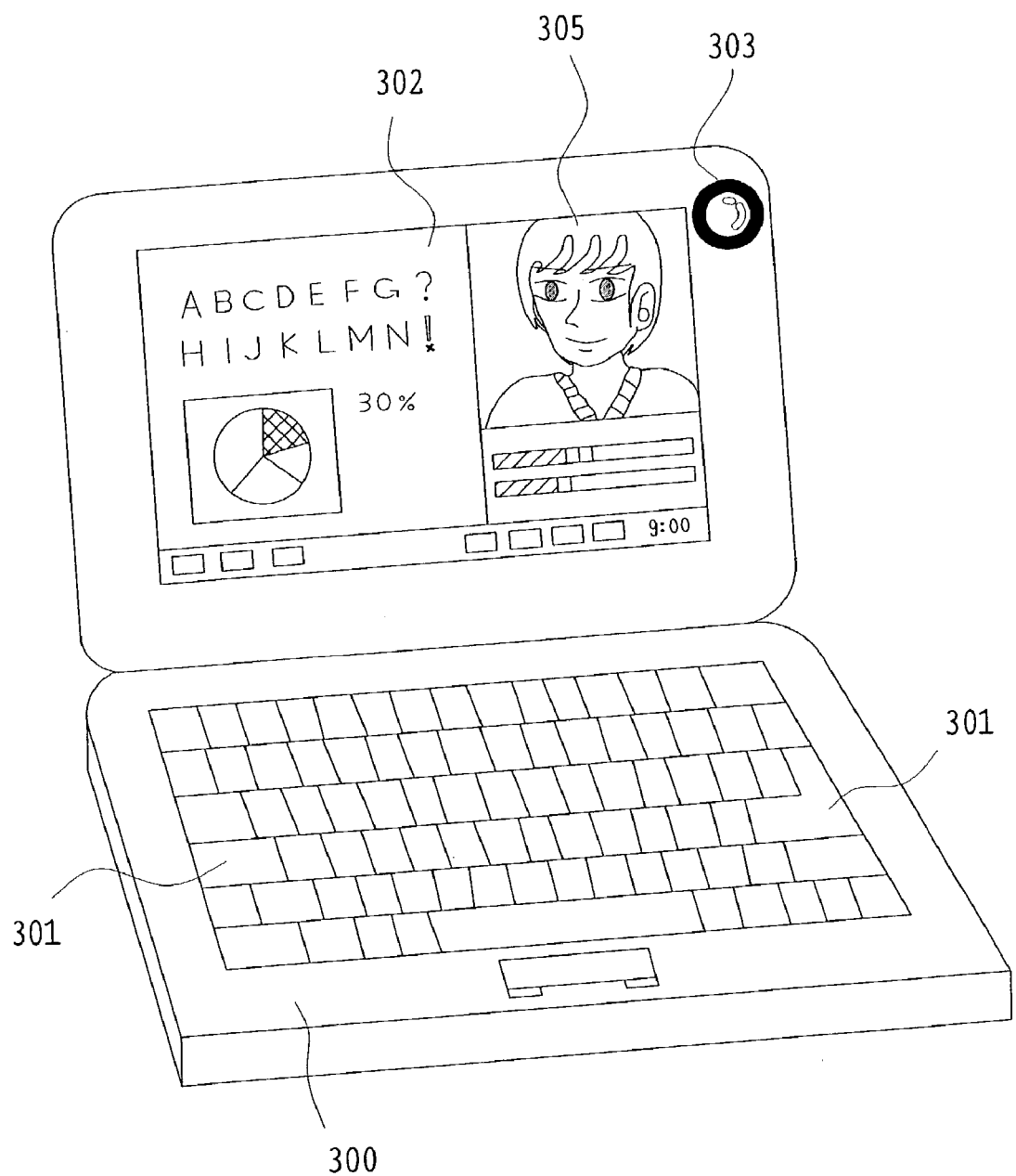
FIG. 105 is a perspective front view showing a personal computer in which the zoom lens of the present invention is incorporated as an objective optical system.
Figure 106:
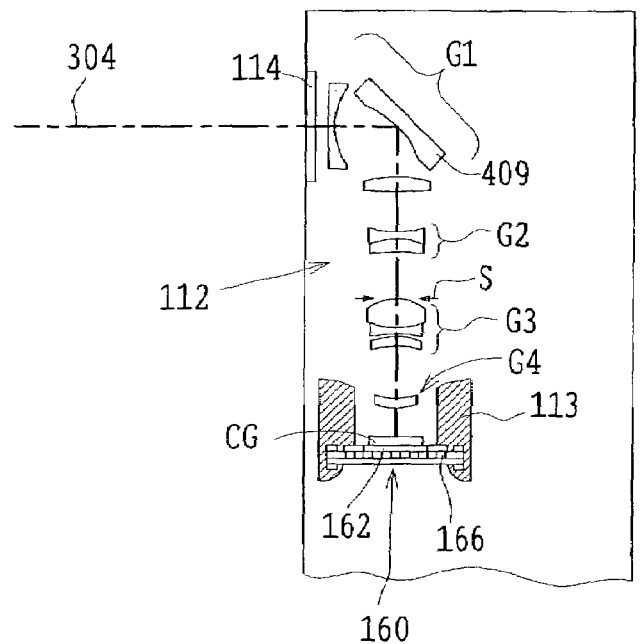
FIG. 106 is a sectional view showing the photographing optical system incorporated in the personal computer of FIG. 105.
Figure 107:
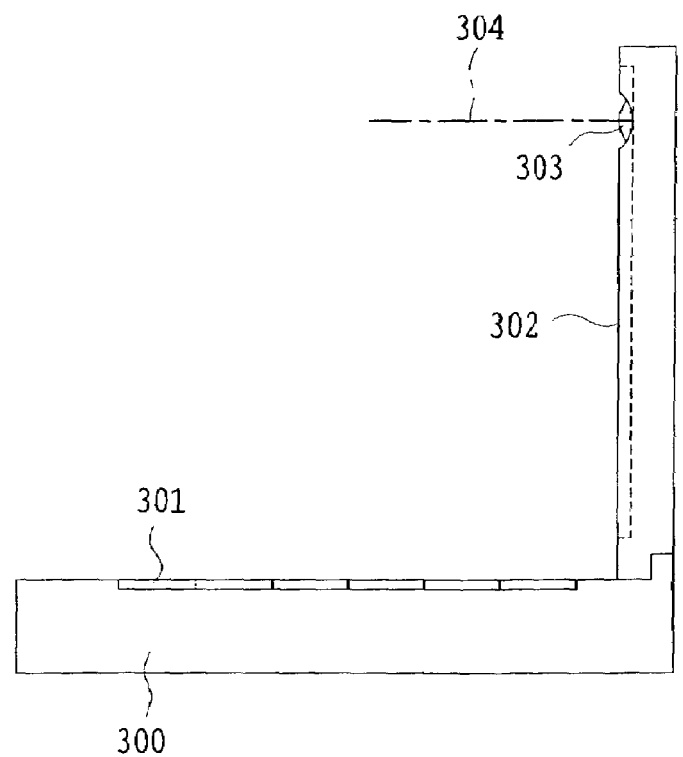
FIG. 107 is a side view showing the personal computer of FIG. 105.

Subsequently, a personal computer of an example of an information processor in which the path bending zoom lens is incorporated as the objective optical system is shown in FIGS. 105–107.

As shown in FIGS. 105–107, a personal computer 300 has a keyboard 301 for inputting information from the exterior by an operator; an information processing means or recording means, not shown; a monitor 302 displaying information for the operator, and an photographing optical system 303 for photographing the operator himself or a surrounding image.

Here, the monitor 302 may be a transmission-type liquid crystal display element illuminated with backlight from the back face, a reflection-type liquid crystal display element reflecting light from the front for display, or a CRT display. In these figures, the photographing optical system 303 is housed in the monitor 302 upper-right, but it may be located, not to speak of this place, on the periphery of the monitor 302 or the keyboard 301.

The photographing optical system 303 has an objective lens 112 including, for example, the path bending zoom lens of the first embodiment of the present invention and an imaging element chip 162 receiving an image. These are housed in the personal computer 300.

Here, the cover glass CG is additionally cemented to the chip 162, and these are integrally constructed as an imaging unit 160, which is fitted into the rear end of a lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, a cover glass 114 for protecting the objective lens 112 is placed. Also, the driving mechanism of the zoom lens in the lens frame 113 is not shown in the figure.

An object image received by the chip 162 is input into the processing means of the personal computer 300 through a terminal 166 and is displayed as an electronic image on the monitor 302. In FIG. 105, a photographed image 305 of the operator is shown as an example. The image 305 can also be displayed on the personal computer of his communication mate from a remote place, by the processing means, through the internet or the telephone.

Figure 108A:
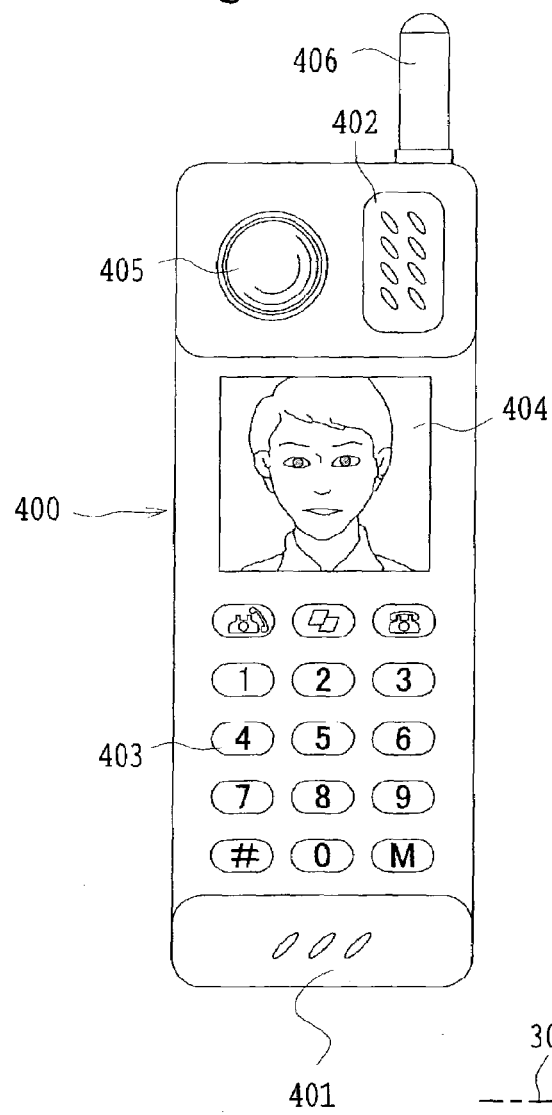
FIG. 108A is a front view showing a cellular phone which has the photographing optical system incorporating the zoom lens of the present invention.
Figure 108B:
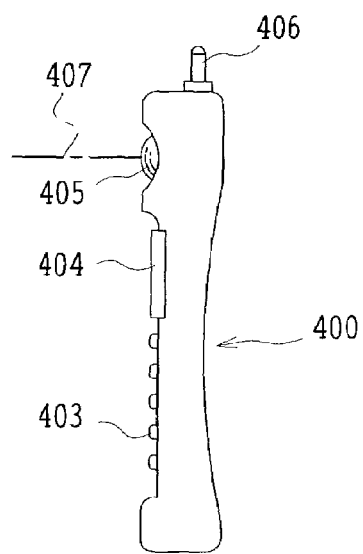
FIG. 108B is side view showing the cellular phone of FIG. 108A.
Figure 108C:
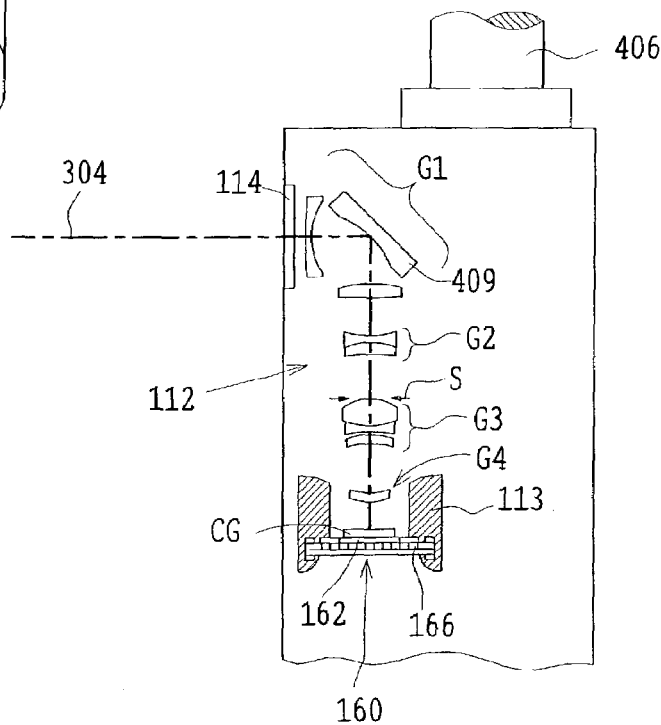
FIG. 108C is a sectional view showing the photographing optical system housed in the cellular phone of FIG. 108A.

FIGS. 108A–108C show a telephone which is an example of the information processor in which the path bending zoom lens of the present invention is housed as the photographing optical system, notably a cellular phone which is handy to carry.

A cellular phone 400, as shown in FIGS. 108A–108C, includes a microphone section 401 inputting an operator's voice as information; a speaker section 402 outputting the voice of a communication mate; input dials 403 in which an operator inputs information; a monitor 404 displaying information, such as photographing images of the operator himself and the communication mate, and telephone numbers; a photographing optical system 405; an antenna 406 transmitting and receiving electric waves for communication; and a processing means (not shown) processing image information, communication information, and an input signal. Here, the monitor 404 is a liquid crystal display element. In these figures, the arrangement of individual parts is not limited to the above description. The photographing optical system 405 has the objective lens 112 including, for example, the path bending zoom lens of the first embodiment in the present invention, located on a photographing optical path 407, and the chip 162 receiving the object image. These are incorporated in the cellular phone 400.

Here, the cover glass CG is additionally cemented to the chip 162, and these are integrally constructed as the imaging unit 160, which is fitted into the rear end of the lens frame 113 of the objective lens 112 and can be mounted in a single operation. Therefore, the alignment of the objective lens 112 and the chip 162 and the adjustment of face-to-face spacing are not required, and assembly is simple. At the top (not shown) of the lens frame 113, the cover glass 114 for protecting the objective lens 112 is placed. Also, the driving mechanism of the zoom lens in the lens frame 113 is not shown in the figure.

An object image received by the chip 162 is input into the processing means, not shown, through the terminal 166 and is displayed as the electronic image on either the monitor 404 or the monitor of the communication mate, or both. Also, the processing means includes a signal processing function that when the image is transmitted to the communication mate, the information of the object image received by the chip 162 is converted into a transmittable signal.

What is claimed is:

1. A zoom lens comprising:
   a most object-side lens unit located at a most object-side position, remaining fixed on an optical axis when a magnification of the zoom lens is changed and a focusing operation is performed;
   a most image-side lens unit located at a most image-side position, remaining fixed on the optical axis when the focusing operation is performed; and
   moving lens units lying between the most object-side lens unit and the most image-side lens unit, moved along the optical axis when the magnification is changed,
   the most object-side lens unit comprising, in order from an object side, a negative lens component, a reflective optical component having a reflecting surface for bending an optical path, and a positive lens component, and
   the most image-side lens unit having at least one aspherical surface.

2. A zoom lens according to claim 1, satisfying the following conditions:

$$1.0 < -f11/\sqrt{(fw \cdot fT)} < 2.5$$

$$1.4 < -f12/\sqrt{(fw \cdot fT)} < 3.2$$

where f11 is a focal length of the negative lens component in the most object-side lens unit, f12 is a focal length of the positive lens component in the most object-side lens unit, fw is a focal length of an entire system at a wide-angle position of the zoom lens, and fT is a focal length of an entire system at a telephoto position of the zoom lens.

3. A zoom lens according to claim 2, wherein the negative lens component of the most object-side lens unit is constructed with a single negative lens and satisfies the following conditions:

$$26 < \nu 1N$$

$$-0.15 < \sqrt{(fw \cdot fT)} < 0.5$$

where ν1N is an Abbe's number, at the d line, of a medium of the single negative lens of the most object-side lens unit and f1 is a focal length of the most object-side lens unit.

4. A zoom lens according to claim 1, wherein the negative lens component of the most object-side lens unit has an aspherical surface.

5. A zoom lens according to claim 4, satisfying the following condition:

$$-2.0 < (R_{1PF} + R_{1PR})/(R_{1PF} - R_{1PR}) < 1.0$$

where $R_{1PF}$ is a radius of curvature, on the optical axis, of an object-side surface of the positive lens component of the most object-side lens unit and $R_{1PR}$ is a radius of curvature, on the optical axis, of an image-side surface of the positive lens component of the most object-side lens unit.

6. A zoom lens comprising, in order from an object side:
   a first lens unit having a reflective optical component with a reflecting surface for bending an optical path, as a most object-side lens unit remaining fixed when a magnification is changed;
   a second lens unit with negative refracting power, constructed as a first moving lens unit moved along an optical axis when the magnification is changed;
   a third lens unit with positive refracting power, constructed as a second moving lens unit moved along the optical axis when the magnification is changed; and
   a most image-side lens unit located at a most image-side position,
   the second lens unit being moved back and forth along the optical axis to follow a path convex toward an image side when the magnification is changed from a wide-angle position to a telephoto position.

7. A zoom lens according to claim 6, wherein the second lens unit is shifted to the object side in focusing on a short-distance object point.

8. A zoom lens according to claim 7, satisfying the following condition:

$$0.16 < D12\min/\sqrt{(fw \cdot fT)} < 0.26$$

where D12min is a minimum value of distance available between the first lens unit and the second lens unit under a condition where an infinite object point is in focus, fw is a focal length of an entire system at the wide-angle position of the zoom lens, and fT is a focal length of an entire system at the telephoto position of the zoom lens.

9. A zoom lens according to claim 6, wherein a fourth lens unit moved along the optical axis in focusing on a short-distance object point is interposed between the third lens unit and the most image-side lens unit.

10. A zoom lens according to claim 9, satisfying the following condition:

$$1.0 < |fF|/\sqrt{(fw \cdot fT)} < 6.0$$

where fF is a focal length of the fourth lens unit, fw is a focal length of an entire system at the wide-angle position of the zoom lens, and fT is a focal length of an entire system at the telephoto position of the zoom lens.

11. A zoom lens according to claim 6, wherein the third lens unit comprises a cemented lens component composed of a positive lens element and a negative lens element, and a single lens component, and is moved toward only the object side when the magnification is changed from the wide-angle position to the telephoto position.

12. A zoom lens according to claim 6, wherein the first lens unit has positive refracting power, the third lens unit is moved toward only the object side when the magnification is changed from the wide-angle position to the telephoto position, and the most image-side lens unit has an aspherical surface and remains fixed when the magnification is changed.

13. A zoom lens according to claim 6, satisfying the following conditions:

$$0.3 < -\beta Rw < 0.8$$

$$0.8 < fRw/\sqrt{(fw \cdot fT)} < 1.8$$

where βRw is a combined magnification of the third lens unit and a lens unit subsequent thereto at the wide-angle position under a condition where an infinite object point is in focus, fRw is a combined focal length of the third lens unit and the lens unit subsequent thereto at the wide-angle position under the condition where the infinite object point is in focus, fw is a focal length of an entire system at the wide-angle position of the zoom lens, and fT is a focal length of an entire system at the telephoto position of the zoom lens.

14. A zoom lens according to claim 6, wherein the third lens unit comprises two positive lens elements and one negative lens element and the negative lens element is cemented to at least one of the positive lens elements.

15. A zoom lens according to claim 14, wherein the third lens unit comprises, in order from the object side, one of the positive lens elements that is a single lens and a cemented lens component composed of another of the positive lens elements and the negative lens element.

16. A zoom lens according to claim 15, satisfying the following condition:

$$0.4 < R_{C3}/R_{C1} < 0.85$$

where $R_{C3}$ is a radius of curvature, on the optical axis, of a most image-side surface of the cemented lens component in the third lens unit and $R_{C1}$ is a radius of curvature, on the optical axis, of a most object-side surface of the cemented lens component in the third lens unit.

17. A zoom lens according to claim 14, wherein the third lens unit comprises, in order from the object side, a cemented lens component composed of one of the positive lens elements and the negative lens element, and another of the positive lens elements that is a single lens.

18. A zoom lens according to claim 17, satisfying the following condition:

$$0.8 < R_{C3}/R_{C1} < 1.3$$

where $R_{C3}$ is a radius of curvature, on the optical axis, of a most image-side surface of the cemented lens component in the third lens unit and $R_{C1}$ is a radius of curvature, on the optical axis, of a most object-side surface of the cemented lens component in the third lens unit.

19. A zoom lens according to claim 6, wherein the second lens unit comprises, in order from the object side, a negative lens element and a positive lens element.

20. A zoom lens according to claim 6, wherein the second lens unit comprises, in order from the object side, a cemented lens component composed of a negative lens element and a positive lens element.

21. A zoom lens according to claim 20, satisfying the following condition:

$$-1.5 < (R_{2F}+R_{2R})/(R_{2F}-R_{2R}) < 0.8$$

where $R_{2F}$ is a radius of curvature, on the optical axis, of a most object-side surface of the second lens unit (the cemented lens component) and $R_{2R}$ is a radius of curvature, on the optical axis, of a most image-side surface of the second lens unit (the cemented lens component).

22. A zoom lens according to claim 6, wherein the most object-side lens unit comprises, in order from the object side, a negative lens component, the reflective optical component having the reflecting surface for bending the optical path, and a positive lens component, and satisfies the following conditions:

$$1.0 < -f11/\sqrt{(fw \cdot fT)} < 2.5$$

$$1.4 < f12/\sqrt{(fw \cdot fT)} < 3.2$$

where f11 is a focal length of the negative lens component in the most object-side lens unit, f12 is a focal length of the positive lens component in the most object-side lens unit, fw is a focal length of an entire system at a wide-angle position of the zoom lens, and fT is a focal length of an entire system at a telephoto position of the zoom lens.

23. A zoom lens according to claim 22, wherein the negative lens component of the most object-side lens unit is constructed with a single negative lens and satisfies the following conditions:

$$26 < v1N$$

$$-0.15 < \sqrt{(fw \cdot fT)}/f1 < 0.5$$

where v1N is an Abbe's number, at the d line, of a medium of the single negative lens of the most object-side lens unit and f1 is a focal length of the most object-side lens unit.

24. A zoom lens according to claim 1 or 6, wherein the most object-side lens unit comprises, in order from the object side, a single negative lens, a reflective optical component, and a single positive lens.

25. A zoom lens according to claim 1 or 6, satisfying the following condition:

$$1.8 < fT/fw$$

where fT is a focal length of an entire system at the telephoto position of the zoom lens and fw is a focal length of an entire system at the wide-angle position of the zoom lens.

26. An electronic imaging device comprising:
a zoom lens; and
an electronic image sensor located on an image side of the zoom lens,
the zoom lens comprising:
a most object-side lens unit located at a most object-side position, remaining fixed on an optical axis when a magnification of the zoom lens is changed and a focusing operation is performed;
a most image-side lens unit located at a most image-side position, remaining fixed on the optical axis when the focusing operation is performed; and
moving lens units lying between the most object-side lens unit and the most image-side lens unit, moved along the optical axis when the magnification is changed,
the most object-side lens unit comprising, in order from an object side, a negative lens component, a reflective optical component having a reflecting surface for bending an optical path, and a positive lens component, and
the most image-side lens unit having at least one aspherical surface.

27. An electronic imaging device according to claim 26, wherein a field angle at a wide-angle position in the electronic imaging device is 55° or more.

28. An electronic imaging device according to claim 27, wherein the field angle at the wide-angle position in the electronic imaging device is 80° or more.

29. An electronic imaging device according to claim 26, satisfying the following condition:

$$F \geq a/(1 \text{ μm})$$

where a is a horizontal pixel pitch of the electronic image sensor and F is an open F value at a wide-angle position of the zoom lens.

30. An electronic imaging device according to claim 29, wherein an inside diameter of an aperture stop determining the open F value is constant, and a lens with a convex surface directed toward the aperture stop is placed immediately before or behind the aperture stop so that a point of intersection of a perpendicular line drawn to the optical axis from the aperture stop with the optical axis is located 0.5 mm or less from an interior of the lens or a vertex of the convex surface.

31. An electronic imaging device according to claim 30, wherein the point of intersection lies in the interior of the lens or before the vertex.

32. An electronic imaging device according to claim 29, wherein variable transmittance means is provided to adjust an amount of light introduced into the electronic image sensor by changing a transmittance and is placed on an optical path of space different from space in which an aperture stop is placed.

33. An electronic imaging device according to claim 29, wherein a shutter is provided to adjust light-receiving time of a light beam introduced into the electronic image sensor and is placed on an optical path of space different from space in which an aperture stop is placed.

34. An electronic imaging device according to claim 29, wherein a low-pass filter is not placed on an optical path from an entrance surface of an optical system to an imaging plane.

35. An electronic imaging device comprising:
a zoom lens; and
an electronic image sensor located on an image side of the zoom lens,
the zoom lens comprising:
a most object-side lens unit located at a most object-side position, remaining fixed on an optical axis when a magnification of the zoom lens is changed and a focusing operation is performed;
a most image-side lens unit located at a most image-side position, remaining fixed on the optical axis when the focusing operation is performed; and
moving lens units lying between the most object-side lens unit and the most image-side lens unit, moved along the optical axis when the magnification is changed,
the most object-side lens unit comprising, in order from an object side, a negative lens component, a reflective optical component having a reflecting surface for bending an optical path, and a positive lens component, and
the most image-side lens unit having at least one aspherical surface,
wherein the zoom lens satisfies the following conditions:

$$1.0 < -f11/\sqrt{fw \cdot fT} < 2.5$$

$$1.4 < f12/\sqrt{fw \cdot fT} < 3.2$$

where f11 is a focal length of the negative lens component in the most object-side lens unit, f12 is a focal length of the positive lens component in the most object-side lens unit, fw is a focal length of an entire system at a wide-angle position of the zoom lens and fT is a focal length of an entire system at a telephoto position of the zoom lens, and
wherein the zoom lens further satisfies the following condition:

$$0.7 < d/L < 2.0$$

where d is an air-equivalent length measured along the optical axis from an image-side vertex of the negative lens component to an object-side vertex of the positive lens component in the most object-side lens unit, and L is a diagonal length of an effective imaging area of the electronic image sensor.

36. An electronic image device according to claim 35, wherein the reflective optical component is a prism and satisfies the following condition:

$$1.55 < npri$$

where npri is a refractive index of a medium of the reflective optical component at the d line.

37. An electronic imaging device comprising:
a zoom lens; and
an electronic image sensor located on an image side of the zoom lens,
the zoom lens comprising, in order from an object side:
a first lens unit having a reflective optical component with a reflecting surface for bending an optical path, constructed as a most object-side lens unit remaining fixed when a magnification is changed;
a second lens unit with negative refracting power, constructed as a first moving lens unit moved along an optical axis when the magnification is changed;
a third lens unit with positive refracting power, constructed as a second moving lens unit moved along the optical axis when the magnification is changed; and
a most image-side lens unit located at a most image-side position,
the second lens unit being moved back and forth along the optical axis to follow a path convex toward an image side when the magnification is changed from a wide-angle position to a telephoto position,
wherein the third lens unit comprises two positive lens elements and one negative lens element and the negative lens element is cemented to at least one of the positive lens elements,
wherein the third lens unit comprises, in order from the object side, one of the positive lens elements that is a single lens and a cemented lens component composed of another of the positive lens elements and the negative lens element, and
wherein the zoom lens satisfies the following conditions:

$$-0.3 < L/R_{C2} < 1.0$$

$$15 < \nu_{CP} - \nu_{CN}$$

where L is a diagonal length (mm) of the electronic image sensor, $R_{C2}$ is a radius of curvature, on the optical axis, of an interface of the cemented lens component in the third lens unit, $\nu_{CP}$ is an Abbe's number of a medium of the positive lens element of the cemented lens component in the third lens unit, and $\nu_{CN}$ is an Abbe's number of a medium of the negative lens element of the cemented lens component in the third lens unit.

38. An electronic imaging device comprising:
a zoom lens; and
an electronic image sensor located on an image side of the zoom lens,
the zoom lens comprising, in order from an object side:
a first lens unit having a reflective optical component with a reflecting surface for bending an optical path, constructed as a most object-side lens unit remaining fixed when a magnification is changed;
a second lens unit with negative refracting power, constructed as a first moving lens unit moved along an optical axis when the magnification is changed;
a third lens unit with positive refracting power, constructed as a second moving lens unit moved along the optical axis when the magnification is changed; and
a most image-side lens unit located at a most image-side position,
the second lens unit being moved back and forth along the optical axis to follow a path convex toward an image side when the magnification is changed, from a wide-angle position to a telephoto position,
wherein the third lens unit comprises two positive lens elements and one negative lens element and the negative lens element is cemented to at least one of the positive lens elements,
wherein the third lens unit comprises, in order from the object side, a cemented lens component composed of one of the positive lens elements and the negative lens element, and another of the positive lens elements that is a single lens, and
wherein the zoom lens satisfying the following conditions:

$$-0.1 < L/R_{C2} < 0.8$$

$$15 < \nu_{CP} - \nu_{CN}$$

where L is a diagonal length (mm) of the electronic image sensor, $R_{C2}$ is a radius of curvature, on the optical axis, of an interface of the cemented lens component in the third lens unit, $v_{CP}$ is an Abbe's number of a medium of the positive lens element of the cemented lens component in the third lens unit, and $v_{CN}$ is an Abbe's number of a medium of the negative lens element of the cemented lens component in the third lens unit.

39. A zoom lens comprising:
   a most object-side lens unit located at a most object-side position, remaining fixed when a magnification of the zoom lens is changed;
   a most image-side lens unit located at a most image-side position, remaining fixed when the magnification is changed; and
   a first moving lens unit with negative refracting power and a second moving lens unit with positive refracting power, lying between the most object-side lens unit and the most image-side lens unit, moved along an optical axis when the magnification is changed,
   the most object-side lens unit comprising a reflective optical component having a reflecting surface for bending an optical path,
   wherein the first moving lens unit is moved along a path convex toward an image side when the magnification is changed from a wide-angle position to a telephoto position.

40. A zoom lens according to claim 39, wherein the most object-side lens unit comprises, in order from an object side, a negative lens component, the reflective optical component having the reflecting surface for bending the optical path, and a positive lens component.

41. A zoom lens according to claim 39, wherein a stop that is moved in a magnification change is placed on an object side of the second moving lens unit.

42. A zoom lens according to claim 39, wherein the most image-side lens unit comprises a single lens element with positive refracting power.

43. A zoom lens comprising:
   a most object-side lens unit located at a most object-side position, remaining fixed on an optical axis when a magnification of the zoom lens is changed;
   a first moving lens unit with negative refracting power, lying across air spacing from the most object-side lens unit, moved along the optical axis when the magnification is changed;
   a second moving lens unit with positive refracting power, moved toward an object side in such a manner that spacing between the first moving lens unit and the second moving lens unit is narrowed when the magnification is changed from a wide-angle position to a telephoto position, and
   a most image-side lens unit, spacing between the second moving lens unit and the most image-side lens unit being varied when the magnification is changed,
   the most object-side lens unit comprising, in order from the object side, a negative lens element, a refractive optical element having a reflecting surface for bending an optical path, and a positive lens element,
   the first moving lens unit comprising a negative lens element and a positive lens element,
   the second moving lens unit comprising three lens elements,
   the most image-side lens unit comprising a single lens element or a cemented lens component, and
   a stop being provided and moved together with the second moving lens unit when the magnification is changed.

44. A zoom lens according to claim 43, wherein the first moving lens unit is moved along a path convex toward an image side when the magnification is changed from a wide-angle position to a telephoto position.

45. A zoom lens according to claim 43, wherein the most image-side lens unit remains fixed when the magnification is changed.

46. A zoom lens according to claim 39 or 43, wherein the most object-side lens unit has positive refracting power.

47. A zoom lens according to claim 39 or 43, wherein the second moving lens unit comprises a single positive lens element and a cemented lens component composed of a positive lens element and a negative lens element.

48. A zoom lens comprising, in order from an object side:
   a first lens unit including a positive lens component, constructed as a most object-side lens unit remaining fixed when a magnification is changed;
   a second lens unit with negative refracting power, constructed as a first moving lens unit moved along an optical axis when the magnification is changed;
   a third lens unit with positive refracting power, constructed as a second moving lens unit moved along the optical axis when the magnification is changed; and
   a most image-side lens unit located at a most image-side position,
   the first lens unit comprising, in order from the object side, a negative lens component and a front surface mirror having a reflecting surface for bending an optical path, and
   the reflecting surface being deformable,
   wherein when the magnification is changed from a wide-angle position to a telephoto position under a condition where an infinite object point is in focus, the second lens unit is moved back and forth along an optical axis to follow a path convex toward an image side.

49. A zoom lens according to claim 48, wherein a profile of the reflecting surface is changed and thereby a focusing operation is performed.

50. A zoom lens according to claim 48, wherein the reflecting surface is constructed with a thin film with which a metal or dielectric is coated; the thin film is connected to a power source through a plurality of electrodes and variable resistors; an arithmetical unit controlling resistance values of the variable resistors is provided; and a distribution of electrostatic forces applied to the thin film is controlled and thereby a profile of the reflecting surface can be changed.

51. A zoom lens comprising:
   a most object-side lens unit located at a most object-side position, remaining fixed when a magnification of the zoom lens is changed;
   a most image-side lens unit located at a most image-side position, remaining fixed when the magnification is changed; and
   a first moving lens unit with negative refracting power and a second moving lens unit with positive refracting power, lying between the most object-side lens unit and the most image-side lens unit, moved along an optical axis when the magnification is changed,
   the most object-side lens unit comprising a reflective optical component having a reflecting surface for bending an optical path,
   wherein the second moving lens unit comprises a single positive lens element and a cemented lens component composed of a positive lens element and a negative lens element.

52. A zoom lens according to claim 51, wherein the most object-side lens unit comprises, in order from an object side, a negative lens component, the reflective optical component having the reflecting surface for bending the optical path, and a positive lens component.

53. A zoom lens according to claim 51, wherein a stop that is moved in a magnification change is placed on an object side of the second moving lens unit.

54. A zoom lens according to claim 51, wherein the most object-side lens unit has positive refracting power.

55. A zoom lens according to claim 51, wherein the most image-side lens unit comprises a single lens element with positive refracting power.

* * * * *

UNITED STATES PATENT AND TRADEMARK OFFICE
CERTIFICATE OF CORRECTION

PATENT NO. : 7,085,070 B2  
APPLICATION NO. : 10/429043  
DATED : August 1, 2006  
INVENTOR(S) : S. Mihara Page 1 of 1

It is certified that error appears in the above-identified patent and that said Letters Patent is hereby corrected as shown below:

In the Claims

Column 75, line 26, change "$1.4 < -f12 / \sqrt{(fw \cdot fT)} < 3.2$" to -- $1.4 < f12 / \sqrt{(fw \cdot fT)} < 3.2$ --;

Column 75, line 40, change "$-0.15 < \sqrt{(fw \cdot fT)} < 0.5$" to -- $-0.15 < \sqrt{(fw \cdot fT)} / f1 < 0.5$ --;

Column 76, line 26, change "$1.0 < |fF| / \sqrt{(fw \cdot fT} < 6.0$" to -- $1.0 < |fF| / \sqrt{(fw \cdot fT)} < 6.0$ --;

Column 76, line 48, change "$0.8 < fRw / \sqrt{(fw \cdot fT} < 1.8$" to -- $0.8 < fRw / \sqrt{(fw \cdot fT)} < 1.8$ --;

Column 78, line 42, change "$F \geq =a / (1\ \mu m)$" to -- $F \geq a / (1\mu m)$ --;

Column 79, line 29, change "$1.0 < -f11 / \sqrt{(fw \cdot fT} < 2.5$" to -- $1.0 < -f11 / \sqrt{(fw \cdot fT)} < 2.5$ --;

and

Column 79, line 30, change "$1.4 < f12 / \sqrt{(fw \cdot fT} < 3.2$" to -- $1.4 < f12 / \sqrt{(fw \cdot fT)} < 3.2$ --.

Signed and Sealed this  
Third Day of June, 2014

Michelle K. Lee  
*Deputy Director of the United States Patent and Trademark Office*